US006973517B1

(12) United States Patent
Golden et al.

(10) Patent No.: US 6,973,517 B1
(45) **Date of Patent: *Dec. 6, 2005**

(54) PARTITION FORMATION USING MICROPROCESSORS IN A MULTIPROCESSOR COMPUTER SYSTEM

(75) Inventors: David Golden, Woonsocket, RI (US); Dennis Mazur, Worcester, MA (US); Richard Edward Bracken, Boston, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 791 days.

This patent is subject to a terminal disclaimer.

(21) Appl. No.: 09/652,458

(22) Filed: Aug. 31, 2000

(51) Int. Cl.[7] ................................................ G06F 13/00
(52) U.S. Cl. ........................................ 710/104; 710/302
(58) Field of Search .............................. 712/13, 20, 23, 712/203

(56) References Cited

U.S. PATENT DOCUMENTS 5,068,780 A 11/1991 Bruckert et al.
5,099,485 A 3/1992 Bruckert et al.
5,255,367 A 10/1993 Bruckert et al.
5,815,723 A * 9/1998 Wilkinson et al. ............ 712/20
5,842,031 A * 11/1998 Barker et al. ................. 712/23
5,878,241 A * 3/1999 Wilkinson et al. .......... 712/203
5,963,745 A * 10/1999 Collins et al. ................ 712/13
6,247,109 B1 6/2001 Kleinsorge et al.
6,678,840 B1 1/2004 Kessler et al.
6,681,282 B1 1/2004 Golden et al.
6,684,343 B1 1/2004 Bouchier et al.

* cited by examiner

*Primary Examiner*—John Follansbee
*Assistant Examiner*—Dustin Nguyen

(57) ABSTRACT

The invention is a control system using microprocessors which communicate through a Local Area Network (private LAN) to control operation of both processors and input and output subsystems (IO system) of a multiprocessor computer system. The processors each have memory associated therewith, and each processor has an IO system comprising a plurality of busses such as PCI busses, associated therewith. The processors are cabled together in a mesh arrangement so that messages can be transferred between any of the processors and delivered to memory associated with the destination processor, or delivered to an IO system associated with the destination processor, etc. The microprocessors are powered on when power is applied to the chassis of the multiprocessor system, and the microprocessors then control the processors of the multiprocessor system, including applying power to the processors, forming hard partitions containing selected processors, computing routes from a processor to a memory associated with any processor for read and write transactions, computing routes to IO subsystems associated with any processor of the hard partition, forming partition boundaries so that processors in one hard partition cannot read and write to memory or IO systems associated with processors in another hard partition, forming soft partitions of processors, controlling boot-up of operating systems executing on the processors of the multiprocessor computer system, removing power from a failed processor, providing power to a repaired processor, etc.

10 Claims, 124 Drawing Sheets

| COMMAND | DESCRIPTION |
|---|---|
| CONNECT | CONNECT A VIRTUAL CONSOLE SESSION TO AN SRM FIRMWARE INSTANCE |
| DISCONNECT | DISCONNECT A VIRTUAL CONSOLE SESSION FROM AN SRM FIRMWARE INSTANCE |
| POWER {OFF,ON} ITEM | CHANGE THE POWER STATE OF AN ITEM (CPU, 8P UNIT, I/O DRAWER) |
| HALT PROCESSOR | ISSUE A HALT TO AN EV7 PROCESSOR (SPECIFIED BY PROCESSOR ID) |
| RESET [PARTITION] | ISSUE A SYSTEM RESET OR A RESET TO THE SPECIFIED PARTITION |
| RESET PROCESSOR | ISSUE A RESET TO AN EV7 PROCESSOR (SPECIFIED BY PROCESSOR ID) |
| RESET {CMM, MBM PBM} | ISSUE A RESET TO ONE OF THE SERVER MANAGEMENT PROCESSORS |
| SET MANUFACTURING | SET SERIAL NUMBER, OTHER FRU DATA |
| SET PARTITION | DEFINE THE NUMBER OF PARTITIONS, ASSIGN PARTITIONABLE RESOURCES TO EACH PARTITION, DEFINE THE PARTITION PERMISSIONS. |
| SHOW CONFIG | SHOW THE ENTIRE SYSTEM CONFIGURATION |
| SHOW CPU {PROCESSOR} | SHOW DATA ON AN EV7 CPU (SPECIFIED BY PROCESSOR ID) OR ALL CPUs |
| SHOW LAN | SHOW THE NODES ON THE SERVER MANAGEMENT LAN |
| SHOW MEMORY | SHOW INFORMATION ON MEMORY CONFIGURATION |
| SHOW PARTITIONS | SHOW THE DEFINED PARTITION DATA |
| SHOW FRU | SHOW THE FLU DATA FOR THE SYSTEM FRUs |
| SHOW POWER | SHOW THE THERMAL AND VOLTAGE SENSOR DATA |
| SHOW ERROR | SHOW THE NON-VOLATILE SAVED ERROR STATE |
| CLEAR ERROR | CLEAR THE NON-VOLATILE SAVED ERROR STATE |
| UPDATE | UPDATE SYSTEM FIRMWARE |
| DATE | SET / SHOW THE SERVER MANAGEMENT TIME |
| EXAMINE / DEPOSIT | DISPLAY / MODIFY MEMORY |
| TEST PROCESSOR n | RUN THE TEST IDENTIFIED BY n ON THE SPECIFIED PROCESSOR ID |
| SET TEST SIGNAL PROCESSOR n | ASSERT CABLE TEST SIGNAL FOR PORT n (N, S, E, W, I/O) ON THE SPECIFIED PROCESSOR ID AND LIGHT THE CABLE LED. |
| CLEAR TEST SIGNAL PROCESSOR n | DE-ASSERT CABLE TEST SIGNAL FOR PORT n (N, S, E, W, I/O) ON THE SPECIFIED PROCESSOR ID AND EXTINGUISH THE CABLE LED. |
| CHECK TEST SIGNAL PROCESSOR n | TEST CABLE TEST SIGNAL FOR PORT n (N, S, E, W, I/O) ON THE SPECIFIED PROCESSOR ID. |

EXTERNAL SERVER MANAGEMENT COMMANDS

FIG. 11

| COMMAND | DESCRIPTION |
|---|---|
| PutChart | SEND A CHARACTER TO THE OPERATOR DISPLAY |
| GetChar | GET CHARACTER FROM THE OPERATOR KEYBOARD |
| SetTermInt | SET OPERATOR TERMINAL INTERRUPT SETTING |
| HELLO | ANNOUNCE THE PRESENT OF SERVER MANAGEMENT MEMBER |
| POLL | PROBE FOR THE PRESENCE OF A SPECIFIC SERVER MANAGEMENT MEMBER |
| NO-OP | NO OPERATION, USED FOR TESTING |
| SysError DATA | SYSTEM ERROR STATE INFORMATION TO BE SAVED |
| FRUError ID, DATA | STORE FRU ERROR DATA IN THE FRU SPECIFIED BY ID |

INTERNAL SERVER MANAGEMENT COMMANDS

FIG. 12

| CELL | DESCRIPTION |
|---|---|
| SECONDS | SECOND COUNT, 0-59, BINARY FORMAT |
| MINUTES | MINUTE COUNT, 0-59, BINARY FORMAT |
| HOURS | HOUR COUNT, 0-23, BINARY FORMAT |
| DAY | DAY OF THE MONTH, 1-31, BINARY FORMAT |
| MONTH | MONTH OF THE YEAR, 1-12, BINARY FORMAT |
| YEAR | YEAR, 0-99, BINARY FORMAT |

BB_WATCH DATA

FIG. 13

| MESSAGE | DESCRIPTION |
|---|---|
| CSB_READ | READ DATA ELEMENT FROM THE PMB |
| CSB_WRIT E | WRITE DATA ELEMENTS TO THE PMB |
| CSB_POLL | OBTAIN PMB STATUS |

CSB MESSAGES

FIG. 14

SERVER MANAGEMENT HARDWARE OVERVIEW

32P MARVEL SYSTEM 2M RACK

RACK AND BOX THUMBWHEEL SCHEME

| TASK | HOW MANY | WHERE |
|---|---|---|
| GROUP LEADER | 1 PER MARVEL SYSTEM[1] | LOWEST MBM IN GROUP |
| PMU SERVER | 1 PER MARVEL SYSTEM[1] | LOWEST MBM IN GROUP |
| PARTITION COORDINATOR | 1 PER HARD PARTITION; MAX 8 PER MBM | MBM WITH LOWEST EV7 IN HARD PARTITION |
| TELNET SERVER | 2 PER SUBPARTITION (COM 0, COM 1) | GRANDPARENT MBM OF PRIMARY EV7 |
| DHCP | 1 PER MARVEL SYSTEM[1] | LOWEST MBM IN GROUP |

MBM TASK ATTRIBUTES

FIG. 18

MBM FIRMWARE OVERVIEW

| GENERAL PHASE | GROUP CHANGES | SPECIFIC STEPS | NOTES |
|---|---|---|---|
| INDEPENDENT PROCESSING | UNAFFECTED | POST | |
| | | H/W POLL STATUS AND STATE | HANDLE MBM HOT SWAP. POWER THAT IS ON IS LEFT ON, POWER THAT IS OFF IS LEFT OFF |
| GROUP FORMATION MAJORITY/ MINORITY REPLICATED DATA SYNC | NORMAL GROUP PROCESSING, NEW GROUP IS FORMED | NEW GROUP IS INITIATED. A GROUP FORMS AND A LEADER IS SELECTED | |
| | | IF THERE WAS NOT A PREVIOUS MAJORITY GROUP, THEN THE REPLICATED DATABASE IS MARKED INVALID. | |
| | | IF THE NEW GROUP IS A MINORITY, MARK THE DATABASE READ-ONLY. | |
| | | IF THE NEW GROUP IS MAJORITY, REQUEST THE DATABASE AND ANY PENDING UPDATES FROM ALL MEMBERS WHO WERE PREVIOUSLY JOINED TO THE MaxPrevMajorityGroup | |
| | | APPLY THE LONGEST LIST OF UPDATES TO THE CORRESPONDING DATABASE COPY AND SEND THE NEW INITIAL REPLICATED DATABASE TO ALL MEMBERS. ALL MEMBERS MARK THE DATABASE AS VALID | |
| | | IF THE NEW GROUP IS A MAJORITY AND THERE WAS NO PREVIOUS MAJORITY GROUP, THEN CLEAR THE powerup_complete FLAG. | |
| | | IF THE NEW GROUP IS A MAJORITY AND THE powerup_complete FLAG IS SET, THEN PROCEED TO THE HARDWARE INIT PHASE. ELSE, PROCEED TO THE OPERATIONAL PHASE. | MINORITY GROUPS REMAIN IN THIS PHASE |
| HARDWARE INIT | RETURN TO FORMING A NEW GROUP AND RERUN INIT | POLL CMMs TO DETERMINE CPU MODULE POPULATION DETAILS WITHIN EACH 8P BACKPLANE. THIS INITIALIZES THE LIST OF AVAILABLE RESOURCES. | |
| | | THE LEADER COMPUTES A ROUTABLE CONFIGURATION FOR EACH PARTITION BASED UPON THE REQUESTED AND AVAILABLE CPU RESOURCES | |

MARVEL SYSTEM POWERUP FLOW WITH GROUP RELATIONSHIP (PART 1)

FIG. 21A

| GENERAL PHASE | GROUP CHANGES | SPECIFIC STEPS | NOTES |
|---|---|---|---|
| HARDWARE INIT | RETURN TO FORMING A NEW GROUP AND RERUN INIT | THE LEADER DECIDES TO POWER UP THE PARTITIONS. IT COMMANDS ALL MBMs, PBMs, AND CMMs TO POWER UP. UPON COMPLETION, THE LEADER OBTAINS THE RESULTS FROM EACH OF THESE COMMANDS AND ADJUSTS THE LIST OF AVAILABLE RESOURCES ACCORDINGLY. | |
| | | THE PARTITION COORDINATORS START XSROM TESTING ON ALL CPUs FOR MEMORY. | |
| | | THE PMU SERVER INITIATE IP CABLE TESTING BETWEEN 8P BACKPLANES AND I/O CRATES. THE RESULTS ARE USED TO RECALCULATE ROUTING AND ASSIGN I/O TO PARTITIONS. | |
| | | THE PARTITION COORDINATORS INITIATE XSROM TESTS FOR I/O AND ROUTING. THE RESULTS ARE USED TO RECALCULATE ROUTING AND ADJUST THE LIST OF I/O RESOURCES. | |
| | | THE PARTITION COORDINATORS INITIATE REMOTE MEMORY TESTING BETWEEN CPUs IN THE SAME PARTITIONS. | |
| | | THE PARTITION COORDINATORS INITIATE INTERRUPT TESTING BETWEEN CPUs IN THE SAME PARTITIONS. | |
| | | THE LEADER SETS THE powerup_complete FLAG TO TRUE AND PROCEEDS TO THE S/W LOAD PHASE. | |
| S/W LOAD (SRM+O/S) | NEW GROUPS ARE TREATED AS HOT-ADDS | THE PARTITION COORDINATORS ELECT A PRIMARY EV7 IN EACH PARTITION. THEY COMMAND ALL SECONDARIES TO SPINE ON RBOX_SCRATCH AND INITIATE LOADING OF THE SRM FIRMWARE ON THE PRIMARY. | |
| | | THE SRM FIRMWARE COMMANDS THE SECONDARY CPUs TO JOIN BY WRITING RBOX_SCRATCH. THE PRIMARY EV7 COMPLETES ALL I/O INITIALIZATION. | |
| | | IF THE SRM auto_action ENVIRONMENT VARIABLE IS SET TO BOOT, THE OPERATING SYSTEM BOOT IS ATTEMPTED ON THE PARTITION. | |
| OPERATIONAL | NEW GROUPS ARE TREATED AS HOT-ADDS | SERVER MANAGEMENT REQUESTS FROM THE PRIMARY EV7 IN EACH PARTITION ARE HANDLED BY THE CMMs/MBMs/PBMs. IF A NEW GROUP HAS CAUSED A CHANGE IN THE CPU, MEMORY, OR I/O RESOURCES, NOTIFY THE PRIMARY EV7 IN EACH AFFECTED PARTITION. | |
| | | IF A NEW RESOURCE HAS BEEN PRE-ALLOCATED TO A PARTITION, THEN THE PARTITION COORDINATOR TAKES THE STEPS NECESSARY TO PROBE THE IP OR IO LINKS TO THE NEW RESOURCE (CPU OR I/O DRAWER). | |

MARVEL SYSTEM POWERUP FLOW WITH GROUP RELATIONSHIP (PART 2)

FIG. 21B

| CAPABILITY | VIA PRIVATE LAN | VIA FPGA |
|---|---|---|
| VIRTUAL CONSOLE TERMINAL ACCESS | YES | NO |
| FIRMWARE UPDATES | YES | NO |
| LOAD/DISABLE TEST FIRMWARE | YES | NO |
| LIVE CONFIGURATION CHANGE [1] | NO | YES |
| WRITING SRM ENVIRONMENT VARS [2] | NO | YES |
| UNSOLICITED NOTIFICATION OF ALERTS | YES | NO |
| STORE PCI SLOT INFORMATION [2] | NO | YES |
| ALL OTHERS | YES | YES |

LAN VS FPGA PMU CAPABILITY MATRIX

FIG. 22

PMU SERVER BLOCK DIAGRAM

| COMMAND GROUP | COMMANDS RECEIVED | CLASS | PMU SERVER HANDLING METHOD |
|---|---|---|---|
| SYSTEM DISCOVERY | GET MBM/PBM CONFIGURATION | FORWARD | COMMANDS ARE FORWARDED TO THE MBM OR PBM ADDRESSED IN THE MESSAGE HEADER. RESPONSES ARE FORWARDED BACK TO THE PMU |
| | GET PCI SLOT INFO | | |
| | GET PARTITION DATABASE | DIRECT | THE PMU SERVER DERIVES THE RESPONSE FROM HIS LOCAL COPY OF THE PARTITION DATABASE |
| | GET OWN PARTITION NUMBER | | |
| | GET SYSTEM TOPOLOGY | DIRECT | THE PMU SERVER KEEPS TRACK OF THE APPLICATIONS MAKING THIS MULTI PHASE REQUEST UNTIL THE LAST ENTITY HAS BEEN REQUESTED. THE ENTITY NUMBER IN THE REQUEST IS USED TO INDEX INTO A LIST COMPOSED OF THE COMBINATION OF GROUP MEMBERS AND PARTITION DATABASE. THE IP ADDRESS, PARENT RELATIONSHIP AND PARTITION NUMBER IS DERIVED FROM THESE VALUES FOUND IN NVRAM. IF THE GROUP MEMBERS OR PARTITION DATABASE CHANGES BEFORE THE LAST ENTITY IS REQUESTED, AN ERROR RESPONSE IS RETURNED ON THE NEXT REQUEST. |
| | SET PCI SLOT INFO | FORWARD | THE PMU SERVER MUST ENSURE THAT THIS REQUEST IS COMING FROM AN EV7 AND NOT FROM THE PMU ON THE LAN. THESE PACKETS ARE DIRECTED TO THE PBM ASSOCIATED WITH THE SLOT. |
| PARTITION CONTROL | ALL COMMANDS OF GROUP | FORWARD | ALL COMMANDS IN THIS GROUP THAT CONTAIN A PARTITION NUMBER ARE FORWARDED TO THE MBM RUNNING THE APPROPRIATE PARTITION COORDINATOR. THE EXCEPTIONS ARE READ STATE OF OCP SWITCHES, OCP SWITCH ASSIGNMENT AND POWER ON/OFF COMMANDS THAT ARE SIMPLY FORWARDED TO THEIR DESTINATION. |
| EV7 SETUP | REQUEST EV7 START TEST | FORWARD | THIS COMMAND IS FORWARDED TO THE DESTINATION EV7 |

PMU SERVER RECEIVED COMMAND HANDLING

FIG. 24A

| COMMAND GROUP | COMMANDS RECEIVED | CLASS | PMU SERVER HANDLING METHOD |
|---|---|---|---|
| CABLE TEST GROUP | GET CABLING CONFIGURATION | DIRECT | THE PMU SERVER RESPONDS WITH THE CONTENTS OF THE CABLE DATABASE THAT HE COMPOSED DURING INITIALIZATION OR WAS REQUESTED VIA RECONFIGURE CABLING. |
| | RETEST CABLE CONFIGURATION | COMPLEX | THE PMU SERVER RE-INITIATES THE TEST OF ALL IP AND IO CABLING MAKING USE OF THE COMMANDS GET MBM IP CABLING AND GET PBM IP CABLING. |
| | SET CABLE TEST SIGNAL<br>GET CABLE TEST SIGNAL | COMPLEX | THE PMU SERVER ENSURES THAT THERE ARE NO OTHER ON-GOING CABLING REQUESTS AND FORWARDS THESE COMMANDS TO THE PBM OR MBM IN THE DESTINATION FIELD AND RETURNS THE RESPONSE TO THE PMU. |
| VIRTUAL CONSOLE | GET TELNET IP ADDRESS/PORT | DIRECT | PMU SERVER DETERMINES THE PRIMARY MBM's IP ADDRESS AND THE SOCKET PORT. |
| FIRMWARE LOAD AND UPGRADE, ENVIRON-MENTAL RETRIEVAL, FRU DATA, ERROR LOGGING, MISCEL-LANEOUS | | FORWARD | ALL COMMANDS IN THESE GROUPS ARE FORWARDED TO THE CMM, PBM OR MBM IN THE DESTINATION FIELD AND THE RESPONSE RETURNED TO THE PMU. |
| DATA/TIME | | FORWARD DIRECT | THE PMU SERVER ALLOWS BASE TIME GETS AND SETS FROM ALL PMUs BUT DELTA TIME SETS AND GETS CAN ONLY COME FROM PARTITION PRIMARY EV7s. THE REQUESTS ARE FORWARDED TO THE MBM BEING ADDRESSED. |
| MISCEL-LANEOUS | GET/SET KNOB READ/WRITE BLOCK DATA | FORWARD | THESE REQUESTS ARE FORWARDED TO THE DESTINATION FOR PROCESSING. |

PMU SERVER RECEIVED COMMAND HANDLING

FIG. 24B

| COMMAND GROUP | COMMANDS RECEIVED | PMU SERVER HANDLING METHOD |
|---|---|---|
| SYSTEM DISCOVERY | GET MBM/PBM CONFIGURATION | |
| | GET PARTITION DATABASE | |
| CABLE TESTING | SEND CABLE ID<br>RECEIVE CABLE ID<br>GET MBM IP CABLING<br>GET PBM IP CABLING | THESE COMMANDS ARE ISSUED IN RESPONSE TO A RETEST CABLE CONFIGURATION REQUEST. THE PROCESS IS DISCUSSED IN SECTION ERROR! REFERENCE SOURCE NOT FOUND., ERROR! REFERENCE SOURCE NOT FOUND. |
| ERROR LOGGING GROUP | ERROR REPORTING | THE PMU SERVER KNOWS THE IP ADDRESS OF CLIENT PMUs AND DISTRIBUTES THE ALERTS TO EACH PMU. |
| MISCEL-LANEOUS | DISTRIBUTE DHCP LEASE DATA | THE DHCP SERVER RUNS ON THE PMU SERVER AND KEEPS TRACK OF THE DHCP CLIENTS. FOR FAILOVER PURPOSES, THIS DATA IS REPLICATED ON ALL NODES. SEE SECTION ERROR! REFERENCE SOURCE NOT FOUND. ERROR! BOOKMARK NOT DEFINED.. |

PMU SERVER ORIGINATING COMMANDS

FIG. 25

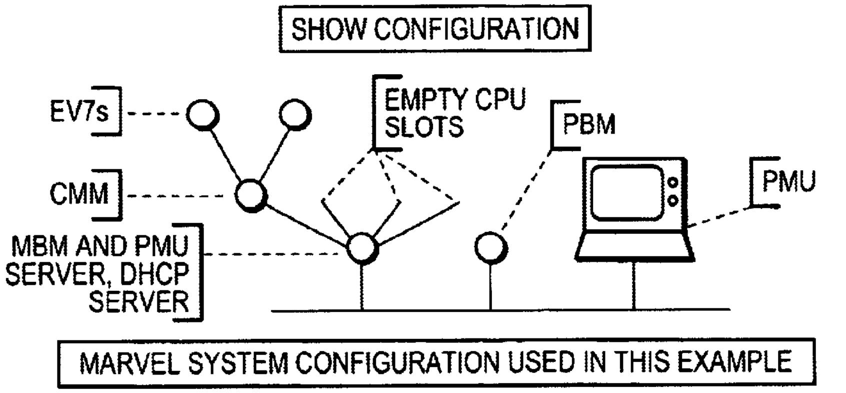

FIG. 26

| | | | | | | |
|---|---|---|---|---|---|---|
| PMU | MBM PMU SERVER DHCP SERVER | CMM | EV70 | EV71 | PBM | THE PMUs PC CONNECTS TO THE LAN AND REQUESTS AN IP ADDRESS |
| PMU | MBM PMU SERVER DHCP SERVER | CMM | EV70 | EV71 | PBM | THE MBM IS RUNNING A DHCP SERVER AND PROVIDE IT A LEASE ON A DHCP ADDRESS. |
| PMU | MBM PMU SERVER DHCP SERVER | CMM | EV70 | EV71 | PBM | THE PMU APPLICATION WHEN INITIALIZING ISSUES THE GET SYSTEM TOPOLOGY COMMAND STARTING AT 0. THE COMMAND IS ISSUED TO THE PMU SERVER WHICH IS A PREDETERMINED ADDRESS |
| PMU | MBM PMU SERVER DHCP SERVER | CMM | EV70 | EV71 | PBM | ENTITY 0, THE DATA FOR THE MBM IS RETURNED. |
| PMU | MBM PMU SERVER DHCP SERVER | CMM | EV70 | EV71 | PBM | PMU SENDS A GET MBM CONFIGURATION TO THE MBM AND PICKS UP INFORMATION, LIKE THE RIMM POPULATION |
| PMU | MBM PMU SERVER DHCP SERVER | CMM | EV70 | EV71 | PBM | THE PMU SERVER TASK, FORWARDS THE COMMAND TO THE MBM SM PROTOCOL SERVICING TASK. IT RETURNS INFORMATION ON THE CPUs THAT IS HAS GATHERED PREVIOUSLY. |
| PMU | MBM PMU SERVER DHCP SERVER | CMM | EV70 | EV71 | PBM | THE PMU ISSUES THE GET SYSTEM TOPOLOGY FOR ENTITY 1 |
| PMU | MBM PMU SERVER DHCP SERVER | CMM | EV70 | EV71 | PBM | ENTITY 1, THE CMM, IS RETURNED. |

SHOW CONFIG FLOW DIAGRAM (PART 1)

FIG. 27

SHOW CONFIGURATION FLOW DIAGRAM (PART 2)

| | | | | | | |
|---|---|---|---|---|---|---|
| PMU | MBM PMU SERVER DHCP SERVER | CMM | EV70 | EV71 | PBM | GET PARTITION DATABASE |
| PMU | MBM PMU SERVER DHCP SERVER | CMM | EV70 | EV71 | PBM | PMU SERVER DELIVERS THE DATABASE |
| PMU | MBM PMU SERVER DHCP SERVER | CMM | EV70 | EV71 | PBM | THE PMU USES THE INFORMATION FROM THE REQUEST COMPLETE LAN TOPOLOGY, AND ISSUES COMMANDS WITH IP ADDRESSES. IT ISSUES GET VOLTAGE READINGS TO THE MBM |
| PMU | MBM PMU SERVER DHCP SERVER | CMM | EV70 | EV71 | PBM | THE PMU SERVER PASSES THE COMMAND TO THE DESTINATION THE MBM. THE MBM RESPONDS WITH VOLTAGE READINGS. |
| PMU | MBM PMU SERVER DHCP SERVER | CMM | EV70 | EV71 | PBM | THE PMU USES THE INFORMATION FROM THE REQUEST COMPLETE LAN TOPOLOGY, AND ISSUES COMMANDS WITH IP ADDRESSES. IT ISSUES GET VOLTAGE READINGS TO THE PBM |
| PMU | MBM PMU SERVER DHCP SERVER | CMM | EV70 | EV71 | PBM | THE PMU SERVER PASSES THE COMMAND TO THE DESTINATION THE PBM. THE PBM RESPONDS WITH VOLTAGE READINGS. |
| PMU | MBM PMU SERVER DHCP SERVER | CMM | EV70 | EV71 | PBM | THE PMU USES THE INFORMATION FROM THE REQUEST COMPLETE LAN TOPOLOGY, AND ISSUES COMMANDS WITH IP ADDRESSES. IT ISSUES GET VOLTAGE READINGS TO THE CMM |
| PMU | MBM PMU SERVER DHCP SERVER | CMM | EV70 | EV71 | PBM | THE PMU SERVER PASSES THE COMMAND TO THE DESTINATION THE CMM. THE CMM RESPONDS WITH VOLTAGE READINGS. |
| PMU | MBM PMU SERVER DHCP SERVER | CMM | EV70 | EV71 | PBM | STEPS ARE REPEATED FOR GET FAN RPM SPEED, GET TEMPERATURE READING, GET POWER SUPPLY, GET EEROM DATA |
| PMU | MBM PMU SERVER DHCP SERVER | CMM | EV70 | EV71 | PBM | THE PMU SERVER QUERIES THE PBM FOR INFORMATION ON THE IO DRAWERS WITH THE GET PBM CONFIGURATION COMMAND |

SHOW CONFIGURATION FLOW DIAGRAM (PART 3)

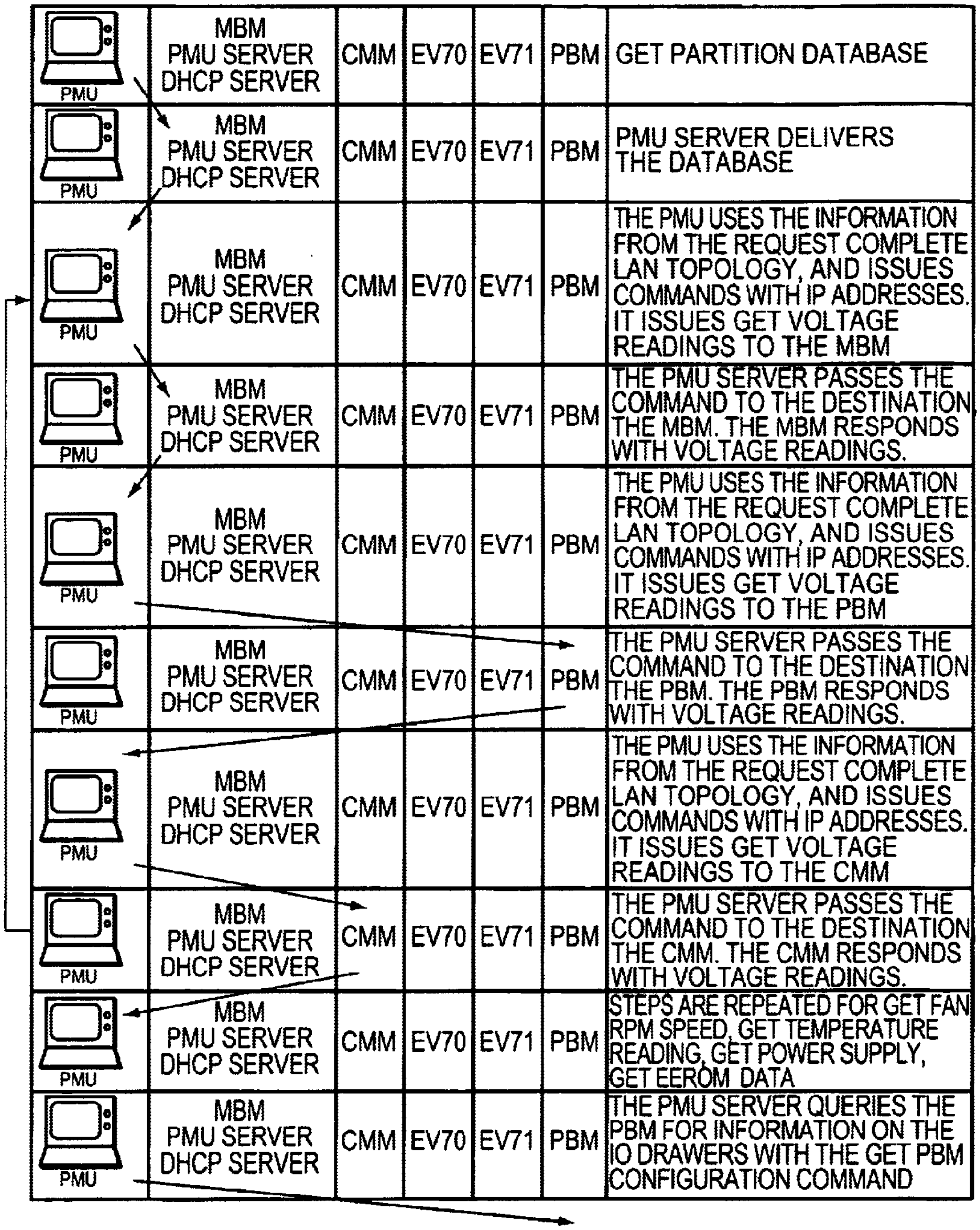

FIG. 29A

| PMU | MBM PMU SERVER DHCP SERVER | CMM | EV70 | EV71 | PBM | THE PBM SUPPLIES INFORMATION EACH IO7 RISER IN THE IO DRAWER |
|---|---|---|---|---|---|---|
| PMU | MBM PMU SERVER DHCP SERVER | CMM | EV70 | EV71 | PBM | GET PCI SLOT INFO |
| PMU | MBM PMU SERVER DHCP SERVER | CMM | EV70 | EV71 | PBM | THE PBM MAY HAVE STORED INFORMATION ON THE PCI CONFIGURATION IF IT WAS STORED BY SRM CONSOLE IN THE PBM RAM |
| PMU | MBM PMU SERVER DHCP SERVER | CMM | EV70 | EV71 | PBM | THE PROCESS IS COMPLETE |

SHOW CONFIGURATION FLOW DIAGRAM (PART 4)

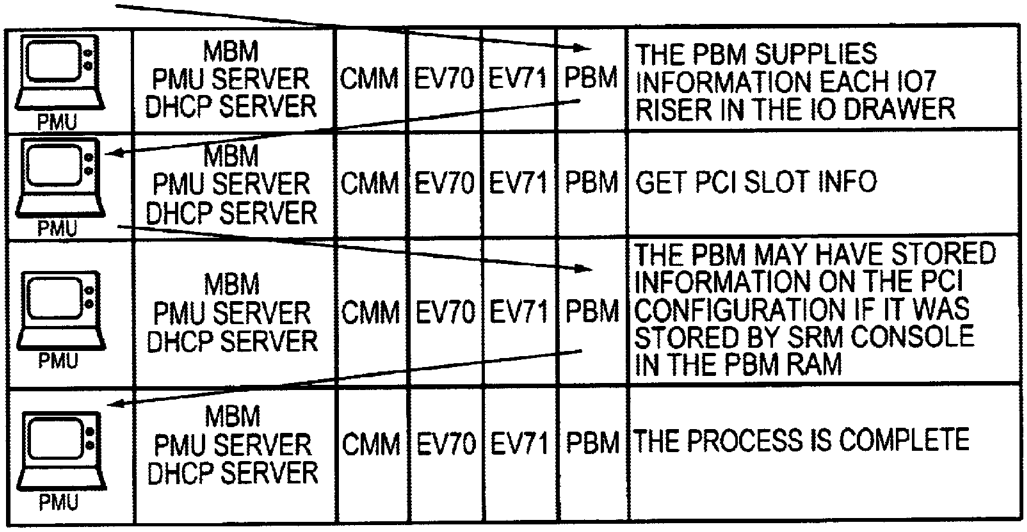

FIG. 29B

Configuration of Marvel at: 5/22/00/ 08:30:05

MBM Rack 3-01 Part No= A1234567; Revision=32; Serial No=123456789 MFGDate040101 3 Errors CMM 0 Part No=C1135; Revision=01; Serial No=11335577

EV70 - Partition 8/0; GTL Voltage= 1.5; 5V=4.9; Temp= 85F; Part No=E7-435; Revision=5; Serial No= 9876543; MFGDate=101100

EV71 - Partition 8/0; GTL Voltage= 1.5; 5V=5,0; Temp= 45F; Part No=E7-435; Revision=2; Serial No= 9876530; MFGDate=092100

RIMMO - 256MB; Part No=RA03-256; Revision=1;Serial No=000123456; MFGDate=070199

RIMMI - 256MB, Part No= RA03-256; Revision=1;Serial No= 000123457; MFGDate=070199

48V Power Suplies: 1-operational; 2 Missing; 3-Operational; 4-Off

FAN1= 340RPM(minimal 200):

PBM Rack 6- 02 Part No= B1234567; Revision=32; Serial No=1233456790 MFGDate 0401000 Errors Power Supply 1 Operational;+5V = 5.0;-5V=5.1; 12V = 11.99;3.3.3V=3.1;Temp=98F; FAN1=286rpm(minimal=100); FAN2 =330rpm(minimal=100); Part No=PAA003; Revision=01;Serial No=SS2358

IO7Drawer - Partiotion 8; Part No=CPQ00I01; Revision=O7; Serial No=IO2345

PCI slot 3 - class=01;subclass=04;deviceid=0701;vendorid=0809;intpin=A;irq=5;

PCI slot 5 - class=02; subclass=03;deviced=0e00;vendorid=a3f2;intpin=D;irq=9

SHOW CONFIG SAMPLE OUTPUT

FIG. 30

PARTITION REQUEST SOURCES

| REQUESTS RECEIVED | CLASS | PARTITION STATES | HANDLING METHODS | REFERENCE FLOW |
|---|---|---|---|---|
| MOVE EV7s TO PARTITION REMOVE EV7s FROM PARTITION | COMPLEX | NOT RUNNING OS | CHECK THE PROPER CABLING OF A NEWLY FORMED HARD PARTITION OR ADDITIONS TO AN EXISTING PARTITION. DETERMINE MEMORY AND ROUTABILITY. DISTRIBUTE THE REQUESTS ON THE TRAIN TO UPDATE VOLATILE DATABASE. | |
| ASSIGN MEMORY OR IO TO SUB PARTITION | TRAINED | | | |
| SET PARTITION STATE ATTRIBUTES | TRAINED | | | |
| SWITCH PRIMARY EV7 | COMPLEX | PARTITION RUNNING OS | DISTRIBUTE THE REQUESTS ON THE TRAIN TO UPDATE VOLATILE DATABASE. | |
| ASSIGN SUB PARTITION | TRAINED | | | |
| ASSIGN MEMORY OR IO TO SUB-PARTITION | TRAINED | | | |
| ADD EV7 OR DELETE EV7 TO/FROM RUNNING PARTITION | COMPLEX | PARTITION RUNNING OS | CABLE TESTING IS PERFORMED TO DETERMINE PROPER CONNECTIONS; A QUIESCE REQUEST IS MADE TO ALL EV7s IN THE PARTITION; NEW RCONFIG/CCONFIG REQUESTS ARE SENT TO ALL EV7s AND IF ACCEPTABLE CONTINUE IS SENT TO THE EV7. IF AN ERROR IS FOUND IN ROUTING NEW RCONFIG/CCONFIG COMPUTATIONS ARE ATTEMPTED AND SENT TO THE AFFECTED EV7s. | FIGURE 16 |
| SAVE PARTITION ASSIGNMENT | TRAINED | DON'T CARE | SEND THE SAVE COMMAND ON THE TRAIN SO THAT ALL COPIES OF VOLATILE DATABASE FOR PARTITION CAN BE COPIED TO NON-VALATILE | FIGURE 9 |
| RESET PARTITION | COMPLEX | PARTITION RESET IN PROGRESS OR PARTITION RUNNING OS | PULSE RESET ON ALL EV7s IN PARTITION, RELOAD SROM, XSROM ON ALL EV7, RECONFIGURE ROUTING, SEND RCONFIG/CCONFIG TO ALL EV7s AND IF NO ERRORS, LOAD SRM TO PRIMARY. | FIGURE 11 |
| | | PARTITION POWERED OFF | RETURN ERROR | |

PARTITION COORDINATOR HANDLING OF REQUESTS (PART 1)

FIG. 32A

| REQUESTS RECEIVED | CLASS | PARTITION STATES | HANDLING METHODS | REFERENCE FLOW |
|---|---|---|---|---|
| POWER OFF PARTITION | COMPLEX | | IF DUAL EV7 IN PARTITION OR EV7 IN FREE POOL, SEND POWER OFF EV7s TO EACH SUCH CMM IN PARTITION. POWER OFF PCI DRAWER ON PBMs THAT HAVE ALL IO7 RISERS IN PARTITION. IF POWER IS OFF FOR ALL CMMs IN A CABINET OF MBMs, POWER OFF THE POWER SUPPLIES IN THE CABINET. | |
| | | PARTITION POWERED OFF OR REQUEST MADE TO SUB PARTITION | RETURN ERROR | |
| POWER ON PARTITION | COMPLEX | PARTITION RESET IN PROGRESS OR PARTITION RUNNING OS | RETURN ERROR | |
| | | PARTITION POWERED OFF | TURN POWER ON TO ANY POWER SUPPLIES THAT ARE OFF AND UNDER CONTROL OF CABINETS THAT HAVE EV7s ASSIGNED TO OUR PARTITION. POWER UP PCI DRAWERS FOR PBMs THAT HAVE IO7 IN OUR PARTITION. POWER UP DUAL EV7s ON CMMs THAT HAVE EV7s IN OUR PARTITION. CONTINUE LIKE THE RESET PROCESS. | |
| HALT PARTITION | FORWARDED | PARTITION RESET IN PROGRESS OR PARTITION RUNNING OS | SEND HALT ON TO PRIMARY EV7 OF PARTITION. | |
| | | PARTITION IN HALT STATE OR PARTITION POWER OFF | RETURN ERROR | |
| DISABLE HALT PARTITION | FORWARDED | PARTITION RESET IN PROGRESS OR PARTITION RUNNING OS | RETURN ERROR | |
| | | PARTITION IN HALT STATE OR PARTITION POWER OFF | SEND HALT OFF TO PRIMARY EV7 OF PARTITION. | |
| STORE ENVI-RONMENT VARIABLES | TRAINED | PARTITION RUNNING OS | THIS CAUSES A DISTRIBUTION OF THE SRM ENVIRONMENT VARIABLES TO ALL PEERS | FIGURE 34 |
| GET ENVI-RONMENT VARIABLES | DIRECT | PARTITION RUNNING OS | RETURN LOCAL COPY OF ALL SRM ENVIRONMENT VARIABLES | |

PARTITION COORDINATOR HANDLING OF REQUESTS (PART 2)

FIG. 32B

| COMMANDS ISSUED | PARTITION STATES | HANDLING METHODS | REFERENCE FLOW |
|---|---|---|---|
| TRAIN FULL | ANY | | |
| EV7 QUIESCE | PARTITION RESET IN PROGRESS | CMM FACILITATES | FIGURE 17, FIGURE 20 |
| CONFIG RBOX/CBOX | PARTITION RESET IN PROGRESS | CMM FACILITATES | FIGURE 17, FIGURE 20 |
| EV7 RESET | ANY | CMM FACILITATES | FIGURE 15 |
| EV7 START TEST | PARTITION RESET IN PROGRESS | CMM FACILITATES | FIGURE 16, FIGURE 18 |
| EV7 HALT | ANY | CMM FACILITATES | |
| LOAD IMAGE | PARTITION RESET IN PROGRESS | CMM FACILITATES | FIGURE 15, FIGURE 20 |
| SET PARTITION STATE | PARTITION RESET IN PROGRESS | CMM FACILITATES | FIGURE 15, FIGURE 16, FIGURE 17, FIGURE 18, FIGURE 20, FIGURE 21 |
| POWER ON/OFF | ANY | CMM, MBM, AND PBM FACILITATES | |

PARTITION COORDINATOR COMMANDS ISSUED

FIG. 33

PARTITION STATE DIAGRAM

INPUTS AND OUTPUTS OF ROUTER ALGORITHM

ROUTING GLOSSARY

PRIMARY DIMENSION: ONE OF THE EAST-WEST OR NORTH-SOUTH. THIS CHOICE IS THE SAME FOR ALL EV7s.

SECONDARY DIMENSION: THE OTHER WAY.

DIMENSION-ORDER ROUTING: THE SHORTEST PATH CONNECTING TWO NODES WHICH PROCEEDS FIRST ALONG THE PRIMARY DIMENSION AND THEN ALONG THE SECONDARY.

ADAPTIVE ROUTING: THE COLLECTION OF PATHS ADVANCING NODE-TO-NODE IN THE SAME PRIMARY AND SECONDARY DIRECTIONS AS THE DIMENSION-ORDER ROUTING. AT EACH INTERMEDIATE NODE IT MUST BE POSSIBLE TO ADVANCE IN EITHER DIRECTION UNTIL THE DIMENSION COORDINATE IN A DIRECTION MATCHES THAT OF THE DESTINATION.

INITIAL HOP: A ROUTING OPTION WHICH ALLOWS A HOP FROM THE SOURCE NODE IN ANY DIRECTION TO AN ADJACENT NODE. THIS OPTION ALLOWS SOME CONNECTION OF NODES IN IMPERFECT MESHES.

SRC ROUTING: ANOTHER DEADLOCK-FREE ROUTING METHOD IN WHICH TRAVEL PROCEEDS FIRST ALONG THE SECONDARY DIMENSION.

ROUTING GLOSSARY

FIG. 36

PARTITION COORDINATION

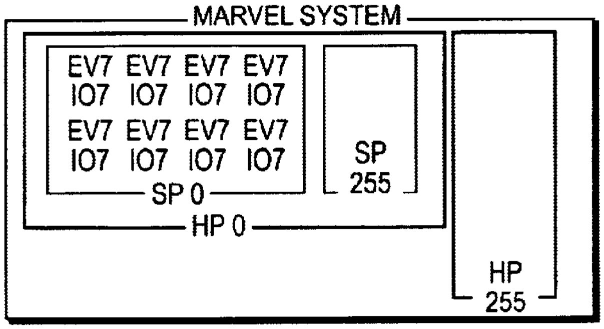

AT INITIAL POWERON, THE UNCONFIGURED MARVEL SYSTEM IS CONFIGURED TO HAVE ALL RESOURCES IN A SINGLE SUBPARTITION. THE GLOBAL FREE POOL (HP 255) IS EMPTY

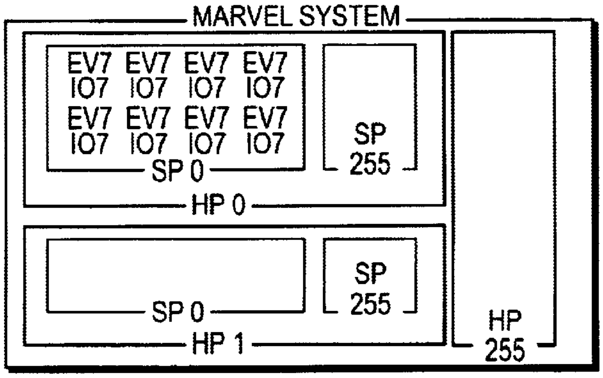

THE USER CREATES HARD PARTITION 1 (HP1) WITH SUBPARTITION 0 (SP 0). THE PARTITION FREE POOL (SP 255) IS CREATED AUTOMATICALLY

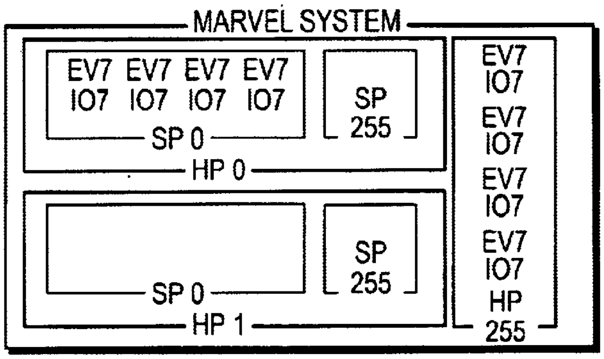

THE USER DELETES SEVERAL EV7 FROM THE HARD PARTITION (HP0) AND THEY MIGRATE TO THE GLOBAL FREE POOL (HP 255)

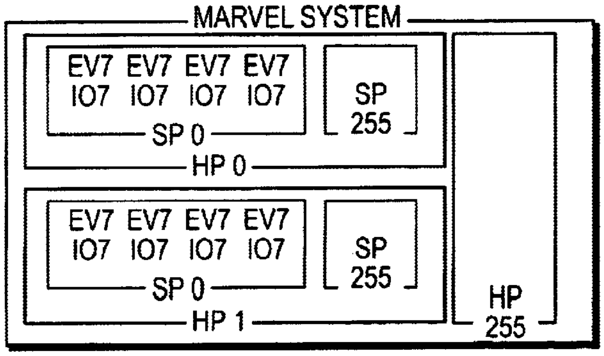

THE USER CAN MOVE THE EV7s INTO THE NEW PARTITION, (HP 1, SP 0). BY DEFAULT THE IO7s ARE ASSIGNED TO THE SAME PARTITION AS THE EV7 TO WHICH IT BELONGS

CREATING A HARD PARTITION BLOCK FLOW

FIG. 38

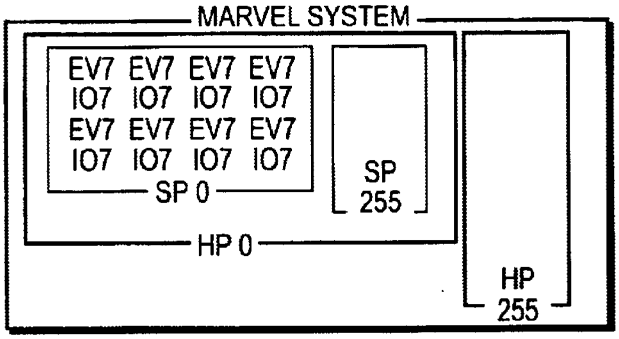

THE INITIAL SYSTEM DEFAULTS ALL THE RESOURCES INTO ONE OPERATION.

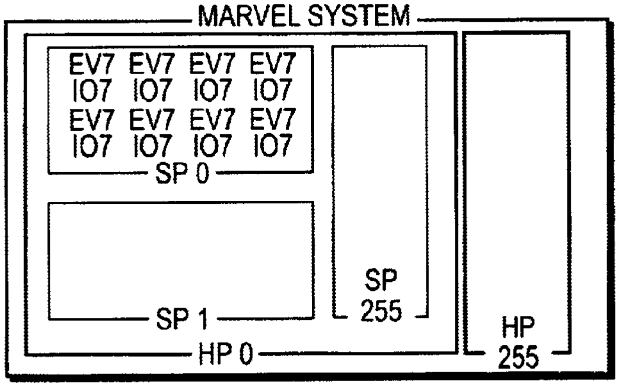

THE USER CREATED A 2nd SUBPARTITION (SP 1) WITHIN THE EXISTING HARD PARTITION (HP 0).

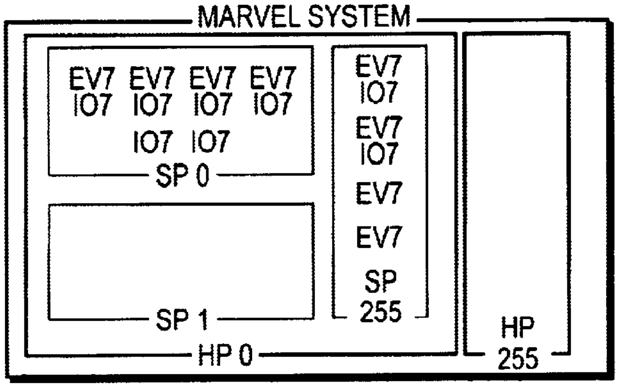

THE USER DELETES EV7s FROM SP 0, MIGRATING THEM INTO THE PARTITION FREE POOL (SP 255). UNLIKE MOVING THEM OUT OF THE HARD PARTITION, THE IO7s DO NOT STICK TO THEIR EV7s. THE USER ISSUES SEPARATE DELETE IO7 COMMANDS, AND IN THIS EXAMPLE, ONLY MIGRATES 2 IO7s.

CREATING A SUBPARTITION BLOCK FLOW (PART 1)

FIG. 39A

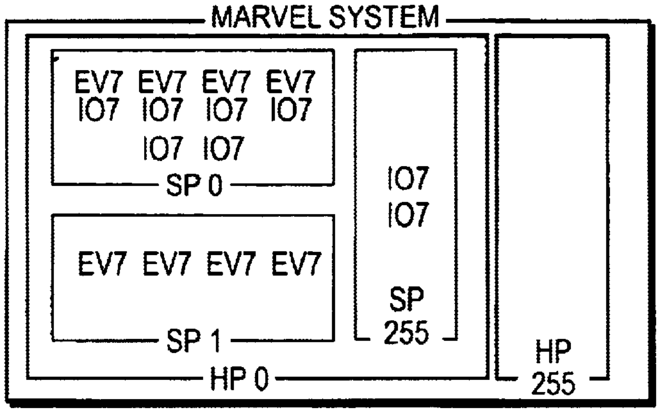
IN CONFIGURATION THE NEW SUBPARTITION (SP 1), EV7s ARE MOVED INTO THE PARTITION. AGAIN NOTE THE IO7s ARE ACTED UPON INDEPENDENT OF THE EV7.
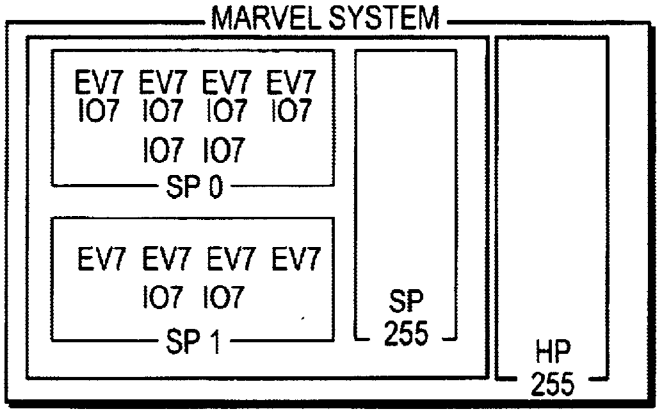
TO GET THE IO7s INTO THE NEW SUBPARTITION, AN ASSIGN COMMAND IS USED.
CREATING A SUBPARTITION BLOCK FLOW (PART 2)
FIG. 39B

CREATING A NEW PARTITION FLOW DIAGRAM (PART 1 OF 2)

CREATING A NEW PARTITION FLOW DIAGRAM (PART 2 OF 2)

RESET STATE

PARTITION START FLOW DIAGRAM (RESET STATE) (PART 1)

PARTITION START FLOW DIAGRAM (RESET STATE) ( PART 2)

DIAGNOSTIC STATE

PARTITION START FLOW DIAGRAM, DIAGNOSTIC STATE (PART 1)

PARTITION START FLOW DIAGRAM, DIAGNOSTIC STATE (PART 2)

CONFIGURE ROUTER

PARTITION START FLOW DIAGRAM (CONFIGURE ROUTE)

PARTITION START FLOW DIAGRAM (RUNNING) (PART 1)

PARTITION START FLOW DIAGRAM (RUNNING) (PART 2)

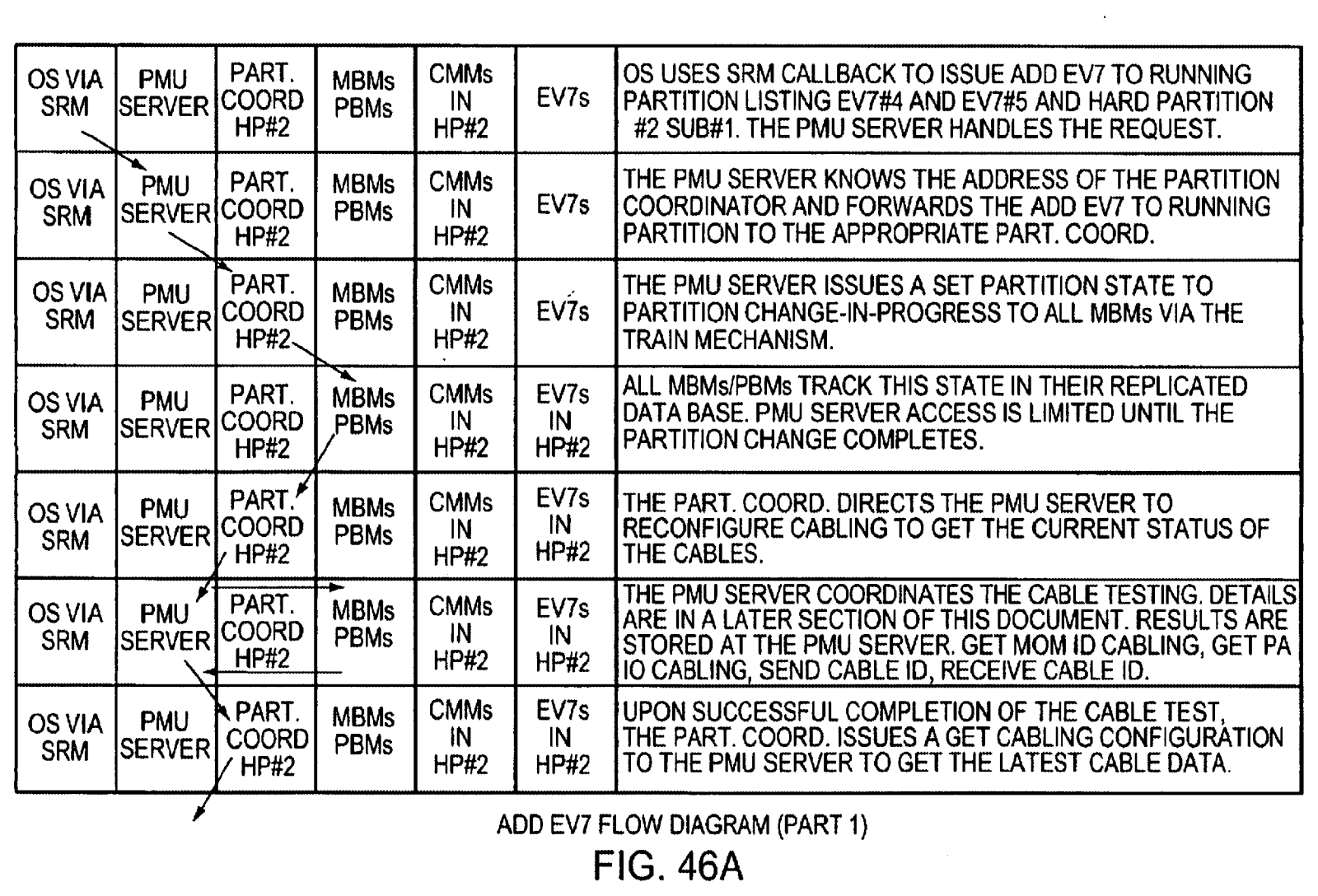

| | | | | | | |
|---|---|---|---|---|---|---|
| OS VIA SRM | PMU SERVER | PART. COORD HP#2 | MBMs PBMs | CMMs IN HP#2 | EV7s | OS USES SRM CALLBACK TO ISSUE ADD EV7 TO RUNNING PARTITION LISTING EV7#4 AND EV7#5 AND HARD PARTITION #2 SUB#1. THE PMU SERVER HANDLES THE REQUEST. |
| OS VIA SRM | PMU SERVER | PART. COORD HP#2 | MBMs PBMs | CMMs IN HP#2 | EV7s | THE PMU SERVER KNOWS THE ADDRESS OF THE PARTITION COORDINATOR AND FORWARDS THE ADD EV7 TO RUNNING PARTITION TO THE APPROPRIATE PART. COORD. |
| OS VIA SRM | PMU SERVER | PART. COORD HP#2 | MBMs PBMs | CMMs IN HP#2 | EV7s | THE PMU SERVER ISSUES A SET PARTITION STATE TO PARTITION CHANGE-IN-PROGRESS TO ALL MBMs VIA THE TRAIN MECHANISM. |
| OS VIA SRM | PMU SERVER | PART. COORD HP#2 | MBMs PBMs | CMMs IN HP#2 | EV7s IN HP#2 | ALL MBMs/PBMs TRACK THIS STATE IN THEIR REPLICATED DATA BASE. PMU SERVER ACCESS IS LIMITED UNTIL THE PARTITION CHANGE COMPLETES. |
| OS VIA SRM | PMU SERVER | PART. COORD HP#2 | MBMs PBMs | CMMs IN HP#2 | EV7s IN HP#2 | THE PART. COORD. DIRECTS THE PMU SERVER TO RECONFIGURE CABLING TO GET THE CURRENT STATUS OF THE CABLES. |
| OS VIA SRM | PMU SERVER | PART. COORD HP#2 | MBMs PBMs | CMMs IN HP#2 | EV7s IN HP#2 | THE PMU SERVER COORDINATES THE CABLE TESTING. DETAILS ARE IN A LATER SECTION OF THIS DOCUMENT. RESULTS ARE STORED AT THE PMU SERVER. GET MOM ID CABLING, GET PA IO CABLING, SEND CABLE ID, RECEIVE CABLE ID. |
| OS VIA SRM | PMU SERVER | PART. COORD HP#2 | MBMs PBMs | CMMs IN HP#2 | EV7s IN HP#2 | UPON SUCCESSFUL COMPLETION OF THE CABLE TEST, THE PART. COORD. ISSUES A GET CABLING CONFIGURATION TO THE PMU SERVER TO GET THE LATEST CABLE DATA. |

ADD EV7 FLOW DIAGRAM (PART 1)

FIG. 46A

ADD EV7 FLOW DIAGRAM (PART 2)

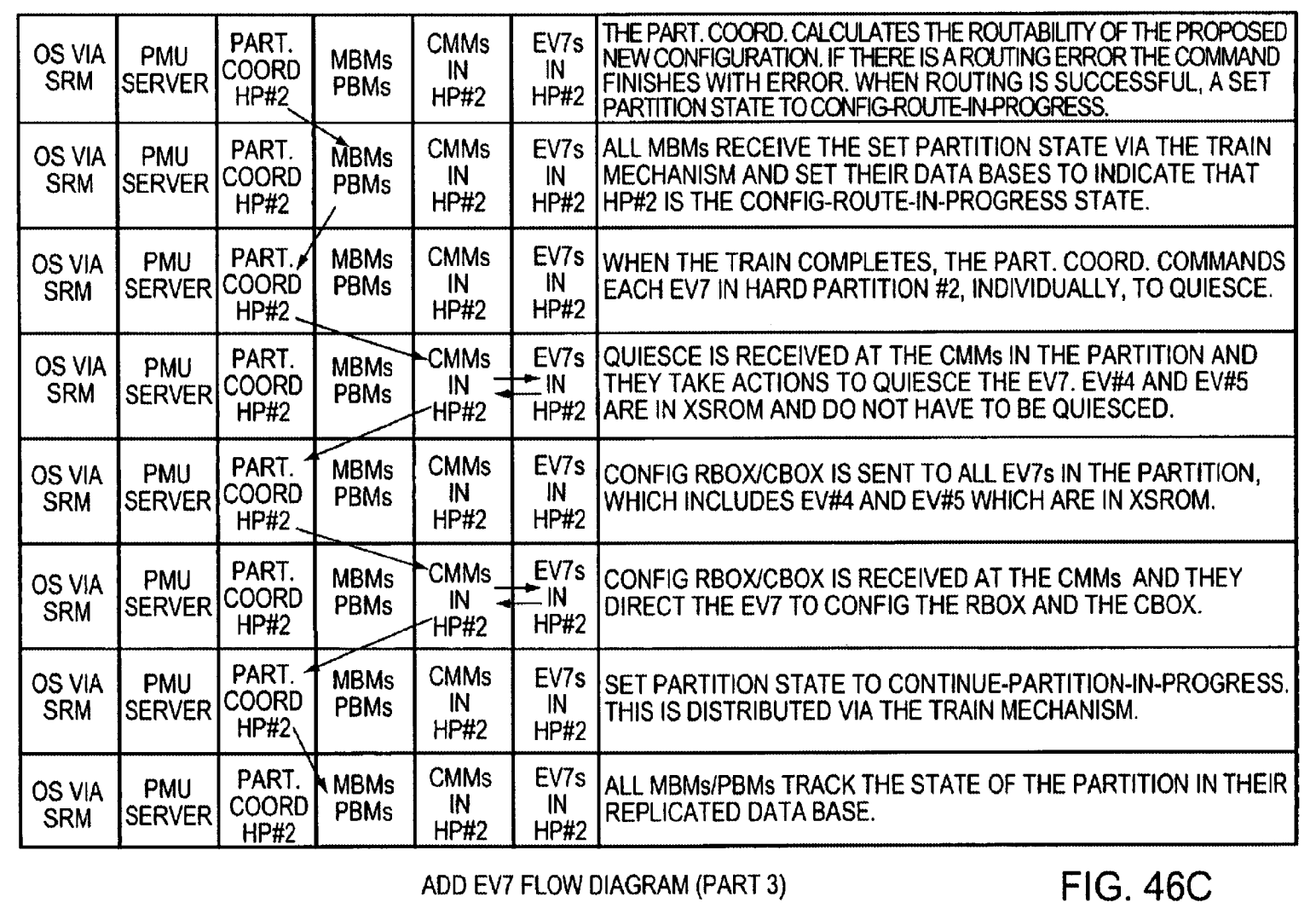

| | | | | | | |
|---|---|---|---|---|---|---|
| OS VIA SRM | PMU SERVER | PART. COORD HP#2 | MBMs PBMs | CMMs IN HP#2 | EV7s IN HP#2 | THE PART. COORD. CALCULATES THE ROUTABILITY OF THE PROPOSED NEW CONFIGURATION. IF THERE IS A ROUTING ERROR THE COMMAND FINISHES WITH ERROR. WHEN ROUTING IS SUCCESSFUL, A SET PARTITION STATE TO CONFIG-ROUTE-IN-PROGRESS. |
| OS VIA SRM | PMU SERVER | PART. COORD HP#2 | MBMs PBMs | CMMs IN HP#2 | EV7s IN HP#2 | ALL MBMs RECEIVE THE SET PARTITION STATE VIA THE TRAIN MECHANISM AND SET THEIR DATA BASES TO INDICATE THAT HP#2 IS THE CONFIG-ROUTE-IN-PROGRESS STATE. |
| OS VIA SRM | PMU SERVER | PART. COORD HP#2 | MBMs PBMs | CMMs IN HP#2 | EV7s IN HP#2 | WHEN THE TRAIN COMPLETES, THE PART. COORD. COMMANDS EACH EV7 IN HARD PARTITION #2, INDIVIDUALLY, TO QUIESCE. |
| OS VIA SRM | PMU SERVER | PART. COORD HP#2 | MBMs PBMs | CMMs IN HP#2 | EV7s IN HP#2 | QUIESCE IS RECEIVED AT THE CMMs IN THE PARTITION AND THEY TAKE ACTIONS TO QUIESCE THE EV7. EV#4 AND EV#5 ARE IN XSROM AND DO NOT HAVE TO BE QUIESCED. |
| OS VIA SRM | PMU SERVER | PART. COORD HP#2 | MBMs PBMs | CMMs IN HP#2 | EV7s IN HP#2 | CONFIG RBOX/CBOX IS SENT TO ALL EV7s IN THE PARTITION, WHICH INCLUDES EV#4 AND EV#5 WHICH ARE IN XSROM. |
| OS VIA SRM | PMU SERVER | PART. COORD HP#2 | MBMs PBMs | CMMs IN HP#2 | EV7s IN HP#2 | CONFIG RBOX/CBOX IS RECEIVED AT THE CMMs AND THEY DIRECT THE EV7 TO CONFIG THE RBOX AND THE CBOX. |
| OS VIA SRM | PMU SERVER | PART. COORD HP#2 | MBMs PBMs | CMMs IN HP#2 | EV7s IN HP#2 | SET PARTITION STATE TO CONTINUE-PARTITION-IN-PROGRESS. THIS IS DISTRIBUTED VIA THE TRAIN MECHANISM. |
| OS VIA SRM | PMU SERVER | PART. COORD HP#2 | MBMs PBMs | CMMs IN HP#2 | EV7s IN HP#2 | ALL MBMs/PBMs TRACK THE STATE OF THE PARTITION IN THEIR REPLICATED DATA BASE. |

ADD EV7 FLOW DIAGRAM (PART 3)

FIG. 46C

ADD EV7 FLOW DIAGRAM (PART 4)

ADD VS MOVE

DESTROYING A SOFT PARTITION

DESTROYING A HARD PARTITION

EV7 FAILYRE/REPLACE FLOW DIAGRAM (PART 1)

EV7 FAILYRE/REPLACE FLOW DIAGRAM (PART 2)

SET MEMBERSHIP CONFIGURATION FLOW DIAGRAM

IP CABLE CONFIGURATION BLOCK DIAGRAM

THE EV7 IDS (x,y) ARE DETERMINED BY THE THUMB-WHEEL SETTING USING THE FOLLOWING ALGORITHM:
x (E,W COORDINATE) = (RACK NUMBer>>2)*8) + ((MBM NUMBER>>1)*4) + CMM NUMBER
y (N,S COORDINATE) = ((RACK NUMBER & 0x03)*4) = ((MBM NUMBER & 0x01)*2) = EV7 NUMBER

WHERE:

RACK NUMBER IS THE HIGH ORDER HALF BYTE OF THE MBM THUMB-WHEEL
MBM NUMBER IS THE LOW ORDER HALF BYTE OF THE MBM THUMB-WHEEL
CMM NUMBER IS FROM 0 TO 3 WITHIN AN MBM
EV7 NUMBER IS 0 OR 1 WITHIN A CMM

IN A SIMILAR MANNER WHEN THE x,y AXIS COORDINATED OF AN EV7 ARE KNOWN, THE THUMB-WHEEL NUMBER CAN BE DERIVED AND INSERTED INTO THE IP ADDRESS FOR THE MBM, CMM AND EV7s.

EV7 COORDINATE ADDRESSING RELATIONSHIP TO THUMBWHEEL ADDRESSING

FIG. 54

IO7 CABLING BLOCK DIAGRAM

GET CABLE CONFIGURATION BLOCK DIAGRAM

IP CABLE ADDITION/DELETION BLOCK DIAGRAM

PMU CABLING ASSISTANT BLOCK DIAGRAM

PROXY FORWARDING BLOCK DIAGRAM

VIRTUAL CONSOLE TERMINAL OVERVIEW

| CMM | EV7 | COM1 PORT | COM2 PORT |
|---|---|---|---|
| 1 | 1 | 323 | 324 |
| 1 | 2 | 325 | 326 |
| 2 | 1 | 327 | 328 |
| 2 | 2 | 329 | 330 |
| 3 | 1 | 331 | 332 |
| 3 | 2 | 333 | 334 |
| 4 | 1 | 335 | 336 |
| 4 | 2 | 337 | 338 |

VIRTUAL TERMINAL TELNET

FIG. 61

VIRTUAL TERMINAL SESSION

VIRTUAL TERMINAL FLOW DIAGRAM

VIRTUAL TERMINAL FLOW DIAGRAM

SET BASE TIME

SET BASE TIME FLOW DIAGRAM

DHCP BLOCK DIAGRAM

| CONTENT | TFTP FILENAME | BLOCK SIZE | SECTOR START(OFFSET) | SECTOR END |
|---|---|---|---|---|
| MBM/PBM FIRMWARE | "mbmfm'", "pbmfw" | 2 MB | 0 | 7 |
| CMM, CMM_FSL, FPGA, SROM, XSROM FIRMWARE | "cmmfw", "cmmfsl", "cmmfpga", "sromfw", "xsromfw" | 0.5 MB | 8(0,tbd,tbd tbd,tbd,tbd,) d) | 9 |
| ERROR LOGS | | 1 MB | 10 | 13 |
| MBM/PBM FSL FIRMWARE | "mbmfsl", "pbmfsl" | 0.5 MB | 14 | 15 |
| NVRAM-PARTITION DATABASE | | 0.75 MB | 16 | 18 |
| SRM FIRMWARE | "srmfw" | 2 MB | 20 | 27 |
| FPGA LOADED BY PBM ON PCI DRAWERS | "pbmfpga" | 0.25 MB | 28 | 28 |
| MBM/PBM BOOT [ IF REQUIRED BY HW ] | | 0.25 | 19(0,0X30000) | 19 |

FLASH LAYOUT

FIG.65

| BYTE OFFSET | VALUE |
|---|---|
| 0.. 7 | 0x010100005500aaff |
| 8.. 19 | IMAGE REVISION IN ASCII |
| 20.. 23 | VENDOR STRING IN ASCII (CPQ) |
| 24.. 31 | MODULE ID IN ASCII (SRMFW, MBMFW, MBMFSL, CMMFW, SROMFW, XSROMFW, CMMFPGA) |
| 32.. 35 | FIRMWARE TYPE IN ASCII (ALPH, X86) |
| 36.. 43 | 0x00 |
| 44.. 47 | CODE LENGTH IN BYTES |
| 48.. 59 | ROM OBJECT NAME (FW,FSL,SROM,XSROM,FPGA) |
| 60.. 63 | 0x11223344 |

IMAGE HEADER

FIG.66

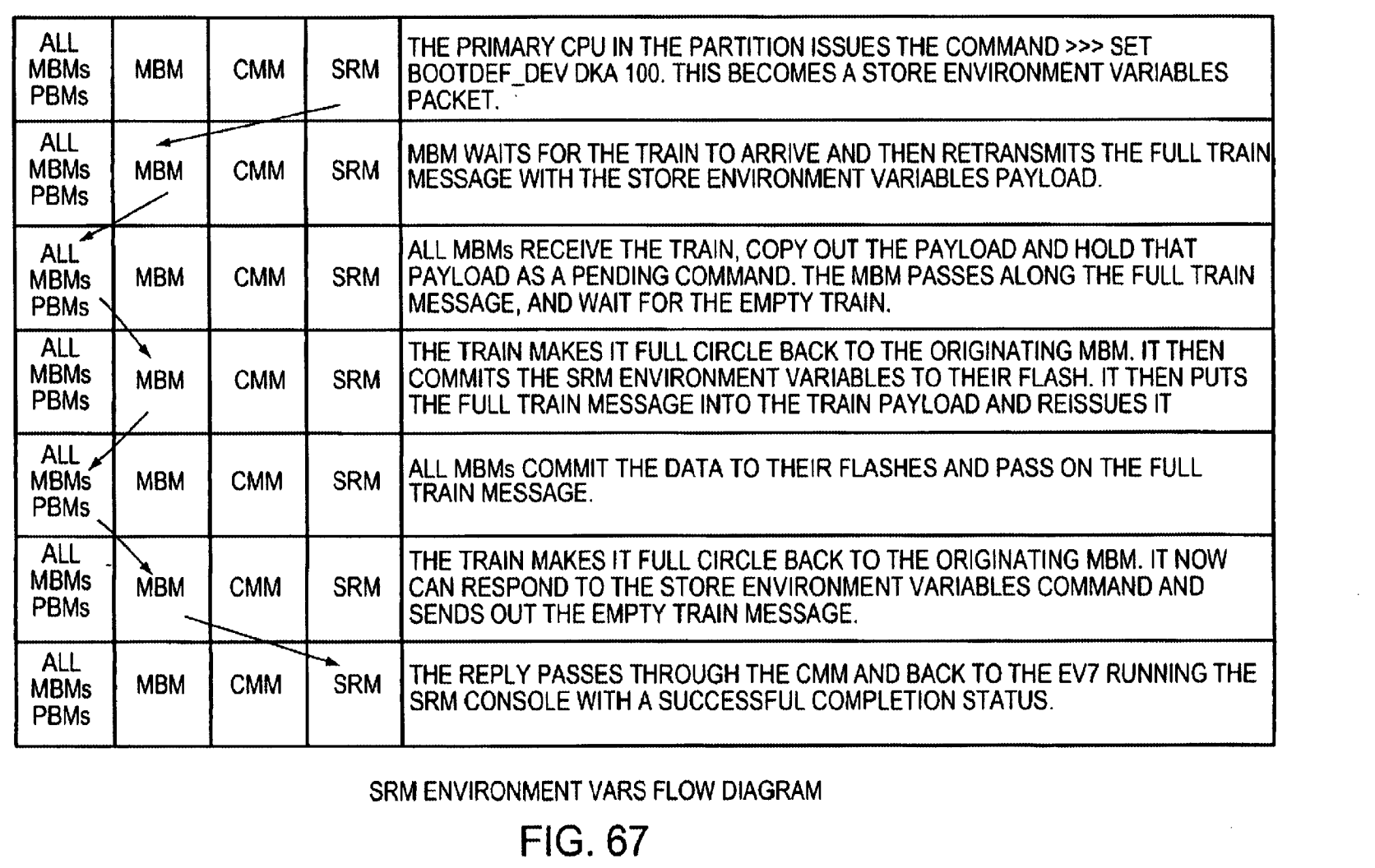

| | | | | |
|---|---|---|---|---|
| ALL MBMs PBMs | MBM | CMM | SRM | THE PRIMARY CPU IN THE PARTITION ISSUES THE COMMAND >>> SET BOOTDEF_DEV DKA 100. THIS BECOMES A STORE ENVIRONMENT VARIABLES PACKET. |
| ALL MBMs PBMs | MBM | CMM | SRM | MBM WAITS FOR THE TRAIN TO ARRIVE AND THEN RETRANSMITS THE FULL TRAIN MESSAGE WITH THE STORE ENVIRONMENT VARIABLES PAYLOAD. |
| ALL MBMs PBMs | MBM | CMM | SRM | ALL MBMs RECEIVE THE TRAIN, COPY OUT THE PAYLOAD AND HOLD THAT PAYLOAD AS A PENDING COMMAND. THE MBM PASSES ALONG THE FULL TRAIN MESSAGE, AND WAIT FOR THE EMPTY TRAIN. |
| ALL MBMs PBMs | MBM | CMM | SRM | THE TRAIN MAKES IT FULL CIRCLE BACK TO THE ORIGINATING MBM. IT THEN COMMITS THE SRM ENVIRONMENT VARIABLES TO THEIR FLASH. IT THEN PUTS THE FULL TRAIN MESSAGE INTO THE TRAIN PAYLOAD AND REISSUES IT |
| ALL MBMs PBMs | MBM | CMM | SRM | ALL MBMs COMMIT THE DATA TO THEIR FLASHES AND PASS ON THE FULL TRAIN MESSAGE. |
| ALL MBMs PBMs | MBM | CMM | SRM | THE TRAIN MAKES IT FULL CIRCLE BACK TO THE ORIGINATING MBM. IT NOW CAN RESPOND TO THE STORE ENVIRONMENT VARIABLES COMMAND AND SENDS OUT THE EMPTY TRAIN MESSAGE. |
| ALL MBMs PBMs | MBM | CMM | SRM | THE REPLY PASSES THROUGH THE CMM AND BACK TO THE EV7 RUNNING THE SRM CONSOLE WITH A SUCCESSFUL COMPLETION STATUS. |

SRM ENVIRONMENT VARS FLOW DIAGRAM

FIG. 67

FIRMWARE LOAD AND UPGRADE BLOCK DIAGRAM

UPGRADING CMM FIRMWARE FLOW DIAGRAM

| ERROR LOG ENTRY | | | | | | | | | | |
|---|---|---|---|---|---|---|---|---|---|---|
| SIZE (DEC) | START (HEX) | END (HEX) | BIT 7 | BIT 6 | BIT 5 | BIT 4 | BIT 3 | BIT 2 | BIT 1 | BIT 0 |
| 2 | 0 | 1 | ENTRY NUMBER (1-OXFFFE BEFORE WRAPPING) | | | | | | | |
| 6 | 2 | 7 | TIME STAMP (ssmmhhDDMMYY) | | | | | | | |
| 2 | 8 | 9 | ENTRY SIZE | | | | | | | |
| n | A | N+A | ENTRY DATA | | | | | | | |

ERROR LOG ENTRY FORMAT

FIG. 70

| ERROR ENTRY DATA | | | | | | | | | | |
|---|---|---|---|---|---|---|---|---|---|---|
| SIZE (DEC) | START (HEX) | END (HEX) | BIT 7 | BIT 6 | BIT 5 | BIT 4 | BIT 3 | BIT 2 | BIT 1 | BIT 0 |
| 4 | 0 | 3 | ENTRY NUMBER | | | | | | | |
| 1 | 4 | 4 | SEVERITY LEVEL | | | | | | | |
| 1 | 5 | 5 | ENTITY IN ERROR | | | | | | | |
| 1 | 6 | 6 | INSTANCE | | | | | | | |
| 2 | 7 | 8 | ERROR CODE | | | | | | | |
| 16 | 9 | 18 | SERIAL NUMBER | | | | | | | |
| N | 19 | N+19 | VARIABLE DATA | | | | | | | |

| | |
|---|---|
| ENTRY NUMBER | ID ADDRESS OF CAM, MOM, PAM, OR EVE THAT ENCOUNTERED THE ERROR. |
| SEVERITY LEVEL | INFORMATIONAL=0; WARNING=1; ERROR=2; |
| ENTITY IN ERROR | THE DEVICE CODE FOR THE DEVICE IN ERROR (EGG. CAM, RIM, EVE, THERMAL, VOLTAGE) |
| INSTANCE | THE INSTANCE OF THE ENTITY. |
| ERROR CODE | ERROR ENUMERATION OR INDEX INTO A SET OF TEXT MESSAGES. |
| SERIAL NUMBER | IDENTIFYING ADDRESS WHERE THE ERROR OCCURRED. |
| VARIABLE DATA | ADDITIONAL DATA SPECIFIC TO THIS ERROR CODE. |

ERROR ENTRY DATA FORMAT

FIG. 71

ERROR REPORTING FLOW DIAGRAM

FIELD REPLACEABLE UNIT

| LINE | 12345678901234567890 |
|---|---|
| 1 | <OVERALL PROGRESS> |
| 2 | <CURRENT STATE> |
| 3 | <LOCATION WITHIN STATE> |
| 4 | <ERROR MESSAGE> |

OCP TEMPLATE

FIG. 74

OCP 8P EXAMPLE

OCP BUTTON LABLE EXAMPLE

OCP SWITCHES BLOCK DIAGRAM

| COMMAND | PURPOSE | PROCESS |
|---|---|---|
| SET ATTENTION INDICATOR | LIGHT, EXTINGUISH LED AT MBM, PBM, CMM OR CABINET. | TAKE ACTION ACCORDING TO THE DESIRED STATE IN THE REQUEST. |
| SET KNOB | NAME/VALUE PAIR TO CONTROL SOME MBM/PBM CAPABILITIES | CODED INTO THE IMAGE IS A LIST OF VARIABLE NAMES THAT CAN BE MODIFIED |
| GET KNOB | THE VALUE CURRENTLY MAINTAINED FOR THE NAMED VARIABLE IS RETURNED. | CHECK TO SEE IF THE NAME IS IN THE LIST AND RETURN IT'S CURRENT VALUE IN THE RESPONSE. |
| READ | ALLOW DEBUG READ OF PHYSICAL MEMORY OR I/O | CHECK ON VALIDITY OF REQUEST AND IF VALID, READ PHYSICAL MEMORY SPACE OR DIRECT I/O SPACE. FOR DEBUG. |
| WRITE | ALLOW DEBUG WRITE OF PHYSICAL MEMORY OR I/O | CHECK ON VALIDITY OF REQUEST AND CHECK MMU PROTECTION PRIVILEGES TO WRITE IN THE SPACE SO AS NOT TO CAUSE PROTECTION VIOLATIONS. IF NOT PROTECTED, WRITE THE BLOCK. FOR DEBUG. |

MISCELLANEOUS COMMAND HANDLING

FIG. 78

| COMMAND | ARG COUNT | ARGUMENTS | RESULT | HANDLING |
|---|---|---|---|---|
| Show _Config | 0 | | SEE SECTION "SHOW CONFIGURATION WITH FRU DATA" | MAKE REQUEST TO PMU SERVER |
| RESET | 2 | 1-PARTITION NO 2-SUB PARTITION NO | RETURNS OK OR ERROR | SEND RESET PARTITION TO PMU SERVER |
| Power_on | 2 | 1-PARTITION NO 2-SUB PARTITION NO | RETURNS OK OR ERROR | SEND POWER ON PARTITION TO PMU SERVER |
| Power_off | 2 | 1-PARTITION NO 2-SUB PARTITION NO | RETURNS OK OR ERROR | SEND POWER OFF PARTITION TO PMU SERVER |
| Halt_on | 2 | 1-PARTITION NO 2-SUB PARTITION NO | RETURNS OK OR ERROR | SEND HALT ON PARTITION TO PMU SERVER |
| Halt_off | 2 | 1-PARTITION NO 2-SUB PARTITION NO | RETURNS OK OR ERROR | SEND HALT OFF PARTITION TO PMU SERVER |
| Prepare _EV7_List | 2-16 | 1-MBM RACK-THUMB-WHEEL, 2-EV7 ID (0-7) UP TO 8 PAIRS | OK IF ALL ELEMENTS ARE IN THE SAME HARD PARTITION OR FREE POOL | SAVES THIS VALUE IN MBM RAM FOR USE WITH THE NEXT ADD EV7s, FREE EV7s. LASTS UNTIL NEXT PREPARE EV7 LIST. |
| Add_Ev7s | 2 | 1-PARTITION NO 2-SUB PARTITION NO | TAKE THE VALUES IN THE EV7 LIST AND ADD IT TO THE PARTITION. | SEND COMMAND TO PMU SERVER. |
| Free_Ev7s | 0 | | TAKE THE VALUES IN THE EV7 LIST AND REMOVE THEM FROM THE PARTITION INDICATED. | SEND COMMAND TO PMU SERVER. |
| Save_ Partition | 2 | 1-PARTITION NO 2-SUB PARTITION NO | THE PARTITION DATABASE GETS STORED TO NVRAM. | SEND COMMAND TO PMU SERVER. |
| Destroy_ Partition | 2 | 1-PARTITION NO 2-SUB PARTITION NO | RESET &. FREE ALL EV7S FROM PARTITION. | SEND COMMAND TO PMU SERVER. |
| Ev7_test | 3 | 1-MBM RACK-THUMB-WHEEL, 2-EV7 ID (0-7), 3-TEST NUMBER | TEST STATUS | SEND A EV7 START TEST REQUEST TO THE CMM. |

FIG. 79A

| COMMAND | ARG COUNT | ARGUMENTS | RESULT | HANDLING |
|---|---|---|---|---|
| Add_Cable | 5-6 | 1-SOURCE - MBM RACK-THUMB-WHEEL,<br>2-EV7 ID (0-7),<br>3-PORT(N,S,E,W),<br>4-DESTINATION - MBM/PBM RACK-THUMB-WHEEL,<br>5- EV7 ID(0-7) OR IO7 ID(0-3),<br>6-PORT(N,S,E,W) OR BLANK WHEN IO7 | THIS COMMAND ASSISTS IN LOCATING THE PROPER CONNECTOR PAIR TO CONNECT THE CABLE. THE LEDS AT EACH CONNECTOR ARE LIT UNTIL THE CONNECTION IS COMPLETE. | THE COMMANDS SET CABLE TEST SIGNAL STATE AND GET CABLE TEST SIGNAL STATE ARE SENT TO THE APPROPRIATE MBM AND PBM TO CAUSE THE LEDS TO LIGHT AND CHECK THE CONNECTION ITSELF. |
| New_Cable | 0 | | REDO CABLING TESTS. | SEND RECONFIGURE CABLING TO PMU SERVER. |
| Show_ cabling | 0 | | DISPLAYS A LIST OF IP & IO CABLING | SEND RETRIEVE CABLING CONFIGURATION TO PMU SERVER |
| Virt_ console | 3 | 1-PARTITION NO<br>2-SUB PARTITION NO.<br>3-COM PORT(1,2) | OPEN A SESSION WITH PRIMARY EV7 & INTERCEPT COMx PORT DATA. | USE PutChar STREAMS FOR BOTH DISPLAY AND KEYBOARD DATA UNTIL THE KEYBOARD DATA SEQUENCE 'ESC'ESC'S'M' IS RECOGNIZED AS AN EXIT OF THE SESSION. |
| Get_fans | 1 | 1-MBM/PBM RACK -THUMB-WHEEL | RPM AND THRESHOLD THAT FANS ARE RUNNING AT. | DETERMINE APPROPRIATE IP ADDRESS FOR DESTINATION AND SEND A GET FAN RPM SPEED MESSAGE |
| Set_fans | 3 | 1- MBM/PBM RACK -THUMB-WHEEL,<br>2-INSTANCE OF FAN,<br>3-RPM | ERROR OR OK | DETERMINE APPROPRIATE IP ADDRESS FOR DESTINATION AND SEND A SET FAN RPM SPEED MESSAGE. |
| Error_ counts | 0 | | RETURNS A LIST OF THE ERROR COUNTS ON ALL MBM/PBM ERROR LOGS. | SEND ERROR LOG COUNT REQUEST TO EACH MBM/PBM. |
| Error_clear | 1 | 1- MBM/PBM RACK -THUMB-WHEEL | OK | SEND ERROR LOG CLEAR REQUEST TO DESTINATION |
| Get_errors | 1 | 1- COUNT OF THE NUMBER OF ERRORS TO BE REPORTED ON EACH DEVICE.1 | A LIST OF THE LAST ERROR MESSAGES IN ENGLISH AS IT WOULD APPEAR ON THE OCP WITH ANY QUALIFYING DATA FORMATTED AS APPROPRIATE. THIS IS REPEATED FOR EACH MBM AND PBM | GET THE ERROR LOG COUNT FROM EACH MICRO. SEND ERROR LOG ENTRY RETRIEVAL REQUEST TO EACH MICRO USING THE HIGHEST NUMBER AS THE 1st REQUEST. |

FIG. 79B

| COMMAND | ARG COUNT | ARGUMENTS | RESULT | HANDLING |
|---|---|---|---|---|
| Get_time | 0 | | DATE AND DINE IS DISPLAYED AS dd/mm/yy hh:mm:ss | USE GET BASE TIME COMMAND |
| Set_ time | 1 | 1-DATE AND TIME ENTRY IN FORMAT: "dd/mm/yy-hh:l mm: ss | REDISPLAYS DATE AND TIME | SET BASE TIME AND ANNOUNCE BASE TIME CHANGE IS SENT TO ALL MBMS. |
| Req_knobs | 2-3 | 1- MBM/PBM RACK -THUMBWHEEL, 2- DEVICE (MBM ", "PBM". "CMM"). 3- IFCMMIN2. THEN NUMBER (0-3) | NAMES AN VALUES OF ALL POSSIBLE KNOBS ARE LISTED. | REQUEST KNOB COMMAND FOR ALL POSSIBLE KNOBS FOR THAT DEVICE.. |
| Set_knob | 4-5 | 1- MBM/PBM RACK -THUMB-WHEEL, 2-DEVICE("MBM". "PBM"."CMM"). 3-IFCMMIN2,THEN NUMBER (0-3) 2-KNOB NAME, 3-KNOB VALUE | OK | SET KNOB ON REQUESTED MICRO. |
| Firmware_ version | 3-4 | 1- MBM/PBM RACK -THUMB-WHEEL, 2-DEVICE("MBM", "PBM". "CMM"), 3-IFCMM IN2.THEN NUMBER (0-3) 4-MODULE('CMM" "FPGA","SROM", "XSROM","MBM" "PBM","CMM_FS L", "MBM_FSL","PBM_ FSL", "PBM_FPGA") | RETURNS THE VERSION NUMBER | REPORT FIRMWARE VERSION COMMAND |
| Firmware_ upgrade | 4-5 | 1-MBM/PBM RACK -THUMB-WHEEL. 2-DEVICE("MBM". "PBM","CMM"). 3-IFCMM IN2. THEN NUMBER (0-3) 4-MODULE("CMM". "FPGA",'SROM", "XSROM","MBM", "PBM","CMM_FSL", "MBM_PSL"," PBM_ FSL","PBM_FPGA") 5-TFTP SERVER IP ADDRESS | MAKES THE TERMINAL INTO A PPP SERIAL LINK MAKING TFTP REQUESTS UNTIL COMPLETION OF THE TRANSFER OR A TIMEOUT OCCURS. POSSIBLE RETURN VALUES ARE: "COMPLETE". "TIMEOUT". FILE TOO LONG". "PILE TOO SHORT" | SEND THE UPGRADE FIRMWARE REQUEST TO THE MBM OR PBM OR CMM. MAKE THE BACKUP COPY WHERE REQUIRED. MBM HAS A COPY OF CMM PROGRAM. |

FIG. 79C

| COMMAND | ARG COUNT | ARGUMENTS | RESULT | HANDLING |
|---|---|---|---|---|
| Load_Test_ Version. | 4-5 | 1- MBM/PBM RACK -THUMB-WHEEL, 2-DEVICE("MBM", "PBM", "CMM"), 3-IF CMM IN2,THEN NUMBER (0-3) 4-MODULE("CMM", "FPGA","SROM" "XSROM","MBM" "PBM","CMM_FS L "MBM_FSL", " PBM_FSL","PBM_ FPGA") 5-TFTP SERVER IP ADDRESS | MAKES THE TERMINAL INTO A PPP SERIAL LINK MAKING TFTP REQUESTS UNTIL COMPLETION OF THE TRANSFER OR A TIMEOUT OCCURS. POSSIBLE RETURN VALUES ARE: "COMPLETE", "TIMEOUT", "FILE TOO LONG", "FILE TOO SHORT" | SEND THE LOAD TEST VERSION COMMAND TO THE MBM OR PBM OR CMM. WHICH MAINTAINS A COPY OF THE PROGRAM IN MBM MEMORY. |
| Disable_ test_ version | 3-4 | 1- MBM/PBM RACK -THUMB-WHEEL, 2-DEVICE("MBM", "PBM","CMM"), 3-IF CMM IN 2.THEN NUMBER (0-3) 4-MODULE("CMM" "FPGA","SROM", "XSROM","MBM" "PBM","CMM_FS L" "MBM_FSL", "PBM_FSL", "PBM_FPGA") | OK | SEND Disable_test version COMMAND |

CLI COMMANDS

FIG. 79D

| KNOB NAME | POSSIBLE VALUES | USAGE |
|---|---|---|
| CLI_PORT_SPEED | 1200, 2400, 4800, 9600, 19200, 38400, 57600, 115200,230400. | SPEED BETWEEN COM PORT AND MODEM (DEFAULT 57600bps) |
| CLI_DATA_BITS | 8, 7 | COM PORT UART USES 7 OR 8 DATA BITS BEFORE STOP (DEFAULT 8) |
| CLI_STOP_BITS | 1, 1.5, 2 | COM PORT UART SENDS 1, 1.5 OR 2 STOP BITS TO MODEM (DEFAULT 1) |
| CLI_FLOW_BITS | HW, SW, NONE | FLOW CONTROL: HW-RTS/CTS SIGNALS (DEFAULT), SW-XON/XOFF BYTES, NONE |
| CLI_MODEM | YES, NO | IF MODEM IS CONNECTED USE NO; OTHERWISE THE FOLLOWING SET OF CLI_MDM KNOBS ARE REQUIRED. |
| CLI_MDM_INIT | AT STRING FOR MODEM INITIALIZATION | ON EACH HANG-UP OR DROP OF CARRIER SIGNAL THIS COMMAND IS SENT TO THE MODEM (DEFAULT IS "ATZ"). IF MODEM DOESN'T RESPOND WITH OK, 3 RETRIES ARE ATTEMPTED. |
| CLI_MDM_DIAL | AT STRING WHEN WE DIAL OUT TO DROP AN ALERT MESSAGE OR DIAL-BACK. | PREFIX FOR DIALING THE NUMBER INDICATED IN THE ALERT NUMBER OR DIAL -BACK NUMBER. (DEFAULT IS "ATDT"). IF MODEM RESPONDS WITH OK, COMMUNICATION IS CONSIDERED TO BE ESTABLISHED, ELSE 3 RETRIES ARE ATTEMPTED. |
| CLI_DIAL_BACK | PHONE NUMBER WITH DIALING PAUSES. | FOR SECURITY PURPOSES WHENEVER A CONNECTION IS MADE, THE PROGRAM WILL HANGUP AND DIAL THE INDICATED TO ESTABLISH CONNECTION. (DEFAULT EMPTY) |
| CLI_DIAL_ALERT | PHONE NUMBER WITH POSSIBLE DIALING PAUSES FOR A RECEIVER OF ALERT MESSAGE. | IF AN ERROR MESSAGE HAS AN ALERT INDICATION, THE TEXT PORTION THAT WOULD BE FORMATTED FOR THE OCP IS SENT AFTER ESTABLISHING A MODEM CONNECTION WITH THE INDICATED NUMBER. NOTE: THERE IS NO PAGING SUPPORT TAPI, ALPHANUMERIC OR NUMERIC IMPLIED BY THIS OPTION. |
| CLI_PASSWOWRD | THE ONLY PASSWORD THAT IS ALLOWED TO AT TIME OF CONNECTION. A PASSWORD PROMPT IS USED. | THE PASSWORD PROMPT APPEARS ON A MODEM CONNECTION REQUESTING THE PASSWORD ENTRY TO CONTINUE. THE ENTRY MUST MATCH THE NULL TERMINATED STRING BELONGING TO THIS KNOB. IF NOT, A HUNG-UP COMMAND IS SENT TO THE MODEM. A DEFAULT PASSWORD WILL EXIST <TBD>, IF NONE HAS BEEN ASSIGNED. |

MODEM KNOBS

FIG. 80

| CAPABILITY | RAMIFICATION DURING MBM FAILURE |
|---|---|
| ROXY FORWARDING | LAN MESSAGES TO THE CMM FAIL |
| CMM PRESENCE WATCHDOG | THERE IS NO NOTIFICATION OF FAILURE |
| TFTP SERVER | CMM IS UNABLE TO BE FIRMWARE UPGRADE |
| ERROR REPOSITORY & DISTRIBUTION | CMM IS UNABLE TO LOG ERRORS |
| POWER HIERARCHY | PARTITION POWER CHANGES CANNOT OCCUR. |
| TIME SERVICES | CMM DOES NOT RECEIVE REGULAR TIME UPDATES |
| VIRTUAL CONSOLE TERMINAL | CONSOLE INPUT/OUTPUT UNAVAILABLE IF PRIMARY IN PATH |
| SRM ENV. VAR. REPOSITORY | ENV. WRITES FAIL; SRM WRITE CALLBACK FAIL |

MODEMS KNOBS FOR CONNECTION TO CCI PORT

FIG. 81

| COMMAND | OS/ SRM UP | ALL EV7s | MAJ. GRP. | COMMENT |
|---|---|---|---|---|
| DISTRIBUTE PARTITION DATABASE WITH EV7 CHANGE, ADD EV7, DELETE EV7. | T | T | T | PROVIDED THE NEW EV7 IS STILL IN THE MAJORITY GROUP AND ROUTABLE. |
| SET PARTITION DELTA TIME, STORE ENVIRONMENT VARIABLES, ASSIGN SUB PARTITION, ASSIGN MEMORY & IO7 | X | X | T | THIS AFFECTS THE DATABASE; BUT WHEN JOINED BACK AGAIN MAJORITY WINS. |
| RESET, HALT, QUIESCE, CONTINUE | T | T | X | THIS DOESN'T AFFECT THE NON-VOLATILE DATABASE. |
| POWER ON, POWER OFF, CHANGE PRIMARY | X | X | X | NEVER ALLOWED ON A SPLIT PARTITION |

OPERATION LIMITATIONS IN A DEGRADED SYSTEM

FIG. 82

| OPERATIONS | STRUCTURES | DISTRIBUTION COMMAND | RAM | NVR |
|---|---|---|---|---|
| THE LAN GROUP PROTOCOL MESSAGES USE EITHER BROADCAST OR REQUEST/ RESPONSE MESSAGES IN FORMING A GROUP. | GroupID(RAM). MajGID(RAM). Micro-procesorSet(NVRAM) | NEW GROUP, ACCEPT, JOIN, SetMembership | X | X |
| THE GROUP LEADER, AFTER FORMING A NEW GROUP, CHECKS THE COPY OF ALL MEMBERS' PARTITION DATABASES AND DISTRIBUTED THE COPY. EV7 CHANGES NOTED BY THE PMU SERVER ARE DISTRIBUTED VIA A PARTITION DATABASE CHANGE. THE PARTITION COORDINATOR, WHEN RECONFIGURING THE PARTITION MAY NEED TO DISTRIBUTE COMMANDS THAT CHANGE THE VOLATILE COPY OF THE PARTITION DATABASE. | EV7/I07. MEMORY LOCATIONS, ASSIGNMENTS AND STATUS. | REQUEST PARTITION DATABASE, DISTRIBUTE PARTITION DATABASE | X | X |
| THE PMU SERVER INITIALIZATION INCLUDES THE CABLE TESTING A DISTRIBUTION OF MAT VOLATILE DATABASE INFORMATION. | CABLE CONFIGURATION | RETRIEVE CABLING CONFIGURATION | X(NOT DISTRIBUTED) | |
| THE DHCP SERVER DISTRIBUTES THE LIST OF DHCP LEASES AND THEIR CHANGES. | DHCP LEASES | DISTRIBUTE DHCP LEASE DATA | X | X |

DATA BASE GROUPING

FIG. 83A

| OPERATIONS | STRUCTURES | DISTRIBUTION COMMAND | RAM | NVR |
|---|---|---|---|---|
| THE PARTITION COORDINATOR DISTRIBUTES TO ALL MEMBERS ANY CHANGES IN THE STATUS OF THE PARTITION'S STATE AND ATTRIBUTES TO ALLOW FAIL-OVER RECOVERY TO ANOTHER PARTITION COORDINATOR. CHANGES TO MEMORY, IO7 AND COMMUNITY ASSIGNMENTS AMONG THE SUB-PARTITIONS. PARTITION STATES ARE AFFECTED BY THE ONGOING STARTING, ROUTING, LOADING, HALTING, RESETTING AND POWER CONTROLS ON THE ENTIRE PARTITION. ATTRIBUTE FIELDS ARE: 1) OS WATCHDOG INTERVAL AND ACTION MASK, 2) BBWATCH DELTA TIME, 3) SRM ENVIRONMENT VARIABLES. | PARTITION STATE AND ATTRIBUTE FTELDS(RAM) THE STATE AND OS WATCHDOG IS KEPT IN VOLATILE RAM AND ALL OTHER ATTRIBUTES ARE STORED IN NVRAM LOCATION FOR THAT PARTITION | SET PARTITION STATE AND ATTRIBUTES OR DISTRIBUTE ONE PARTITION'S DATABASE | X | X |
| MBM MAINTAINS IN RAM STATUS ON IT'S OWN CMMs, EV7s AND MEMORY. I2C DATA, ERROR LOG COUNT. KNOBS AND OCP DATA IS MAINTAINED IN RAM. | CMM EV7 STATUS. EC SENSOR AND EEROM VALUES, VOLATILE KNOBS. | MBM REPORT CONFIGURATION | X(NOT DISTRIB UTED) | |
| MBM MAINTAINS THE CURRENT USE OF THE OCP SWITCH SETTINGS AND SOME KNOBS. DEFAULT IS ENTIRE SYSTEM ENCLOSURE. | OCP SWITCH CONTROL, PERMANENT KNOBS.. | OCP TO PARTITION ASSIGNMENT | X(NOT DISTRIB UTED) | X(NOT DISTRIB UTED) |
| PBM MAINTAINS A RAM COPY OF IT'S OWN 107 IDS, I2C DATA AND ERROR LOG COUNT. | 107 RISER IDS. I2C SENSOR AND EEROM VALUES. | PBM REPORT CONFIGURATION, RECEIVE CABLE ID | X(NOT DISTRIB UTED) | |
| PBM RECEIVES FROM SRM THE PCI CONFIGURATION DATA AND RETRIEVES IT ON REQUEST. MBM, PBM AND CMM KNOB DATA ARE KEPT IN NVRAM TO TAILOR BEHAVIOR. | PCI CONFIG SPACE (RAM), KNOB DATA. | STORE PCI SLOT INFO, READ PCI SLOT INFO. SET KNOB DATA, GET KNOB DATA. | X(NOT DISTRIB UTED) | X(NOT DISTRIB UTED) |

DATA BASE GROUPING

FIG. 83B 84,000

84,002 — IN FLASH

NON-VOLATILE PARTITION DB

| N/S | E/W | HARD | SUB |
|-----|-----|------|-----|
| 0 | 0 | 7 | |
| . | . | . | |
| . | . | . | |
| . | . | . | |
| x | y | z | |

x : 0-15  y : 0-15  z : 0-255
VARIABLE SIZE; DENSE;

Ⓡ

MICROPROCESSOR SET — 84,004

| RACK | BOX |
|------|-----|
| 1 | P 1 |
| 2 | I 7 |
| ... | ... |

P - PROCESSOR
I - I/O
NON-VOLATILE
RANGE:   RACK:    0-32
         BOX:     0-32
VARIABLE LENGTH
MAX SIZE:                    Ⓡ

SRM ENV VARs

HARD 0  SUB 0
  bootdef_dev
  ewa0_mode
  .....
PER SUB PARTITION
NON-VOLATILE
FIXED 2KB                    Ⓡ     — 84,006

DELTA TIME                Ⓡ     — 84,008

PER SUB PARTITION
NON-VOLATILE
FIXED: 6 BYTES x 256

Ⓡ REPLICATED SYSTEM WIDE

REPLICATED DATABASE

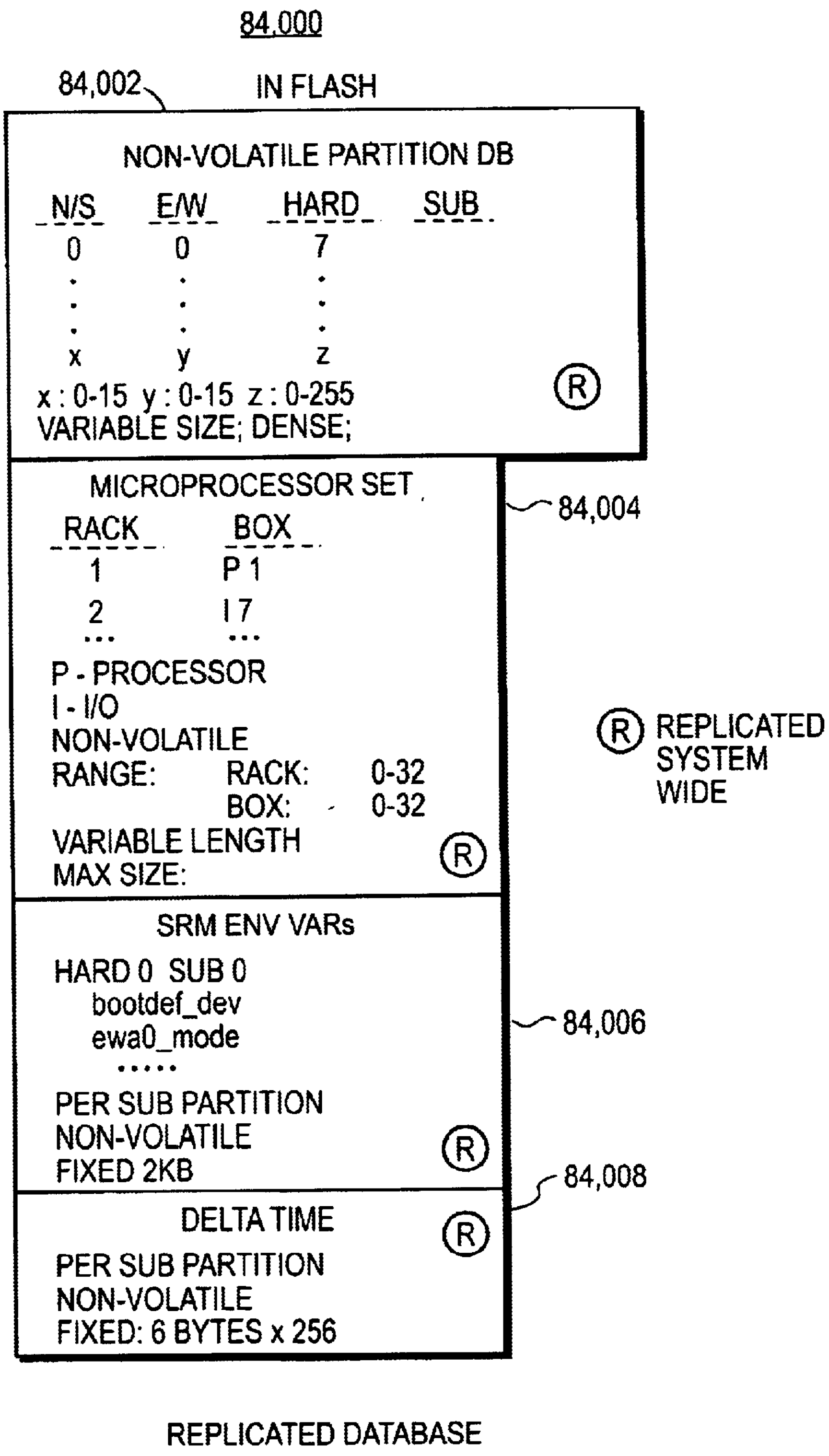

FIG. 84A

PBM HARDWARE OVERVIEW

| ERROR CODE | DEVICE TYPE | REPOR-TER | OCP/CLI TEXT | LOG | ALERT | SYSEVENT | EEROM | LOC DATA | OCP |
|---|---|---|---|---|---|---|---|---|---|
| 1 | NONE | ANYONE | FREE TEXT | X | ? | ? | | X | ? |
| 2 | NONE | ANYONE | BINARY WITH NO TEXT | X | ? | ? | | X | ? |
| 1 | EV7 | CMM | EV7 XX FAILURE CODE XX ON RUNNING OS | X | X | X | | X | X |
| 2 | EV7 | CMM | EV7 XX FAILURE IN ROUTING TO EV7 XX | X | X | | | | |
| 3 | EV7 | CMM | EV7 XX POWER ON FAILED | X | X | | | | X |
| 4 | EV7 | CMM | EV7 XX FAILED ON TEST XX WITH STATUS XX | X | X | | | | |
| 5 | EV7 | CMM | EV7 XX OVERHEATED AT XXX FAHR. | X | X | X | | | X |
| 6 | EV7 | CMM | EV7 XX XX.X POWER AT XX.X | X | X | X | | | X |
| 7 | RIMM | CMM | MEMORY TEST XX FAILURE FOR RIMM XX | X | X | | | X | X |
| 8 | FPGA | CMM | CMM X FPGA FAILURE XX | X | X | | | | X |
| 9 | CMM | CMM | CMM X POST ERROR XX | X | X | | | X | X |
| 10 | CMM | CMM | CMM X FAILSAFE REQUIRED | X | X | | X | | X |
| 11 | CMM | CMM | CMM X FAILED TO START TEST XX | X | X | | X | X | X |
| 12 | 12C | CMM, MBM | 12C FAILURE ON MBM XX CMM X | X | X | X | | | X |
| 13 | MBM | MBM | MBM POST FAILURE XX | X | X | | | X | X |
| 14 | POWER SUPPLY | MBM | POWER SUPPLY X CAN'T POWER ON | X | X | X | | X | X |
| 15 | LAN | MBM | NO PEER COMMUNICATION ON LAN | X | | X | | | X |
| 16 | UART | MBM | COM PORT X FAILURE | X | X | | | | X |
| 17 | MBM/ PBM | MBM/ PBM | FAIL SAFE LOAD REQUIRED | X | X | | | | X |
| 18 | LAN | MBM/PBM | IN ISOLATED GROUP ON LAN | X | X | X | | | X |
| 19 | MEMORY | MBM/PBM | SINGLE/MULTI BIT ECC ERROR | X | X | | | X | X |
| 20 | WDT | MBM/PBM | MBM WATCHDOG RESET | X | X | X | | | X |
| 21 | WDT | MBM | WATCHDOG EXPIRED ON PARTITION XX | X | X | X | | | X |
| 22 | IO7 | PBM | IO7 XX DRAWER NOT ACCESSIBLE | X | X | X | | | X |
| 23 | TEMP | MBM/PBM | TEMPERATURE TOO HIGH XXX FAHR | X | X | X | X | | X |
| 24 | EEROM | CMM, MBM/PBM | EEROM XX NOT ACCESSIBLE | X | X | | | | X |
| 25 | OCP | MBM | EV7 XX POWER ON FAILED | X | X | | | | |
| 26 | OCP | MBM | EV7 XX NOT CONNECTED TO IO7 XX | X | | X | | | X |
| 27 | EV7 | MBM | VIRTUAL CONSOLE AT EV7 XX BUSY | X | | | | | X |

ERROR CODES

FIG. 87

SHARED RAM COMMUNICATION

MBM TO CMM COMMUNIICATION

EXAMPLE OF MBM FORWARDING

EXAMPLE OF CMM FORWARDING

CMM COM PORT CONNECTION

THE TELNET SESSION

REQUEST FORMAT

| SIZE (DEC) | START (HEX) | END (HEX) | BIT 7 | BIT 6 | BIT 5 | BIT 4 | BIT 3 | BIT 2 | BIT 1 | BIT 0 |
|---|---|---|---|---|---|---|---|---|---|---|
| 4 | 0 | 3 | ORIGINATOR IP ADDRESS | | | | | | | |
| 4 | 4 | 7 | DESTINATION IP ADDRESS | | | | | | | |
| 4 | 8 | B | IDENTIFIER | | | | | | | |
| 2 | C | D | COMMAND CODE | | | | | | | |
| n | E | n+E | DATA (OPTIONAL) | | | | | | | |

REQUEST FORMAT

FIG. 94

RESPONSE FORMAT

| SIZE (DEC) | START (HEX) | END (HEX) | BIT 7 | BIT 6 | BIT 5 | BIT 4 | BIT 3 | BIT 2 | BIT 1 | BIT 0 |
|---|---|---|---|---|---|---|---|---|---|---|
| 4 | 0 | 3 | ORIGINATOR IP ADDRESS | | | | | | | |
| 4 | 4 | 7 | DESTINATION IP ADDRESS | | | | | | | |
| 4 | 8 | B | IDENTIFIER | | | | | | | |
| 2 | C | D | RESPONSE CODE | | | | | | | |
| 2 | E | F | STATUS ( SEE APP. A ) | | | | | | | |
| n | 10 | n+10 | DATA (OPTIONAL) | | | | | | | |

RESPONSE FORMAT

FIG. 95

| BIT 7 | BIT 6 | BIT 5 | BIT 4 | BIT 3 | BIT 2 | BIT 1 | BIT 0 |
|---|---|---|---|---|---|---|---|
| ORIGINATOR IP ADDRESS (0) | | | | | | | |
| DESTINATION IP ADDRESS (FFFFFFFFh) | | | | | | | |
| IDENTIFIER (GroupID) | | | | | | | |
| COMMAND CODE | | | | | | | |
| SM LAN MESSAGE | | | | | | | |

TRAIN MESSAGE HEADER FORMAT

FIG. 96

| COMMAND DESCRIPTOR | CODE |
|---|---|
| NEW GROUP | 0101h |
| ACCEPT GROUP OFFER | 0102h |
| REJECT GROUP OFFER | 0103h |
| JOIN GROUP | 0104h |
| PROBE MICROPROCESSOR | 0105h |
| I-am-alive | 0106h |
| REPORT CONFLICTING ADDRESS | 0107h |
| SET MEMBERSHIP CONFIGURATION | 0108h |

LAN FORMATION GROUP

FIG. 97

| COMMAND DESCRIPTOR | CODE |
|---|---|
| FULL TRAIN MESSAGE | 0201h |
| EMPTY TRAIN MESSAGE | 0202h |

RELIABLE MESSAGE GROUP

FIG. 98

| COMMAND DESCRIPTOR | CODE |
|---|---|
| GET CMM STATE | 0310h |
| GET MBM CONFIGURATION | 0321h |
| GET PBM CONFIGURATION | 0322h |
| GET PARTITION DATABASE | 0323h |
| DISTRIBUTE PARTITION DATABASE | 0324h |
| GET SYSTEM TOPOLOGY | 0330h |
| STORE PCI SLOT INFO | 0331h |
| GET PCI SLOT INFO | 0332h |
| GET OWN PARTITION NUMBER | 0333h |

SYSTEM DISCOVERY GROUP

FIG. 99

| COMMAND DESCRIPTOR | CODE |
|---|---|
| CREATE PARTITION | 0401h |
| SET PARTITION ATTRIBUTES | 0402h |
| MOVE EV7S TO PARTITION | 0403h |
| REMOVE EV7S FROM PARTITION | 0404h |
| SAVE PARTITION ASSIGNMENT | 0405h |
| START PARTITION | 0406h |
| RESET PARTITION | 0407h |
| POWER ON PARTITION | 0408h |
| POWER OFF PARTITION | 0409h |
| HALT PARTITION | 040Ah |
| ADD EV7S TO RUNNING PARTITION | 040Bh |
| DELETE EV7S FROM RUNNING PARTITION | 040Ch |
| SWITCH PRIMARY EV7 | 040Dh |
| DESTROY PARTITION | 040Eh |
| CONTINUE PARTITION | 040Fh |
| COMPUTE ROUTING | 0410h |
| CONFIGURE RBOX/CBOX | 0411h |
| SET PARTITION STATE | 0412h |
| GET STATE OF OCP SWITCHES | 0413h |
| OCP SWITCH ASSIGNMENT | 0414h |
| POWER ON/OFF | 0415h |
| SYSTEM EVENT | 0416h |
| ASSIGN SUB PARTITIONS TO COMMUNITY | 0417h[1] |
| GET HARD PARTITION MEMORY ASSIGNMENTS | 0418h |
| ASSIGN MEMORY BLOCK TO SUB PARTITION | 0419h |
| ASSIGN 107 TO SUB PARTITION | 041Ah |
| STORE ENVIRONMENT VARIABLES | 041Bh |
| GET ENVIRONMENT VARIABLES | 041Ch |

PARTITION CONTROL GROUP

[1] COMMUNITIES ARE TO BE IMPLEMENTED AT A LATER PHASE OF DEVELOPMENT

FIG. 100

| COMMAND DESCRIPTOR | CODE |
|---|---|
| EV7 RESET ON/OFF | 0501h |
| EV7 PULSED RESET | 0502h |
| EV7 HALT ON/OFF | 0503h |
| EV7 QUIESCE | 0504h |
| EV7 RBOX/CBOX CONFIG. | 0505h |
| REQUEST EV7 START TEST | 0506h |
| LOAD IMAGE | 0507h |
| LOAD & RUN SRM | 0508h |

EV7 SETUP GROUP

FIG. 101

| COMMAND DESCRIPTOR | CODE |
|---|---|
| SET CABLE TEST SIGNAL STATE | 0601h |
| GET CABLE TEST SIGNAL STATE | 0602h |
| SEND CABLE ID | 0603h |
| RECEIVE CABLE ID | 0604h |
| GET MBM IP CABLING | 0605h |
| GET PBM IO CABLING | 0606h |
| GET CABLING CONFIGURATION | 0607h |
| RECONFIGURE CABLING | 0608h |

CABLE TEST GROUP

FIG. 102

| COMMAND DESCRIPTOR | CODE |
|---|---|
| GET TELNET IP ADDRESS/PORT | 0701h |
| PUT CHARS FROM KEYBOARD TO VIRTUAL CONS | 0702h |

VIRTUAL CONSOLE GROUP

FIG. 103

| COMMAND DESCRIPTOR | CODE |
|---|---|
| GET FIRMWARE VERSION | 0801h |
| UPGRADE FIRMWARE | 0802h |
| LOAD TEST VERSION | 0803h |
| DISABLE TEST VERSION | 0804h |

FIRMWARE LOAD AND UPGRADE GROUP

FIG. 104

| COMMAND DESCRIPTOR | CODE |
|---|---|
| GET VOLTAGE READINGS | 0901h |
| GET TEMPERATURE READINGS | 0902h |
| GET FAN RPM READINGS | 0903h |
| SET FAN RPM SPEED | 0904h |
| SET OCP DISPLAY DATA | 0905h |
| SET ATTENTION INDICATOR | 0906h |
| GET SWITCH STATE | 0907h |
| GET POWER SUPPLY STATE | 0908h |

ENVIRONMENTAL RETRIEVAL GROUP

FIG. 105

| COMMAND DESCRIPTOR | CODE |
|---|---|
| GET EEROM DATA | 0A01h |
| SET EEROM DATA | 0A02h |

FRU DATA GROUP

FIG. 106

| COMMAND DESCRIPTOR | CODE |
|---|---|
| ERROR REPORTING | 0B01h |
| GET ERROR LOG COUNT | 0B02h |
| ERROR LOG CLEAR | 0B03h |
| GET ERROR LOG ENTRY | 0B04h |

ERROR LOGGING GROUP

FIG. 107

| COMMAND DESCRIPTOR | CODE |
|---|---|
| START OS WATCH DOG | 0C01h |
| KEEP ALIVE | 0C02h |
| STOP OS WATCHDOG | 0C03h |

OS WATCH DOG TIMER

FIG. 108

| COMMAND DESCRIPTOR | CODE |
|---|---|
| GET BASE TIME | 0D01h |
| SET BASE TIME | 0D02h |
| DISTRIBUTE BASE TIME CHANGE | 0D03h |
| SET PARTITION DELTA TIME | 0D04h |
| GET PARTITION DELTA TIME | 0D05h |

DATE/TIME GROUP

FIG. 109

| COMMAND DESCRIPTOR | CODE |
|---|---|
| GET KNOB | 0E01h |
| SET KNOB | 0E02h |
| UNRECOGNIZED RESPONSE | 0E03h |
| DISTRIBUTE DHCP LEASE DATA | 0E04h |
| READ | 0E05h |
| WRITE | 0E06h |

MISCELLANEOUS GROUP

FIG. 110

PARTITION FORMATION USING MICROPROCESSORS IN A MULTIPROCESSOR COMPUTER SYSTEM

INCORPORATION BY REFERENCE OF RELATED APPLICATIONS

This patent application is related to the following co-pending, commonly owned U.S. Patent Applications, all of which were filed on even date with the within application for United States Patent, which are each hereby incorporated by reference in their entirety:

U.S. patent application Ser. No. 09/652,644, now U.S. Pat. No. 6,701,387, entitled ADAPTIVE DATA PREFETCH PREDICTION ALGORITHM;

U.S. patent application Ser. No. 09/653,133, now U.S. Pat. No. 6,456,510, entitled UNIQUE METHOD OF REDUCING LOSSES IN CIRCUITS USING $V^2$ PWM CONTROL;

U.S. patent application Ser. No. 09/652,641 entitled IO SPEED AND LENGTH PROGRAMMABLE WITH BUS POPULATION;

U.S. Provisional Patent Application Ser. No. 60/304,167 entitled SYSTEM AND METHOD FOR USING FUNCTION NUMBERS TO INCREASE THE COUNT OF OUTSTANDING SPLIT TRANSACTIONS;

U.S. patent application Ser. No. 09/652,984, now U.S. Pat. No. 6,647,453, entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/653,180, now U.S. Pat. No. 6,681,282, entitled ONLINE ADD/REMOVAL OF SERVER MANAGEMENT INFRASTRUCTURE;

U.S. patent application Ser. No. 09/652,494, now U.S. Pat. No. 6,640,272 entitled AUTOMATED BACKPLANE CABLE CONNECTION IDENTIFICATION SYSTEM AND METHOD;

U.S. patent application Ser. No. 09/652,459 entitled CLOCK FORWARDING DATA RECOVERY;

U.S. patent application Ser. No. 09/652,980, now U.S. Pat. No. 6,629,257, entitled CLOCK FORWARD INITIALIZATION AND RESET SIGNALING TECHNIQUE;

U.S. patent application Ser. No. 09/944,515 entitled PASSIVE RELEASE AVOIDANCE TECHNIQUE;

U.S. patent application Ser. No. 09/652,985, now U.S. Pat. No. 6,633,967, entitled COHERENT TRANSLATION LOOK-ASIDE BUFFER;

U.S. patent application Ser. No. 09/652,645, now U.S. Pat. No. 6,724,850, entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171, now U.S. Pat. No. 6,711,693, entitled VIRTUAL TIME OF YEAR CLOCK.

FIELD OF THE INVENTION

This invention relates to the control of computer systems, and more particularly to the control of multiprocessor systems.

BACKGROUND

It is standard engineering practice to assemble a plurality of processors into multiprocessor computer system. It is also standard engineering practice to couple the plurality of processors by a bus for the processor to exchange control signals, where the bus is usually referred to as the control bus. The processors can then exchange control information useful to operation of operating systems executing on the processors. For example, in the event that one of the processors fails, its failure can be detected by the other processors through control message protocols such as keep alive messages, etc.

More complex multiprocessor systems use auxiliary microprocessors to gather information about the main processors, and to communicate with other microprocessors using the control bus. An example of the use of microprocessors communicating over a control bus for control of processors in a multiprocessor system is described in co-pending and commonly owned U.S. patent application Ser. No. 09/545,781, now abandoned, filed on Apr. 7, 2000.

A disadvantage of using a control bus to exchange control information between processors, either with or without microprocessors to gather and to transmit the control information, is that the arrangement is limited in flexibility and expandability. For example, the control bus is ordinarily part of a backplane, and the backplane is fixed by the hardware employed. Also the arrangement is limited in that the input/output structures of the multiprocessor system are often connected to main busses within the backplane, and it is difficult to individually control the input and output devices using signals transmitted over the control bus.

There is needed a flexible system for control of processors in a multiprocessor system, and where the control system may be conveniently expanded or contracted as processors are added to or removed from the multiprocessor system.

SUMMARY OF THE INVENTION

The invention is a control system using microprocessors which communicate through a Local Area Network (private LAN) to control operation of both processors and input and output subsystems (IO system) of a multiprocessor computer system. The processors each have memory associated therewith, and each processor has an IO system comprising a plurality of busses such as PCI busses, associated therewith. The processors are cabled together in a mesh arrangement so that messages can be transferred between any of the processors and delivered to memory associated with the destination processor, or delivered to an IO system associated with the destination processor, etc.

The microprocessors are powered on when power is applied to the chassis of the multiprocessor system, and the microprocessors then control the processors of the multiprocessor system, including applying power to the processors, forming hard partitions containing selected processors, computing routes for messages from a processor to a memory associated with any processor for read and write transactions, computing routes for messages to IO subsystems associated with any processor of the hard partition, forming partition boundaries so that processors in one hard partition cannot read and write to memory or IO systems associated with processors in another hard partition, forming soft partitions of processors, controlling boot-up of operating systems executing on the processors of the multiprocessor computer system, removing power from a failed processor, providing power to a repaired processor, etc.

There is a microprocessor associated with each processor, and a microprocessor associated with each IO subsystem, and these microprocessors communicate through the private LAN. Each microprocessor maintains a data base giving the configuration of all of the processors in the multiprocessor computer system, and this data base is maintained current by being transferred through the private LAN as changes occur in the system. By use of this data base the microprocessors are enabled to perform their control functions. In a preferred embodiment of the invention, the processors of the multiprocessor computer system are mounted with two processors on one backplane, there are four (4) backplanes in a rack along with the memory associated with each processor and a drawer for each processor backplane containing the IO system associated with the two processors of that backplane, and in the rack there is one of the microprocessors controlling the eight (8) processors of the rack. The microprocessors communicate by an Ethernet LAN comprising twisted pair media coupling to an Ethernet hub.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views:

FIG. 11 is a table showing External Server Management Commands;

FIG. 12 is a table giving Internal Server Management Commands;

FIG. 13 is a table giving Time of Year Data, corresponding to BB_WATCH;

FIG. 14 is a table giving messages to provide compatibility to older systems;

FIG. 18 is a table giving MBM task attributes;

FIGS. 21A and B are a table giving Powerup Flow with group relationships;

FIG. 22 is a LAN versus field programmable gate array (FPGA) capability matrix;

FIGS. 24A and B are a PMU Server Received Command Handling table;

FIG. 25 is a table giving PMU Server Originating Commands;

FIG. 26 is a diagrammatic sketch giving an exemplary system configuration;

FIG. 27 is a table giving a Show Configuration Flow Diagram, Part 1;

FIGS. 29A and B are a Show Configuration Flow Diagram, Part 3;

FIG. 30 is a table giving a Show Configuration Sample Output;

FIGS. 32A and B are a table giving a method of Partition Coordinator for Handling Requests;

FIG. 33 is a table giving a Partition Coordinator Commands Issued Reference;

FIG. 36 is a table giving a Routing Glossary;

FIG. 38 is a block diagram of a process Creating a Hard Partition;

FIGS. 39A and B are a block diagram of a process Creating a Sub-Partition;

FIG. 46A is a Flow Diagram, "add EV7 Flow Diagram, Part 1";

FIG. 46C is a Flow Diagram, "Add EV7 Flow Diagram, Part 3";

FIG. 54 is a table giving an EV7 Coordinate addressing relationship to thumbwheel addressing;

FIG. 61 is a table giving a Virtual Terminal Telnet port numbers;

FIG. 65 is a table giving a Flash Memory Layout;

FIG. 66 is a table giving an Image Header;

FIG. 67 is a table giving a SRM Environment Variables Flow Diagram;

FIG. 70 is a table giving an Error Log Entry Format;

FIG. 71 is a table giving an Error Entry Data Format;

FIG. 74 is a table giving an OCP Template;

FIG. 78 is a table giving Handling of Miscellaneous Commands;

FIG. 79A, FIG. 79B, FIG. 79C, and FIG. 79D is a table giving CLI commands;

FIG. 80 is a table giving settings of Modem Knobs;

FIG. 81 is a table giving Modem Knobs settings for connection to a CLI port;

FIG. 82 is a table giving Operation Limitations in a degraded system;

FIGS. 83A and B are a table giving Data Base Grouping;

FIG. 84A is a first table giving Fields of a Partition Data Structure;

FIG. 87 is a table giving Error Codes;

FIG. 94 is a field diagram of a Request message;

FIG. 95 is a field diagram of a Response message;

FIG. 96 is a field diagram of a Train message header format;

FIG. 97 is a table giving a list of LAN formation group messages;

FIG. 98 is a table giving a list of messages in a reliable message group;

FIG. 99 is a table giving a list of messages in a system discovery group of messages;

FIG. 100 is a list of messages in a partition control group of messages;

FIG. 101 is a table giving a list EV7 set up group of messages;

FIG. 102 is a table giving a list of cable test group messages;

FIG. 103 is a table giving a list of virtual console group messages;

FIG. 104 is a table giving a list of firmware load and upgrade group of messages;

FIG. 105 is a table giving a list of environmental retrievable group of messages;

FIG. 106 is a table giving a list of FRU data group of messages;

FIG. 107 is a table giving a list of error logging group of messages;

FIG. 108 is a table giving a list of OS watchdog timer group of messages;

FIG. 109 is a table giving a list of date/time group of messages;

FIG. 110 is a table giving a list miscellaneous messages.

DETAILED DESCRIPTION OF AN ILLUSTRATIVE EMBODIMENT

Figure 1:
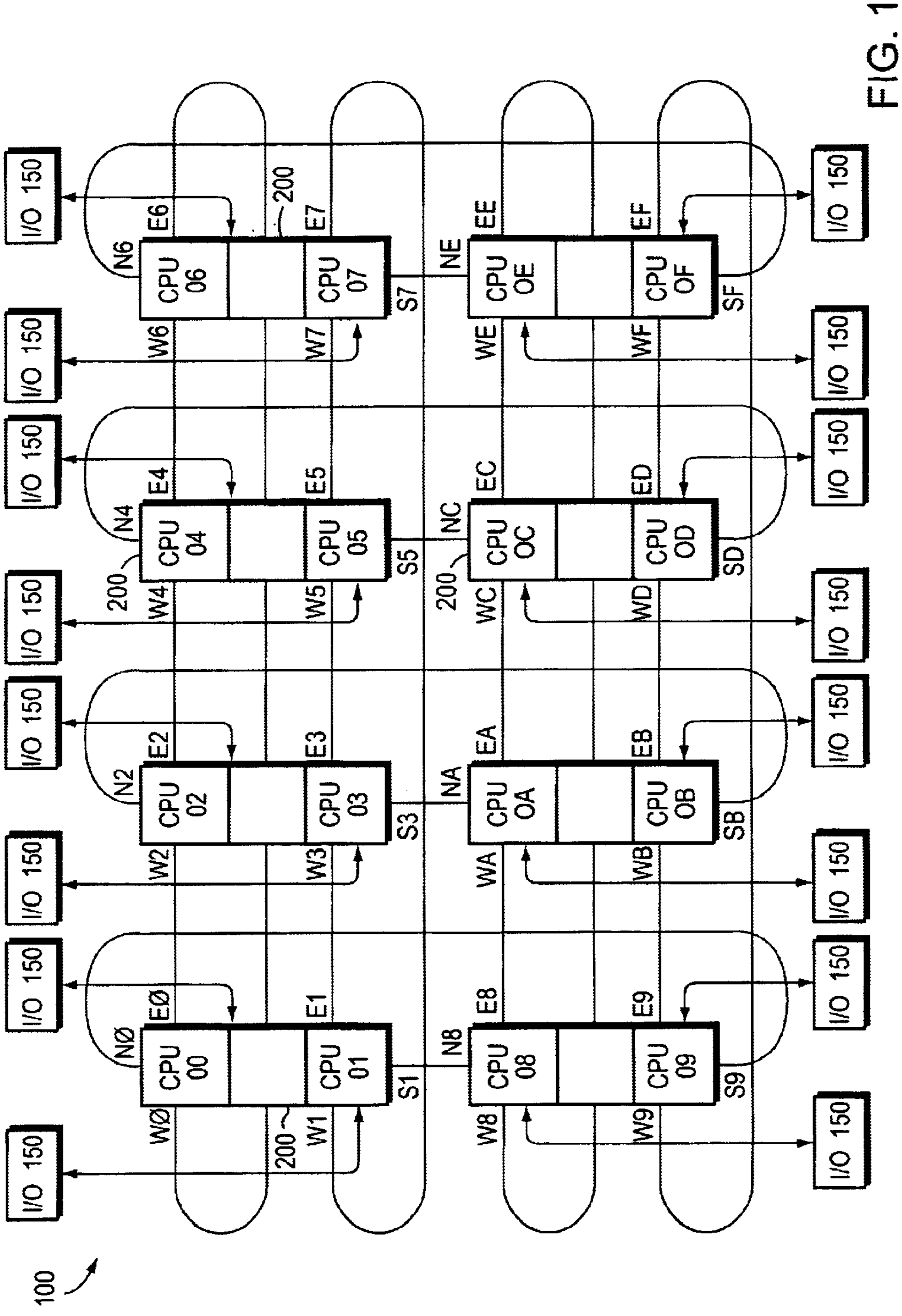
FIG. 1 is a schematic block diagram of a Symmetrical Multiprocessor (SMP) system comprising a plurality of dual processor (2P) modules interconnected to form a two dimensional (2D)-torus mesh configuration.

FIG. 1 is a schematic block diagram of a symmetrical multiprocessor (SMP) system 100 comprising a plurality of processor modules 200 interconnected to form a two dimensional (2D)-torus mesh configuration. Each processor module 200 comprises two central processing units (CPUs) with connections for two input/output (I/O) ports along with 6 inter-processor (IP) network ports. The network ports are preferably referred to as North (N), South (S), East (E) and West (W) compass points. The North-South (NS) and East-West (EW) compass point connections create a (Manhattan) grid. Additionally, the outside ends of the mesh wrap-around and connect to each other. I/O traffic enters the 2D torus via I/O channel connections between the CPUs and I/O subsystem 150. Each compass point is coupled to an IP channel that comprises 32 bits of data and a 7-bit ECC code for a total of 39 bits of information transfer.

Figure 2:
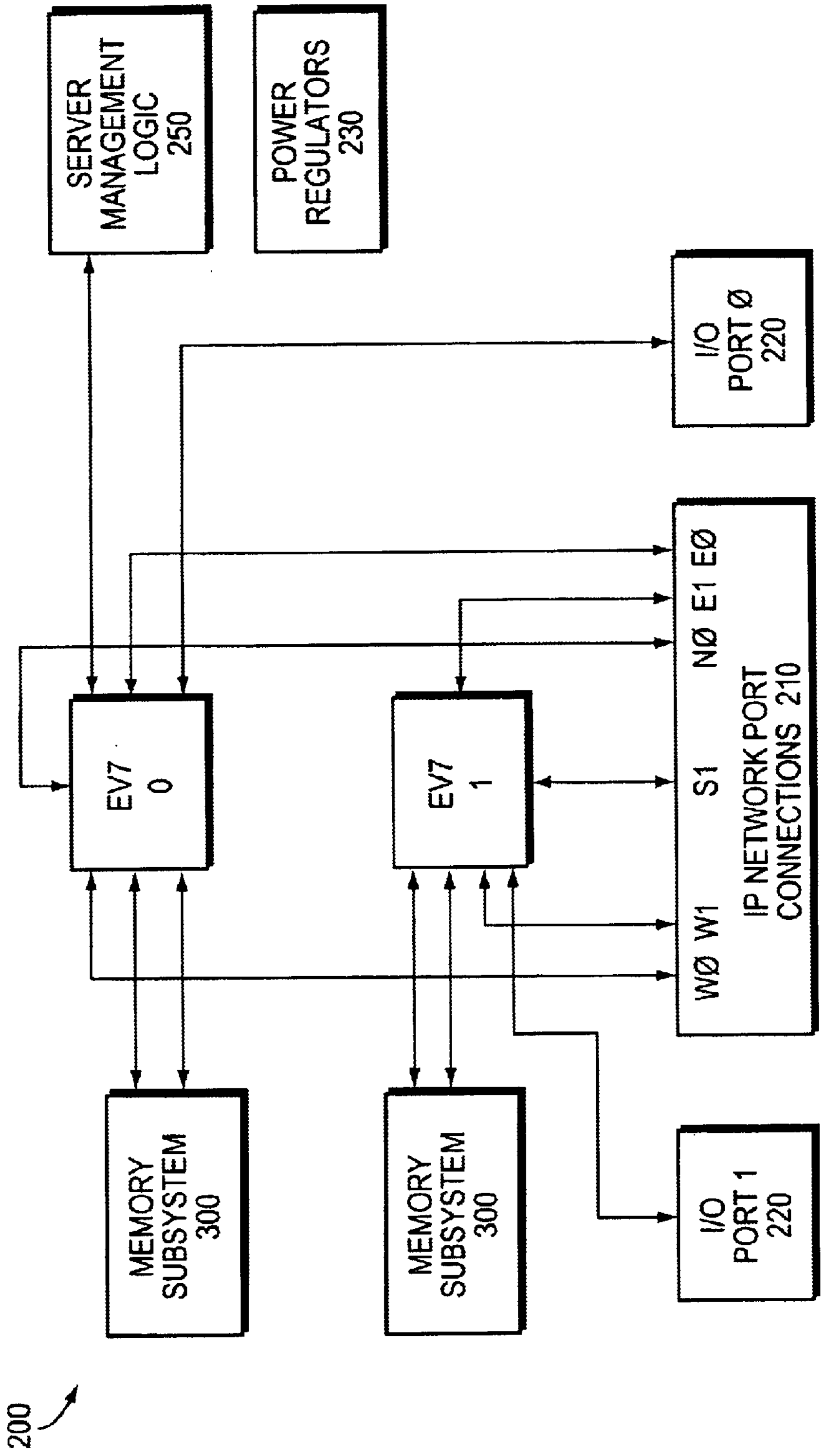
FIG. 2 is a schematic block diagram of a 2P module of FIG. 1.

FIG. 2 is a schematic block diagram of the dual CPU (2P) module 200. As noted, the 2P module 200 comprises 2 CPUs with connections 210 for the IP ("compass") network ports and an I/O port 220 associated with each CPU. The 2P module 200 also includes power regulators 230, system management logic 250 and memory subsystem 300 coupled to 2 memory ports of each CPU, wherein each CPU may have up to 16 gigabytes (GB) of memory per processor using 512 megabit (Mb) RDRAMs. In accordance with an aspect of the present invention, the system management logic 250 cooperates with a server management system to control functions of the SMP system. Each of the N, S, E and W compass points, along with the I/O and memory ports use clock-forwarding, i.e., forwarding clock signals with the data signals, to increase data transfer rates and reduce skew between the clock and data.

Each CPU is preferably an EV7 processor that includes an EV6 core, an I/O interface and 4 network ports. In the illustrative embodiment, the EV7 address space supports up to 256 processors and 256 IO7s in 16 GB mode. In 32 GB mode, the EV7 supports up to 128 processors with memory. The EV6 core preferably incorporates a traditional reduced instruction set computer (RISC) load/store architecture. In the illustrative embodiment described herein, the EV6 cores are generally the Alpha® 21264 processor chips manufactured by Compaq Computer Corporation®, with the addition of a 1.75 megabyte (MB) an internal cache and CBOX, the latter providing integrated cache controller functions to the EV7 processor. However, it will be apparent to those skilled in the art that other types of processor chips may be advantageously used. The EV7 processor also includes a RBOX that provides integrated routing/networking control functions with respect to the compass points. The EV7 further includes a ZBOX that provides integrated memory controller functions for controlling the memory subsystem.

The memory subsystem 300 is preferably implemented using RAMBUS technology and, accordingly, the memory space is generally divided between 2 RAMBUS controllers. However, an EV7 processor can operate with 0, 1 or 2 RAMBUS controllers.

Figure 3:
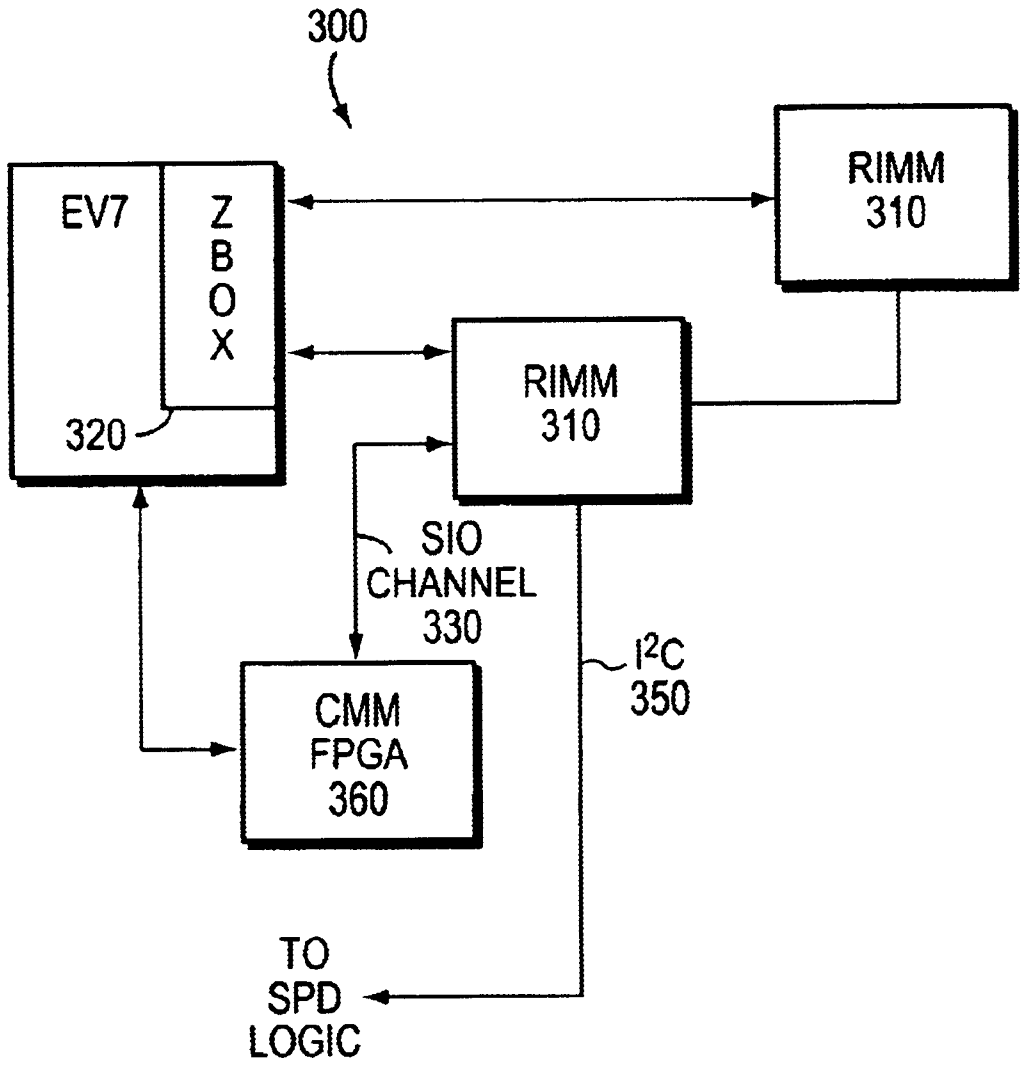
FIG. 3 is a schematic diagram of a memory subsystem of the SMP system.

FIG. 3 is a schematic diagram of the SMP memory subsystem 300 illustrating connections between the EV7 and RAMBUS memory modules (RIMMs 310). Software configures the memory controller logic (ZBOX 320) within the EV7 and the logic on each RIMM 310 before testing and initializing memory. Specifically, the memory subsystem components include 2 RAMBUS memory controllers (not shown) within the ZBOX 320, a RIMM 310 containing RDRAM memory devices, a serial I/O (SIO 330) channel to the RDRAMs of the RIMMs 310, serial presence detect (SPD) logic (EEPROM data) via an $I^2C$ bus 350, and a CPU management module (CMM) field programmable gate array (FPGA 360) that interfaces between a CMM (not shown) and the EV7 processor.

Figure 4:
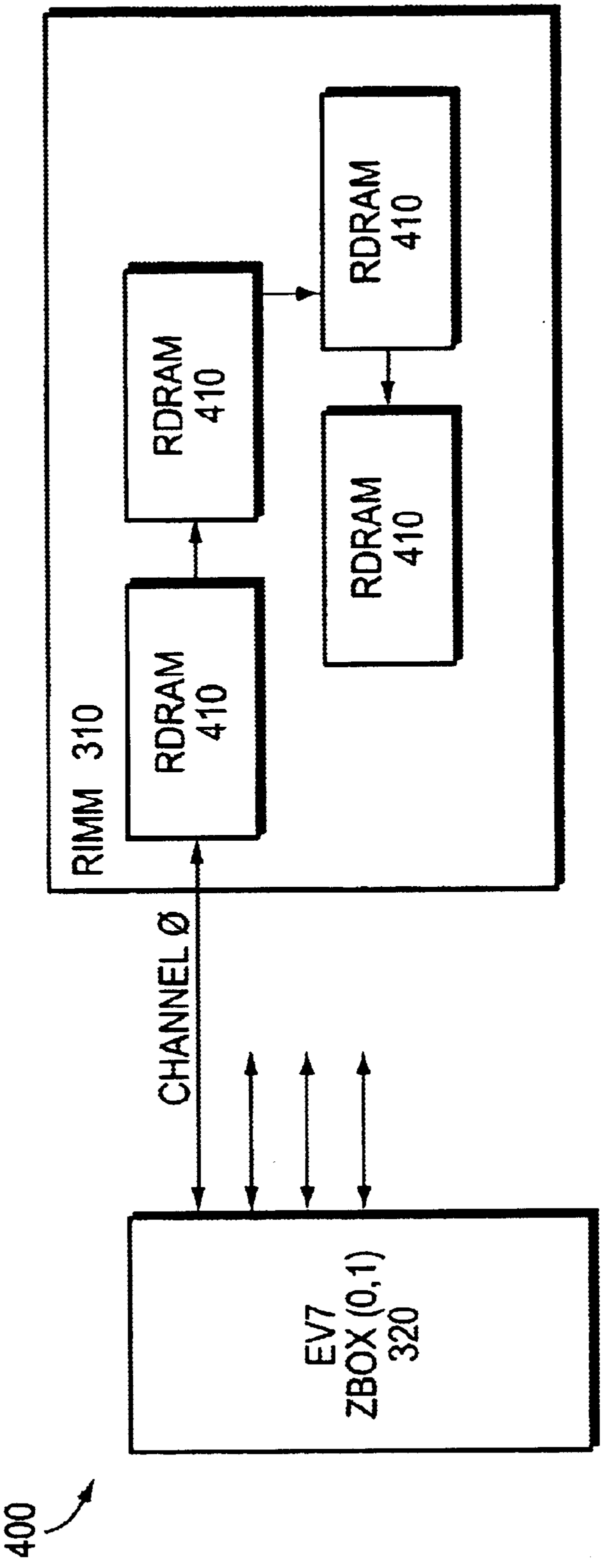
FIG. 4 is a schematic block diagram showing the organization of the memory subsystem of FIG. 3.

FIG. 4 is a schematic block diagram showing the RAMBUS memory organization 400. Both EV7 memory controllers (ZBOX0/ZBOX1) and the RDRAMs 410 contain programmable elements which configure the addressing and timing of each RDRAM on each channel. The RIMMs are visible to system software via 3 separate paths: the SPD logic (via the $I^2C$ bus 350), the SIO channel 330 and the RAMBUS channels 380. The SPD path provides a data structure contained within a serial EEPROM located on each RIMM 310. The SIO path provides access to programmable timing and configuration registers contained on the RDRAM devices. The RAMBUS channel is the row/column serial data path to the RDRAMs. Each channel is connected to a physical RIMM that may contain up to 32 RDRAM devices.

Figure 5:
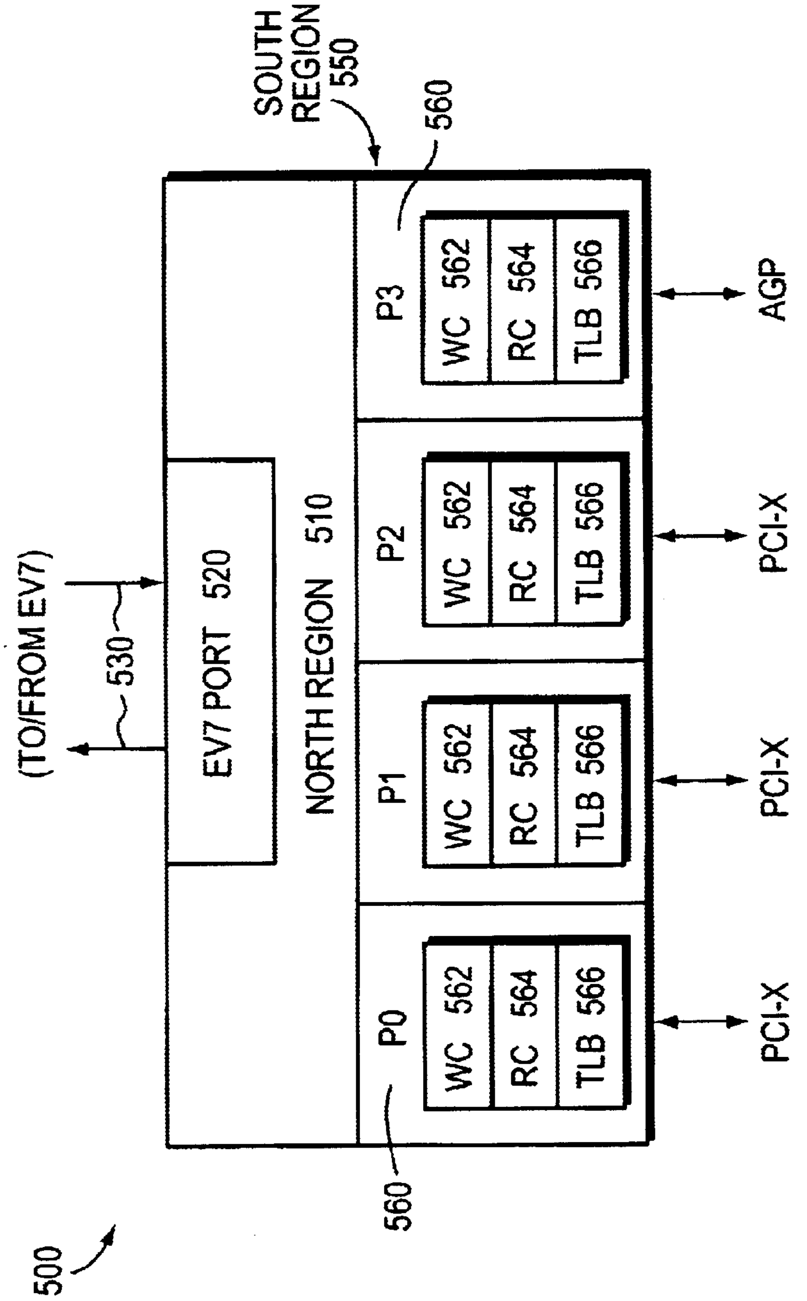
FIG. 5 is a schematic block diagram of an IO7 of an I/O subsystem of the SMP system.

FIG. 5 is a schematic block diagram of an IO7 device 500 that provides a fundamental building block for the SMP I/O subsystem. The IO7 is preferably implemented as an application specific integrated circuit (ASIC) using IBM SA27E ASIC technology and packaged in a 748-pin column grid array CCGA package. Each EV7 processor supports one I/O ASIC connection; however, there is no requirement that each processor have an I/O connection. In the illustrative embodiment, the I/O subsystem includes a PCI-x I/O expansion box with hot-swap PCI-x and AGP support. The PCI-x expansion box includes an IO7 plug-in card that spawns 4 I/O buses.

The IO7 500 comprises a North circuit region 510 that interfaces to the EV7 processor and a South circuit region 550 that includes a plurality of I/O ports 560 (P0–P3) that interface to standard I/O buses. An EV7 port 520 of the North region 510 couples to the EV7 processor via 2 unidirectional, clock forwarded links 530. Each link 530 has a 32-bit data path that operates at 400 Mbps for a total bandwidth of 1.6 GB in each direction.

In accordance with an aspect of the present invention, a cache coherent domain of the SMP system extends into the IO7 and, in particular, to I/O caches located within each I/O port of the IO7. Specifically, the cache coherent domain extends to a write cache (WC 562), a read cache (RC 564) and a translation buffer (TLB 566) located within each I/O port 560. As described further herein, the caches function as coherent buffers in that the information contained within these data structures are not maintained for long periods of time.

Figure 6:
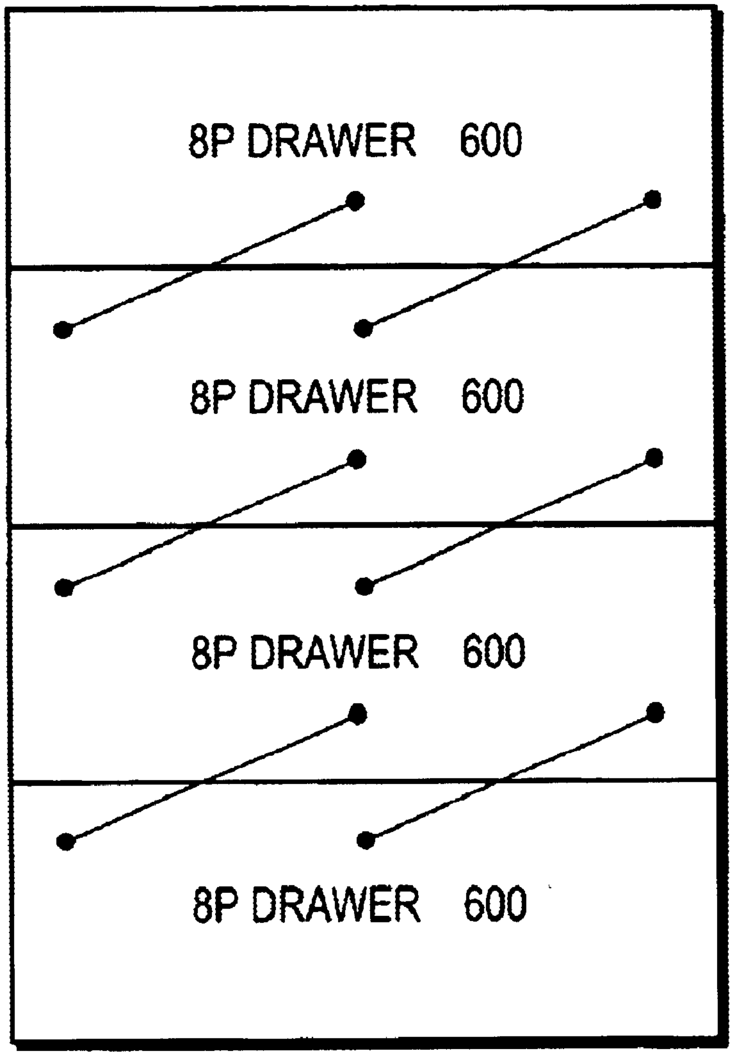
FIG. 6 is a schematic diagram of an illustrative embodiment of four (4) 8P drawers of the SMP system mounted within a standard 19-inch rack.

Referring again to the embodiment of FIG. 1, the 2D-torus configuration of the SMP system 100 comprises sixteen (16) EV7 processors interconnected within two 8P drawer enclosures 600. Specifically, there are four (4) 2P modules 200 interconnected by a backplane within each enclosure 600. This configuration is scalable by powers of 2 (EV7 processors) up to a total of 256 (or preferably 128) processors. In the illustrative embodiment, four (4) 8P drawers may be mounted within a standard 19-inch rack (2 meters in length) as shown in FIG. 6. Mounting 4 8P drawers in a single rack creates a substantial cabling problem when interconnecting the 32 processors within the 2D-torus configuration and when coupling the processors to the I/O subsystems via the IO7 devices 500 associated with the processors. In accordance with another aspect of the present invention, an efficient means for interconnecting cables among the 8P drawers of a fully-configured, 19-inch rack is provided.

Figure 7:
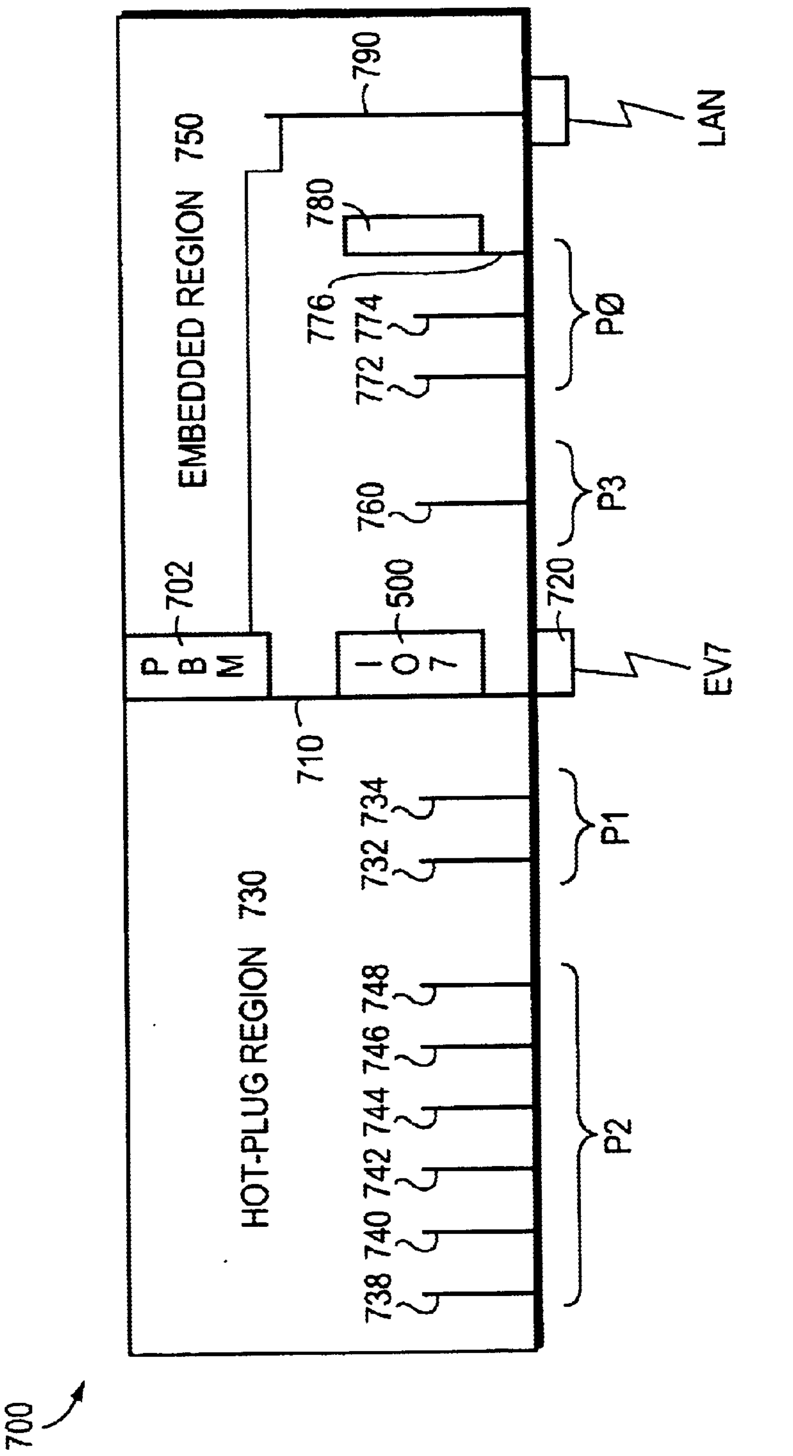
FIG. 7 is a schematic block diagram of an I/O drawer of the SMP system.

FIG. 7 is a schematic block diagram of an I/O drawer 700 of the SMP system which includes a first I/O riser card 710 containing an IO7 500, a connector 720 coupling the IO7 to the EV7 processor and a plurality of I/O buses. The speed of the I/O buses contained within the I/O drawer is a function of the length and the number of loads of each I/O bus. The I/O drawer is divided into two parts: a hot-plug region 730 and an embedded region 750. In the illustrative embodiment, there is a dedicated slot 760 adjacent to the I/O riser card 710 within the embedded region 750 that is dedicated to a 4x AGP Pro graphics card. Also included within the embedded region 750 are 3 standard, 64-bit PCI card slots 772–776, two of which may be occupied by additional AGP Pro cards. Otherwise, these PCslots are available for embedded I/O card options. For example, an I/O standard module card 780 may be inserted within one of the PCI slots 772–776.

Each I/O drawer 700 also includes power supplies, fans and storage/load devices (not shown). The I/O standard module card 780 contains an IDE controller for the storage/load devices, along with a SCSI controller for those devices and a universal serial bus that enables keyboard, mouse, CD and similar input/output functions. The embedded region 750 of the I/O drawer is typically pre-configured and not configured for hot-swap operations. In contrast, the hot-plug region 730 includes a plurality of slots adapted to support hot-swap. Specifically, there are 2 ports 732–734 of the hot plug region dedicated to I/O port one (P1 of FIG. 5) and 6 slots 738–748 dedicated to I/O port two (P2 of FIG. 5). Likewise, the dedicated AGP Pro slot 760 comprises port three (P3) and the 3 standard PCI slots 772–776 comprise port zero (P0). The I/O buses in the hot-plug region 730 are configured to support PCI and PCI-x standards operating at 33 MHz, 66 MHz, 100 MHz and/or 133 MHz. Not all slots are capable of supporting all of these operating speeds. In another aspect of the present invention, a technique is provided that enables all slots (under certain configurations) to support all operating frequencies described above.

Also included within the I/O drawer 700 and coupled adjacent to the IO7 is a PCI backplane manager (PBM 702). The PBM 702 is an integral part of a platform management infra-structure as described further herein. The PBM is coupled to a local area network (e.g., 10 base 100 Ethernet) by way of another I/O riser board 790 within the I/O drawer. The local area network (LAN) provides an interconnect for the server management platform that includes, in addition to the PBM, a CMM located on each 2P CPU module and an MBM (Multiprocessor computer system Backplane Manager) located in each 8P drawer. In a preferred embodiment of the invention the Ethernet LAN comprises twisted pair Ethernet media coupling to an Ethernet hub. Note that the cable coupling the IO7 to the EV7 on a 2P module may be up to 6 meters in length.

Figure 8:
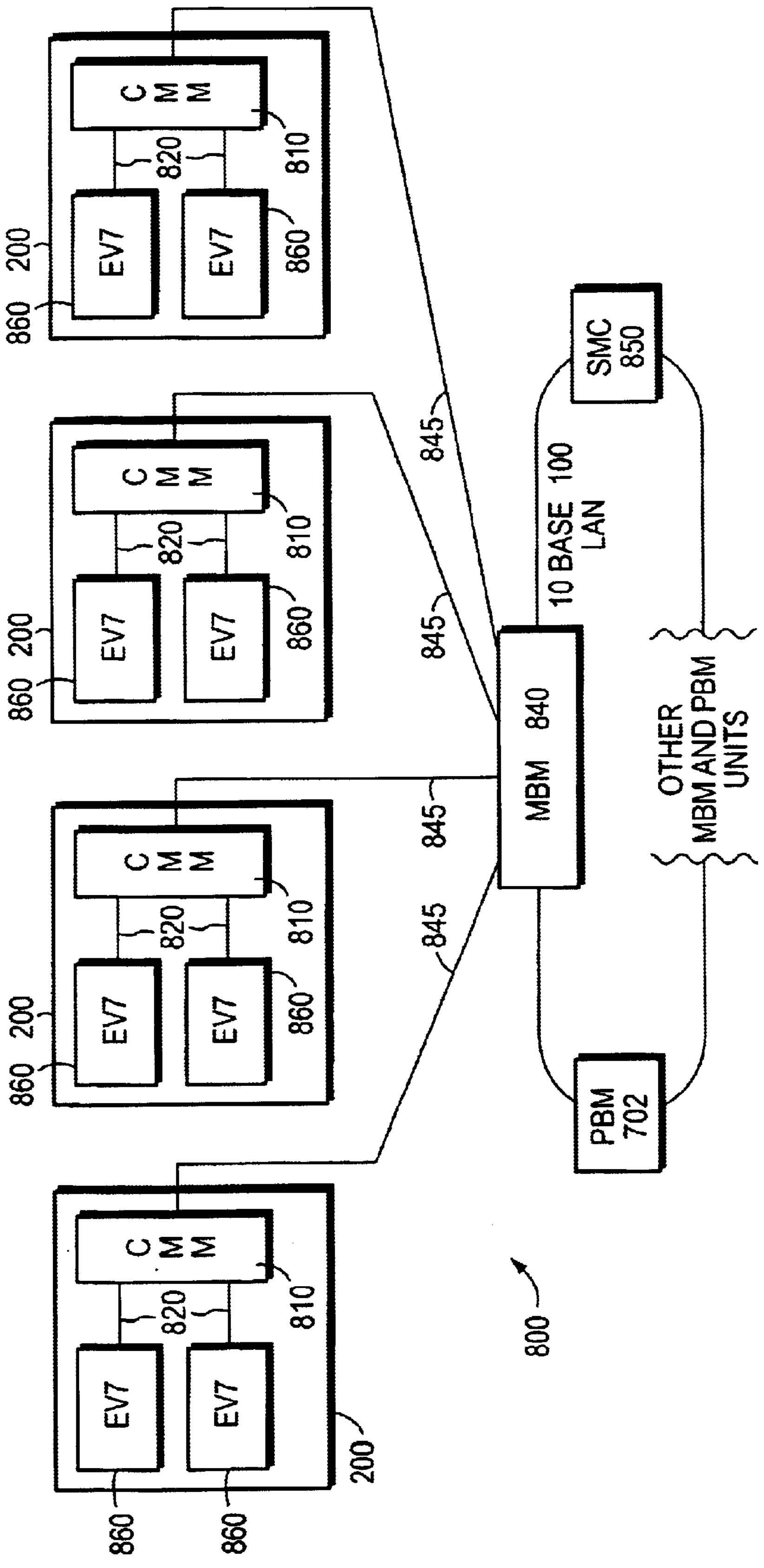
FIG. 8 is a schematic block diagram of a server management platform for the SMP system.

FIG. 8 is a schematic block diagram of the server management platform 800 for the SMP system. The server management comprises a 3-tier management scheme. At the lowest level, each 2P module 200 has a plug-in, CPU management module (CMM 810) that provides power and initialization control for the local 2P module. The CMM also interfaces directly to both EV7 processors via serial links 820 and provides debug, initialization, error collection and communication support to a higher, intermediate level of the service management hierarchy.

The MBM 840 is preferably an independent plug-in card within an 8P drawer 600. Each CMM 810 on each 2P module 200 within an 8P drawer 600 communicates with an MBM 840 through a point-to-point serial connection 845 that is preferably implemented in etch so as to obviate the need for a cable connection. In the illustrative embodiment, each MBM controls 4 CMM devices within an 8P drawer.

The MBM 840 spawns a server manager network port that is connected to a service management LAN hub. The MBMs 840 preferably communicate with the PBMs 702 in the I/O drawers via a TCP/IP protocol over a server management LAN. In the illustrative embodiment, the server management platform is preferably implemented as a 10 base 100 (Ethernet) LAN, although similar types of local area network implementations, such as Token Ring or FDDI, may be advantageously used with the system.

A personal computer (PC) or similar network device connected to one of the ports of the service management LAN hub serves as a server management console (SMC 850). The SMC 850 provides the highest level of server management and, to the end, executes a platform management utility that provides a unified view of the entire SMP system for purposes of controlling the system, even if the system is divided into multiple hard partitions. From a physical implementation, the MBMs, PBMs and SMC are coupled-to the service management hub; however, logically they are interconnected by the LAN.

The server management platform is used to bring up ("boot") the SMP system and create partitions. As used herein, a hard partition is defined as hardware resources capable of supporting a separate instance of an operating system. In addition, the server management platform facilitates hot-swap (insert/delete) of hardware resources into/from the system. For example, assume it is desirable to dynamically remove a 2P module 200 from the SMP system 100. The SMC 850 instructs the appropriate MBM 840 which, in turn, instructs the appropriate CMM 810 on the 2P module to power down its regulators 230 in preparation of removal of the module. It should be noted that the SMP system may "boot" and operate without a functioning SMC, but reconfiguration and complete system visibility may be lost if redundant SCMs are not connected and the single SCM fails or is otherwise disconnected.

All console functions for the SMP system are provided by the SMC node 850 on the LAN. In the case of a hard partitioned system, a logical console is provided for each hard partition. In the illustrative embodiment, the SMP system may be expanded up to 256 processors (within, e.g., 32 8P drawers) and 256 I/O drawers, wherein each I/O drawer 700 includes a PBM 702 and each 8P drawer 600 includes an MBM 840. Therefore, the server management platform is preferably implemented as a local area network to accommodate such expandability. In an alternate embodiment, the SMC may be implemented as a web server and the server management LAN may function as a virtual private network (VPN). In accordance with this embodiment, system management of the SMP system may be controlled remotely over a network, such as the Internet, through a firewall at the SMC console station.

Virtual Channels

The SMP system comprises a plurality of virtual channels including a request channel, a response channel, and I/O read channel, and I/O write channel and an error channel. Ordering within a processor with respect to memory is achieved through the use of memory barrier (MB) instructions, whereas ordering in the I/O subsystem is done both implicitly and explicitly. In the case of memory, references are ordered at the home memory of the cache line data in a directory in flight (DIF) data structure (table) of the EV7.

In the I/O subsystem, write operations are maintained in order relative to write operations and read operations are maintained in order relative to read operations. Moreover, write operations are allowed to pass read operations and write acknowledgements are used to confirm that their corresponding write operations have reached a point of coherency in the system. Ordering in the I/O subsystem is important from the perspective of any two end points. For example, if processor (EV7a) communicates with its associated IO7 (IO7a), then all operations must be maintained in order. However, communication between another processor (EV7b) and IO7a is not maintained in order. If ordering is important, another mechanism, such as semaphores between processors, must be utilized.

Deadlock Avoidance

Two types of deadlock may occur in the SMP system: intra-dimensional and inter-dimensional deadlock. Intra-dimensional deadlocks can arise because the network is a torus and the wrap-around path can cause a deadlock cycle. This problem is solved by the use of virtual channels. Inter-dimensional deadlocks can arise in any square portion of the mesh. These cycles can be eliminated if messages route all in one dimension before routing any in the next dimension or in dimension order. For example, if all messages traversed in the East-West (EW) direction before traversing in the North-South (NS) direction, no deadlock cycles can be generated because there is never a dependency from NS channels to the EW channels. The content of an RBOX configuration register selects whether the NS or EW channels are primary.

Dimension-order (i.e., deadlock-free) routing requires that a message route along a fixed path from source to destination. However, in some cases there may be multiple minimum-distance paths from source to destination. In this case, it is desired to select a path from source to destination that encounters the least network connection. This is called "minimal adaptive routing".

The EV7 processor allows for adaptive routing that is deadlock-free. Buffering is allocated for a deadlock-free network. Disposed over the deadlock-free network is an adaptive network of buffers. A message can travel on the adaptive buffers until it encounters a situation that might lead to deadlock. In this case, a message may exit the adaptive buffers and enter the deadlock-free network. Due to the nature of the deadlock-free network, that network can always make forward progress. Since the messages in the adaptive network may always drain into the deadlock-free network, the system should never deadlock. In effect, the adaptive network has dependencies on the deadlock-free network but not vice versa. A message in the adaptive buffers can re-enter the deadlock-free network at any point, just like any new message.

The SMP system allows adaptive routing to be performed based on the dynamic load in the network. However, the system is still deadlock-free because the deadlock-free network is always available. The majority of buffering is allocated to the adaptive network. There is minimal buffering in the deadlock-free network; that is, there is sufficient buffering to eliminate cyclic dependencies. The RBOX may (with the exception of I/O channel references in the normal case) start a message in either the adaptive or deadlock-free networks. When an adaptive message is blocked in the EV7 RBOX (router) due to lack of buffering, the message is converted to the deadlock-free network as space becomes available. It is also possible for the EV7 processor to convert from the deadlock-free network back into the adaptive network. Basically, the EV7 decides at each "hop" of the 2D-torus which buffer type it can use.

Generally, the following rules are followed on EV7 processors for a message to traverse the deadlock free network: (1) the message is routed in dimension-order from its current location, and (2) the message selects a virtual channel on each dimension-change. The EV7 can handle other special cases that violate these rules, such as an "L-shaped" system as well. It should be noted that messages in the I/O virtual channel are never routed adaptively.

The header of an EV7 message contains information indicating the direction that the message may take in each of the two dimensions and a value for each dimension. When the value for a given dimension equals "WHOAMI" (a stored value) of an EV7 processor at which the message has arrived, the message is assumed to have traveled sufficiently far in that dimension. When the WHOAMIs of both dimensions equal both values contained in the message, the message has reached its destination. A routing table (RBOX_ROUTE) in the RBOX holds the values that are sent along with each message, as well as the directions that a message should travel in each dimension. The routing table is consulted once as each message is sent, preferably at the source of the message. The information from the routing table is all that is required to find the destination processor. The routing table at each processor contains 276 entries, one entry for each processor in the system (plus one for each sharing mask bit).

I/O DMA Access and Exclusive Caching

The IO7 may perform direct memory access (DMA) accesses to the EV7 system memory by way of either exclusive caching or time-outs. A DMA device is contained within the IO7 and is configured to service I/O bus read and write operations. For a DMA write stream, a first way to prefetch data in multiple blocks is via a stream of read modify request (ReadModReq) commands. The second is via a stream of invalidate-to-dirty request (InvaltoDirtyReq) commands to gain exclusive access to the block (presumably to write the entire block). The InvaltoDirtyReq commands require that the write operations be full-block writes.

For a DMA read stream there are two ways to prefetch data in multiple blocks, depending on the ordering required by the DMA device. The most efficient way is to use a stream of fetch requests (i.e., non-cacheable fetch) commands, while another way is to use a ReadModReq command to obtain exclusive access to the block (often to write a portion of the block). The advantage of this latter way is that the I/O device can implement a sequentially consistent read stream since the exclusive access forces order. A disadvantage involves generation of Victim-Clean messages to release exclusive access to the block. Multiple DMA devices that attempt to access the same block at the same time must be serialized, as will a processor and a DMA device.

When using the DMA access and exclusive caching technique, the DMA device is expected to force the eviction of a data block (cache line) soon after receiving a forward for the cache block. The IO7 may exclusively cache copies of blocks for long periods of time. If a processor or another IO7 requests a copy of the block, the directory determines that the IO7 is the exclusive owner of the block and forwards the request to the IO7. When this happens, the directory expects to eventually receive both a ForwardMiss and a Victim (or VictimClean) response.

When the IO7 uses exclusive caching to access DMA requests, it should respond with ForwardMiss messages to every received forward request. The following is also required: (1) any currently cached blocks/TLB entries that could match the address in the forward message must be marked for eventual eviction (after a time-out); and (2) any currently pending miss addressed file (MAF) entries that could possibly match the address must be marked so that the block eventually gets evicted after it returns. It should be noted that the receipt of a forward message does not imply that the IO7 currently holds a copy of the block. That is, a victim may be on its way from the IO7 to the directory before the IO7 receives the forward message. Note also that this scheme allows the IO7 to (exclusively) cache copies of scatter-gather maps or I/O TLB entries.

When using the time-out technique, the DMA device is expected to evict blocks soon after it obtains exclusive access to the block. This allows the IO7 to ignore the forward messages. When the IO7 uses this mode to access DMA, it should respond with a ForwardMiss response to every receive forward request and otherwise ignore the forward message.

I/O Space Ordering

The EV7 processor supports the same I/O space ordering rules as the EV6 processor: load (LD)-LD ordering is maintained to the same IO7 or processor, store (ST)-ST ordering is maintained to the same IO7 or processor, LD-ST or ST-LD ordering is maintained to the same address, and LD-ST or ST-LD ordering is not maintained when the addresses are different. All of these ordering constraints are on a single processor basis to the same IO7 or processor. Multiple loads (to the same or different addresses) may be in flight without being responded to, though their in-flight order is maintained to the destination by the core/CBOX and the router. Similarly, multiple stores (the same or different addresses) can be in flight.

The EV7 processor also supports peer-to-peer I/O. In order to avoid deadlock among peer IO7 "clients", write operations are able to bypass prior read operations. This is required because read responses cannot be returned until prior write operations have completed in order to maintain PCI ordering constraints. By allowing the write operations to bypass the read operations, it is guaranteed that the write operations will eventually drain, thereby guaranteeing that the read operations will eventually drain.

Partitions

A domain is defined as a failure unit. A domain may constitute from one to many processors. The SMP system can be partitioned into domains via interprocessor register (IPR) settings. These domains provide varying degrees of isolation, survivability and sharing between domains, such as hard partitions, semi-hard partitions, firm partitions and soft partitions.

In a hard partition, there is no communication between domains. In this type of system, an EV7 processor, memory or I/O failure does not affect another domain. Each domain can be individually reset and booted via separate consoles. Proper EV7 RBOX_ROUTE, RBOX_CFG and RBOX_*_CFG settings are the primary requirement to establish a hard partition.

A firm partition allows domains to share a portion of its memory, the "global" memory, which is distributed throughout the domains. The local memory for each domain still resides within each domain. The EV7 processor can prevent domains from accessing local memory in other domains. An EV7 processor, memory or I/O hardware failure in one domain may cause corruption or fatal errors within the domain containing the failure. A hardware failure may also cause corruption or failures in other domains. The proper settings in the RBOX_ROUTE, RBOX_*_CFG, CBOX Access Control, CBOX Local Processor Set and CBOX Global Processor Set IPRs are the primary requirement to set up a firm partition.

A semi-hard partition is a firm partition with some additional restrictions and hardware reliability assurances. It requires that all communication within a domain must stay within the domain. Only sharing traffic to the global memory region may cross domain boundaries. Hardware failures in one domain can cause corruption or fatal errors within the domain that contains the error. Hardware failures in any domain can also corrupt the global region of memory. However, hardware failures in one domain will not corrupt the local memory of any other domains provided the local and global sets have been properly defined in the CBOX Local Processor Set, CBOX Global Processor Set, and CBOX Access Control IPRs and those IPRs are configured to deny access from remote processors. In addition, corruption should not occur provided the RBOX_ROUTE configuration correctly directs local traffic with a local domain, inval sets do not cross domain boundaries and the time-out values are established to time out inter-domain channels before timing out intra-domain channels, as indicated in the time-out ordering.

A soft partition allows for all communication to cross domain boundaries. The domain is strictly a global software concept in this case. The partitions can share a global portion of the memory. Each domain has a region of local memory that the other domains cannot access. But a hardware failure in one domain may cause corruption in any other domain in a soft partition. The proper settings in the CBOX Local Processor Set, CBOX Global Processor Set and CBOX Access Control IPRs are the primary requirement to set up a soft partition.

Server Management Subsystem

The Server Management subsystem forms an omniscient view of the system. This provides for logical partitioning, physical environment monitoring, power control, retrieval of saved error state, and console communications. The term "subsystem" is used to include both the hardware and firmware components that accomplish these functions.

Topics discussed include the following.

Server Management Subsystem Overview, describing both the hardware architecture and the general functionality of the Server Management Firmware.

Firmware Requirements, itemizing the required functions of the Server Management Firmware. These will be grouped by related area. Each area contains some amount of introductory text. Each requirement is contained in it's own numbered list item.

Firmware Top Level Architecture, describes the architectural decomposition of the listed requirements into the firmware components running on each hardware entity.

Reference documents describing the Alpha systems include *Alpha System Reference Manual* (SRM), Sites, Witek, et. al., published by Compaq Computer Corporation, all disclosures of which are incorporated herein by reference.

Server Management Subsystem Overview

The Server Management Subsystem is a distributed system of microprocessors which cooperatively control, monitor, and support the Multiprocessor computer system EV7 CPUs and I/O.

Server Management Hardware Architecture

Figure 9:
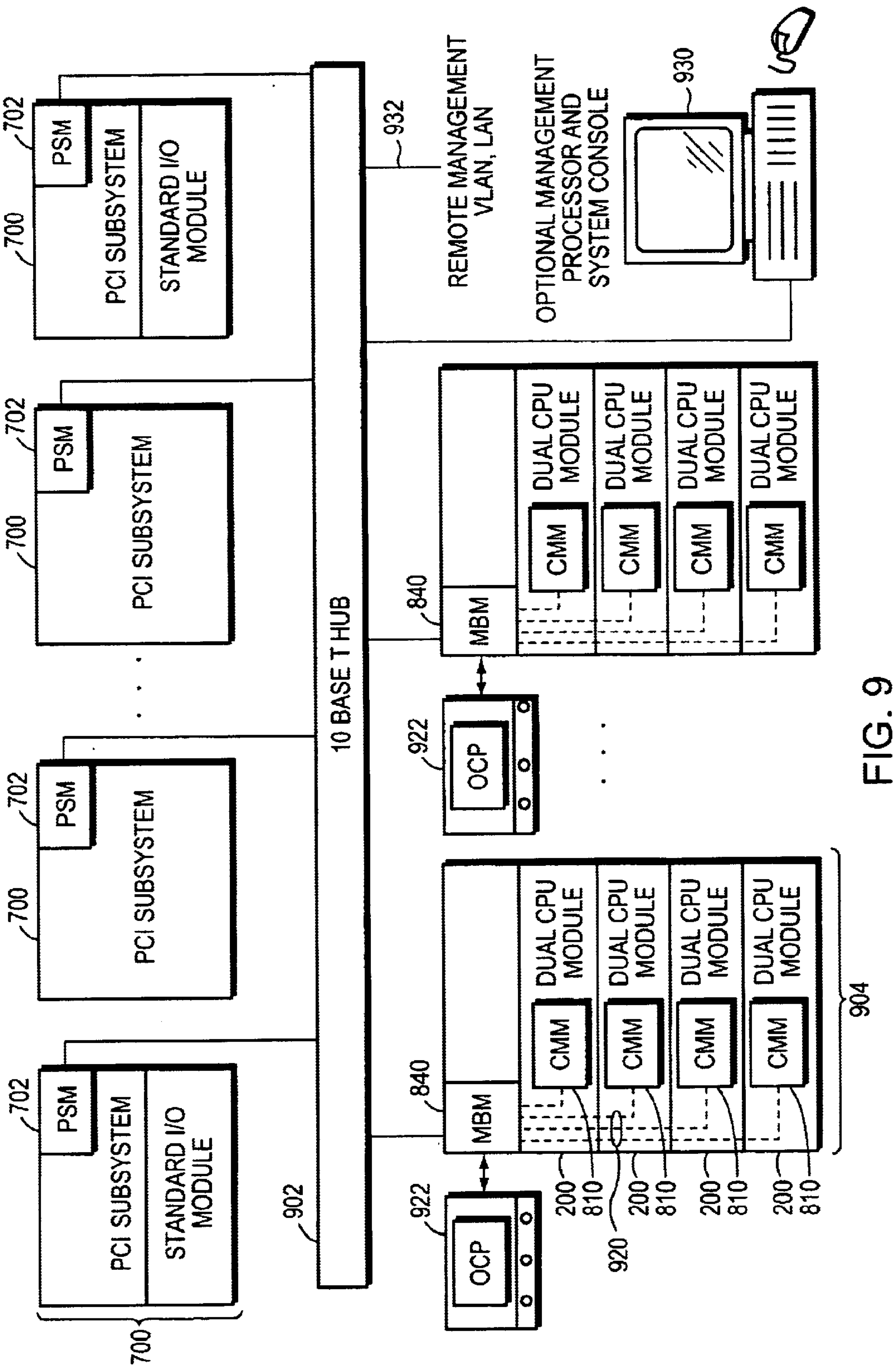
FIG. 9 is a block diagram of a multi processor system showing interconnection of the system management components.

Turning now to FIG. 9, a block diagram 900 of Multiprocessor computer system Server Management Hardware is shown. The Server Management microprocessors communicate with each other via point to point connections and a private Local Area Network (LAN) 902. A Multiprocessor computer system is composed of dual EV7 CPU modules 200 interconnected via a backplane. Each EV7 CPU can optionally be connected to a PCI I/O drawer. This forms a modular, building block, oriented system. The Server Management hardware parallels this structure. Each dual EV7 CPU module contains a microprocessor called the CPU Module Manager 810 (CMM). Each backplane 904 of 4 dual processor modules contains a Multiprocessor computer system Backplane Manager (MBM) microprocessor. Each PCI I/O drawer 700 contains a PCI Backplane Manager 702 (PBM). The details of each of these hardware components are described below.

CPU Module Manager (CMM)

The CMM 810 communicates with the pair of EV7 processor chips, as well as performing serial RDRAM EEPROM I/O, thermal and power management functions. It is directly connected, via a serial communication path, to the local MBM. The CMM 810 can power the EV7 CPU module on and off, reset and halt the EV7 processors individually, and control EV7 Power On Self-Test (POST) and initialization. This module includes a flash ROM containing CMM, FPGA, and EV7 code. The FPGA chip is a Field Programmable Gate Array chip and contains logic circuitry as described further below.

Multiprocessor Computer System Backplane Manager (MBM)

The MBM communicates with each of the 4 CMMs in the local backplane via a point-to-point serial connection 902. It also performs thermal and power management functions at the backplane level. It communicates with its peer MBM modules and PBM modules via a twisted pair Ethernet LAN 902. The MBM includes a flash ROM for MBM and EV7 code as well as non-volatile data storage.

PCI Backplane Manager (PBM)

The PBM 702 is responsible for the thermal and power monitoring and control of the PCI drawer 700. It communicates with the MBMs 840 in the system via a twisted pair Ethernet LAN 902. The PBM includes a flash ROM for PBM code and non-volatile data storage.

Server Management Firmware Overview

The Server Management Firmware is a distributed software system that helps orchestrate many facets of the hardware control of the system. It provides the user interface and platform level view, and thus a central point of monitoring and control. It also provides a network packet level interface that can be used by Platform Management applications.

Historical Perspective

Traditionally, AlphaServer systems have provided the "Console" interface, as described in the SRM, as the user interface prior to operating system boot. The SRM firmware runs on the Alpha CPU and is loaded from a flash ROM in processor I/O space. It provides commands a Console Command Line Interface (CLI) prompt (>>>) to allow interrogation of the system configuration, test, reset. The Console also allows the setting of environment variables that alter the behavior of hardware and/or software. The Console is available via a serial line or a graphics video display. Additionally, some platforms have provided an optional "Remote Management Controller", or RMC. This RMC is generally tied into the platform's power & thermal monitoring and control circuitry and provides basic functions, such as "show" commands, reset, and halt. The RMC is connected between the operator terminal and the Console serial line. The operator communicates with the RMC via either an Operator Control Panel (OCP) or a CLI which is reached by typing a special "escape" on the system console serial line. There is generally little interaction between the SRM console firmware and the RMC, other than retrieval of thermal data and a few non-volatile settings. Once the SRM Firmware is running, the RMC is in a passive state. Once system software is running, the SRM Firmware is also in a suspended state, until such time as the Operating System halts and returns control to the SRM Firmware.

A previous Server Management Subsystem, referred to as Alpha Server GS 320, provides the next level of integration between the control and monitoring of the overall system and the execution of firmware/software on the Alpha CPU. Alpha Server GS 320 is a trademark of Compaq Computer Corporation for a computer system using Alpha processors. System software & SRM firmware can communicate with the Server Management microprocessors via a shared RAM structure and a "master" System Control Module (SCM). The subsystem is an active participant in hot-plug and hard partitioning operations, as well as environmental monitoring and asset management. The SCM is connected in the path of the serial console terminal, as with the previous RMC implementations. In support of logical partitioning, the system provides for multiple SCMs, although only one is the master of the microprocessor interconnect at any given time. External hardware/software is required to provide a single point of control for the multiple system console serial lines.

Present Invention

The present invention uses Server Management firmware providing an integrated solution between the Alpha firmware and system software and the Server Management functions. This includes removing the restrictions surrounding serial communication lines, loading EV7 firmware from the Server Management subsystem rather than from a fixed I/O device, performing virtual console terminal connections, providing a global view of the system configuration, integrating partitioning and hot-plug operations, and catastrophic error state collection. The system provides a framework that can support these functions, and additional functionality that has not been implemented as of yet.

External Interfaces

This section describes the hardware and software interfaces that are external to the Server Management Subsystem. The requirements section references these interfaces.

Private LAN

The Server Management processors communicate over a private local area network (LAN) 902. It is separate from any network that the customer connects to the Multiprocessor computer system.

Customer LAN

The customer LAN is a local area network that is used by the customer to communicate with their Multiprocessor computer system(s). Customer LANs are often connections to the worldwide Internet, and are made through Network Interface Cards supported by the PCI buses 732–738, etc. in the I/O drawers 700.

Platform Sensors

Platform sensors include:

- Thermal sensors to read the temperature within an enclosure space
- Voltage sensors which measure electrical voltages of power supply outputs
- Discrete sensors which indicate the good/bad state of fans & power supplies
- Discrete sensors which indicate the state of switches
- Discrete sensors which indicate the presence of components or modules Platform Controls Platform controls include:

- Power supply on/off
- Fan speed

Operator Control Panel (OCP)

There is one Operator Control Panel 922 (OCP) per 8P backplane. The OCP 922 is a module containing:

- an alphanumeric display
- discrete switches for halt and reset

Flash Image

There are flash ROMs associated with each microprocessor. These flash ROMs contain code & data storage for the following components:

- Microprocessor code
- FPGA programming data
- EV7 SROM
- EV7 XSROM
- SRM Firmware & PAL
- Non-volatile Configuration data
- Catastrophic error log data SRM Firmware The SRM firmware is the EV7 code that runs the "Console". It is dependent upon the Server Management Firmware for:

- Loading
- Retrieving some configuration information
- Retrieving current logical partitioning state
- Performing logical partitioning allocation and deallocation
- Console Virtual Terminal I/O
- Platform Sensor data PALcode The PALcode component performs the functions required by the Alpha SRM. It makes use of the Server Management firmware for logging catastrophic error information.

Serial Console

The serial console is a serial UART port, used for system debug of systems of greater than 2 processors, or as the system console on a dual processor Multiprocessor computer system.

RIMM $I^2C$ Interface

The memory RIMMs include serial EEPROM components that contain the Serial Presence Detect (SPD) data required in order to configure the RAMbus memory subsystem. The EEROMs are connected via an $I^2C$ bus to the CMM.

EV7 CPUs

The Alpha EV7s 860 interface directly to the CMMs 810. This connection includes:

Halt and Reset

SROM clock and data

GPORT I/O bus

BIST signal(s)

System Software

System software interfaces with the Server Management Firmware to:

Obtain sensor data

Allow agent software to issue commands to the Server Management Subsystem

Obtain and save the current date/time via the SRM defined BB_WATCH, as described herein below.

Operator Station

The operator station 922 is defined as the location running the Platform Management Utility.

This utility uses the Private LAN 902 to perform the Server Management operator functions.

Requirements

The description that follows is for the purpose of showing exemplary functional requirements of the Server Management Firmware. The Server Management Firmware will be referred to as "the firmware". Any other firmware will be called out specifically. This specification describes the requirements as follows.

Initialization

Network Processing

Environment and Configuration

OCP and Console Traffic

EV7 Control

Error Logging

SRM Firmware Interface

Server Management Command Execution

Partition Management

Is Real Time Clock (BB_WATCH)

Firmware Update

Platform Debug Utility

Initialization

The Server Management microprocessors are powered by an auxiliary power supply (Volts Auxiliary or VAUX) power supply, separate from the main system supply. This supply is present even in the absence of system power.

Upon application of VAUX

1. Module self-test is performed on all Server Management processors (CMM, MBM, and PBM). Self-test status is stored by each Server Management processor for retrieval upon command.
2. There is a discovery process by which all members learn of the total population. This is accomplished via communication over the Server Management LAN.
3. The system supports the re-initialization, addition, or deletion of Server Management processors without affecting running operating system instances.
4. Upon completion of the Server Management Subsystem initialization, CPU and I/O initialization is begun, if the system master power switch is enabled/on.
5. The functions of system initialization and operating system bootstrap are independent of the presence of an Operator Station or Platform Management Utility.

Network Processing

This section describes the requirements related to the distributed processing and communication on the private Server Management LAN 902. Each microprocessor is considered to be a "member" of the network.

1. A message packet protocol is used for communication between any PBM, MBM, CMM, and EV7 on the private LAN.
2. The addressing on the private LAN is constructed such that each member is addressed in a deterministic method, based upon its geographic location, physical node ID, or other software visible feature.
3. The MBMs and PBMs directly connected to the Ethernet LAN operate as peers. Traffic from subordinate CMMs is routed via its directly connected MBM.
4. The network protocol supports periodic announcement messages, which are used by each of the individual members to build a complete list of members.
5. Traffic on the private LAN is not be visible to the customer's LAN.
6. An optional Operator Station 930 may be connected to the private LAN, function as a member of the network, and communicate using a Platform Management Utility.
7. Address selection for multiple operator stations is automatic and transparent to the user, if desired.

Remote LAN Communication

Remote LAN communication through connection 932 is defined as any Server Management LAN traffic that originates from the Customer LAN (as opposed to a directly connected operator station).

8. Connection to a customer LAN through connection 932 is via a two port gateway. The gateway contains a single port on the private LAN and a single port on the Customer LAN.
9. The gateway is assigned a single IP address on the Customer LAN.
10. The gateway functions is a member of the Private LAN. A private LAN IP address is assigned via a deterministic method.
11. Only external commands (defined in a subsequent section) are accepted from the Customer LAN side). Illegal commands are rejected.
12. Commands are passed through the gateway to the Private LAN. Responses are returned from the Private LAN to the Customer LAN.
13. The gateway function implements a means of access control (e.g. usename/password) from the Customer LAN side.

These features may be satisfied by a gateway function running on the Operator Station platform, or may be implemented in another embedded micro processor.

Environment and Configuration

This group of requirements involves the monitoring of the physical configuration, thermal, and electrical environment of the Multiprocessor computer system.

14. Power on/off sequencing for the entire system, as well as hot-plug capable modules & drawers, are coordinated by the firmware.

15. A list of all of the following hardware components, with associated asset information (revision, serial #) shall be maintained:
    EV7 CPUs
    RDRAM RIMMs
    IO7s
    CMMs, MBMs, PBMs
    I/O Drawers
    PSUs and Fans
16. The CMMs retrieve the RDRAM SPD data from each RIMM on all CPUs. Further, this data is provided to the EV7 XSROM code.
17. The BIST status of all EV7 CPUs in the system is stored.
18. The configuration data and/or sensor data is provided upon command.
19. The Primary EV7 CPU in each partition is interrupted upon configuration changes that add or remove hardware resources (CPU or I/O chassis).
20. Configurable parameters are maintained in non-volatile storage. In a system that contains multiple MBMs, there are multiple copies of this data.
21. A mechanism for the SRM firmware to store and retrieve non-volatile parameters (referred to as environment variables) is provided.
22. In the event that the value of a critical platform sensor enters a region defined as hazardous, steps are taken to power down the components within the domain of that sensor. Notification is made to the OCP and to any attached Platform Management Utility that such an event has occurred. The occurrence is logged.
23. A set of functions is provided which allow a discrete signal to be set, cleared, and checked from each side of an EV7 Interprocessor cable.

Configurable Parameters

Operator settable parameters that are maintained by the firmware include the count of partitions, the LP-count and the identity of the EV7 Processors and I/O drawers belonging to each partition.

OCP and Console Traffic

The OCP provides the lowest level control of the system and diagnostic feedback to the user. The traditional text based interface to an AlphaServer and any associated Remote Management Controller is considered "Console Traffic". This group of requirements covers the OCP interface and ASCII character I/O between the user and:

The SRM Console in each logical partition
System Software Console I/O via the SRM console port
The 2P Serial Console/Debug Console OCP Interface 24. The alphanumeric display on each 8P backplane is used to display critical error and status messages.
25. The halt switch is programmable to be inoperative, halt all partitions in that 8P backplane, or halt all processors in all partitions.
26. The reset switch is programmable to be inoperative, reset all partitions in that 8P backplane, or reset all processors in all partitions.

SRM Console Firmware Traffic

27. A mechanism is provided by which the SRM Console firmware, running in a given logical partition, performs ASCII character I/O to the Platform Management Utility. A connection to a given logical partition is defined as a session.
28. The Platform Management Utility provides a means to connect to the operator display and keyboard to a session running on each partition.
29. Characters of output are buffered in the absence of an established session.
30. SRM Console firmware messages leading up to the first user input prompt are stored as an audit trail for later retrieval by the Platform Management Utility. This audit trail is re-written each time that the logical partition is initialized by the Server Management firmware.
31. Simultaneous character I/O sessions are supported.

System Software Console I/O via the SRM Console Port

Per the Alpha SRM, "Alpha console provides system software with a consistent interface to the console terminal, regardless of the physical realization of that terminal."The Multiprocessor computer system takes advantage of this to virtualize console character I/O. The SRM Console firmware utilizes the same interface as described in the section above to perform this function.

The features necessary for the SRM Console firmware to implement the GETC, PUTS, PROCESS_KEYCODE, RESET_TERM, SET_TERM_INT, and SET_TERM_CTL callbacks are described in the Alpha SRM.

2P Serial Console/Debug Port

A serial port connection, via the MBM is to be utilized for two purposes. In the case of a minimal configuration Multiprocessor computer system (2P, single partition) there may not be an Operator Station. Also, for the purpose of system lab and/or software debug, it is desirable to have a hardwired serial line connection closer to the EV7 CPU.

32. There are, in debug mode or for a 2 Processor system, a means provided to connect the SRM Console firmware traffic to a Serial Console line on a given MBM.
33. Given the same configuration requirements, this mechanism is supported as the System Software console I/O port.

EV7 Control

The Server Management Subsystem orchestrates, via hardware and firmware, the power on sequencing of the EV7 CPUs.

34. The EV7 SROM code is loaded from flash into the CMM FPGA.
35. The EV7 XSROM code is loaded from flash via the CMM FPGA.
36. EV7 startup sequence with the SROM/XSROM is sequenced in a synchronized fashion, following the power-up flow.
37. A means to execute individual SROM/XSROM tests is provided.
38. The SRM Console code is loaded from the MBM flash to the EV7.
39. The EV7 CPU RESET sequence is performed upon command.
40. The ability to set and clear the EV7 HALT signal is provided via a command.
41. The proper power-on/off and reset sequence to initialize the EV7 is performed via the CMM.
42. A means of loading EV7 firmware (XSROM or SRM Firmware), as an alternative to the contents of the flash image, is provided for diagnostic purposes.

Error Logging

The Server Management firmware provides a mechanism by which key information from catastrophic failure conditions can be collected for later analysis. It also provides functions to support storing specified FRU error data in that FRU's non-volatile storage.

43. A means is provided for EV7 PALcode to signal errors designated as catastrophic (e.g. double error halts). Further, it shall provide for the non-volatile storage of such errors. This storage shall be cleared upon user command.
44. SROM/XSROM progress status and/or messages is stored as an audit trail, per EV7, for retrieval by the Platform Management Utility. This audit trail is re-written each time that the EV7 is initialized by the Server Management firmware.
45. A mechanism is provided to allow SROM, XSROM, or other diagnostic firmware to store failure date within FRUs which support it.

SRM Firmware Interface

This section describes the interdependencies between the SRM Console Firmware and the Server Management Subsystem. This interface provides the SRM Console Firmware with the ability to issue Server Management commands and access to the system state and configuration data. Console character I/O has been covered in a previous section.

46. The SRM Console Firmware executing in each logical partition instance has the ability to send and receive network packets on the Server Management LAN.
47. The SRM Console Firmware interface allows any valid Server Management command (described in another section) to be executed.

Server Management Command Execution

This is the set of requirements surrounding Server Management command interpretation and execution. There are two types of commands present on the Server Management LAN. Internal commands are those that provide communication between the microprocessors and/or the Platform Management Utility, e.g. "print a character". External are commands which transfer information or control to/from the outside world, e.g. "show FRU".

48. The Platform Management Utility allows external Server Management commands to be issued by an operator.
49. Internal commands are provided for intercommunication between private LAN members.

External Server Management Commands

The table of FIG. 11 contains the set of required External Server Management Commands.

Internal Server Management Commands

The table of FIG. 12 contains the set of required Internal Server Management Commands.

Partition Management

The Server Management Firmware has a specific role to play in the area of Logical Partitioning. The Galaxy Configuration Tree Specification describes the role of the Server Management Subsystem in a partitioned system as well as the callbacks provided by the SRM Console Firmware.

50. The count and identities of hard partitions in the system is maintained.
51. The state of the current partition ownership of the hard partitionable entities (an "entity") in the system is maintained. In an exemplary embodiment of the invention, the only hard partitionable entities in a Multiprocessor computer system are the EV7 CPUs. Placing a CPU in a hard partition also implies that its memory and associated IO7 are within that partition.
52. A mechanism to store the current partition count and ownership information in non-volatile storage is provided.
53. Partition initialization on power-up according to the partition information stored in non-volatile storage is performed.
54. A mechanism by which to provide the current partitioned state to the SRM Console Firmware running in any partition is provided.
55. A mechanism to allow the SRM Console Firmware, running in any partition, to change the ownership state of an entity is provided.
56. A mechanism by which an Operator can define which partitions may be allowed to allocate specific, free, entities is provided.
57. The primary CPUs of all partitions are notified of changes to the partition and ownership information, via interrupt. There is a mechanism for the SRM Console Firmware to enable/disable this interrupt upon request by System Software.
58. The logical and physical EV7 processor IDs are passed to firmware executing on the EV7 processor for use during configuration.

Real Time Clock (BB_WATCH)

The Alpha SRM defines the entity which stores the battery backed up date and time information as BB_WATCH. System software uses the information stored in the BB_WATCH to provide a consistent date/time across system reboots and power outages. This section describes the requirements for having Server Management firmware provide the BB_WATCH functionality.

59. System Software running on a primary EV7 is provided access to read and write the BB_WATCH data described in the Table of FIG. 13. The access is via the EV7 GIO port.
60. The Server Management firmware maintains a battery backed up timebase.
61. A unique set of BB_WATCH data is provided for each partition.
62. The time for System Software to read or write the BB_WATCH data is less than one second.

Firmware Update

The contents of the Flash Image are distributed throughout the Server Management Subsystem. This section describes the requirements related to updating the various flash images.

63. A Fail Safe Loader (FSL), which executes in the absence of a valid firmware load, is implemented on each microprocessor. The Fail Safe Loader initiates a firmware update of the affected flash image. The FSL is protected by hardware to prevent unintended erasure.
64. The update of multiple flash ROMs is coordinated by the Platform Management Utility.
65. A discrete input, such as a jumper, is employed to prevent against accidental firmware update.

Firmware Top Level Architecture

This section describes the top-level firmware architecture and allocation of the requirements from the previous sections.

Figure 10:
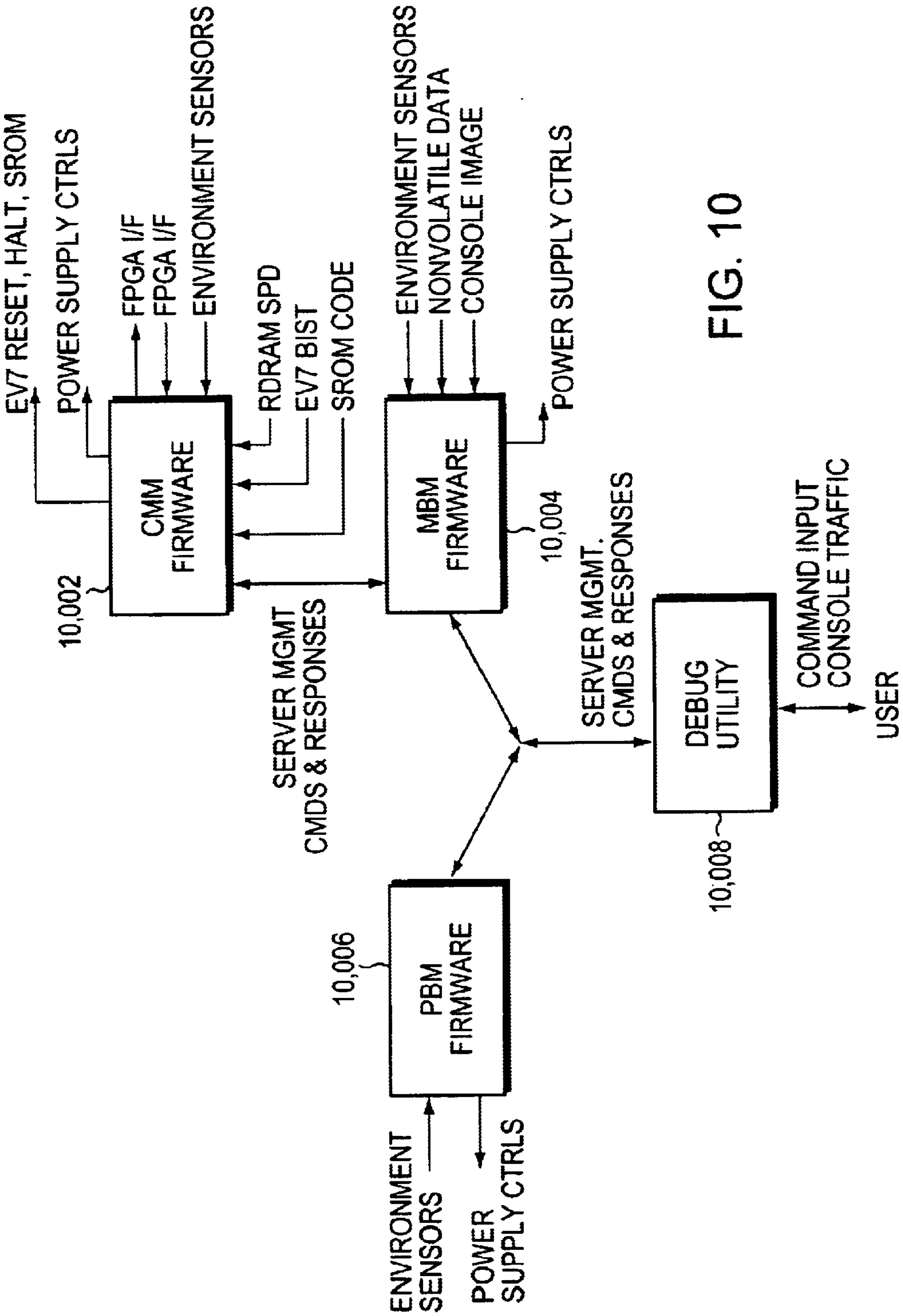
FIG. 10 is a block diagram of firmware used in system management components.

FIG. 10 gives the Top Level Architecture of Firmware

The Server Management Firmware implementation contains the following components:

CMM Firmware 10,002

MBM Firmware 10,004

PBM Firmware 10,006

CMM Firmware

The CMM is responsible for the direct execution of all EV7 related tasks. In addition, it must satisfy the process Environment and Configuration requirements that relate to the Multiprocessor computer system Dual CPU board. It directly executes the Server Management commands described in section 47 that are applicable to its operation.

MBM Firmware

The MBM firmware is responsible for orchestrating the overall system initialization. As peers on the private LAN, each MBM participates in the network operations. By communicating with the PBMs and subordinate CMMs, it performs tasks required by the processor.

In cooperation with the other MBMs, the configurable parameters are maintained. The MBMs perform a routing operation in the routing of Console Traffic. The MBMs perform the partition management functions. It also directly executes the Server Management commands that are applicable to its operation.

PBM Firmware

The PBM firmware participates with other PBMs and MBMs on the private LAN to satisfy the PBM requirements. It provides environment sensor data. It also directly executes the Server Management commands that are applicable to its operation.

Definition of Terms

Adaptive routing: the collection of paths advancing node-to-node in the same primary and secondary directions as the dimension-order routing. At each intermediate node it must be possible to advance in either direction until the dimension coordinate in a direction matches that of the destination.

Dimension-order routing: the shortest path connecting two nodes which proceeds first along the primary dimension and then along the secondary.

DRDRAM: DRAM memory chips that conform to the Direct RAMbus specifications. This new memory chip architecture provides extremely fast access times, 60 nS to a closed page and 30 nS to an open page. In addition to fast access time Direct RAMbus DRAMs support high bandwidth. A single RDRAM can support 1.6 GB/sec of memory bandwidth.

Dynamic Duo: Multiprocessor computer system Dual processor CPU module. Includes two EV7 chips, their memory RIMMs, the 48V to DC converters, CPU server management logic, and connectors for six IP ports and two IOP ports.

EV7: New version of the Alpha chip design based on EV68. The EV7 chip uses the EV68 core at its center and adds an on-chip memory controller, on-chip L2 cache (no module level cache support in this version of the Alpha chip), on-chip processor-to-processor and processor-to-IO router. The initial implementation uses 0.18 um bulk CMOS with copper interconnect. EV7x: EV7 chip implemented in a future CMOS process. 'x' denotes the process generation, i.e. EV78 is the EV7 chip produced with the next generation CMOS process.

EV8: Next generation Alpha chip following EV7.

Group: A set of interconnected MBMs and PBMs.

Hard-Partition: A subset of the system's resources that is electronically isolated.

Initial hop: a routing option which allows a hop from the source node in any direction to an adjacent node. This option allows some connection of nodes in imperfect meshes.

IO7: IO ASIC that attached directly to the EV7 IO port. The IO7 spawns four independent IO buses. Three of the buses are PCI-X and one of the buses is a 4x-AGP. This combination of buses provides for a very flexible IO subsystem.

IP: Inter-processor port on an EV7 chip. The IP ports are designated as North, East, South, and West relating to geographical location of the port in the interconnect mesh connecting processors together.

IOP: IO port on the EV7. This is the port that the IO7 ASIC connects to. The IOP has two uni-directional clock forwarded paths for communicating with the IO7 ASIC.

Members: MBMs and PBMs that belong to a group.

Partition: A subset of resources.

Partition Coordinator: A Server Management firmware task that manages a hard partition and all of its subpartitions.

Partition Database: A database of configuration information that is replicated among all the MBMs and PBMs.

PCI-X: New generation registered version of PCI bus. PCI-X runs at 133 MHz, 100 MHz, or 66 MHz. PCI-X is backward compatible with PCI and will run at 33 MHz or 66 MHz when such a PCI device is plugged into the bus. The bus supports 32 bit and 64 bit devices.

Primary dimension: one of EAST-WEST or NORTH-SOUTH. This choice is the same for all EV7s in a hard partition.

RIMM: Memory DIMM utilizing DRAMs conforming to the RAMbus Inc.'s DRDRAM specification and RAMbus Inc.'s RIMM specification. RAMbus Inc. owns the specifications and is working with RAM vendors and memory suppliers to make RIMMs a commodity memory. Secondary dimension: the other way (see primary dimension).

SIO: A new IO specification still being defined.

SMP: Symmetric multiprocessing. This is a tightly coupled shared memory multiprocessor system.

SRC routing: another deadlock-free routing method in which travel proceeds first along the secondary dimension.

Striping: Interleaving of the NUMA memories

Sub-Partition: Partitions within a hard partition that are not completely electronically isolated.

Zone: The subsets of hardware resources that results from a hub or link failure.

Server Management

The Multiprocessor computer system Server Manager Firmware subsystem has two basic obligations: (i) to serve the user requests to act on Multiprocessor computer system hardware, and (ii) to automatically manage the Multiprocessor computer system hardware according to rules and constraints.

A user walks up to a laptop running the Partition Management Utility (PMU). He/she issues the command to power on a partition. The PMU sends the power on command to the PMU Server running on an MBM. The PMU Server forwards that command to the Partition Coordinator, which runs on an MBM. The Partition Coordinator sends a sequence of commands to other MBMs, CMMs, and EV7s to power up the hardware in the partition, to run the diagnostics, to configure the routers, and to bring up the SRM console and operating system. The user's request is complete.

Multiprocessor computer system Server Management Firmware Hardware Overview

Figure 15:
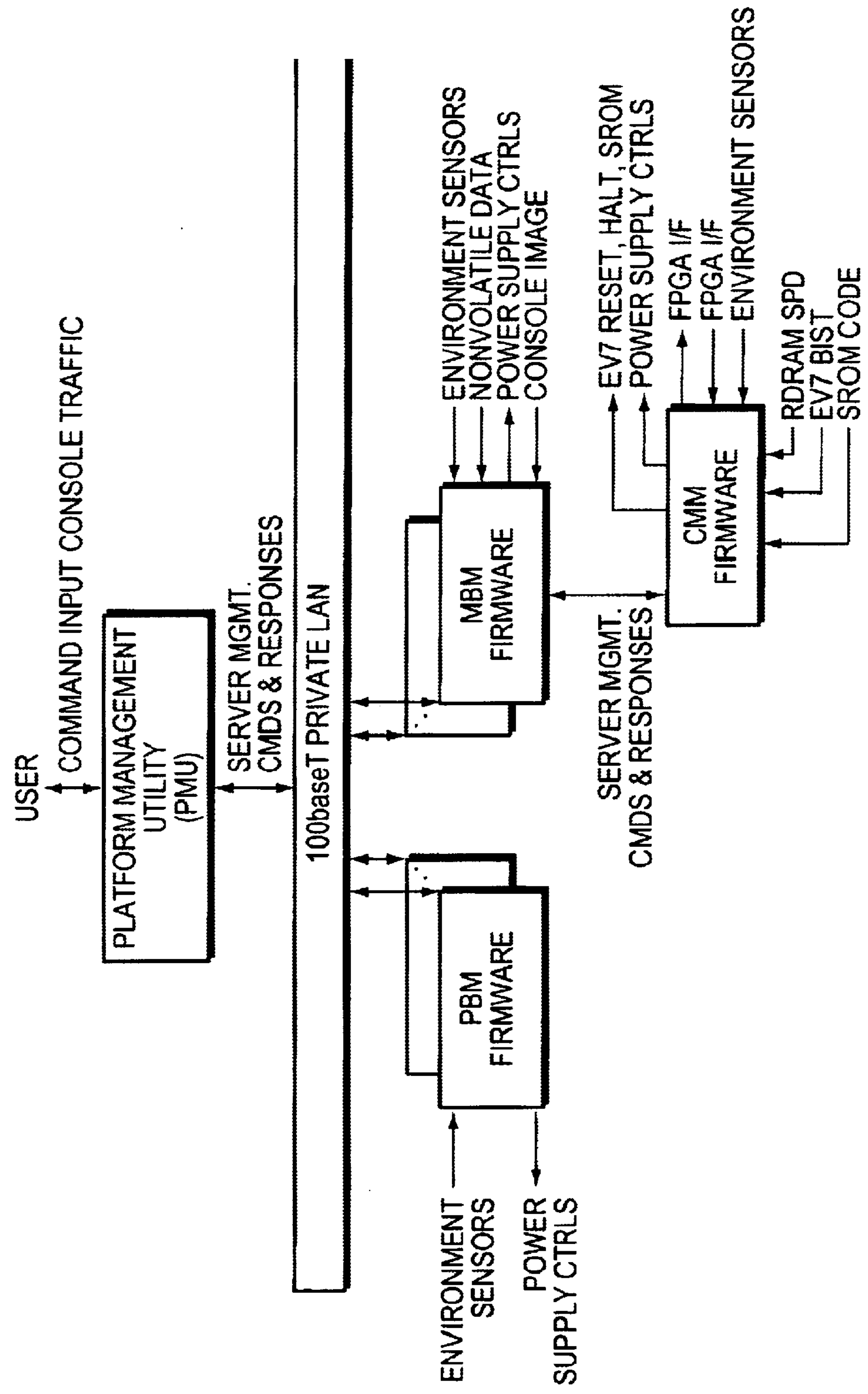
FIG. 15 is a block diagram giving Server Management Hardware Overviews.

FIG. 15 shows hardware components of the Multiprocessor computer system Server Management subsystem, along with the associated firmware. The Multiprocessor computer system Server Management Firmware is the set of distributed hardware and software that facilitates managing a Multiprocessor computer system. The Multiprocessor computer system hardware is managed by a collection of microprocessors acting cooperatively. These micros are known as the CMM, the MBM, and the PBM. The CMM resides on the CPU module 810 and is affiliated with two EV7s. The MBM resides on the 8P backplane on MBM unit 840 and is a parent to the CMMs. The PBM resides in the IO box in PBM unit 702 and is a peer to the MBM.

The communication architecture is a 100baseT private LAN 902 and serial UART connections between the MBM and CMM Processors. The MBMs and PBMs have a direct connection to this LAN. The CMMs are connected to the MBM with a dedicated serial connection. The MBM routes the network messages for the CMM.

MBM Hardware Overview

Figure 16:
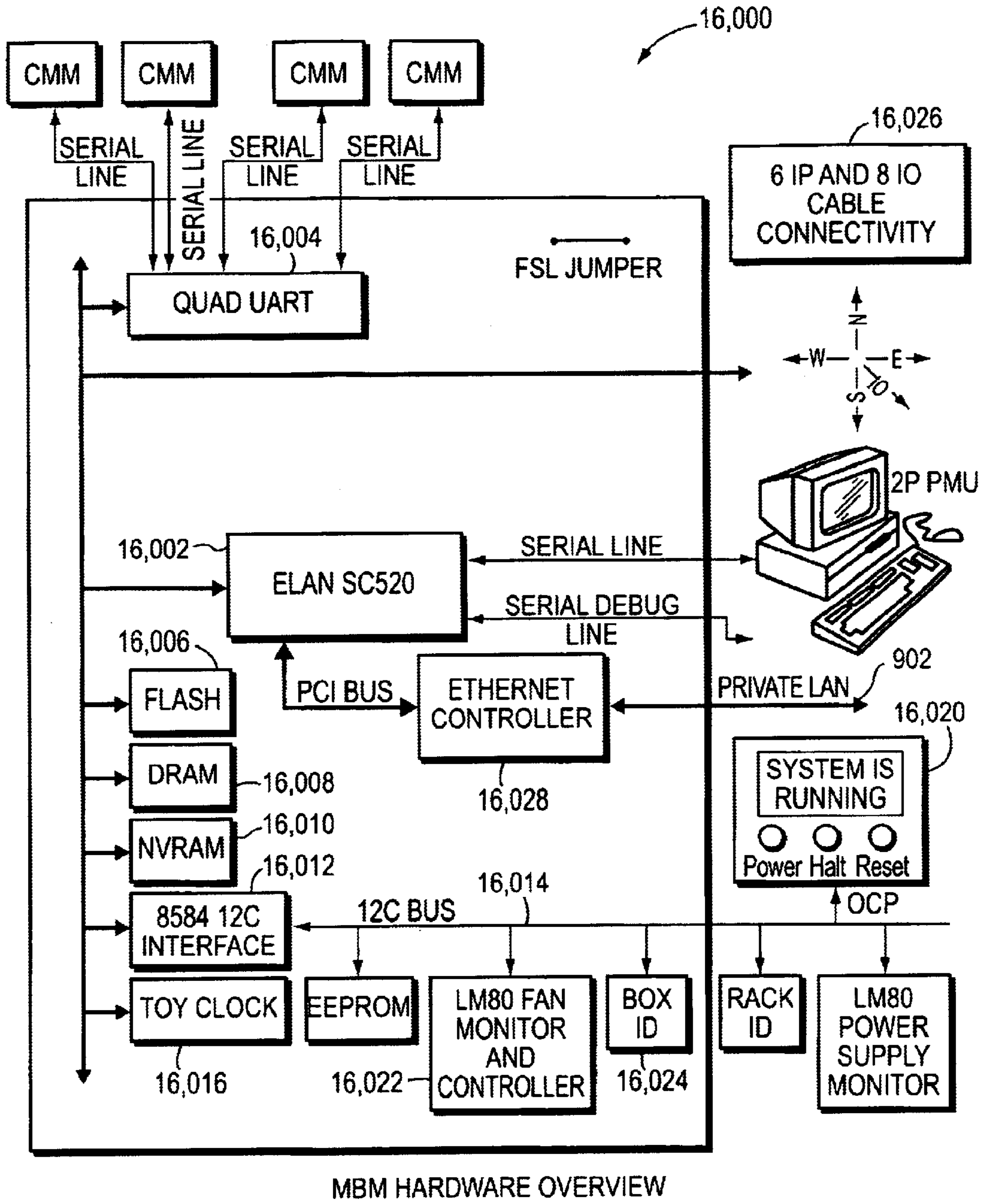
FIG. 16 is a block diagram giving MBM Hardware Overview.

Below is a brief overview of MBM hardware(16,000), as shown in FIG. 16.

ELAN SC520—compute engine for the MBM, a microprocessor 16,002

Quad Uart 16,004—each uart connects to a CMM via PPP

Flash 16,006—Stores firmware images for MBM, CMM, SRM, and data such as the partition information and data bases, the SRM environment variables, error logs DRAM 16,008—Memory used to run the MBM firmware; ECC checked NVRAM 16,010—a combination of flash and either CMOS or some larger NVRAM device. Frequently changing state and data is stored here.

I2C Interface 16,012—EEROM, fans, voltages, temperature

12C Bus 16,014

TOY clock 16,016—Most importantly used as the clock for the EV7s controlled by this MBM OCP display and switches 16,020—Displays information about the state of the CPU box. Switches are software managed Rack and box thumbwheels 16,022, 16,024—the MBM derives a unique address from these; they also aid the human in identifying components IP & IO Cable Connectivity 16,026—14 cables are tested for expected connectivity and indicators help the human connect up the cables Ethernet controller 16,028—All MBMs and PBMs are connected via private Ethernet 902. Management utilities are also share this LAN Local terminal uart—in the lab, and for the 2P system, a simple connection is available not shown, in FIG. 16.

Debug uart—only used in the lab by developers, not shown in FIG. 16.

Addressing the Hardware

All MBMs are identical except for a uniquely identifying thumbwheel. The MBM uses this unique identifier to determine a unique IP address for itself and for 4 CMMs and 8 EVs. The IP addresses are reserved for the CMMs and EVs even if these components are not present.

Box and Rack Thumbwheels

Figure 17:
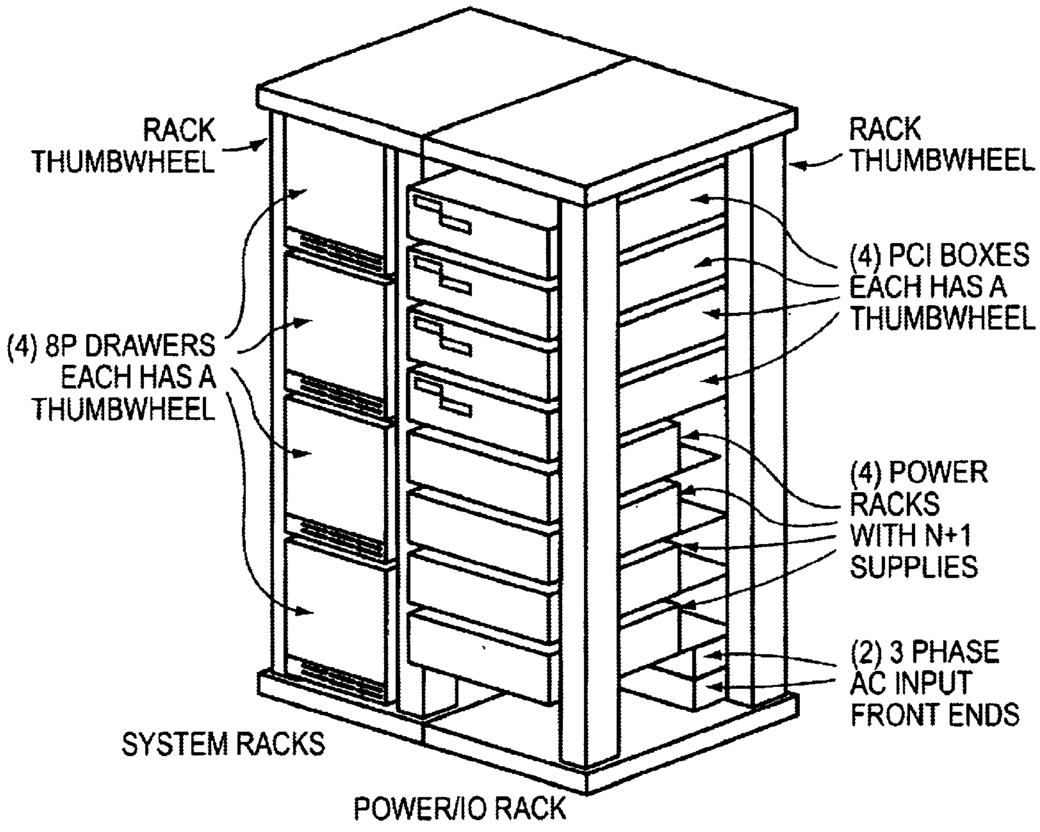
FIG. 17 is an isometric view of a Rack and Box with Thumbwheel switches.

Each 8P drawer and IO box as shown in FIG. 17 has a user settable thumbwheel with a 4 bit value (0–15). The thumbwheel value can be read by the PBM and the MBM. In addition, there is a thumbwheel identifying the rack in which the box resides with an 8 bit value (0–255). MBM thumbwheels 16,022, 16,024 indicate values of 0–3 on the 8P drawer and 0–7 on the rack. PBM thumbwheels can have any value for the IO box and rack. These thumbwheels are used by the MBM and the PBM to derive a unique IP address on the SM 16,002, etc. The thumbwheel settings are available to the micros when the system is powered off, and always visible to the user.

Identification by thumbwheel is just one of the four naming schemes being used in an exemplary Server Management Subsystem implementation. In addition, the rack and box identification is used to verify that InterProcessor cabling is correct.

MBM Firmware Overview

The main duties of the Server Management firmware are:

Configure the partitions and associate the EV7s, IO7s, and memory to a partition Provide each partition with individualized non-volatile storage and time services Provide services to the CMM (Network proxy, time service, firmware repository . . . )

Power on and Power off components

Orchestrate diagnostics and perform cable testing

Offer console connections to each partition (virtual console)

The PBM duties are a subset of the MBM. A section dedicated to the PBM is given herein below.

Operational Overview

MBM Self Management

The MBMs are the core of the Multiprocessor computer system Server Management Sub-system. They are parents to the CMMs and they service the Platform Management Utility. Every MBM needs to manage its network connections, its environmentals, and serve its CMMs. Task that always run on each and every MBM:

Group protocol

Time Server

CMM TFTP Server

TFTP Client

Environmental Monitoring

MBM LAN Management

MBMs all have the same capability. But at any moment, some MBMs are responsible for more of the SM capabilities than others. As the configuration changes, the responsibilities of the MBMs change. This design allows for a robust architecture in the presence of faults. Since all MBMs are capable of performing any of the Server Management duties, an SM service can failover to any other MBM (or PBM). Additionally, some load balancing is achieved by distributing the labor. After each configuration event, the SM subsystem re-evaluates the task assignments, and restarts task as necessary.

Tasks that are instantiated on selected MBMs are shown in the Table of FIG. 18. In a degraded system that has broken into zones, there are 1 of these tasks for each zone: "Group Leader" and "PMU Server".

Server Management Startup—an Overview

When a Multiprocessor computer system is powered up, the MBMs and PBMs connect to the private LAN 902 and discover each other. They all participate in the "Group Membership Protocol". They agree on a "Group Leader" MBM/PBM to provide a consistent view of the replicated databases and to monitor the LAN membership. Since each MBM/PBM has a copy of the partition database, they each send their copy to the Group Leader for "reconciliation".

The Group Leader distributes the authoritative copy of the database back to each member.

The Group Leader starts up the "PMU Server" task to handle (i) requests from the Platform Management Utilities (PMUs), (ii) error alerting, (iii) cable testing requests from partitions. Next, a "Partition Coordinator" task starts for each partition defined in the partition database. The Partition Coordinator task is the focal point for managing a partition (a partition is a component subset of the entire Multiprocessor computer system). The Partition Coordinator controls the MBMs/PBMs in the partition. It synchronizes diagnostic testing, and initiates the partition startup. With all server management tasks ready, the DHCP server now starts up and offers network addresses to operator stations running PMUs. The Platform Management Utility(s) run on a separate system that requests a DHCP address and begins communicating with the PMU Server. Each of these tasks is discussed in more detail in the following sections.

Parts of the MBM

Figure 19:
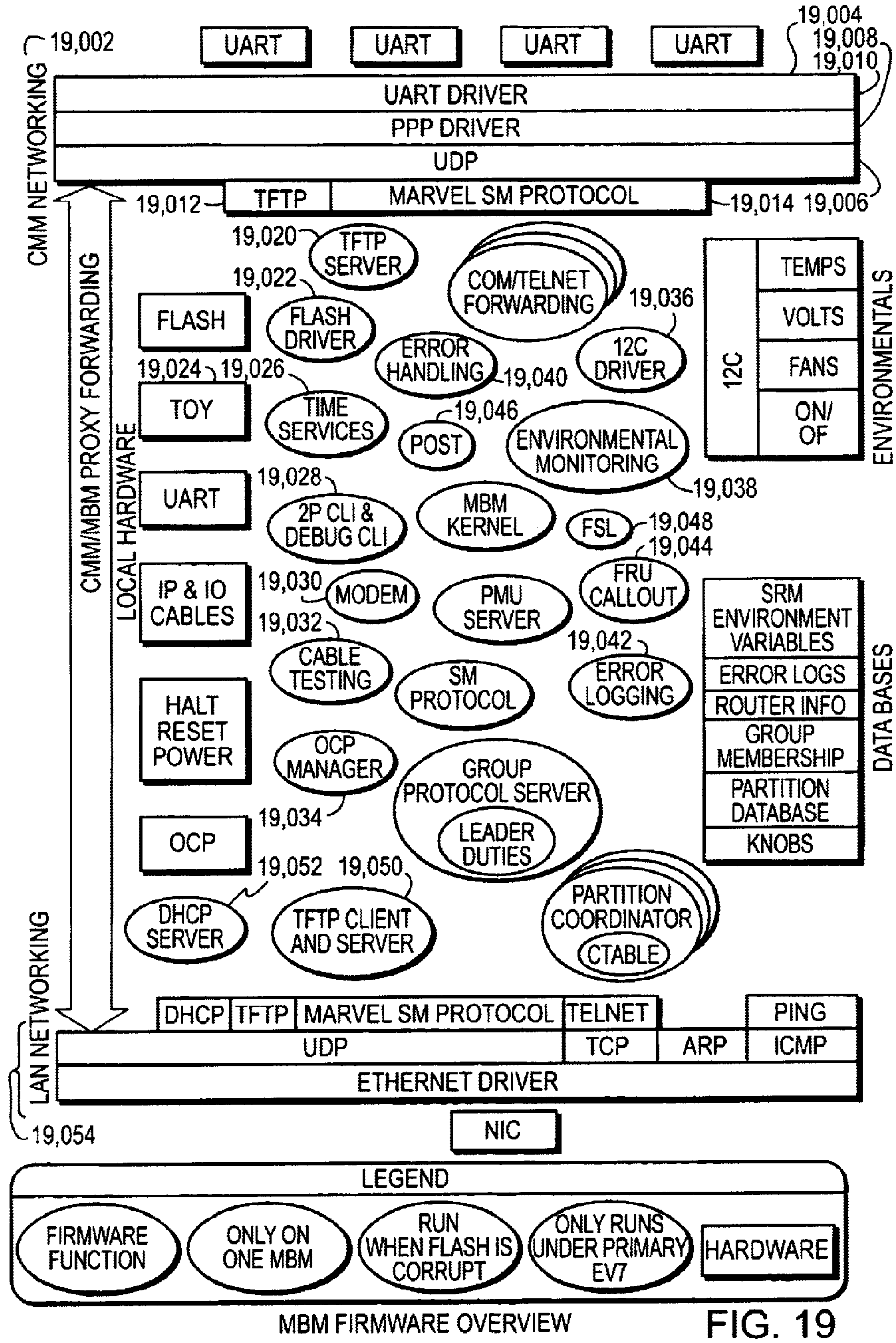
FIG. 19 is a block diagram giving an MBM firmware overview.

Below is a brief description of the items shown in FIG. 19.

CMM Network stack 19,002—UART driver 19,010, UDP19,006, PPP 19,008, TFTP 19,012. The MBM talks to the CMM over the serial lines using standard network protocols for much of its work.

SM Protocol—The Server Manager Protocol 19,014 is described. This is a private protocol.

TFTP 19,020 Server—Requests from the CMM for firmware that is stored in MBM flash are serviced by the parent MBM. Requests from an MBM for firmware is requested via BOOTP.

TELNET COM Forwarding—The console terminal interface is via a Telnet session which runs on the MBM. Characters are passed on further to the EV7 via the FPGA uart emulation hardware. Up to 16 TELNET sessions are possible on a single MBM (8 partitions×2 COM ports per partition).

Flash Driver 19,022—The flash driver is accessed for reads and writes through a device driver. There is one flash driver running per MBM.

Time Services—The MBM provides the access to the TOY 19,024 for VMS and UNIX operating systems running on the EV7s. It also implements the synchronization of time across the partition. Each MBM runs the Time Server 19,026.

2P CLI & Debug CLI 19,028—In the 2P configuration, no laptop is required for management. A simple command interface is provided. This interface mechanism is also used as a debug mechanism on large configurations. Each MBM runs the Debug CLI. In the 2P system, there is only A1 MBM.

Modem 19,030—Dial out is for alert conditions. This is only run from one MBM, designated by a Server Management Knob. The connection to the modem is not a fault tolerant service since in an exemplary embodiment, the modem only has one connection into the system.

Cable Testing 19,032—User's are assisted in connecting cables with LEDs and commands. Cables are also tested as part of diagnostics. Cable Testing is orchestrated by the PMU Server on request from either the PMU or a Partition Coordinator. All MBMs and PBMs participate.

OCP Manager 19,034—A small amount of information can be displayed on the OCP to indicate the configuration and errors. Each MBM has an OCP to utilize.

I2C Driver 19,036—The 8584 I2C controller is accessed for reads and writes through a device driver. It is used to access sensors, EEPROMs, the OCP, and sundries.

Environmental Monitoring 19,038—Fans, temperatures, and voltages are monitored and notification of out-of-range conditions alerts the PMU.

Error Handling 19,040—Errors that the MBM detects (ECC, environment, power cycling, . . . ) and other assorted errors are stored in the log.

Error Logging 19,042—a history buffer of errors is maintained. It can be retrieved by the PMU.

FRU callout 19,014—MBMs evaluate the results of diagnostics and alert the PMU about a failing component.

POST 19,046—Power On Self Test. The MBM does some self checking diagnostics. The POST runs on every MBM and PBM.

FSL 19,048—The Fail Safe Loader tries to recover from a corruption of the standard MBM flash image. An FSL exists on each MBM and PBM.

MBM Kernel—VxWorks, multitasking real image is used as the kernel.

Partition Coordinator & Ctable—A process runs for each partition that manages and synchronizes all the elements in the partition. There is one Partition Coordinator for each partition. An MBM may have from 0 to 8 Partition Coordinators running on it.

Group Protocol Server & Leader—The group protocol, runs on each MBM and PBM to ensure a coherent assignment of the Multiprocessor computer system resources. One MBM in the system is elected as leader to orchestrate this operation. Each MBM participates in the Group Protocol, but only one MBM is a leader per group. There may be more than one group in cases when a hardware failure divides the system.

PMU Server—One of the MBMs is elected to service the requests of the PMU using a well-defined IP address. In a split system there is a PMU Server for each "zone".

TFTP Client & Server 19,050—Update images and test images are passed back and forth via TFTP. When an MBM's image is corrupt, another MBM services a bootp request and provides the ailing MBM with a good image.

DHCP Server 19,052—One of the MBMs in the system provides IP address to PMUs joining the LAN.

Figure 20:
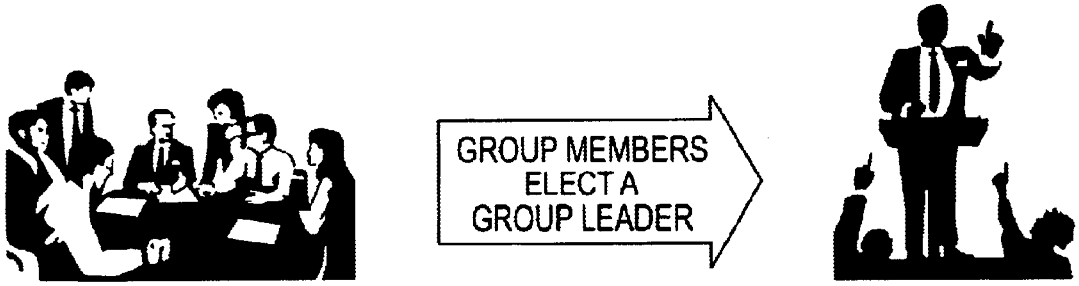
FIG. 20 is a diagrammatic sketch showing group members electing a group leader.

LAN Network Stack 19,054—Ethernet driver, UDP, TCP, ARP, ICMP, DHCP, TFTP, Telnet, PING and the SM Protocol Group Leader The information used to configure a Multiprocessor computer system is stored in the flash on the MBMs and PBMs. There is no master MBM or PBM, but rather the configuration data is replicated on each MBM and PBM. This facilitates dynamic configuration changes and robustness during failures. And although there is no master, the LAN micros elect a leader, as shown in FIG. 20, to coordinate the system's operation.

The MBMs and PBMs in the system coordinate by forming a set of micros, the group, that has a common view of the micros that exist. In the absence of failure, all the MBMs and PBMs are "members" of the group. The micro with the lowest thumbwheel identification is chosen as the "leader".

Each MBM and PBM has a copy of the partition configuration data. It is possible, due to a history of configuration changes, the replicated partition configuration data (sometimes referred to as the partition database) may differ from micro to micro. It is the job of the leader to reconcile these differences and to distribute the reconciled database to all the members. The leader also starts the different management services, like the DHCP server and the PMU server.

A group forms or reforms whenever an MBM/PBM connects to/disconnects from the SM LAN (including failures, MBM/PBM crashes, etc. ). At the time a group reforms, all existing services are shut down, the leader is temporarily non-existent, and access to the database is locked. Each time the group reforms, the leader is again redetermined. If the lowest id MBM/PBM leaves the group, the next lowest valued MBM/PBM becomes the leader. If a new lowest id MBM/PBM connects to the LAN, it becomes the new leader. The new leader reconciles the database and also restarts the different management services, like the DHCP server and the PMU server.

The service shutdown and restart behavior at group formation time is consistent throughout the relocatable services in the system. The Partition Coordinators tasks are relocatable (see section 0, "Partition Coordinator"). TELNET services are not relocatable because Telnet uses TCP, a connection oriented protocol.

As shown in the table of FIGS. 21A and B, the power up flow is shown with emphasis on the role of the group. This flow can best be appreciated when we imagine an operator walking from one rack to the next and switching the breakers on each power supply to ON. MBMs/PBMs start serially, just moments apart. The MBMs/PBMs form groups, reform groups, and run system diagnostics until the system reaches the phase where the SRM is running on a partition. After that point, changes in group membership (MBMs/PBMs coming and going) are treated as hot adds.

The Platform Management Utility (PMU)

The Platform Management Utility is the operator interface to the Server Management system. The PMU is most often an application running on a PC 930 that is connected to the server management private LAN. It can also be an application running on the Multiprocessor computer system EV7 and accessing through the private LAN.

The PMU issues commands and requests as:

- Server Management Protocol Packets to the PMU Server (see section 0 "PMU Server"),
- TELNET protocol to TELNET servers (see section 0 "Virtual Console Terminals")
- TFTP client protocol to TFTP servers (see section 13 "Firmware Load and Upgrade")

Some characteristics of a PMU are:

- A PMU runs on a trusted host on the private LAN. The PMU runs on a host that is a member of the SM LAN, and importantly, does not allow access from the customer LAN.
- This host connects to the private LAN directly or through a gateway.
- Multiple PMUs can be operating simultaneously.
- The IP address is obtained on the private LAN interface via DHCP. Two exceptions to this are a PMU running on an EV7, which does not use DHCP but uses the IP address assigned to the EV7 primary, and one reserved address for VMS.
- A PMU interactively allows the operator to power segments of the machine, create and destroy partitions, query components and environmentals.
- A PMU enforces rules an policies about configurations.
- A PMU implements policies reacting to error notifications.
- Etc.

The PMU can also be an application running on EV7, and connecting through the CMM ram mechanism. Through this access mechanism, in an exemplary embodiment of the invention, not all PMU functionality is supported. The CMM ram access mechanism does not support higher level networking protocols like TFTP and Telnet. Conversely, some capabilities of the SM protocol are provided only for the operating system, and not the PMU.

The summary table shown in FIG. 22 of SM Protocol packets issued by the PMU is presented here as the requests seen at the PMU Server.

Live configuration change means adding or deleting a cpu/io from a running partition Writing SRM environmental VARS and storing PCI slot information is only an OS callback action. This action is never initiated by the PMU.

Figure 23:
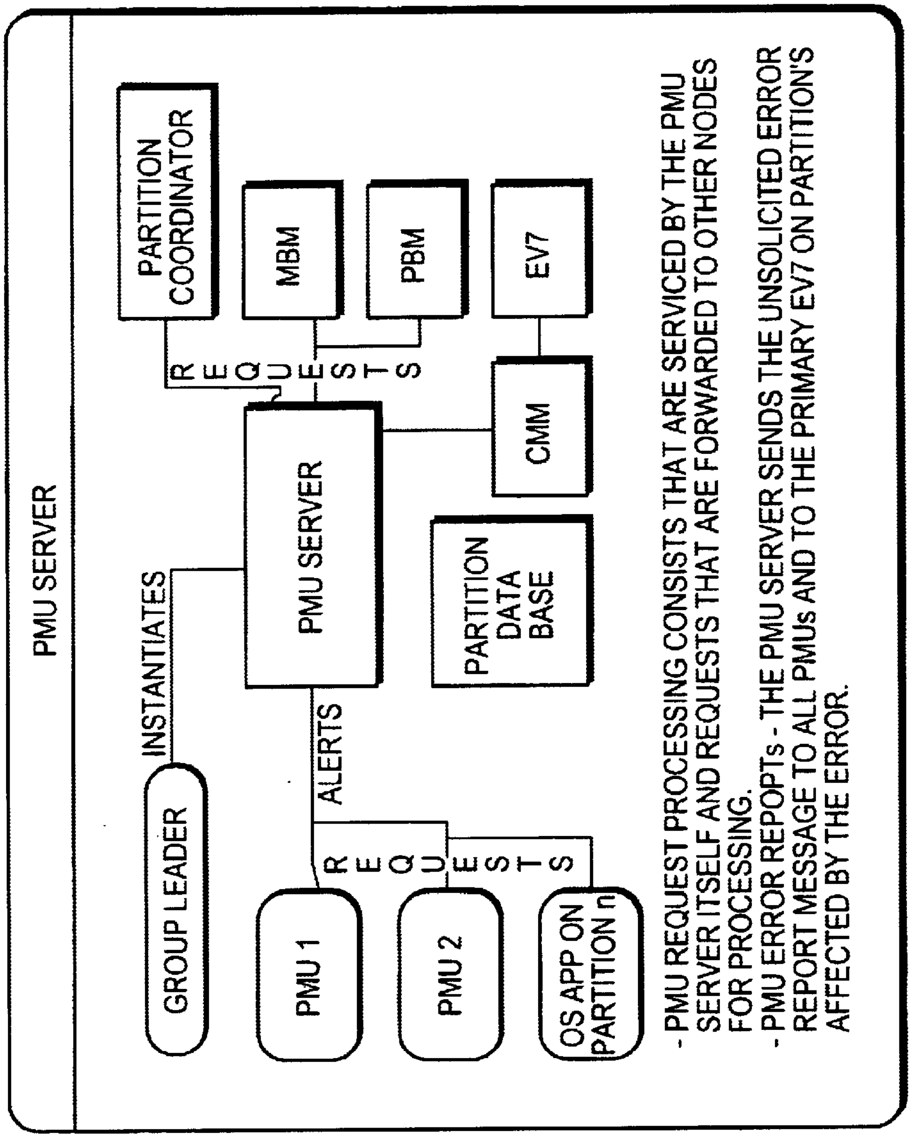
FIG. 23 is a PMU Server Block Diagram.

A block diagram of the PMU Server is given in FIG. 23.

PMU Server

The PMU Server is the focal point for PMU activity. It is available to the PMU at a fixed IP address, for example 10.253.0.0 which allows it to run on any MBM, and transparently fail over. The PMU Server has a dual functionality of (1) processing requests from PMU Applications and (2) distributing alerts to all PMUs. The PMU server simplifies the PMU interface by allowing the PMU to address any node on the SM LAN using the SM packet's common message header destination but still placing the PMU Server as the UDP datagram destination.

PMU Server Handling of SM Requests

All requests from the PMU must go to the PMU Server. This allows the PMU Server to order commands if necessary, preempt operations when required, and synchronize operations. Some PMU requests are handled right at the Server. The PMU Server caches some information about the system which it serves up directly to the PMU. These are "direct" commands.

Other times the Server acts as a command router just passing commands onto to the command target. These are "forwarded" commands. Some commands are forwarded to a Partition Coordinator (described in the next section) where a series of transactions can result. When forwarding commands to the partition coordinator, the PMU Server modifies the destination field to the IP address of the Partition Coordinator.

Sometimes, the PMU Server turns a single PMU command into a series of smaller tasks, masking the intricacies of the Multiprocessor computer system operations. These are "complex" commands.

The table of FIGS. 24A and B lists the commands that the PMU Server services by group, class (forward, direct or complex) and a description of how the handling is done.

SM Commands Originating from the PMU Server

Only a few of the SM protocol packets actually originate from the PMU Server. They are generated as either part of power up system discovery, to satisfy cable testing requests, or to send alerts to the PMU. The table of FIG. 25 gives a list of SM commands originating from the PMU server.

PMU Server Handling of Alerts

When a micro needs to alert the operator of an error condition or noteworthy event, the micro sends the alert to the PMU Server. The PMU Server knows of all the PMUs that are connected to the system, and sends an unsolicited error message to all PMUs. The PMU Server distributes the alert to the LAN PMUs. Since the PMUs that are running on the EV7s through the shared ram interface are not known to DHCP, those PMUs are not sent alerts. The fixed PMU address range, used for operating systems that do not support DHCP, receive the alerts even if they do not exist.

The PMU Server distributes system events (sysevents) that span partition boundaries. Sysevents are notifications sent to the software running on the EV7. Example sysevents include (i) an environmental red zone, or (ii) a configuration change. More detail on the PMU server handling alerts is given herein below.

Show Configuration with FRU Data Example

For an application program to display the Multiprocessor computer system Configuration, the following commands are used:

- A series of REQUEST SYSTEM TOPOLOGY commands incrementing the entity number and saving the response data in an application structure hierarchy. When that is complete, MBMs, PBMs, CMMs, EV7s and power trays are known along with their IP addresses or rack number in the case of power trays.
- All command requests from the application are sent to the PMU Server but using the IP address associated with the device being addressed (i.e. EV7, CMM, MBM, PBM). The application can make use of the commands:
  - GET MBM CONFIGURATION gets information about CMMs and RIMMs
  - GET PBM CONFIGURATION gets information about IO7s
  - GET MBM IP CABLING and GET PBM IO CABLING to display the Cabling layout of the Server.
  - GET PARTITION DATABASE to determine the current partitioning configurations.
  - GET VOLTAGE READING on a component for the nominal and current values of all voltages.
  - GET TEMPERATURE READING on a component for the limits and current reading of all thermal sensors.
  - GET FAN RPM SPEED for all fans on component.
  - GET POWER STATE to determine the state of all power supplies attached to an MBM or PBM.
  - GET EEROM DATA to identify the serialization information on sub-components that contain EEROMs. The EEROM Locator number used in this request is fixed to a given device type (e.g. for a CMM, 0=EV7 EEROM; 1–20=RIMM EEROM). In the case of an IO7 Drawer with a partition assignment, a GET PCI SLOT INFO request returns PCI Configuration Data for each slot in the drawer.

Figure 28:
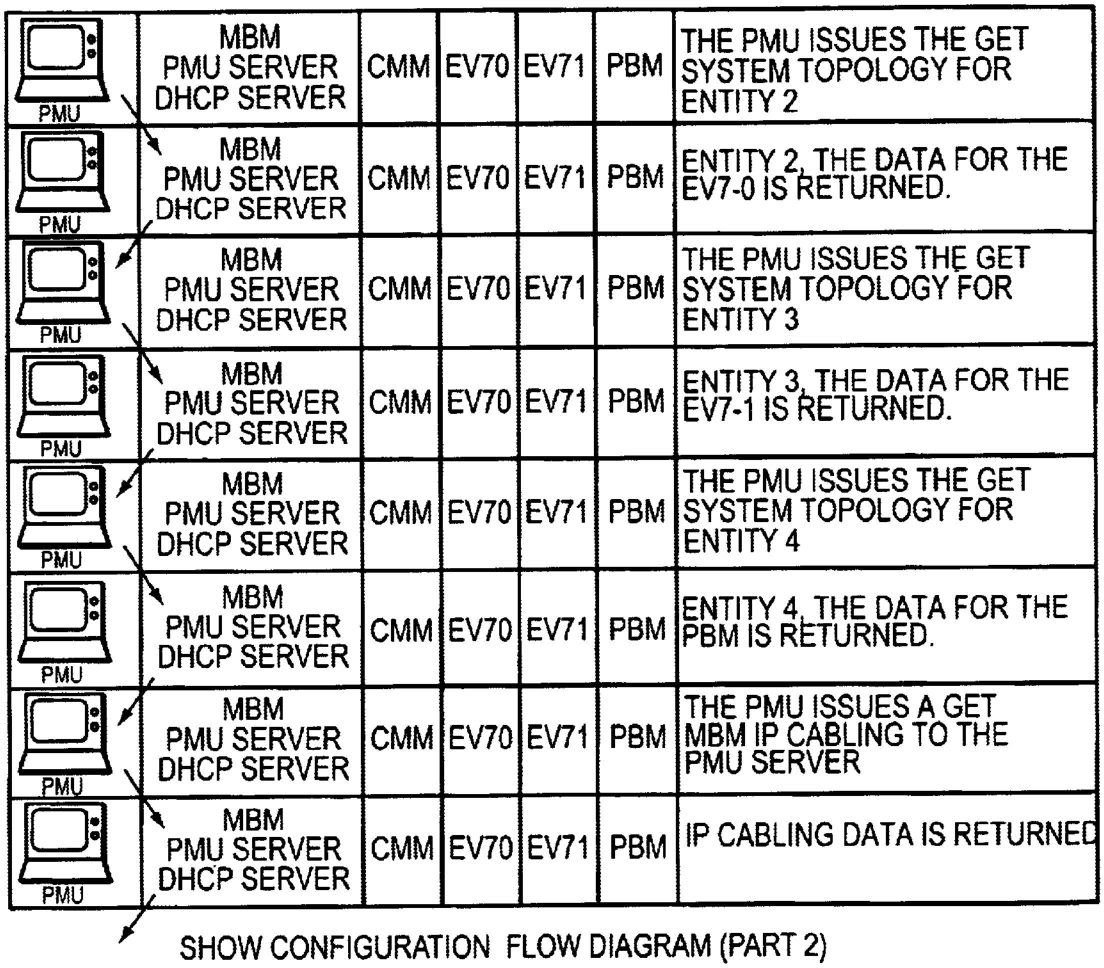
FIG. 28 is a table giving a Show Configuration Flow Diagram, Part 2.

In FIG. 26 there is shown an exemplary simple configuration of 1 MBM, 1 CPU, 1 PBM, and 1 PMU is shown. The flow tables of FIG. 27, FIG. 28, and FIGS. 29A and B reflect these hardware components. The MBM has the DHCP task, the PMU Server task, and the generic MBM protocol server task. These tasks are emphasized in capitals when they are involved in the flow. Note that, in this flow, the EV7s are not affected. Information about the EV7s and RIMMs was gathered at "power on" and saved.

The MBM's CLI on the debug console replaces the PMU for the 2P Multiprocessor computer system Systems and is available on other configurations as well. It makes use of a set of commands to display the System configuration. A complete example for a simple Multiprocessor computer system configuration is shown in FIG. 30.

Partition Coordinator

Figure 31:
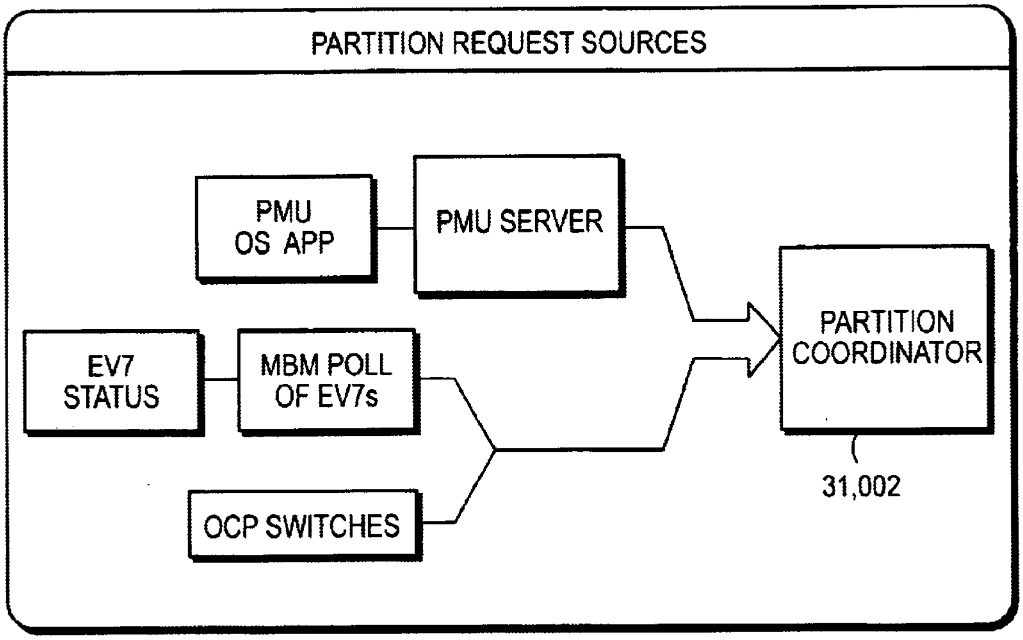
FIG. 31 is a block diagram of a Partition Request Sources Process.

The Group Leader starts a task, the Partition Coordinator 31,002 of FIG. 31, for each hard partition that is defined in the partition database. The Partition Coordinator has the overview of the state of all elements in its partition. It oversees and coordinates the operations between the elements. Routing and coordination of diagnostics must be done at a hard partition level, and is not done at the subpartition level. Therefore, there is only one Partition Coordinator per hard partition. The subpartitions in the hard partition are all managed by the same hard partition coordinator.

Since an MBM could be associated with as many as 8 partitions, an MBM could have as many as 8 Partition Coordinators running on it. The Partition Coordinator carries out the steps to start a partition, add and delete elements of a partition, and other operations that require synchronization among the partition components. For example, during diagnostics, all EV7s of a partition are asked to send on their west port and receive on their east port. The Partition Coordinator directs all the EV7s to start this test at the same time. For another example, when adding an EV7 to a running hard partition, all EV7s in the partition must be quiesced, all subpartitions must be quiesced, and their router tables reconfigured. The Partition Coordinator directs all EV7s to quiesce at the same time, and it passes out the router tables to each EV7, and then continues all the subpartitions.

The Partition Coordinator is also the task that computes the routing tables for each EV7 in its partition. This compute intensive operation is broken up naturally on partition boundaries and can use the distributed MBMs as compute resources.

All requests and changes of status that take place on a partition are passed to the Partition Coordinator. The Partition Coordinator is instantiated by an MBM when a DISTRIBUTE PARTITION DATABASE message is received. Any changes in the state or attributes of the partition (i.e. all completed requests indicated below) cause a volatile database distribution message to be sent on a Train Broadcast.

Partition Coordinator Handling of SM Protocol Requests

The Partition Coordinator receives most of its requests from the PMU Server as a result of a user action. Most requests can be categorized into either of two types: (i) partition configuration and state directives, and (ii) partition data assignments. The configuration directives are usually "complex" requests that the Partition Coordinator turns into a series of simpler "direct" requests to each member of the partition. The partition data assignments are usually just redistributed by the Partition Coordinator and do not require acting on CMMs or EV7s.

The table of FIGS. 32A and B reflects the actions taken by the Partition Coordinator on each partition request depending upon the current state of the partition.

Protocol Operations that Originate from the Partition Coordinator

The requests to assign data and parameters into the partition database are stored on every MBM/PBM. The Partition Coordinator embeds requests into a Train Full message for guaranteed delivery to each MBM/PBM. The configuration directives received at the Partition Coordinator are fanned out to all members of the partition. Sometimes these requests are turned into a series of actions, as can be seen in the flows referenced in the table "Partition Coordinator Commands Issued" of FIG. 33.

Partition States

Figure 34:
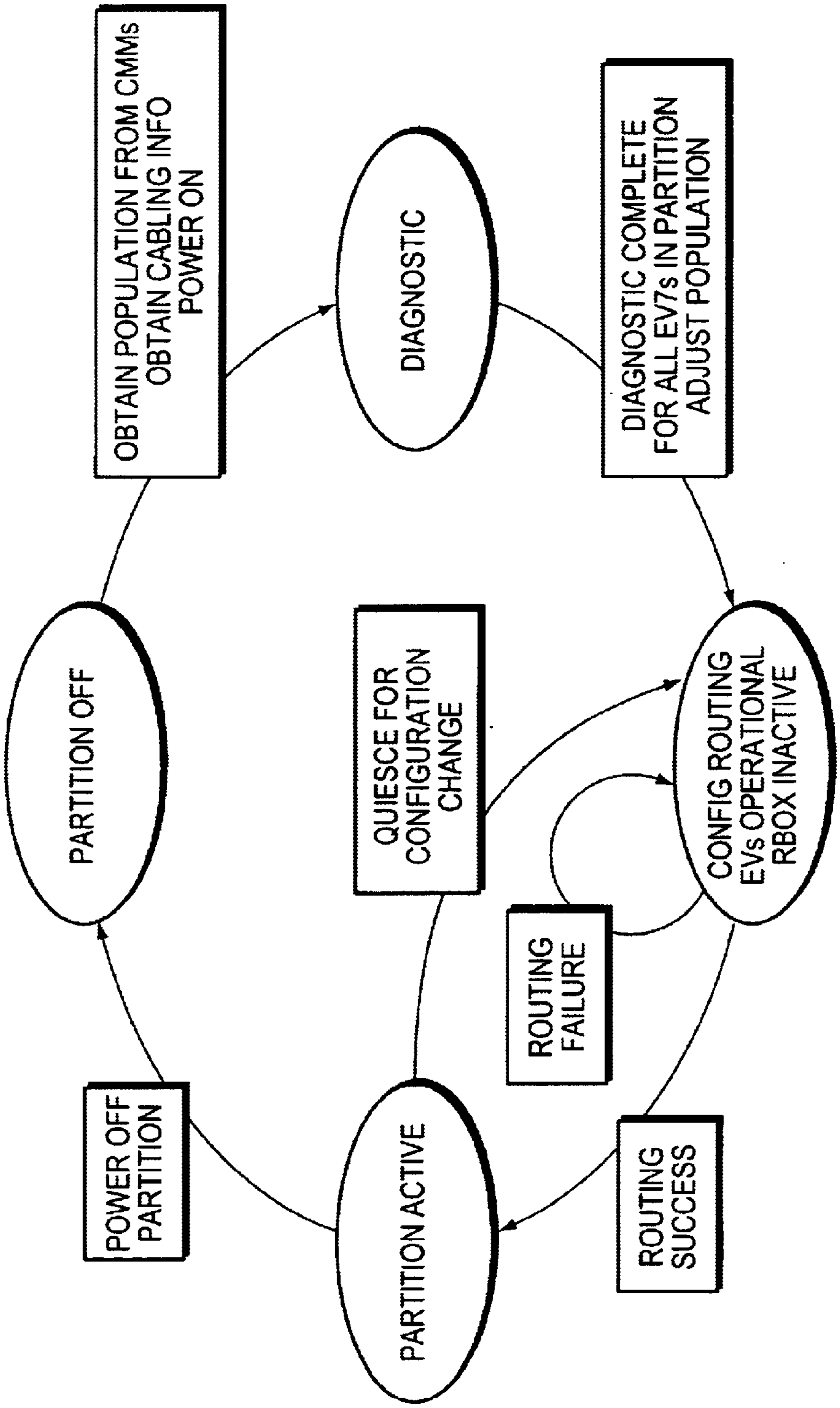
FIG. 34 is a State Diagram of a Partition.

When a partition is started, testing is done on the IP and IO cable connectivity and the EV7s perform tests. With the results of these tests, the Partition Coordinator can calculate the EV7 routing tables. Routing a set of EV7s may fail. In that case the Partition Coordinator selects a subset of the EV7s and tries to route that set. When the routing is successful, the tables are distributed to the EV7s and the partition is activated. For a configuration change to a running partition (add or delete), the partition must be quiesced, and goes back to the CONFIG ROUTING phase where new EV7 router tables are calculated. A PARTITION STATE DIAGRAM is shown in FIG. 34.

Determining the Routing Table

Figure 35:
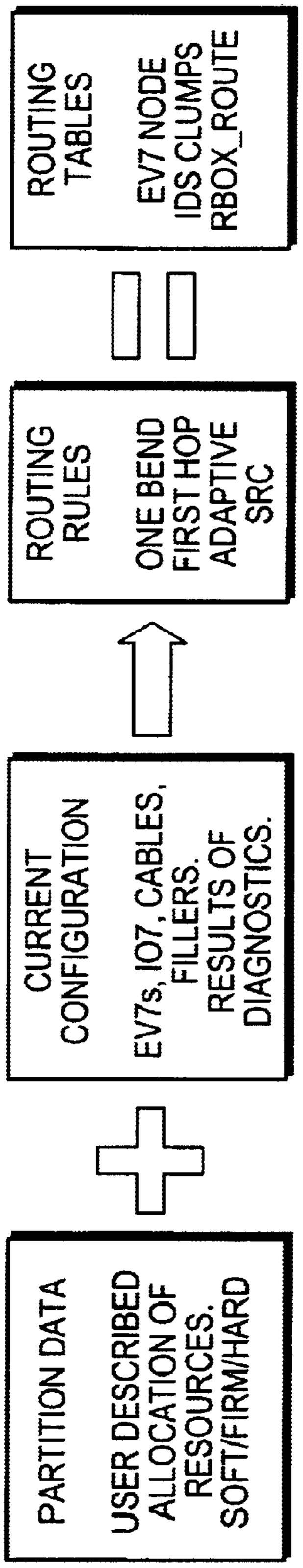
FIG. 35 gives Inputs and Outputs of a Router Configuration Algorithm.

Contents of an EV7's RBOX and CBOX IPRs determine its routing behavior within the mesh. The partition coordinator generates this information from the user description of the partition and routing options as well as from the actual topology of the partition as discovered by EV7 diagnostics, which are orchestrated by the partition coordinator. Inputs and outputs of the router algorithm are shown in FIG. 35.

Connectivity Test

Initially, the partition coordinator sets EV7 PID values and routing table entries sufficient for each processor to test its connections to adjacent processors as determined by the partition database and MBM cabling. Failing processors and connections are removed from the partition database and reported to the PMU.

EV7 Routing

Within a partition each pair of processors must typically be able to communicate along a "dimension-ordered" path. It may also be possible to establish an "adaptive" connection. Depending on user choices and system defaults communicated from the PMU, "initial hop" and "SRC" routing may be permitted as well. Within the given constraints on the various forms of routing, the CTABLE module of the partition coordinator determines whether the partition can be routed. If it can be routed, CTABLE supplies routing table entries for each processor. Otherwise, failure to route is communicated to the PMU.

The routing process should always result in either a (1) success—the requested configuration is routed, (2) partial—only some of the EV7s in the partition can be routed, (3) fail—there are no good EV7s. A Routing glossary is shown in FIG. 36.

Striping

Four processors can be grouped for balanced memory access (striping). When the partition database designates stripe sets, the partition coordinator creates them by assigning to the grouped processors PIDs which differ only in their two least significant bits.

Clumping (EV7 SharedInvalBroadcast Message)

Processors can be grouped to receive and forward invalidate messages (clumping). When the partition database indicates a maximum partition size greater than 20, the partition coordinator creates clumps by filling in routing table entries reserved for this purpose on each EV7.

PID Determination

The partition coordinator assigns a unique PID to each EV7 in the partition. PIDs are used to group processors for purposes of receiving invalidate messages (clumping) and of managing memory latency (striping).

The description of a partition in the database must include the maximum number of EV7s that will ever be members of the partition. Using this datum, the partition coordinator will determine if clumping is needed and the size of the clumps.

In response to the requests "Add EV7s to Running Partition" or "Delete EV7s from Running Partition", the partition coordinator analyzes the routability of the proposed new partition and proceeds if routing is possible. Otherwise, it reports an error. The partition coordinator will also report an error if the Delete would remove from the partition some but not all of an active stripe set.

Active means that the members of the set are configured to access a non-empty set of memory by the striping mechanism.

The Partition Coordinator Flow

Figure 37:
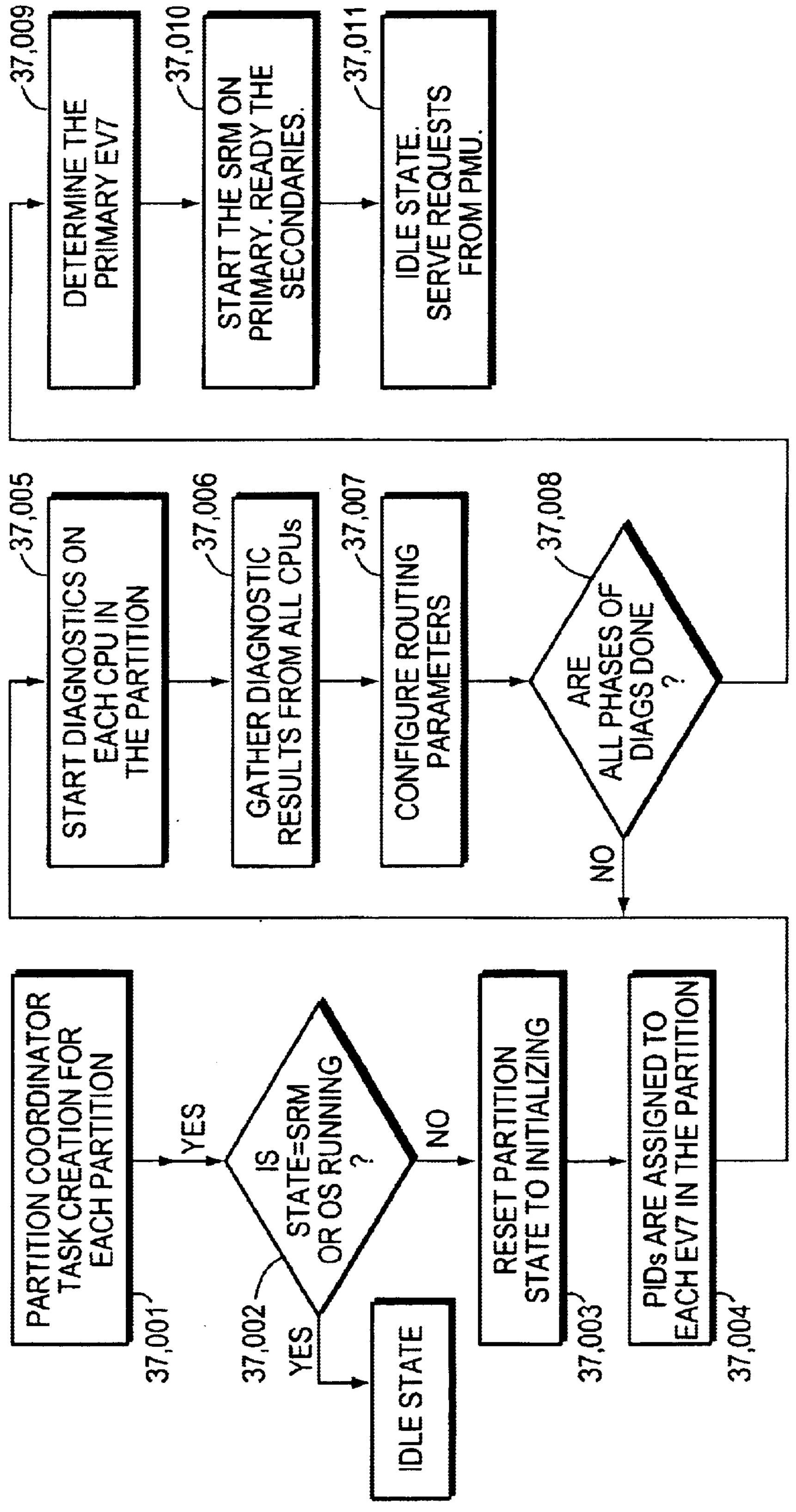
FIG. 37 is a block flow diagram of Partition Coordination.

The flow described in FIG. 37 is a high level flow of the important duties of the Partition Coordinator task in bringing up a partition.

At block 37,001, a task, the Partition Coordinator, gets created for each hard partition defined by the partition database.

At block 37,002, prior to this, all MBMs/PBMs have synchronized their partition data, and information about the current state of the system. With this information, the Partition Coordinator knows if the OS is running on the partition it commands. If the MBM was hot swapped or reset, it could be reinitializing under an already running operating system, which it must not disturb.

At block 37,003, if no operating system or SRM console is running, the new Partition Coordinator brings the partition into a known reset state.

At block 37,004, PIDs are assigned to each EV7.

At block 37,005, diagnostics are now run on each CPU in the partition. Some diagnostics require synchronized steps with other CPUs, and the Partition Coordinator coordinates that synchronization.

At block 37,006, the Partition Coordinator gathers all the results from the diagnostics run on each CPU.

At block 37,007 the Partition Coordinator uses the collected results of tests to configure the routing parameters.

At block 37,008 this process is repeated for several phases of diagnostics.

At block 37,009, determine which EV7 will be the primary cpu for the each subpartition At block 37,010, start the SRM on the primary, and start the secondaries. This is done for each subpartition.

At block 37,011, the Partition Coordinator services commands from the PMU which stop, halt, or in any way change the partition.

Configuration Events

This section discusses some of the configuration changes that occur on a Multiprocessor computer system. There is emphasis on the flow diagrams to show the interaction of the micros and the application of the system management (SM) protocol. Configuration events can be (i) soft configuration events (i.e. a reallocation of known resources), or (ii) hard configuration events (i.e. physical changes such as adding new hardware to the system.)

Some soft configuration events:

Creating a new partition

Starting a partition

Adding an EV7 to an existing and running partition

Adding an IO drawer to a partition

Destroying a partition

Deleting an EV7 from a partition

Deleting an IO drawer from a partition

Some Hard Configuration Events

Powering ON/OFF a partition

Hot Swap of a CPU module

Adding on new hardware, such as the addition of an 8P box

Creating a new partition

By default, the entire system is a single hard partition. The user can subdivide this system by partitioning the system. Partitioning the system requires creating an identifier for the partition and associating EV7s, IO busses, and memory with that partition.

Partitioning Configuration Guidance Is Offered by the PMU

A hard partition always has at least one sub-partition, the free pool (perhaps called the "idle asset" pool) that is created.

In an alternative embodiment of the invention, memory can be shared by setting up a community.

As shown in FIG. 38, flows for creating hard partitions in response to operator action are shown.

Turning now to FIGS. 39A and B, Flows for creating a sub partition in response to operator action are shown.

Figure 40:
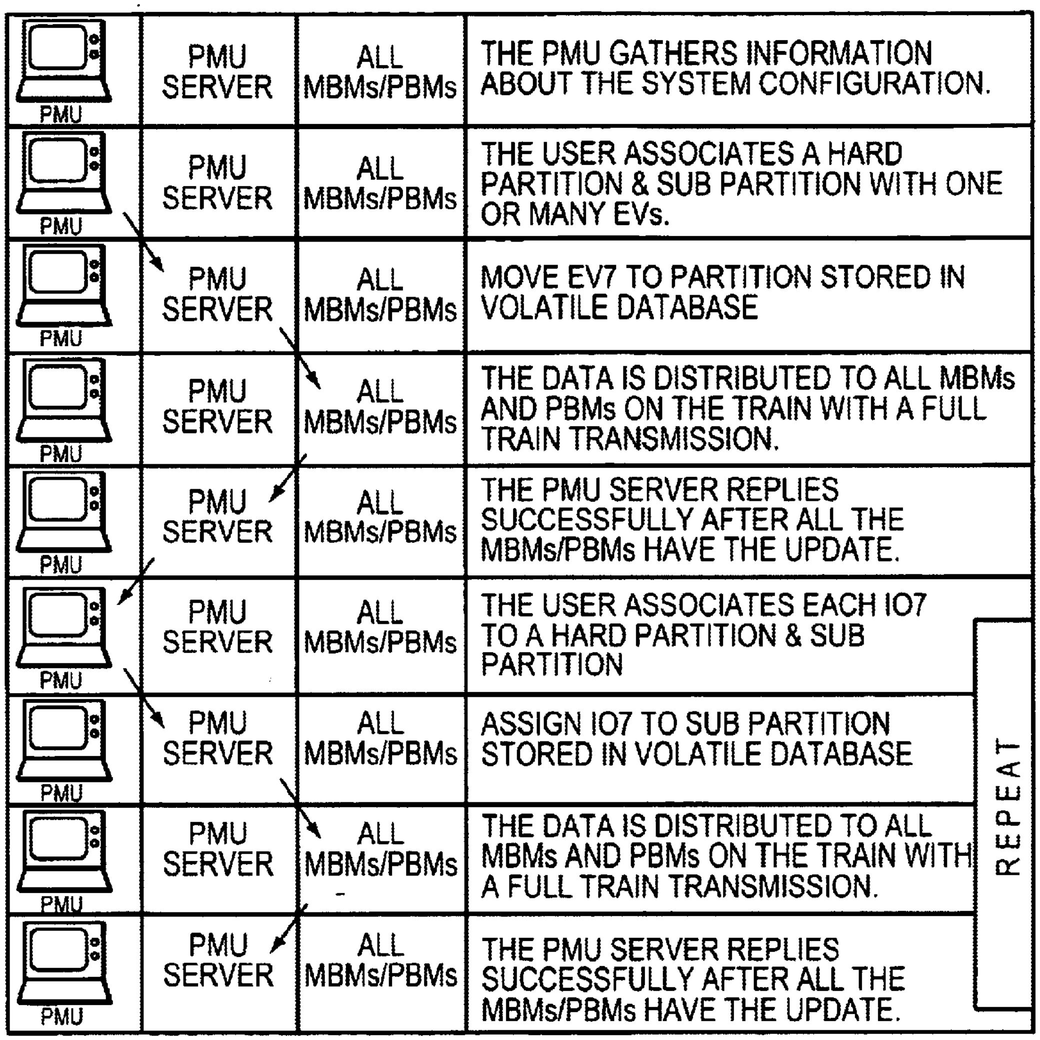
FIG. 40 is a block diagram of a process creating a new partition flow diagram, Part 1.

Turning now to FIG. 40, A first part of a flow diagram for creating a new partition is shown.

Figure 41:
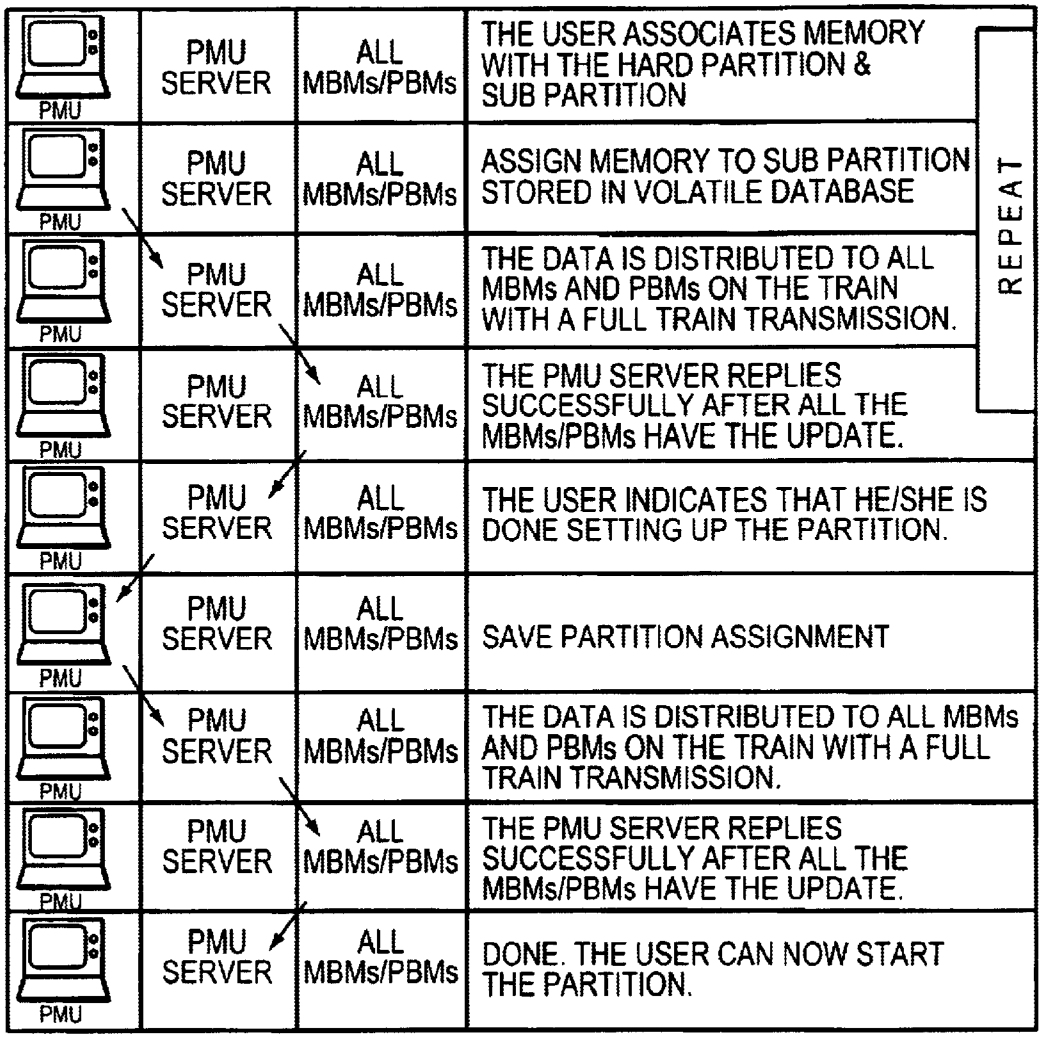
FIG. 41 is a table giving a process for creating a New Partition Flow Diagram, Part 2.

Turning now to FIG. 41, the second part of the flow diagram of FIG. 40 is shown.

Starting a Partition

This is an example showing the operation of starting a partition from an unknown state. The partition is already powered on. This flow is initiated by a user directive to reset the partition.

Figure 42A:
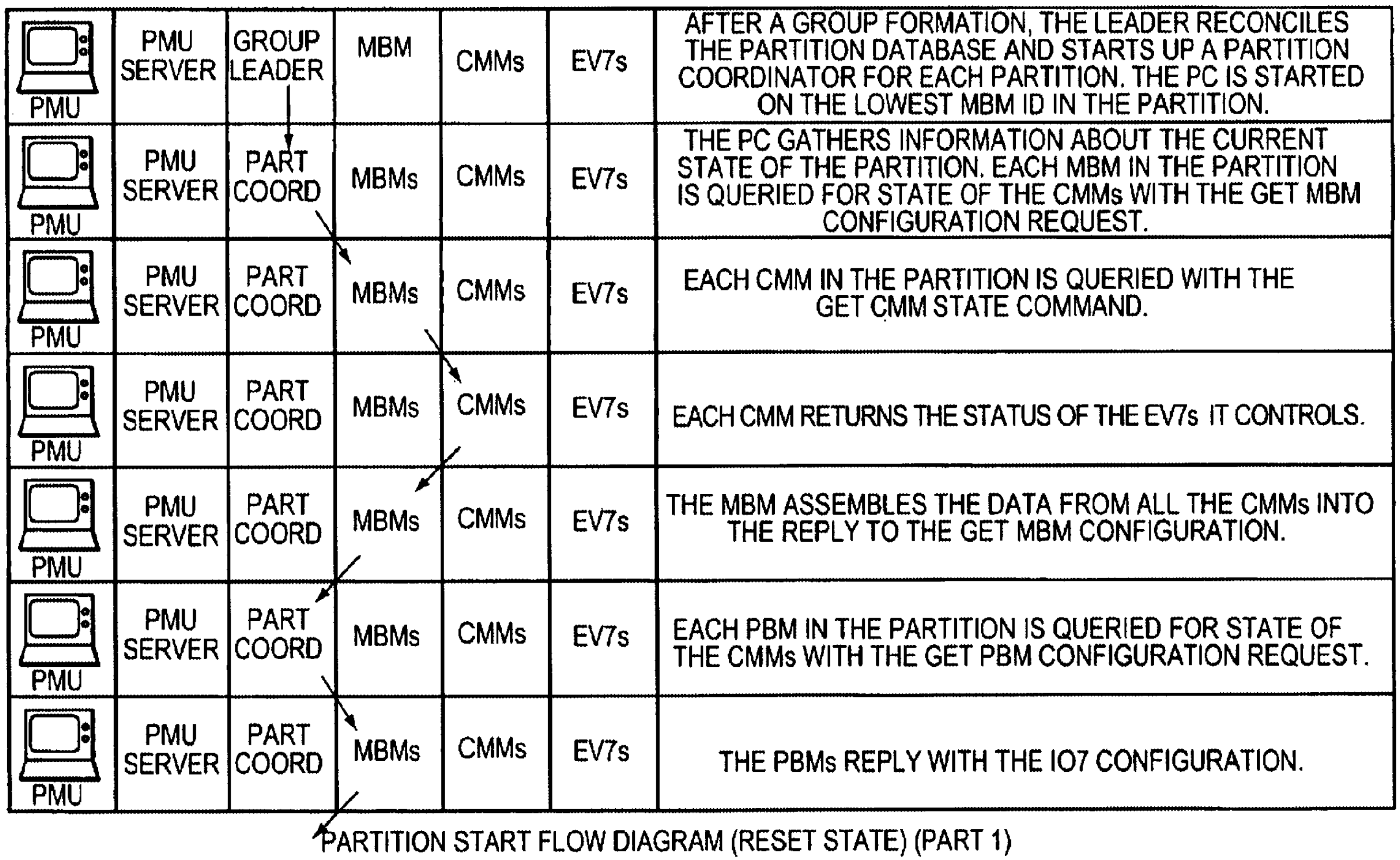
FIGS. 42A and B are a partition Start Flow Diagram, Reset state.
Figure 42B:
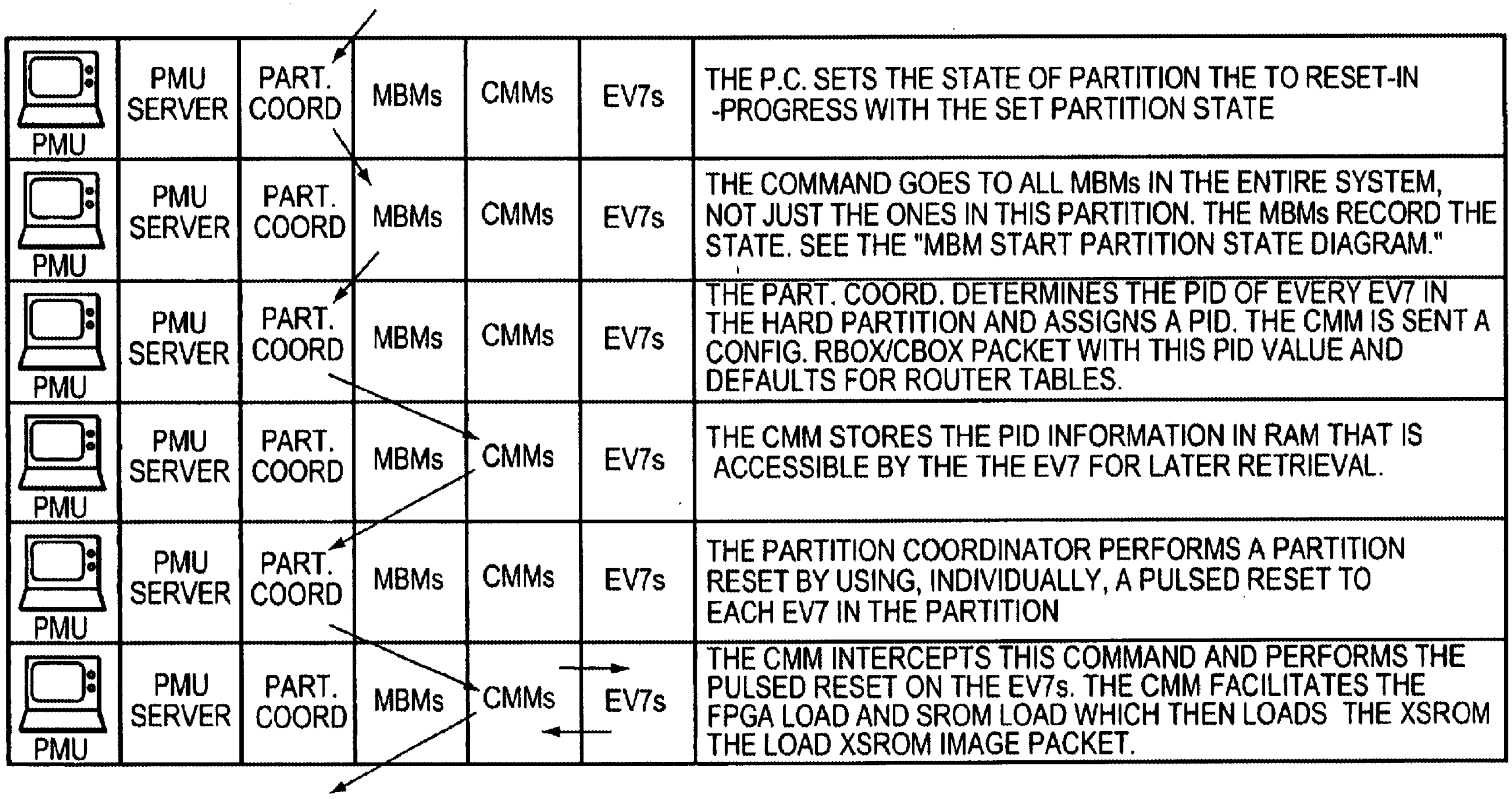

The "Reset State" is shown in FIGS. 42A and B.

Figure 43A:
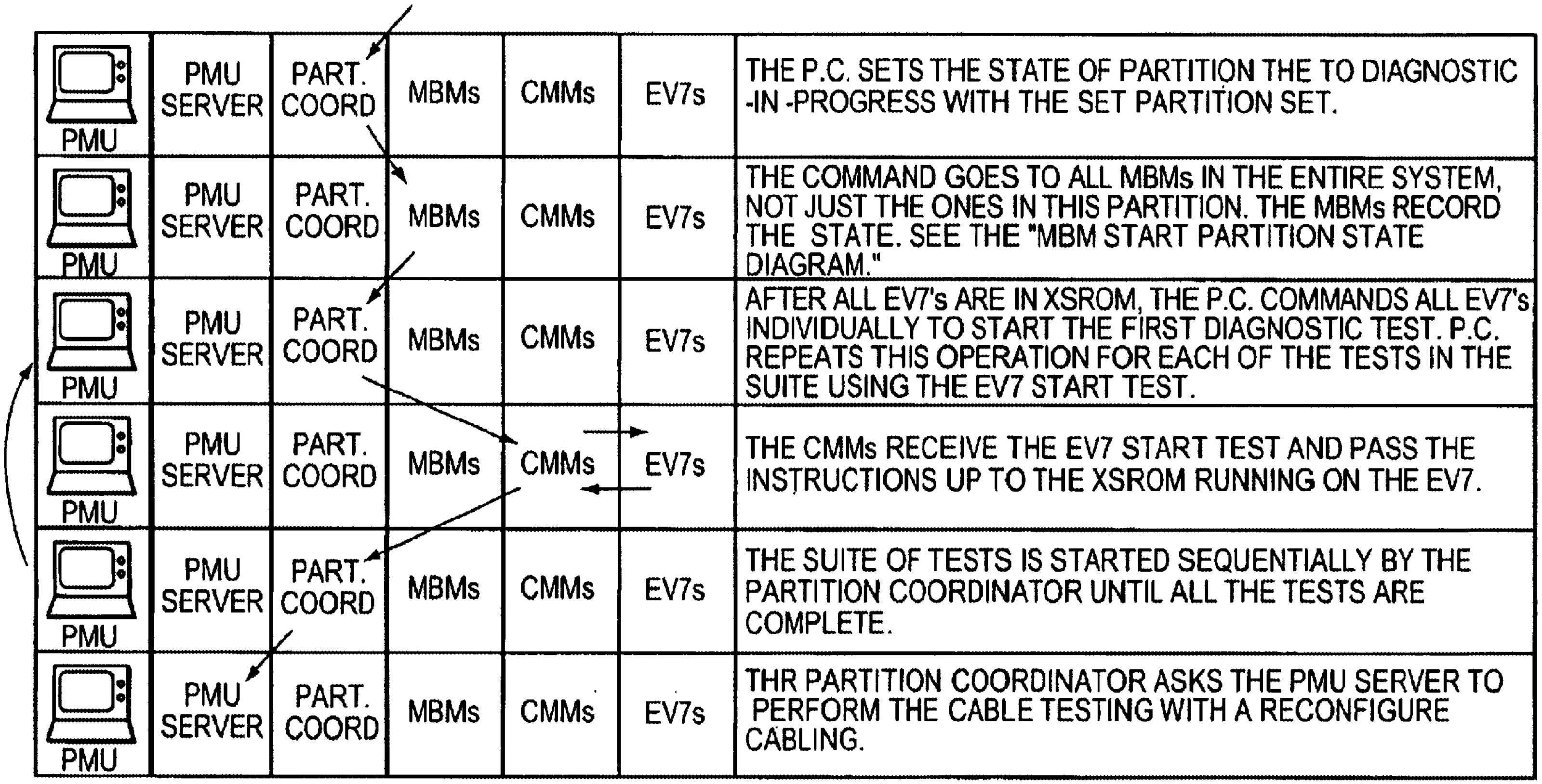
FIGS. 43A and B are a partition Start Flow Diagram, Diagnostic State.
Figure 43B:
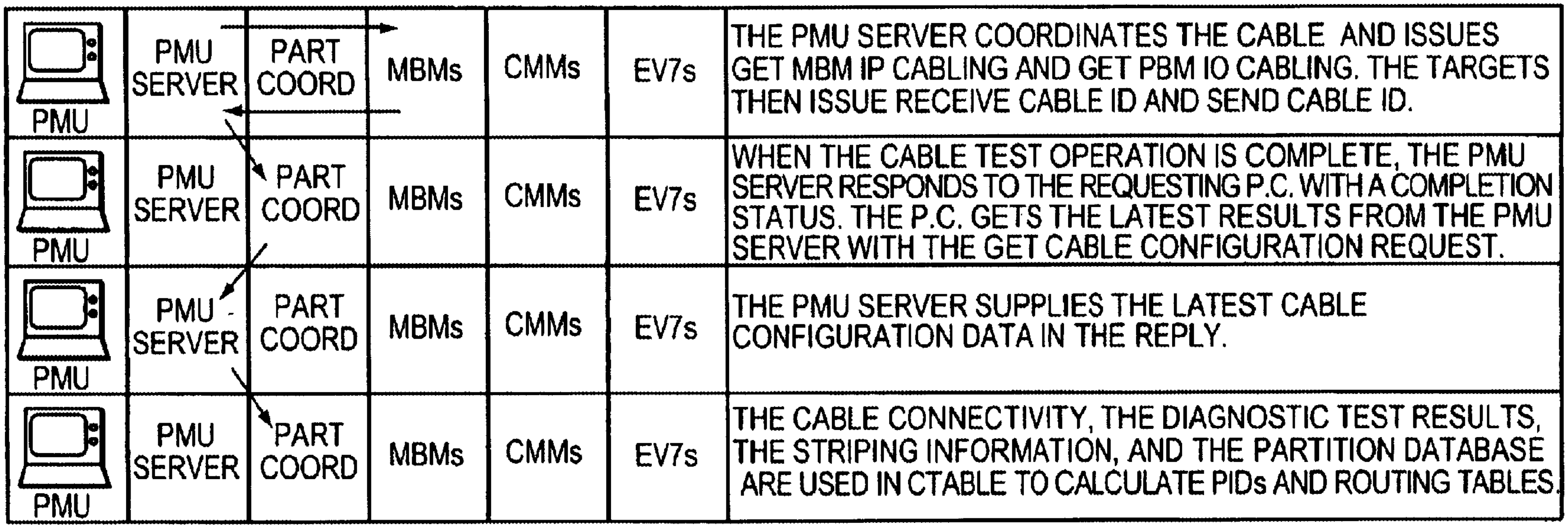

The Diagnostic State is shown in FIGS. 43A and B.

Figure 44:
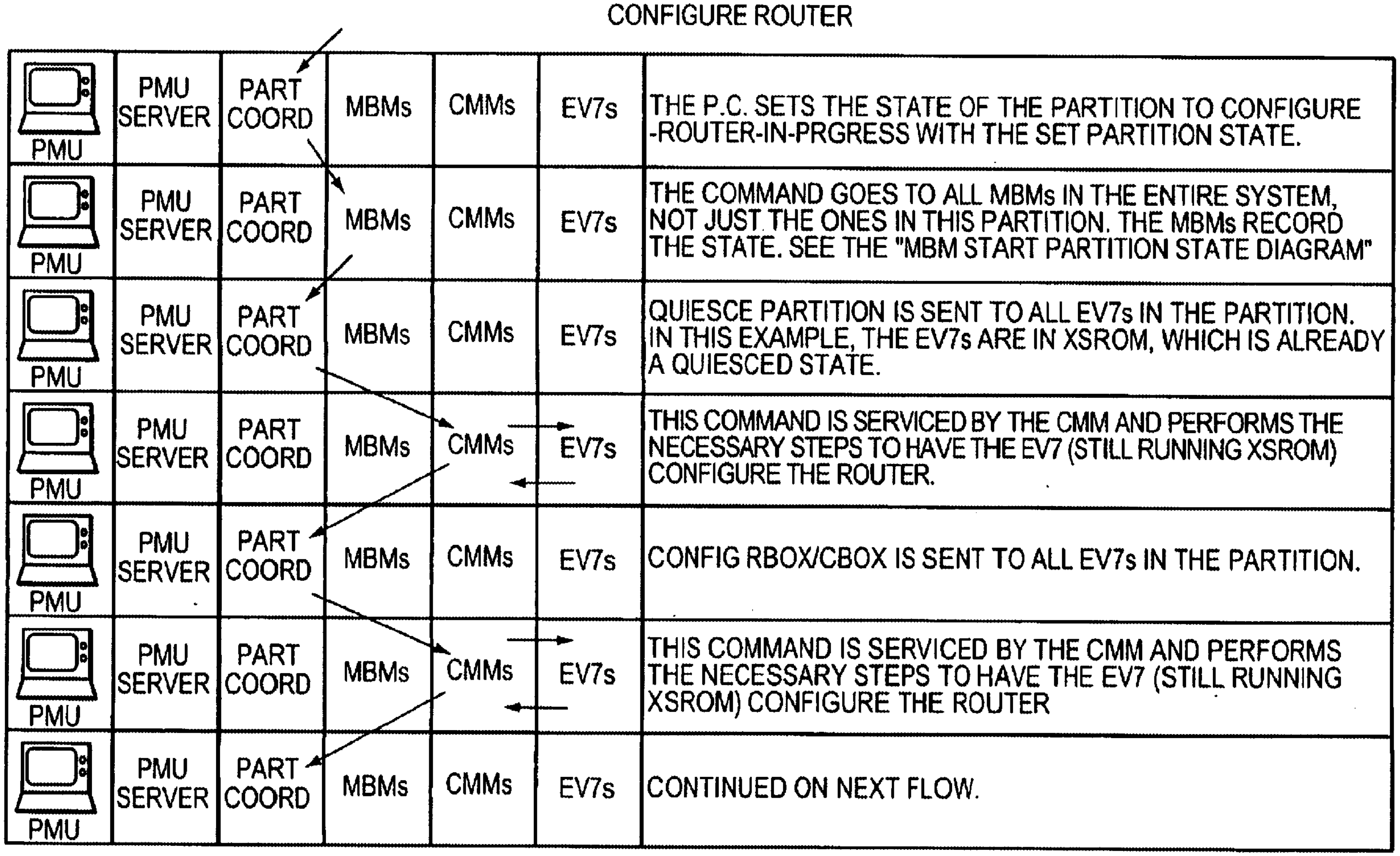
FIG. 44 is a partition Start Flow Diagram, Configure Router.

A flow diagram showing the Configure Router State is shown in FIG. 44.

Figure 45A:
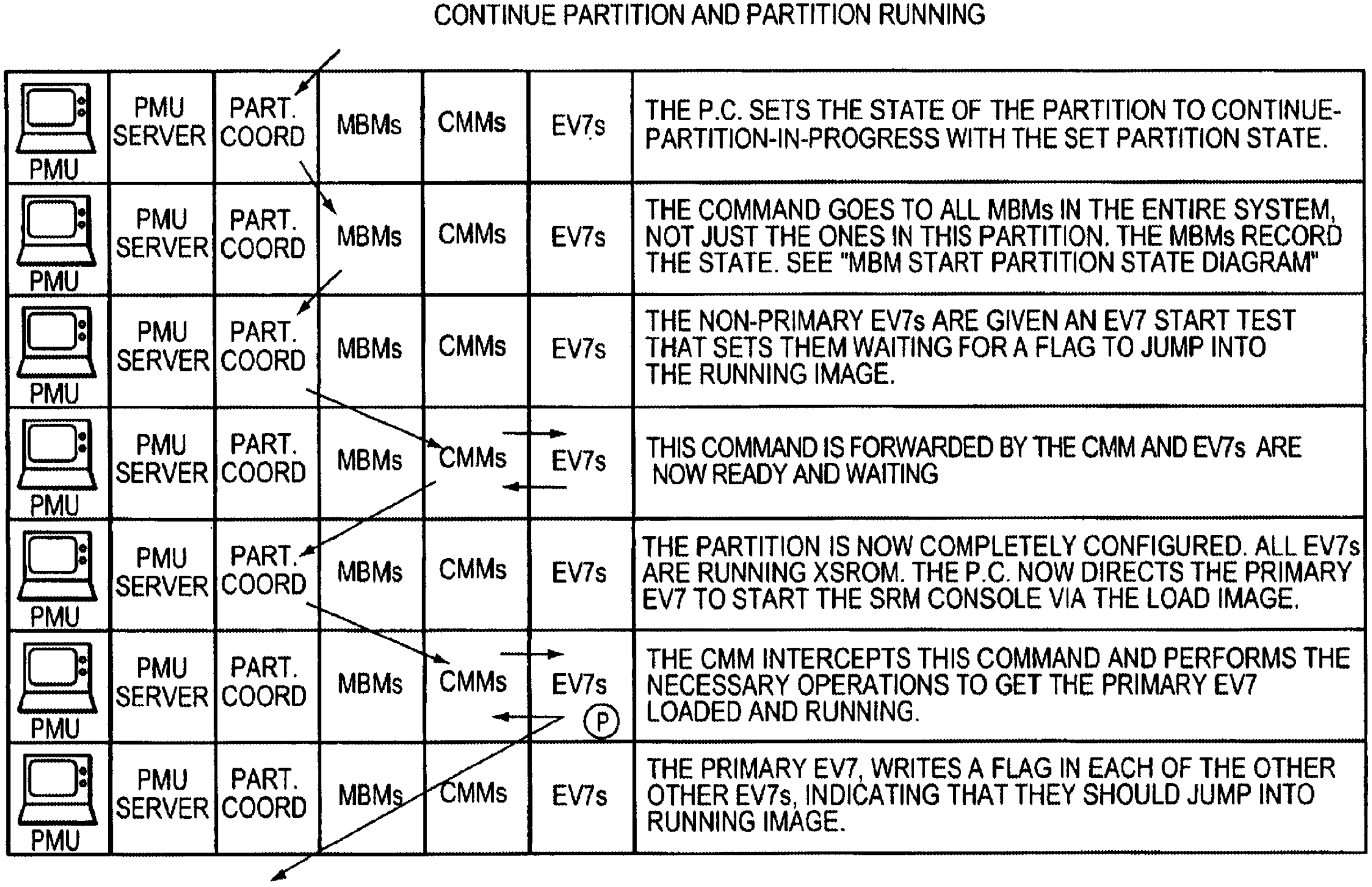
FIG. 45A and B are a partition Start Flow Diagram, Running.
Figure 45B:
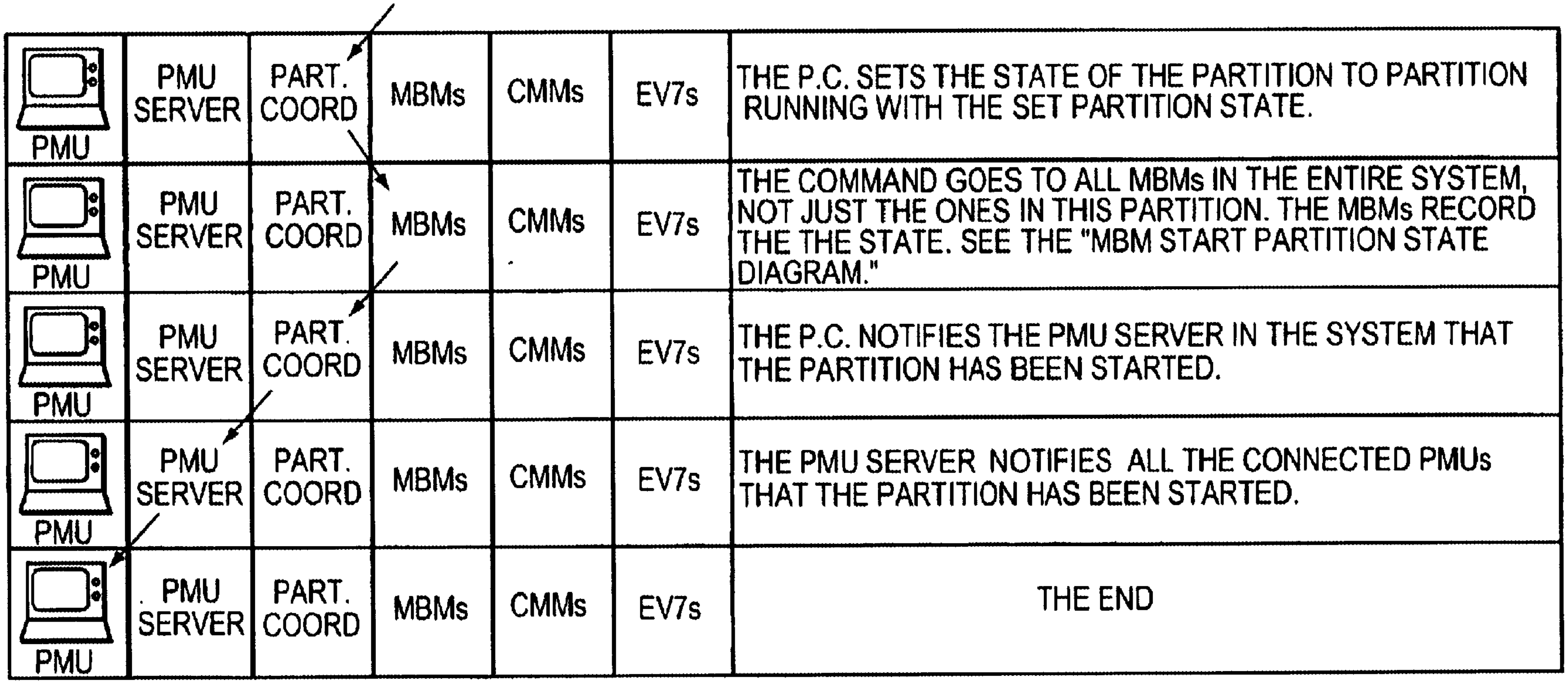

A flow diagram showing the Continue Partition State and Partition Running State is shown in FIG. 45A and B.

ADD vs. Move

Note that the MOVE EV7 TO PARTITION packet is used in the flow "Creating a New Partition Flow Diagram" of FIG. 40 because the partition is not actively running an operating system. In the flow shown in FIG. 46A "Add EV7 (Part 1)", an operating system is running in the partition and is the initiator of the configuration change.

Figure 47:
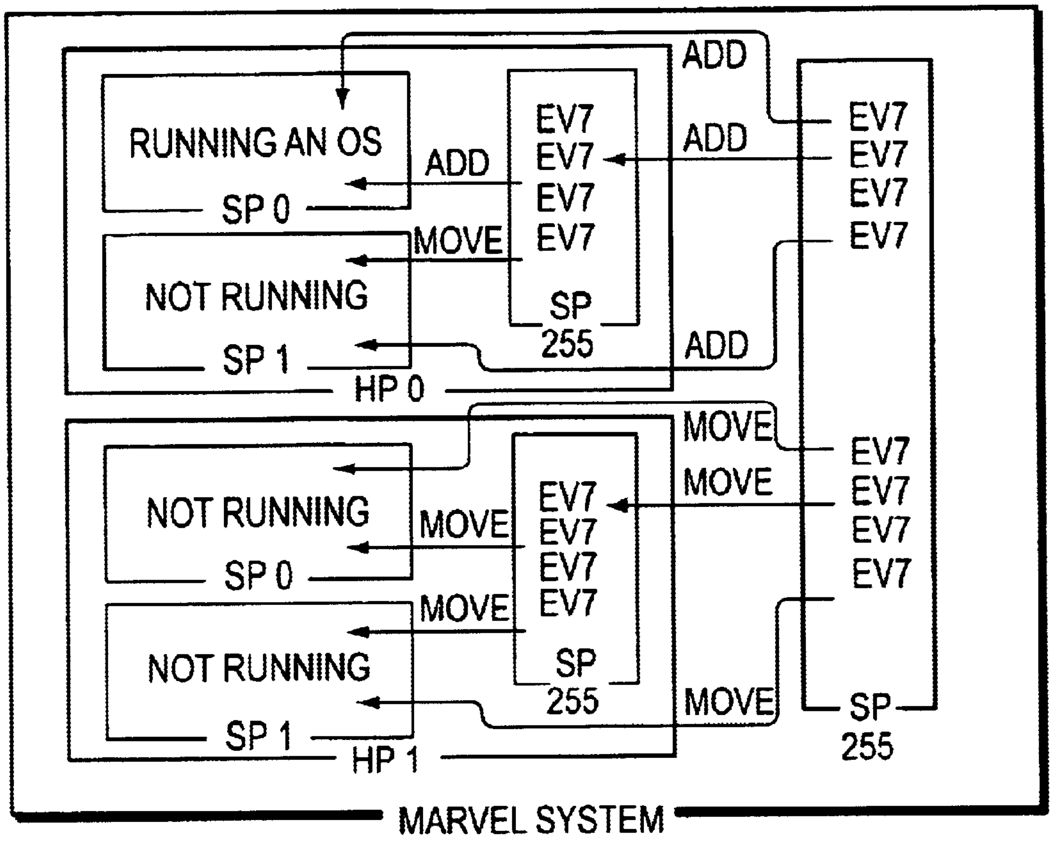
FIG. 47 is a Flow Diagram for an Add versus Move.

In the FIG. 47, the use of "Add" is contrasted with the use of "Move". Hard Partition 0/Sub Partition 0 is running an operating system. Therefore, any additions from the global free pool require the use of an Add. Within the partition, an Add is required to move an EV7 from the partition free pool into the running subpartition. However, a Move is used with the subpartition that is "Not running".

In contrast, a Move is used in all cases where the subpartitions are idle, and no operating system is disrupted by a configuration change, as shown in hard partition 1 (HPI) block of FIG. 47.

Adding a CPU to a Partition

Figure 46B:
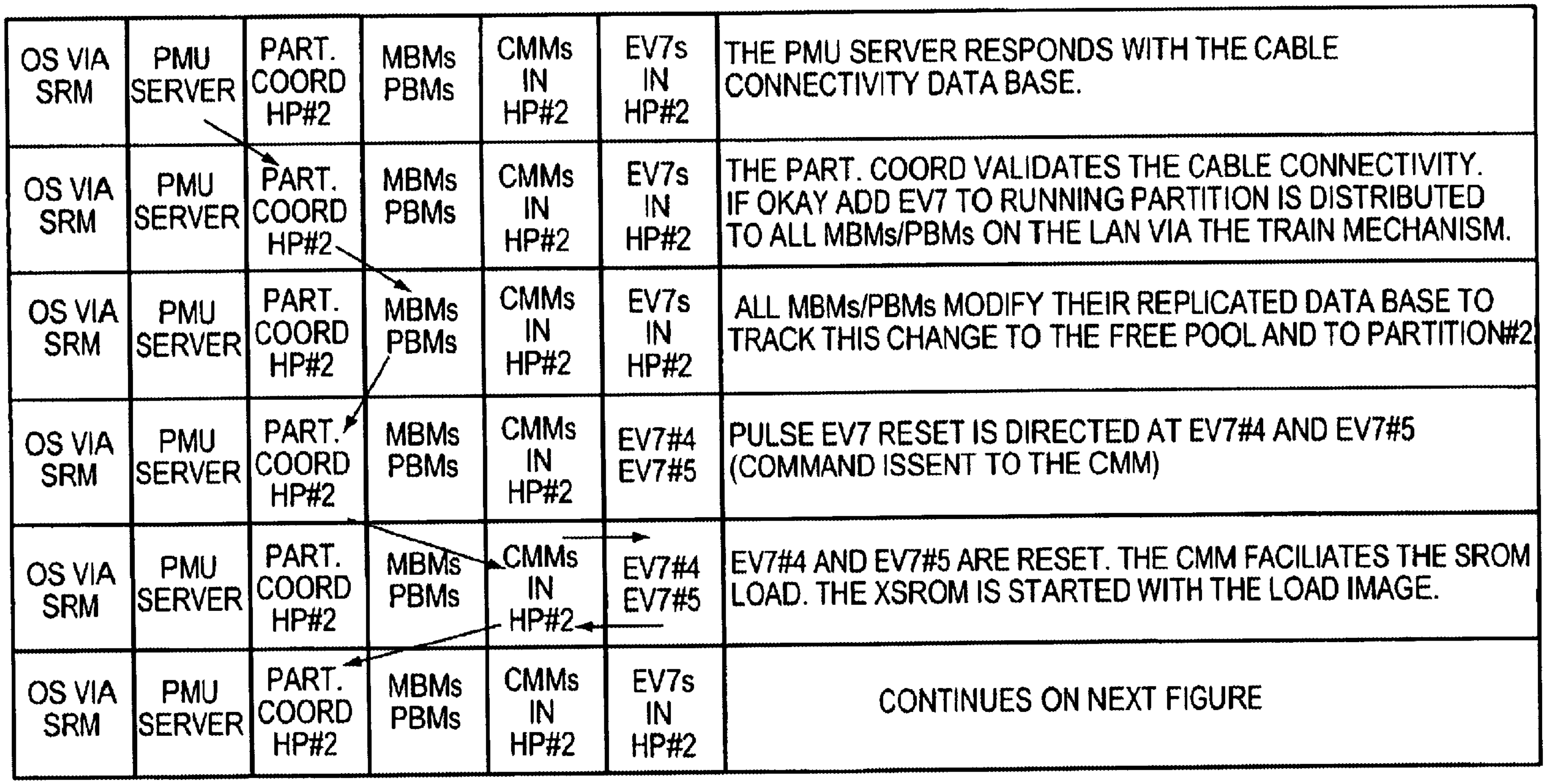
FIG. 46B is a Flow Diagram, "Add EV7 Flow Diagram, Part 2"
Figure 46D:
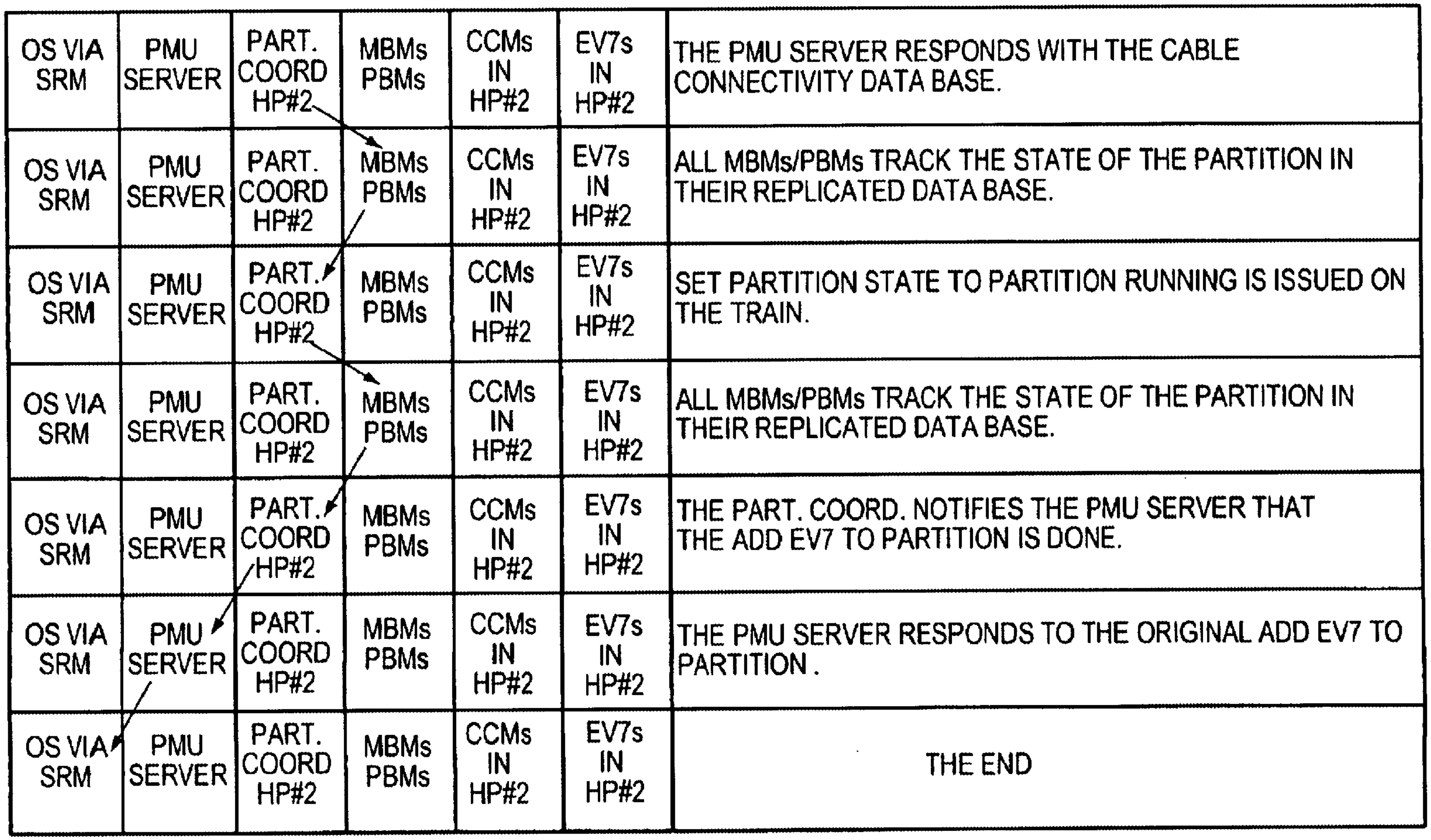
FIG. 46D is a Flow Diagram, "Add EV7 Flow Diagram, Part 4"

Turning to FIG. 46A, there is shown an example of moving a CPU module (EV7#4 and EV7#5) from the free pool (hard partition #255 subpartition #255) to hard partition #2, subpartition #1. This flow starts after the operating system has been directed to perform the partitioning change. The flow continues in FIG. 46B-D.

Destroying a Partition

Figure 48:
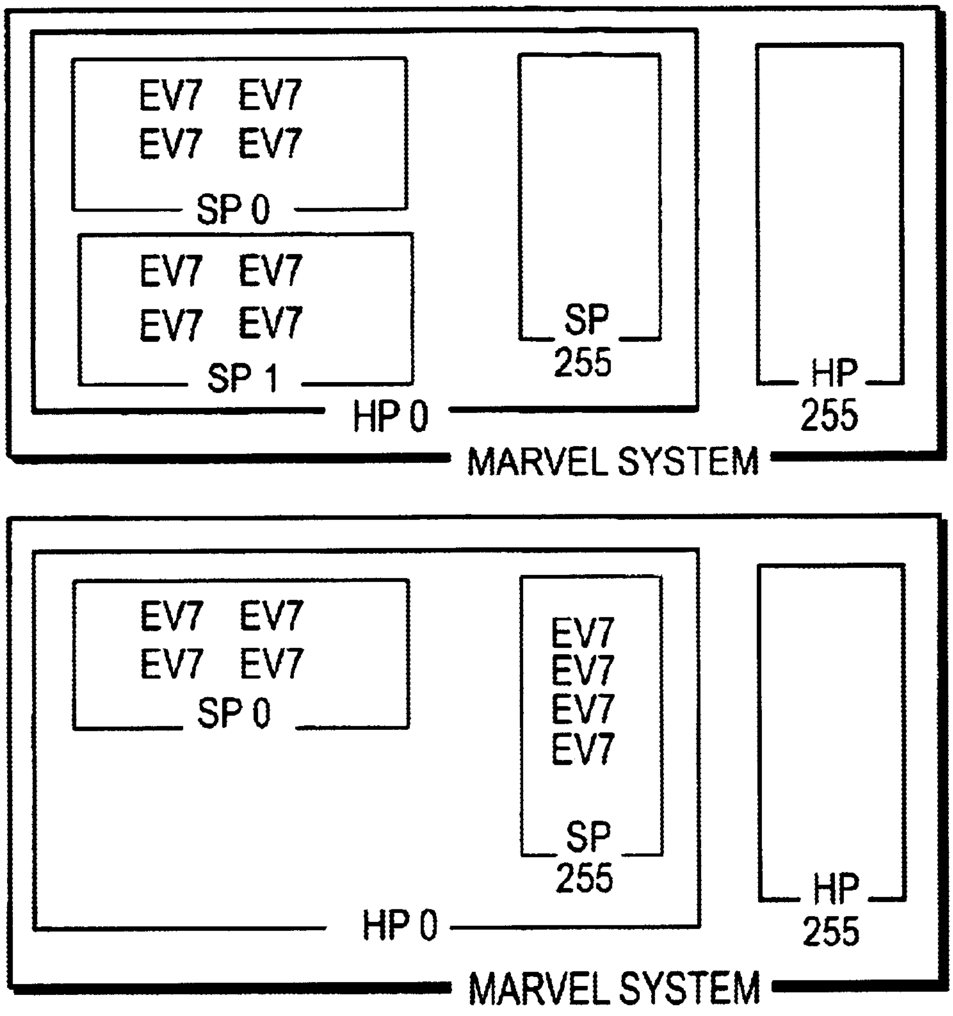
FIG. 48 is a block diagram illustrating Destroying a soft partition.
Figure 49:
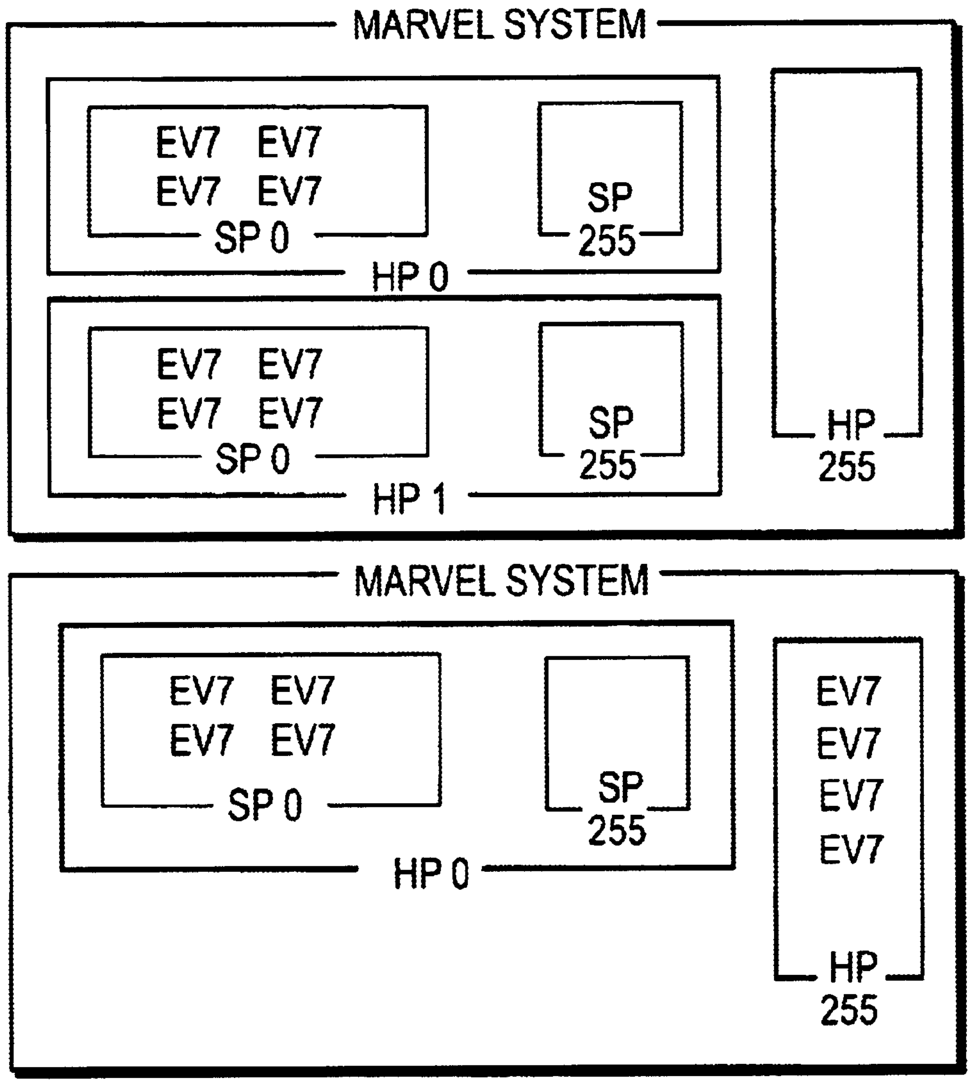
FIG. 49 is a block diagram illustrating Destroying a hard partition.

A partition must be in Halt or Power Off state. FIG. 48 shows destroying a hard partition. If no more partitions in Hard Partition, the whole partition is destroyed, including the SRM environment variables and any other partition specific non-volatile information. FIG. 49 shows destroying a soft partition.

Deleting a CPU from a Partition

The process of deleting a CPU from a partition has many similarities to adding a CPU. The partition must be quiesced and routability must be maintained.

Adding/Deleting an I/O Drawer to a Partition

IO7s migrate across hard partitions with the EV7s on their North port. Within a hard partition, IO7 can migrate freely without the need to queisce the operating system. The role of the server manager in IO7 migration within a partition is minimal.

Power Management of a Partition

When a request is made to turn a partition on or off, the Partition Coordinator determines the requirements of each component as needed by other partitions. Power controls, powering components on or off, are performed according to component dependencies. EV7s depend on the VRM of the EV7 pair found on the CPU module as well as the 48V n+1 power supplies, and IO7s depend on IO drawer power supplies.

Power Off Partition

When receiving a POWER OFF PARTITION request, the Partition Coordinator should:

1. Send the POWER OFF command to CMMs where either both EV7s are assigned to the partition or the attribute state of the other partition is powered off or in the free pool.
2. Determine from the partition database whether any given PBM has IO7s completely under this partition's control or the state of the other partition is powered off or the other IO7s are in the free pool. When these conditions are met send the POWER OFF command to the PBM.
3. For all MBMs having at least 1 EV7 assigned to the partition, make a GET MBM CONFIGURATION request to determine the state of the 8 EV7s controlled by the MBM. If the state indicates it is not in use (e.g. being tested while in the free pool) and any other partition owners of EV7s controlled by this MBM are powered off, the Partition Coordinator may send the POWER OFF command to the MBM who turns off the power supply for the MBM.

Power On Partition

When receiving a POWER ON PARTITION request, the Partition Coordinator should:

1. Check, via GET POWER STATE, the power supplies on each MBM having an EV7 in the partition and send POWER ON to the MBM when the power supply is off.
2. Check, via GET POWER STATE, the power supplies for each PBM having an IO7 that is assigned to the partition and send POWER ON to the PBM when the power supply is off.
3. Send POWER ON to each EV7 in the partition
4. Continue bringing up the partition in the same form as reset.

Hot Swap of a CPU Module (EV7 Failure and Replacement)

Figure 50:
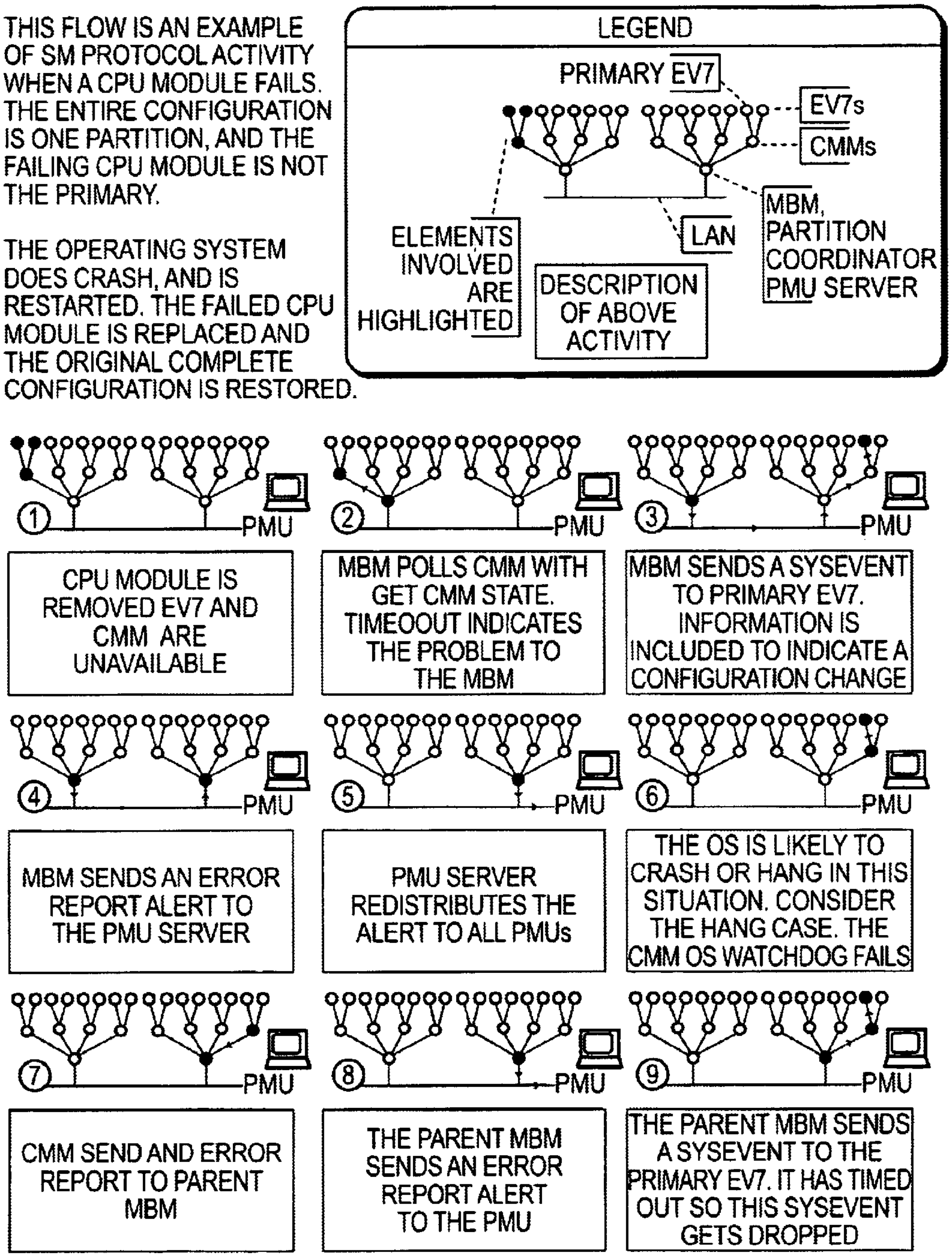
FIG. 50 is a flow diagram illustrating a "EV7 Failure/Replacement Flow Diagram, Part 1"
Figure 51:
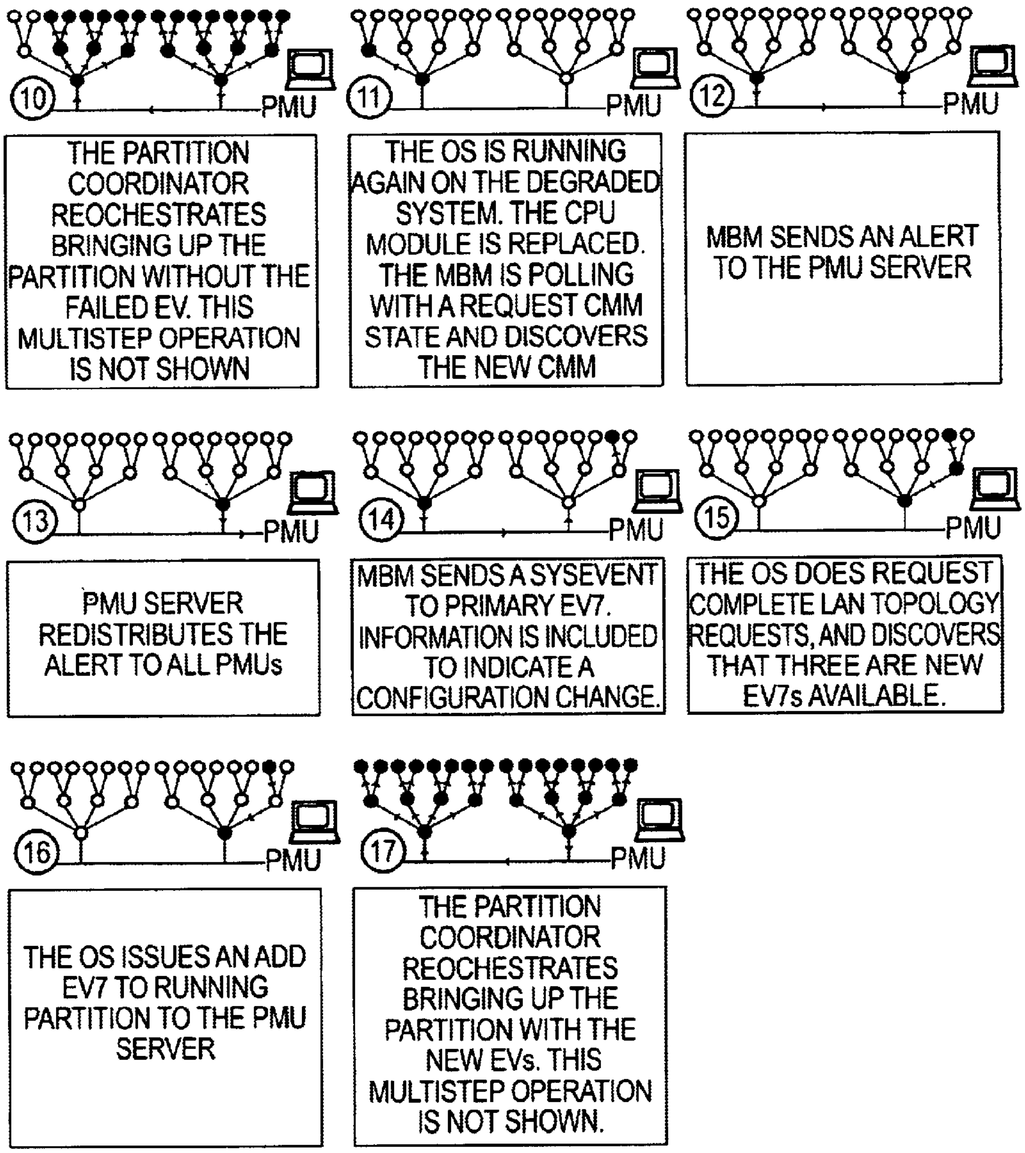
FIG. 51 is a flow diagram illustrating "EV7 Failure/Replacement Flow Diagram, Part 2"

The flow shown in FIGS. 50 and 51 is an example of SM protocol activity when a CPU module fails. The entire configuration is one partition, and the failing CPU module is not the primary.

The operating system does crash, and is restarted. The failed CPU module is replaced and the original complete configuration is restored.

Block 50,001 shows: CPU module is removed. EV7 and CMM are unavailable.

Block 50,002 shows: MBM polls CMM with GET CMM STATE. Timeout indicates the problem to the MBM.

Block 50,003 shows: MBM sends a SYSEVENT to primary EV7. Information is included to indicate a configuration change.

Block 50,004 shows: MBM sends an ERROR REPORT alert to the PMU server.

Block 50,005 shows: PMU Server redistributes the Alert to all PMUs.

Block 50,006 shows: The OS is likely to crash or hang in this situation. Consider the hang case. The CMM OS Watchdog fails.

Block 50,007 shows: CMM send an ERROR REPORT to parent MBM.

Block 50,008 shows: The parent MBM sends an ERROR REPORT alert to the PMU.

Block 50,009 shows: The parent MBM sends a SYSEVENT to the primary EV7. It has timed out so this SYSEVENT gets dropped.

Block 50,010 shows: The Partition Coordinator re-ochestrates bringing up the partition without the failed EV. This multistep operation is not shown.

Block 50,011 shows: The OS is running again on the degraded system. The CPU module is replaced. The MBM is polling with a REQUEST CMM STATE and discovers the new CMM.

Block 50,012 shows: MBM sends an ALERT to the PMU server.

Block 50,013 shows: PMU Server redistributes the Alert to all PMUs.

Block 50,014 shows: MBM sends a SYSEVENT to primary EV7. Information is included to indicate a configuration change.

Block 50,015 shows: The OS does REQUEST COMPLETE LAN TOPOLOGY requests, and discovers that there are new EV7s available.

Block 50,016 shows: The OS issues an ADD EV7 to RUNNING PARTITION to the PMU SERVER.

Block 50,017 shows: The Partition Coordinator re-ochestrates bringing up the partition with the new EVs. This multistep operation is not shown.

Adding a New 8P Box to a System—"The Rogue"

Figure 52:
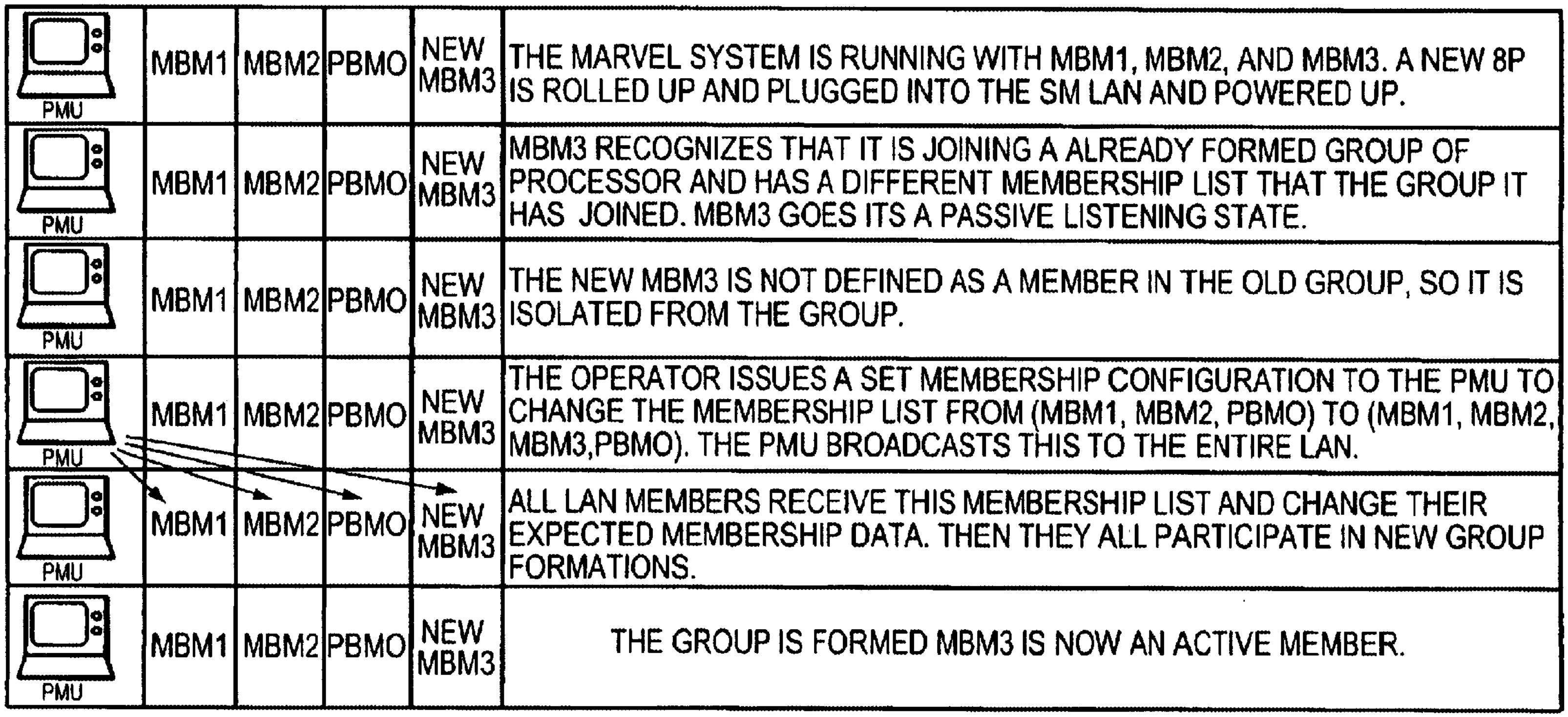
FIG. 52 is a Set Membership Configuration Flow Diagram.

When a new 8P box is connected to an existing Multiprocessor computer system, the operator must declare the new MBM as a valid member of the network. From the PMU, the operator issues a command that includes the new 8P. All resources on the new 8P are entered into the free pool partition. Turning now to FIG. 52, a set Membership Flow Diagram is shown.

Cable Configuration and Testing

A volatile copy of the cable connections for both IP and IO cabling is prepared by the PMU Server after a group is formed. PMUs and Partition Coordinators can request the RECONFIGURE CABLING to have the PMU Server re-check-cable connections. 8 IO ports and 6 IP ports are located on each MBM and 4 IO ports on each PBM. Each cable's connector contains: 1) an input signal to determine if the cable is present, 2) two sets of LEDs marked A & B at each end of the connection, 3) the ability to turn any set of LEDs on or off and read the result. A LED lights on both ends of the cable when zero is written to the cable test signal. To conserve power, LEDs should normally be extinguished.

IP Cable Discovery

As part of the determination of the proper inter-processor physical cabling layout, each MBM cooperates in the PMU Server's cable testing by responding to the requests for GET MBM IP CABLING. IP cables connect pairs of EV7 external 8P routing ports. The 6 IP ports are 2 North, 2 South, 1 East and 1 West.

Figure 53:
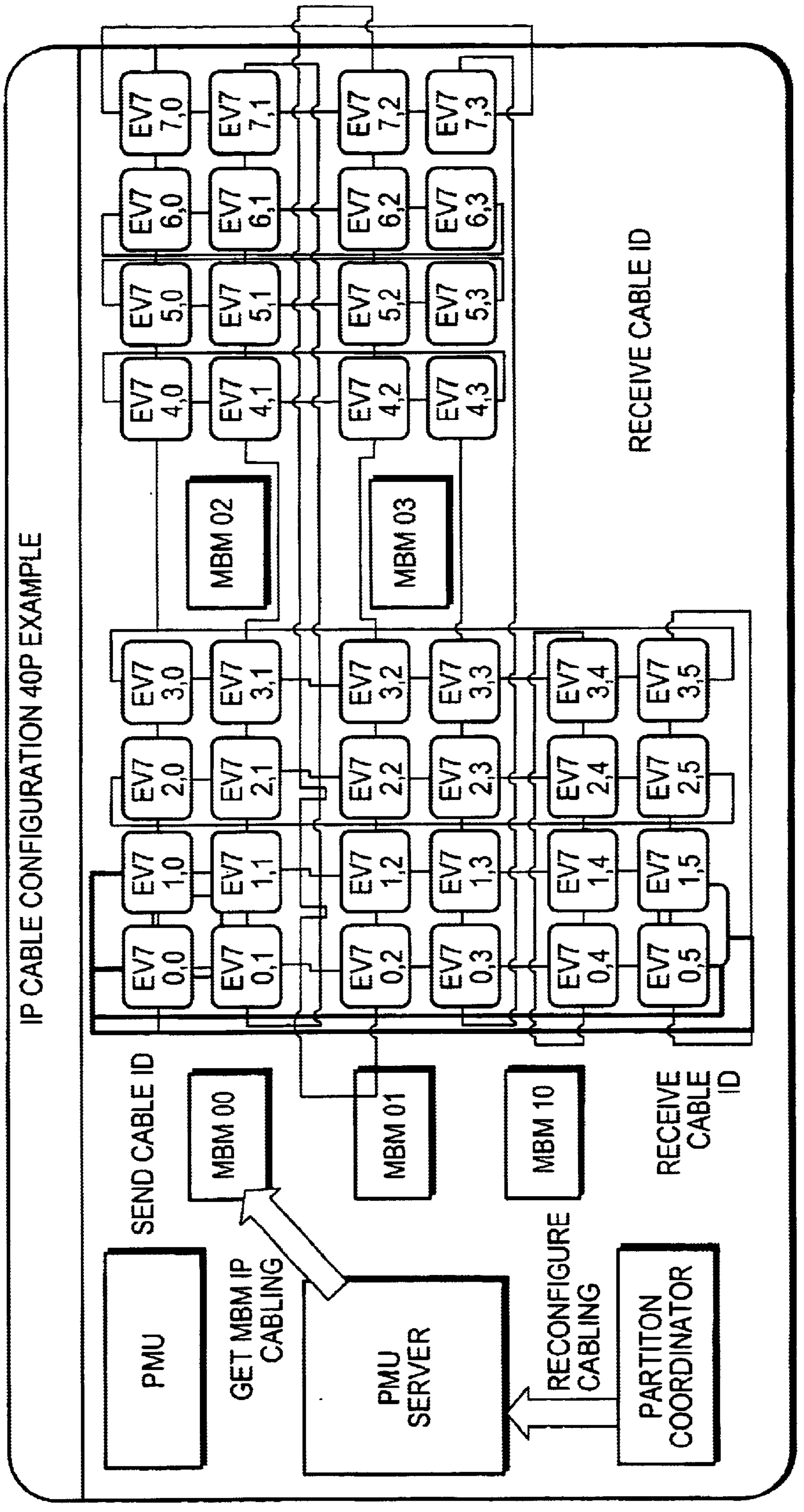
FIG. 53 is an IP Cable Configuration Block Diagram.

An IP cable configuration diagram is shown is FIG. 53.

The MBM requests a RECEIVE CABLE ID from each MBM expected to be on the other end of each of his external ports. The MBM sends the ID down the cable by performing the equivalent to SEND CABLE ID request on his own ports. Whoever responds positively to the request returns the receiving ends port direction and EV7 port number and the EV7 ID received. This is then repeated for all external port directions on the MBM. Each MBM known to be present in the Multiprocessor computer system reports his cabling connections to the PMU Server who maintains the cabling database.

There are certain illegal thumb-wheel number settings for rack thumb-wheel and MBM thumb-wheels as well as invalid cabling configurations that are checked at this time and reported as an error in the error log. The MBM thumb-wheel number consists of a rack number (0–7) and an MBM number (0–3). Turning now to FIG. 54 coordinate addressing relationship to thumbwheel addressing is shown.

IO Cable Discovery

Figure 55:
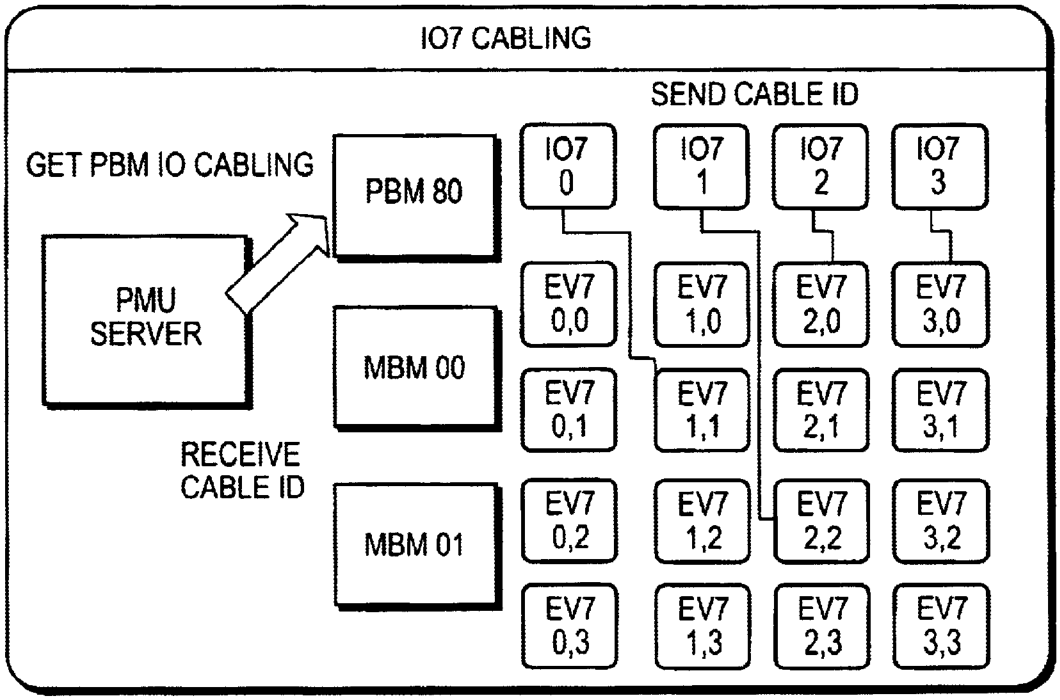
FIG. 55 is a IO7 Cabling Block Diagram.

The PMU Server makes a similar determination of all IO7 to EV7 cable connections by making a GET PBM IO CABLING request to each PBM. The PBM in turn sends a RECEIVE CABLE ID to all MBMs; then sends the IO7 riser ID down the I/O cable via a SEND CABLE ID request. The PBM responds with the EV7 IDs connected to the I/O risers. The PMU Server repeats this for all PBMs while maintaining the cabling database, as shown in FIG. 55.

Cable Database Retrieval

Retrieval of the cable connection database is done through requests to the PMU Server. When the PMU or Partition Coordinator requests the cabling via GET CABLING CONFIGURATION, the results from the last RECONFIGURE CABLING are returned.

Figure 56:
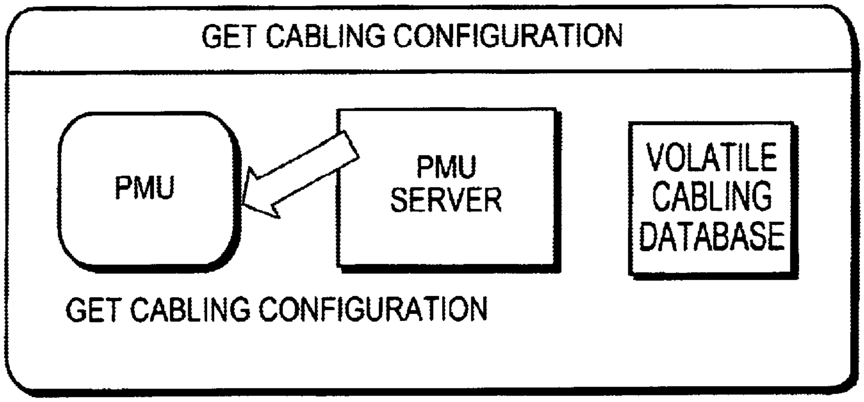
FIG. 56 is a get Cable Configuration Block Diagram.

A GET CABLE CONFIGURATION Block Diagram is shown in FIG. 56.

Cabling Check on Additions

Figure 57:
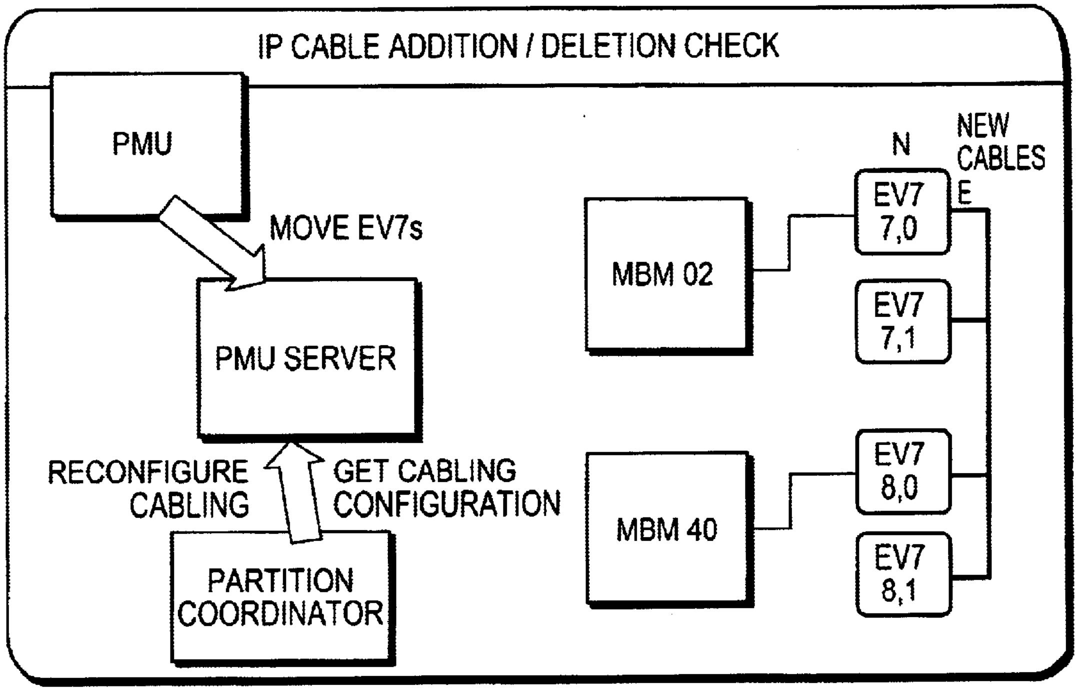
FIG. 57 is an IP Cable Addition/Deletion Block Diagram.

The partition coordinator uses the cabling database to determine the connections that can be made among the processors assigned to the partition under its control. When adding or removing an EV7 or IO7 from/to the partition, the partition coordinator must determine the effect this change has on its own grid of processors. The result may leave other processors isolated when attempting to route. The PMU is warned of the resulting effect. FIG. 57 shows a cable Addition/Deletion Block Diagram.

PMU Cable Locator Assistant

Figure 58:
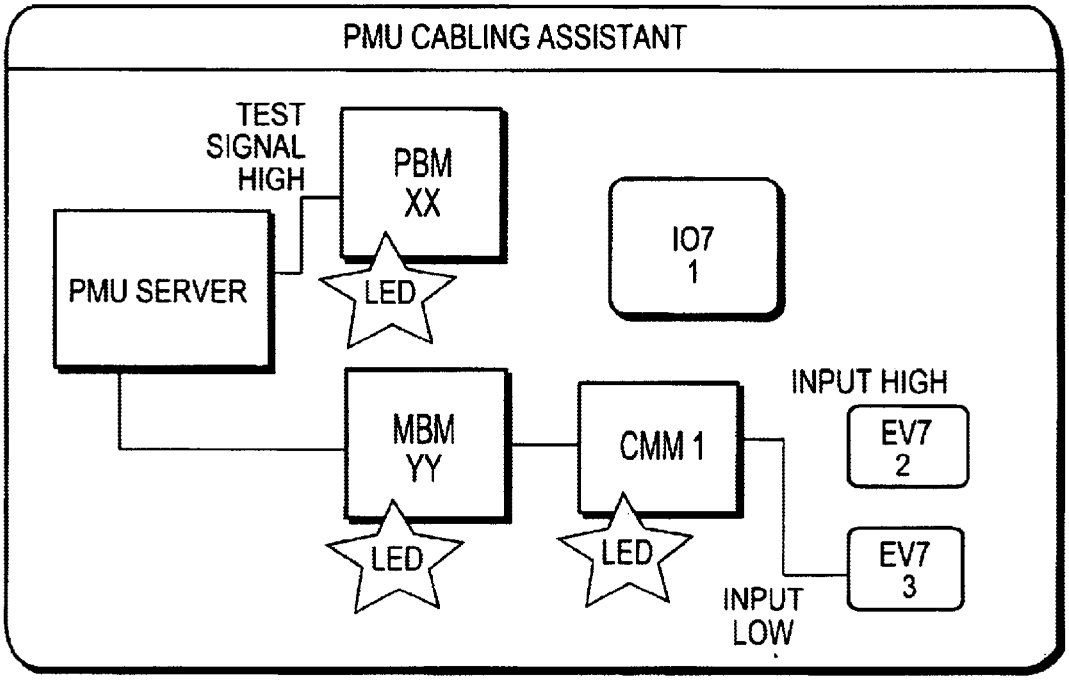
FIG. 58 is a PMU Cabling Assistant Block Diagram.

To assist the cabling operation itself, the PMU makes use of SET CABLE TEST SIGNAL STATE, GET CABLE TEST SIGNAL STATE and SET ATTENTION LIGHT INDICATOR. A block diagram of a Cabling Assistant is shown in FIG. 58.

This could be used to identify the proper connection by writing 0 to the cable test signal on the port of a cable that is being tested. Then read the same port on the expected other end of the cable to determine if the read of the signal is present. The MBM rack, PBM Rack or CMM attention light indicator can be lit or flash to identify the location until the cable is properly connected and thereby assist in locating the other end of the cable. When the cable is properly connected, all LEDs should be extinguished to conserve power.

The MBM/CMM/EV Hierarchical Relationship

Figure 59:
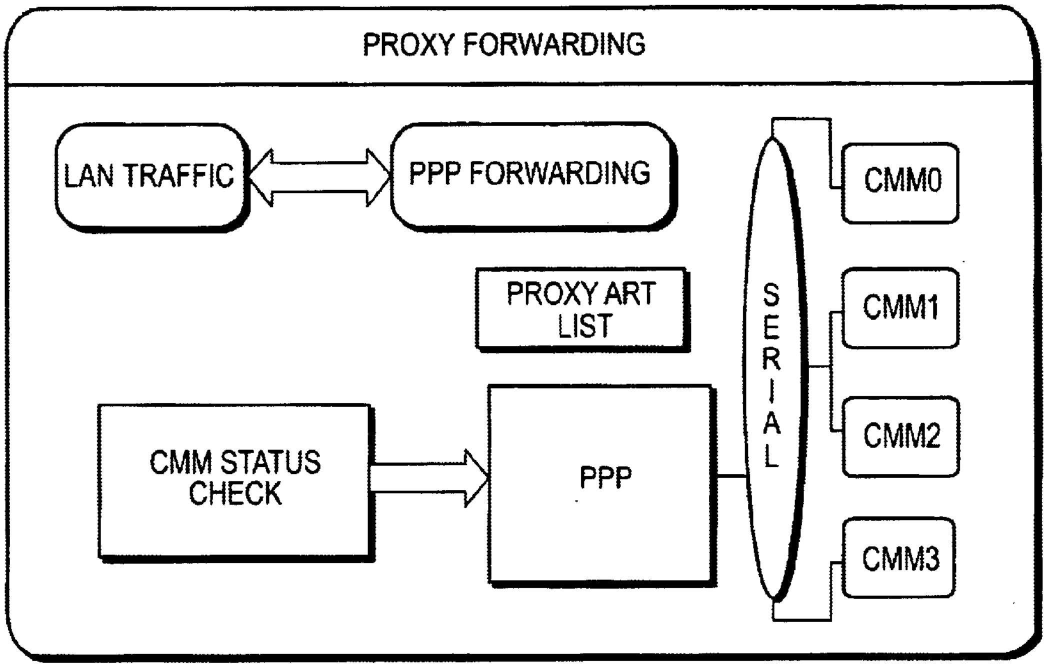
FIG. 59 is a Proxy Forwarding Block Diagram.

An MBM is parent to as many as 4 CMMs, and grand parent to as many as 8 EV7s. Communication to the CMMs is over a serial connection running PPP. The MBM provides some important services to both CMM and EV7. Services provided by the MBM comprise:

- Proxy Forwarding
- CMM presence watchdog
- TFTP Server
- Error repository & distribution
- Power hierarchy
- Time Services
- Virtual Console Terminal
- SRM Env. Var. Repository Proxy Forwarding Turning now to FIG. 59, a block diagram of Proxy Forwarding is shown.

The MBM connects to the LAN, but the CMM does not. The MBM enables proxy arp for each of the 4 PPP links. It configures host routes for each of the links. Packons on the LAN destined for the CMM are received by the MBM and forwarded within the IP stack to the appropriate CMM.

The EV7s are never UDP sources or destinations, so forwarding is only provided for the CMMs.

The MBM also provides the forwarding of CMM request to the LAN.

The PPP interface supports UDP, TFTP, PING, and the SM protocol, and does not support TCP or Telnet. SM private LAN broadcasts are not sent to the CMM.

CMM Status Check

The initial PPP connection to each of the 4 CMM to MBM serial lines brings up the connection and sets up the proxy arp entry so that external traffic gets forwarded to CMMs. The MBM continues to check the state of the CMM connection and attempt to re-establish with any that are not functioning. This service also requests the state of the CMM and its EV7 on a periodic basis of about 2 seconds. Timeouts imply the connection is lost, in which case, an error entry is made and attempts are made to re-establish the connection at periodic intervals. There are several ways for an MBM to detect if a CMM has stopped functioning:

1. The PPP layer can detect if the PPP connection is lost.
2. A hardware register indicates the presence of a CPU module.
3. An SM protocol packet could fail.

Virtual Console Terminals

Figure 60:
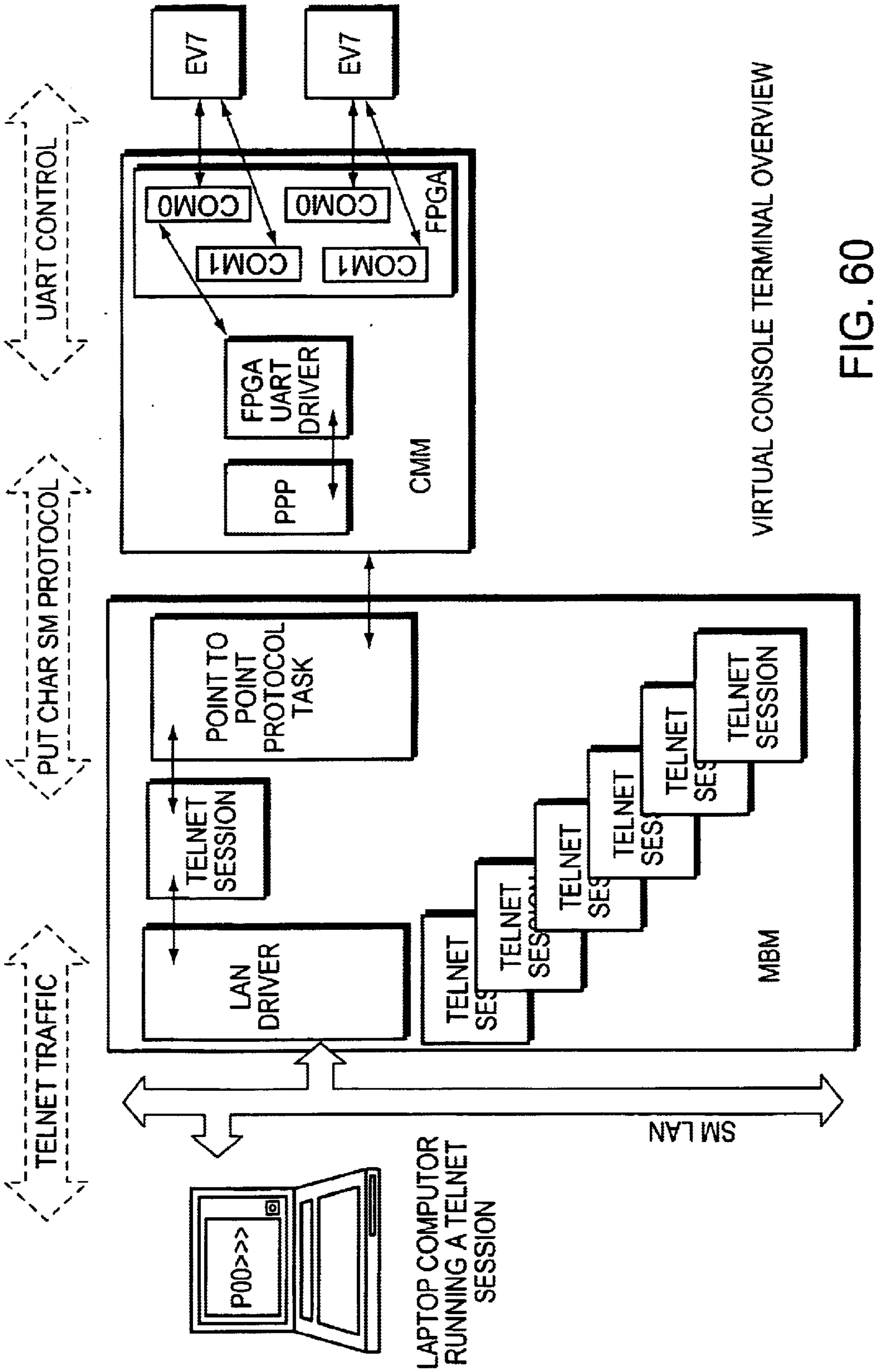
FIG. 60 is a Virtual Console Terminal Overview.

Turning now to FIG. 60, a block diagram of the virtual terminal overview is shown.

Each MBM has one Telnet server for each EV7 virtual COM port (8 total for COM1 ports, 8 more for future use of COM2).

Addressing the Virtual Terminal

Each Telnet server has the MBM's IP address, and a unique port number, starting with port 323. RFC 1161 shows 256–343 as unused in the Well Known Port list.

The Port numbering scheme is shown in FIG. 61.

Establishing a Telnet Session to a Partition

Every EV7 has a virtual COM1 and COM2 port. However, the server management firmware only provides console terminal support for the primary EV7 in the partition.

Steps to Establishing a Connection

1. Connect PMU platform (e.g. laptop) to an available hub port.

2. Get the IP address/port for the Telnet server for a Partition's Primary EV7 (PMU issues GET TELNET IP ADDRESS/PORT to PMU server. PMU server responds with Telnet server's IP address and port).

3. Telnet directly from PMU to Primary EV7's telnet server on Primary EV7's MBM.

Note: PMU connects directly to Primary EV7 Telnet server (not through the PMU server).

Flow Diagram of a Virtual Console Session

Figure 62A:
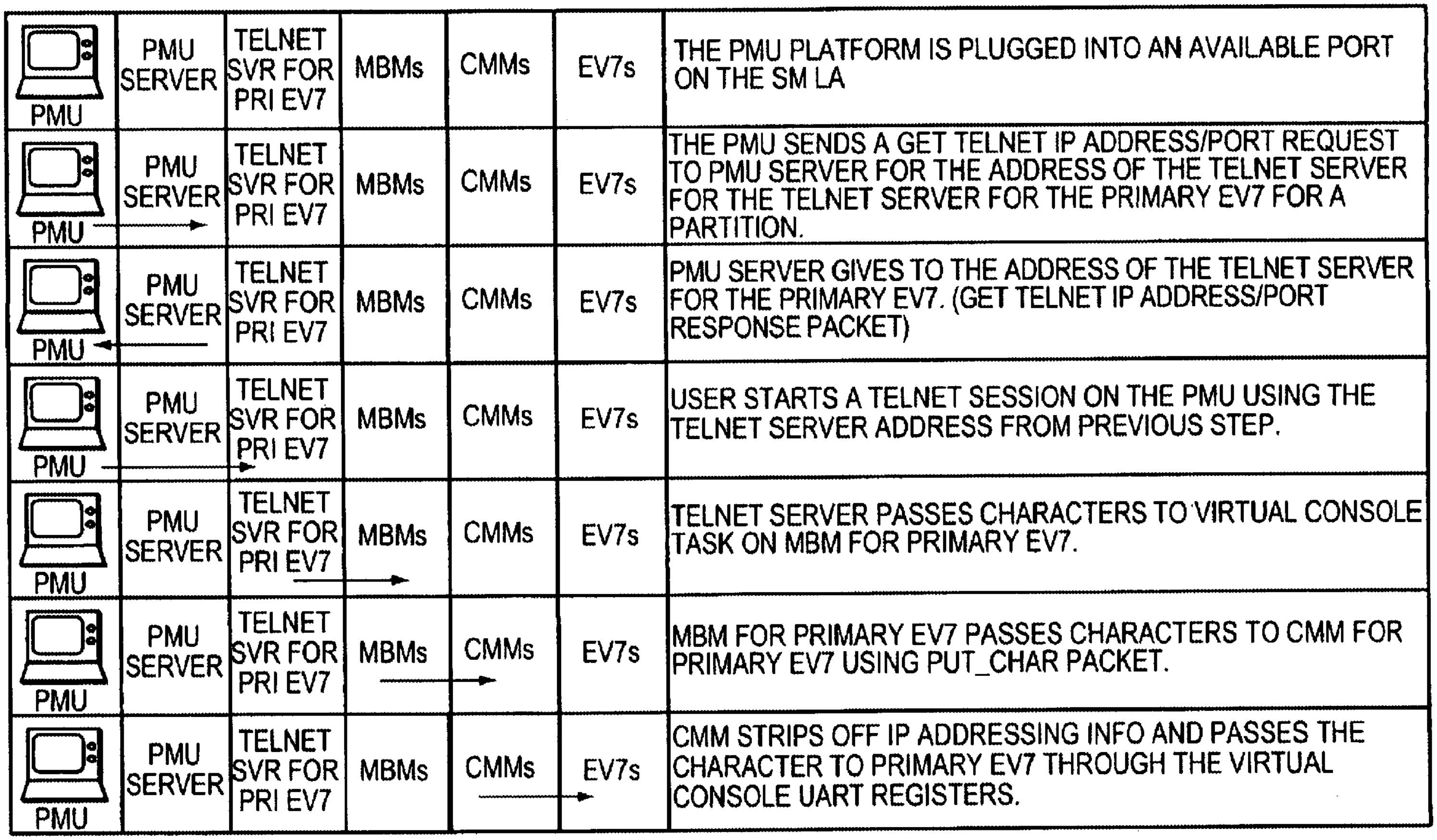
FIGS. 62 and B are a table giving a Virtual Terminal Flow Diagram.
Figure 62B:
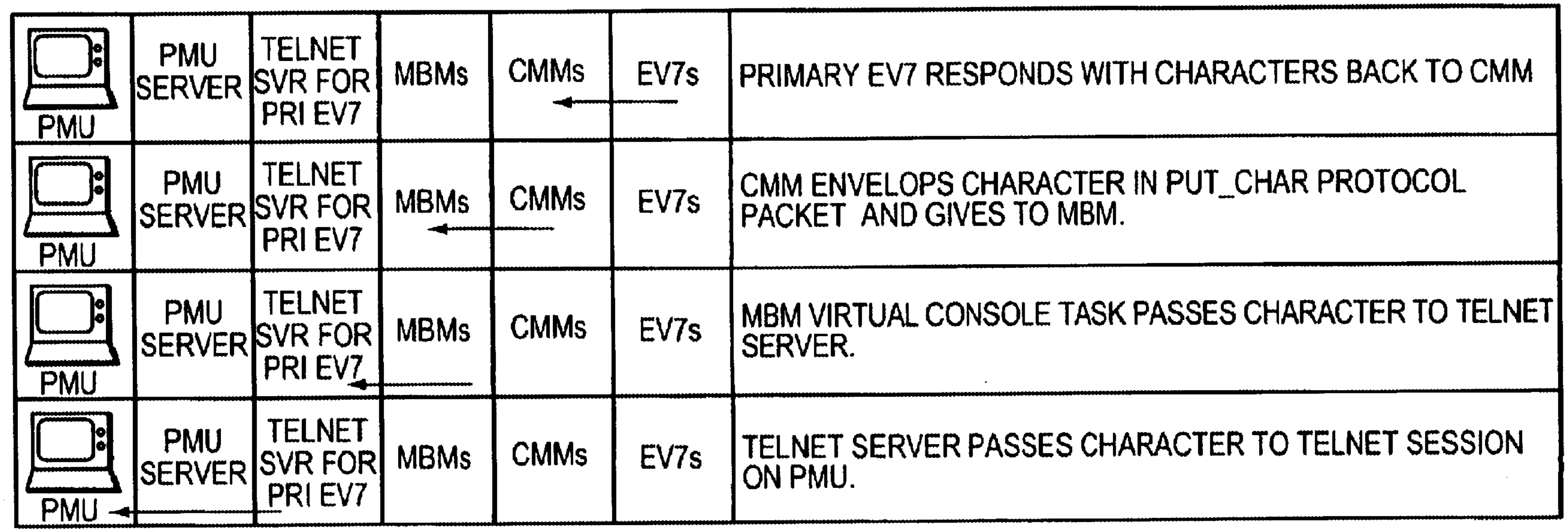

A Virtual Terminal Flow Diagram is shown in FIG. 62A and B.

Telnet Server Technical Details

The telnet server provided by vxWorks will not do exactly what is needed for this design. The vxWorks telnet source code must be modified to allow more than one server, and to telnet to a task other than the target shell. The telnet server will take the keystrokes, and issue the PUT_CHAR commands to the virtual console uart on the CMM. Each telnet server running on the MBM sets up for:

WILL ECHO
DO SUPPRESS GO AHEAD
WILL SUPPESS GO AHEAD
DO TERMINAL TYPE
DO TRANSMIT BINARY
WILL TRANSMIT BINARY

Noteworthy Virtual Console Behavior

The OS and SRM console always communicate through the primary EV7. The primary is capable of changing (e.g. A SWITCH PRIMARY EV7 command occurs) while a telnet session is running on the PMU. The MBM breaks the Telnet connection when the switch primary occurs. Upon recognizing the broken connection, the PMU reissues the GET TELNET IP ADDRESS/PORT and reestablishes the connection to the new primary.

Virtual Toy Clock

The virtual time of year clock (TOY) clock is next described.

Figure 63:
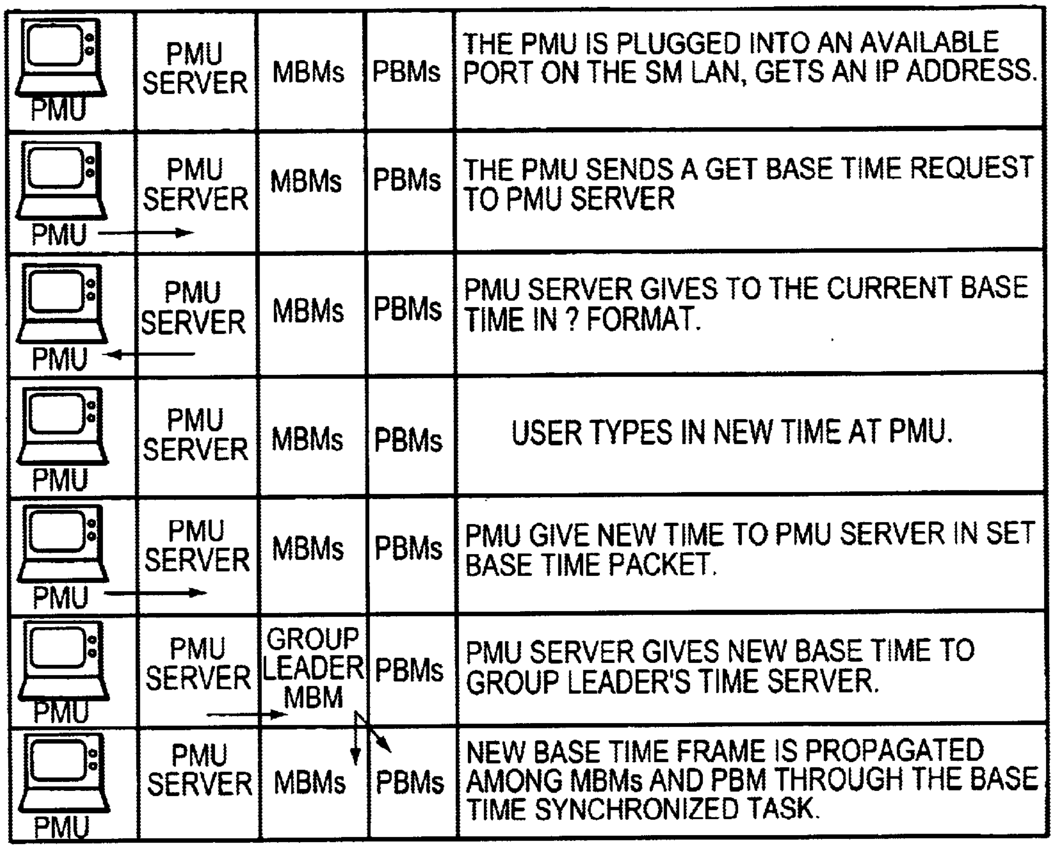
FIG. 63 is a table giving a set base Time Flow Diagram.

Turning now to FIG. 63, a flow diagram for SET BASE TIME is shown. In summary, all of the MBM units in the multiprocessor computer system maintain a "base time". The time as seen by each partition, the partition "current time", is computed from the base time by adding a "delta time" stored in the replicated database on all MBMs and PBMs.

The delta time for each partition is initialized to zero upon boot up of a partition. When a partition is initialized and booted for the first time the EV7 processors accesses the time of day data via the CMM. The CMM computes the time for the partition by adding the partition specific delta time to the base time. If the operating system running on that partition changes the time of day, the CMM and the MBMs store the difference between the time value being set and the base time as the partition's "delta time".

The TOY (time of year) chip, also known as the "watch chip", on each MBM supports TOY functionality for the client CMMs and CPUs. Neither the CMM nor the CPUs have TOY hardware, so the MBM must supply the TOY information. The MBM periodically sends each client CMM a DISTRIBUTE BASE TIME CHANGE SM packet. The CMM applies the delta time, then stores the TOY data from this packet in address space that is accessible through the FPGA as BB_WATCH. An EV7 reads BB_WATCH through the Gport interface.

The Server Management strategy regarding TOY updates assumes that the operating systems access the TOY infrequently. Also the strategy assumes that ½ the update interval is within tolerance for the operating system.

The watch chip is initialized by the application program with the SET BASE TIME SM message.

Synchronization of the Watch Chip

Each MBM contains a physical time of year device, a TOY clock 16,016 or a 19,024 TOY device, also referred to as the watch chip mentioned above. These time pieces are all synchronized to the same base time, which is an arbitrary time set by the user. The base time could be Universal Coordinated Time (UTC), Eastern Standard Time (EST), etc. Synchronization is maintained within a predetermined time envelope by use of a "synch wave" technique. The predetermined time envelope is determined by the known delays in messaging between the microprocessors of the MBMs and PBMs. The "Synch Wave" technique is described in the following paragraphs.

A hardware clock consists of an oscillator which generates a cyclic waveform at a uniform rate. A counting register records the number of cycles elapsed since the start of the clock. For example, a quartz crystal controlled clock may be used for the oscillator. Quartz clocks of standard engineering design may have a maximum drift from real time, of a drift rate within a microsecond per second. When a number of processors exchange messages to coordinate their clocks, the delay in message transmission gives an upper bound to the error between readings of the various clocks of the processors.

The clocks of various MBM microprocessors diffuse messages carrying their time determination by a microprocessor sending a new synch message to all other processors. All microprocessors receiving a new synch message transmit their own synch message to all other microprocessors. This process generates a "synch wave" as the message diffuses to all microprocessors. In a preferred embodiment of the invention, the fastest microprocessor clock may be used to define the base time. One clock will be a little faster than any other clock. The microprocessors all set their clocks to agree with the fastest clock setting in the synch wave. All clocks are then in synchronization within a time envelope determined by delays in message propagation between processors, and all are set to the time of the fastest MBM microprocessor clock. The synchronization of all MBM and PBM microprocessors by the synch wave method produces the base time for the partition of the MBM and PBM microprocessors.

In an alternative embodiment of the invention, the base time is set as follows. The MBMs (multiprocessor system wide) elect a principal MBM unit. The MBM units generate synch waves through which they determine the fastest MBM watch chip clock. The principal MBM unit adopts the fastest time as base time, and sends messages to all other MBMs telling them to write the adopted time as the base time into their watch chips. However, this method is not preferred because some clocks in a partition with a fast clock may be reset backwards, and such an event could have collateral consequences.

An alternative method for setting the base time is for the principal MBM, after its election, to simply use its watch time as base time, and eliminate synchronizing to the fastest clock in the MBMs of the multiprocessor computer system.

When a new MBM enters a system, it must recognize that its base time is invalid. The new MBM must then get the correct time from the next "sync wave". There is a base-time synchronizer on each MBM.

The SET BASE TIME command is executed by an outside agent, usually a human. The SET BASE TIME command provides the MBM group leader with a time to use as the current base time. The MBM group leader time then becomes the new real current time throughout the entire multiprocessor computer system through the following process. The base-time synchronizer routine sends out a "synch message" with the new base time to all MBM's and PBM's. This base time is then written into all watch chips in the MBM and PBM units of the multiprocessor system.

The base-time synchronizer is awakened by one of the following events: a new base time is received (i.e. A user manually sets the time), a new processor joins, a new time message is sent by another MBM, or a timeout occurs (i.e. The base-time synchronizer may do periodic broadcasts of time).

Delta time is a partition specific value that is determined on each partition. The delta time is maintained on each MBM in a partition. The delta time plus base time equals BB_WATCH time, which is needed by the EV7s. The CMM uses GET DELTA TIME to get the delta time, then combines this delta with the base time to provide BB_WATCH time.

All EV7's must have direct access to a BB_WATCH server. Therefore, there will be one BB_WATCH server per MBM, supplying base and delta times to each CMM for the EV7s. Each BB_WATCH server is kept in synchronization with the other BB_WATCH servers via the base-time synchronizer function.

See the following paper for more details of synch wave synchronization of a group of processors such as the microprocessors of the MBMs and PBMs: "Clock Synchronization in the Presence of Omission and Performance Failures, and Processor Joins", Flaviu Cristian, Houtan Aghili, and Ray Strong, IBM Research, Almaden Research Center, 1986, all disclosures of which are incorporated herein by reference.

Figure 84B:
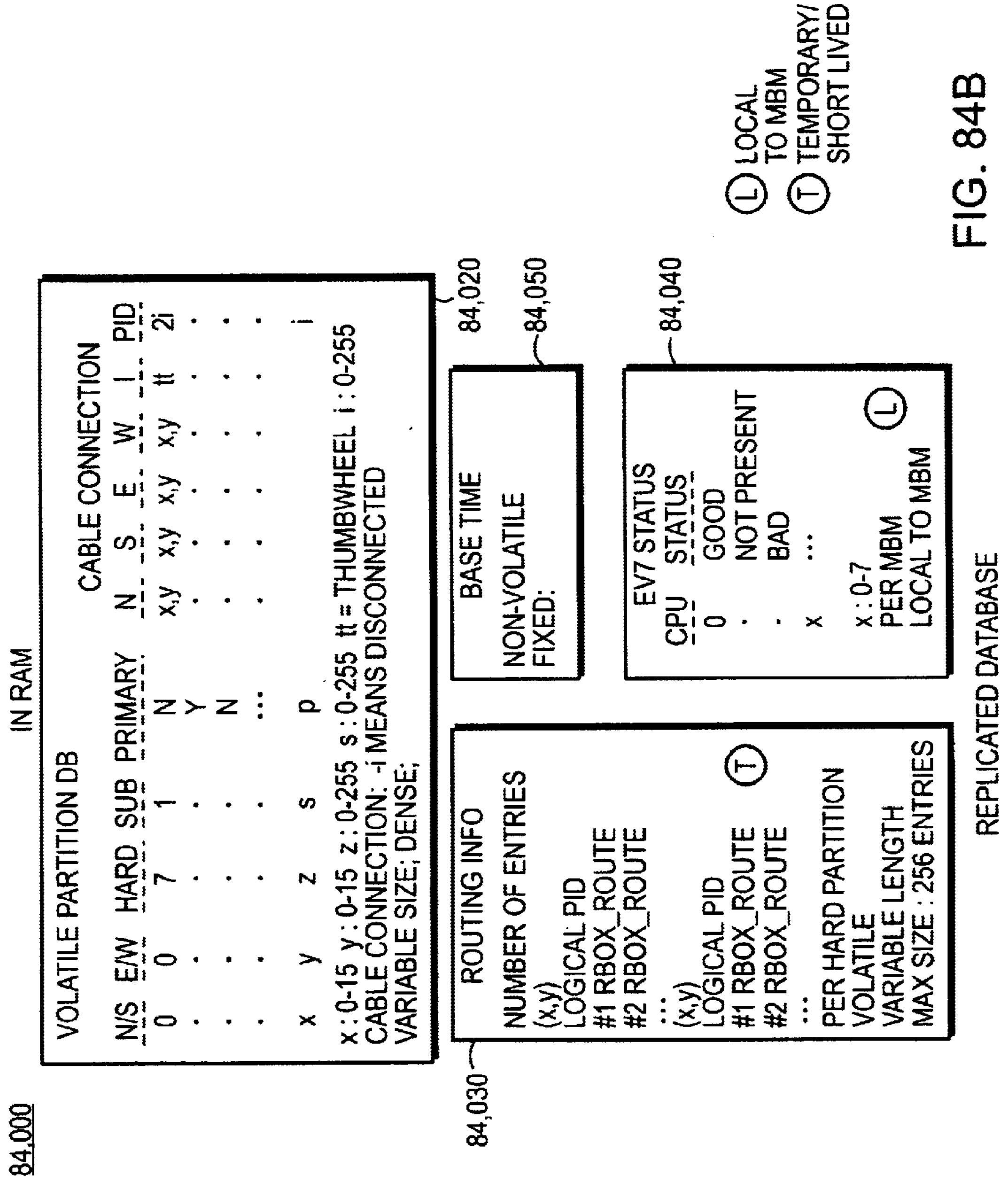
FIG. 84B is a second table giving Fields of a Partition Data Structure.

The delta time for each partition is maintained in the replicated data base 84,000 shown in FIG. 84A and FIG. 84B, in block 84,008. Through the replicated database each MBM and PBM unit knows the delta time for each partition. Further, the base time is the same for all MBM and PBM units. Accordingly, any partition may be broken down and reassembled using any of the physical units of the entire multiprocessor computer system, and have the correct current time available for the new partition's EV7 processors. The correct current time for the new partition is taken from the common base time and the delta time for that partition which is read from block 84,008 of the replicated database 84,000.

DHCP Server

Figure 64:
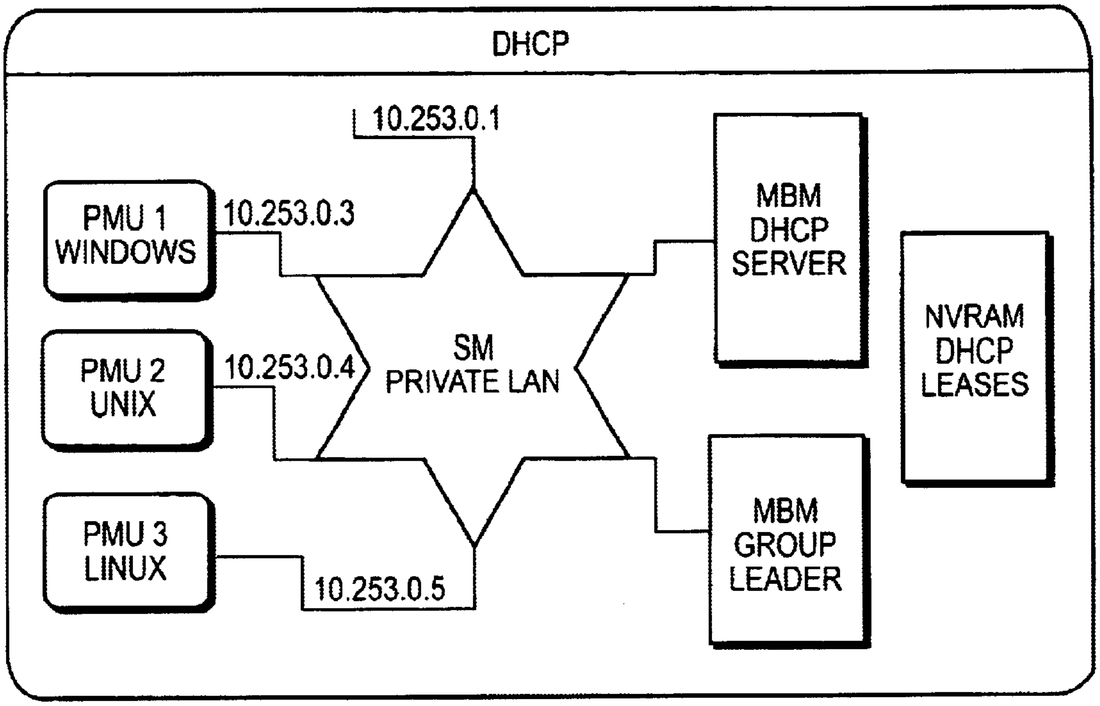
FIG. 64 is a Block Diagram giving a DHCP.

The DHCP Server supported by VxWorks is started by the Group Leader in order to give lease IP addresses to PMU DHCP clients that connect into the SM LAN. A DHCP block diagram is shown in FIG. 64.

Any DHCP leases made cause a DISTRIBUTE DHCP LEASE DATA request with the IP Addresses, MAC Addresses and Lease Duration information. This request is sent to all MBM/PBM peers, so each can maintain their copy of DHCP leases in NVRAM.

The DHCP lease data is maintained in order to restart the DHCP Server with the proper lease data whenever the group leader restarts it, and so the PMU Server can send alerts to all known PMU IP Addresses on the SM private LAN.

The DHCP Server is started by calling dhcpsInit( ) and in turn controlled through the following customized pieces:

dhcpsLeaseTbl structure that contains the entries available to lease and their associated lease parameters. In our case we only need a single entry consisting of:

```
{"dflt", "10.253.0.1", "10.253.0.253","snmk=255.0.0.0","maxl=
  604800"};
```

This uses the default name entry with an IP address range of 10.253.0.1–253 using a subnet mask of 255.0.0.0 and a maximum lease time of 1 week in seconds.

The hook routine dhcpsLeaseStorageHook that is invoked by the server with an action that the hook routine should take to store or retrieve the current DHCP hashed bindings database settings, which in our case will be copied to/from the MBM Nvram. To interpret the format of these binding database entries we can make use of the DHCP Library hash functions. In the case of a storage request, the copy is sent on the Reliable Database Train as a Distribute DHCP Lease Data request.

Since the vxWorks DHCP Server does not inform us of database changes in a timely manner, the task "own_dhcps" is started to periodically obtain this information from the DHCP Server's database.

Non-Volatile Storage

The MBM flash contains the firmware images for all the micros, FSLs for all the micros, FPGA code, EV7 diagnostic firmware, and the SRM console. Additionally, the flash is used to store error logs, SRM environment variables for each partition, and all partition configuration information (referred to as the partition database).

Flash Layout

The following table estimates the sizes of the data stored in the flash. Items with file names are accessible with TFTP for read and write. The MBM image of VxWorks kernel and libraries prior to adding application code is 0.7 MB uncompressed. The MBM Fail Safe Loader in compressed format is 0.35 MB. Since decompressing the MBM image would cause a slight delay in booting, it is not used for the MBM Image.

FIG. 65 is a table giving Flash Layout.

Image Header Format

Turning now to FIG. 66, an Image Header is shown.

All images use the APU header format used on Alpha Systems. Some fields are set to fixed values for backward compatibility with existing tools. The header begins in the second 512 byte block of the image and the images make use of a 32 bit checksum in the last 4 bytes of the image.

A Flash Driver is required to perform the necessary reads and writes on the file descriptor argument in vxWorks "tftpGet". The driver is opened using the TFTP filenames and an indicator of a test RAM version when requested. On write requests, the Driver is responsible for erasing flash sectors and backing up other files contained in the same sector. The driver read requests are simply memory copies from ROM.

SRM Environment Variables

Turning now to FIG. 67, on SRM Environment VARS Flow Diagram is shown.

The SRM console requires non-volatile storage to maintain environment variables, such as the boot device. NVRAM is not available on the CPU module, so the SM subsystem makes available some of the NVRAM managed by the MBM. The SRM console, via the SM protocol, reads and writes its block of environment variables to the CMM. The MBM maintains a 2K block for SRM environment variables, backed by NVRAM, for each active partition. In order to maintain a partition's environment variables even over partition component adds and deletes, the environment variable information is replicated on each MBM.

Error Cases

If all MBMs and PBMs are not accessible, and therefore replication cannot occur to all micros, then the environment variables are only stored in volatile memory. Only the partition primary CPU manipulates the environment variables, so stale information on inaccessible MBMs is not used.

Flash Organization

The CDP Flash, which may be adopted in an illustrative embodiment of the invention, is organized in 32 bit wide accesses. Each word may be in a different device. Each device is 2 MB with 64K sectors. Since it is 32 bit wide we can consider a logical sector as 256K and with 32 sectors available in 8 MB.

Firmware Upgrade and Test Load

Figure 68:
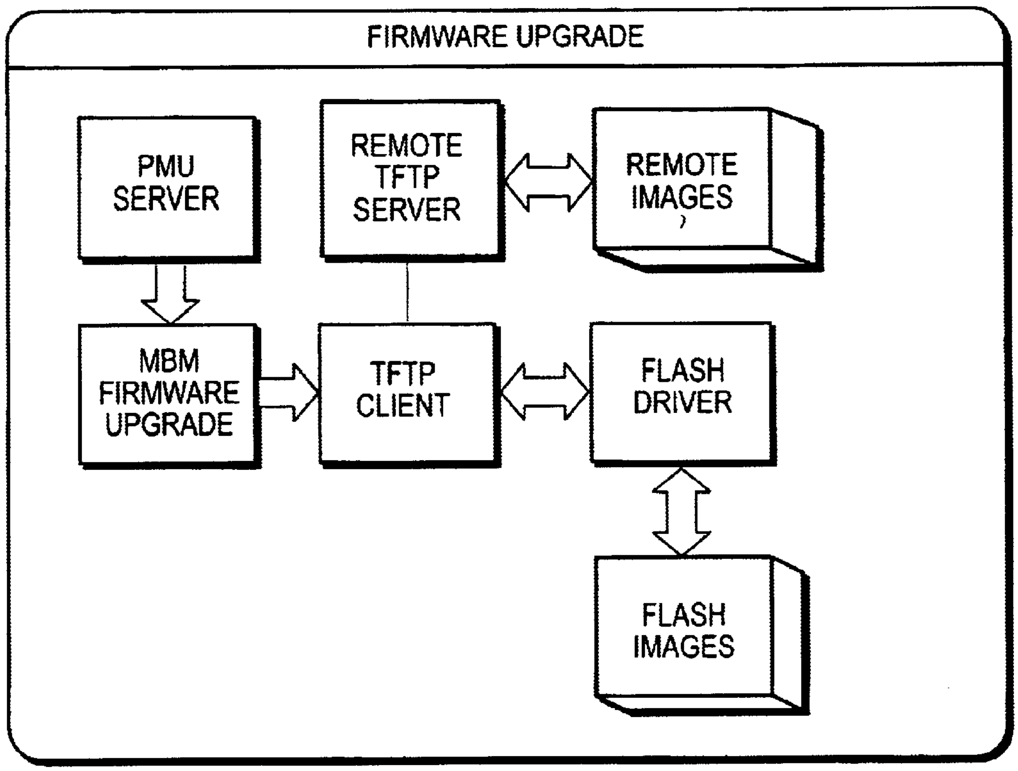
FIG. 68 is a Firmware Load and Upgrade Block Diagram.

Multiprocessor computer system firmware is upgraded from the PMU over the SM private LAN. A firmware load and upgrade block diagram is shown in FIG. 68.

Upgrading Firmware

Figure 69:
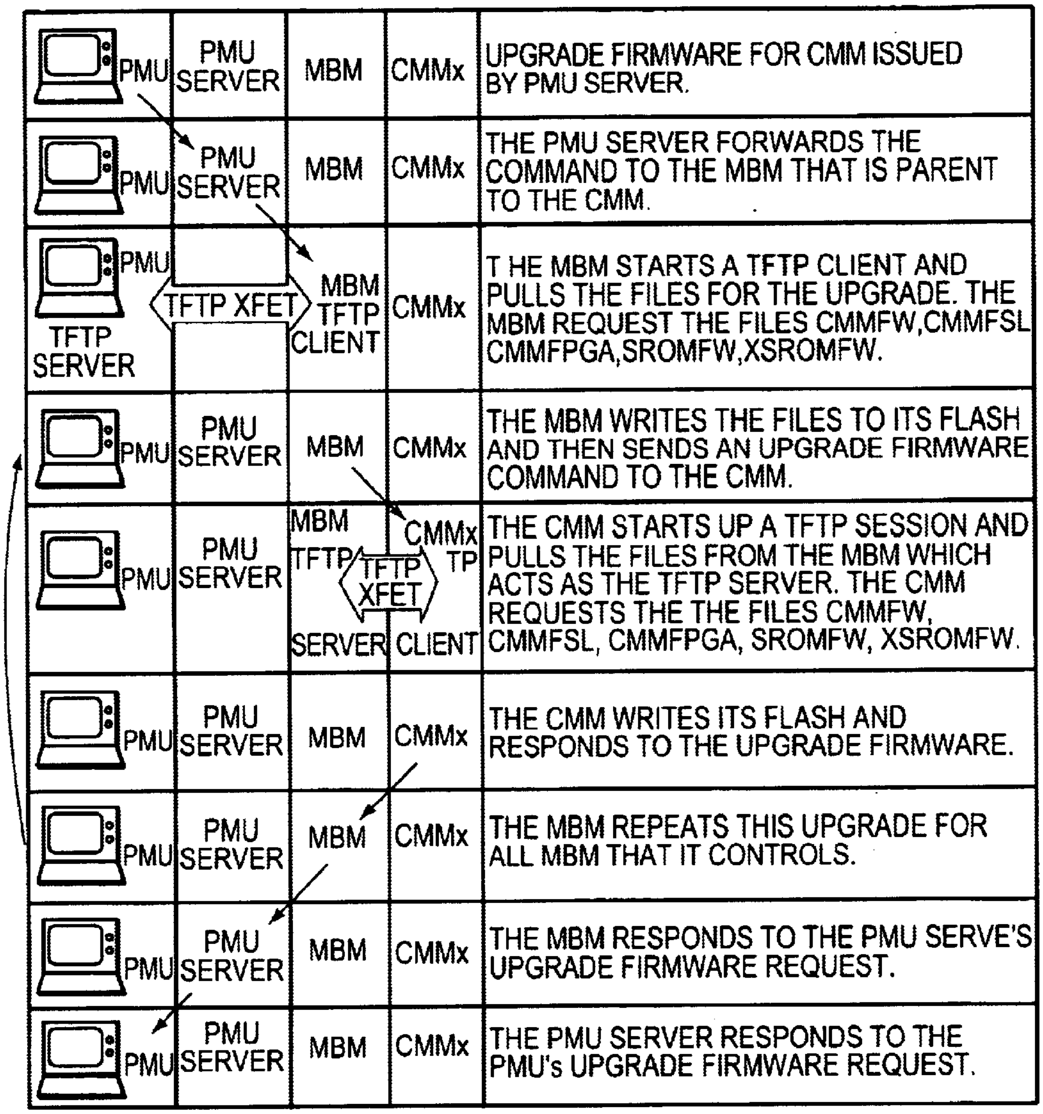
FIG. 69 is an Upgrading CMM Firmware Flow Diagram.

Turning now to FIG. 69, a flow diagram of upgrading CMM firmware is shown.

Upgrading MBM/PBM Firmware

The PMU can upgrade individual MBM/PBM firmware images from files it supplies. The PMU Server issues an UPGRADE FIRMWARE command to the target MBM. The MBM opens up a TFTP session back to the PMU. The MBM pulls over the specified file from the PMU, writes its flash part, and notifies the PMU of success.

Upgrading CMM Firmware

Upgrading CMM firmware is handled slightly differently than an MBM/PBM upgrade. The PMU issues the UPGRADE FIRMWARE command to the parent MBM specifying CMM firmware. The MBM updates its flash part. After its flash is updated, the MBM sends an UPGRADE FIRMWARE command to the first CMM. The CMM opens a TFTP session to the parent MBM and pulls over the specified file from the parent MBM's flash. The CMM writes the file to its flash part. The remaining CMMs are updated sequentially in the same way. The CMM only TFTPs to its parent MBM.

FSL Recovery Upgrade

FSL firmware upgrade of a CMM

On CMM startup, should the CMM FSL program detect a bad checksum on the CMM firmware, the FSL will start a TFTP session and pull over a new copy of the image from the parent MBM. This image automatically gets written into the flash.

FSL firmware upgrade of an MBM

On MBM startup, should the MBM FSL program detect a bad checksum of any of the images in the MBM flash, the FSL will bootp request, from its LAN peers, a new copy of the image. The MBM starts a TFTP session and pulls the new image over, writes it into its flash, and resets itself and reloads.

MBM OS Components

VxWorks

Wind River's VxWorks has been selected in an exemplary embodiment of the invention as the RTOS of choice to support the MBM application. The VxWorks kernel has priority driven pre-emptive scheduling in a real-time multitasking environment with several choices of intertask communication methods, interrupt handling support and memory management. Libraries are readily available in x86 compiled format to support our networking and serial device needs. The Wind River Tornado2 development environment contains a set of tools to build VxWorks bootable and downloadable images and perform source level debugging.

Additional libraries beyond the default set used for MBM application (based on the ElanSC520 boot extension of the 486 BSP) build are:

END Interface Support for the END Network Driver

PppLib for point to point connections with the 4 CMMs

DHCP Server for maintaining PMU IP Addresses and Lease Times

Telnet Server for starting SRM Console CLI interfaces with the PMU

TFTP Client and Server for transferring images between CMM, MBM and PMU

Boot Program

The boot process performs x86 specific processing to place the processor into 32 bit flat protected mode and sets up the ELANSC520 HW registers to allow the vxWorks kernel to start.

MBM Initialization

Following the rules defined in the VxWorks Programmer's Guide in the section on Board Support Package, we have made changes to initialize the Hardware Registers in sysLib.c. The function initElanRegs was added and called from sysHwInit and sysHwInit2. In addition PciAutoConfigLib was added, and minor modifications were made to sysNetConfig.c for supporting PCI Initialization.

On completion of the kernel initialization the usrAppInit entry point is programmed to perform the POST checks and initialize a list of services, as follows:

On 2P versions, initialize the CLI Handler to control the Debug COM Port.

Run the Power On Self-test on UARTs, Flash devices, I2C Master and slave device accessibility and on the NIC. An errors found are reported on the OCP and CLI port. Some errors may be fatal. Some errors may have been detected in the kernel boot phase and error indicators set on the LEDs and UART for the CLI port. Where possible errors will be logged to the MBM Error Log and displayed on the OCP error line.

Initialize the error log to check on log validity, set up pointers, log any POST errors.

Initialize the ECC Error Handler to keep track of single bit ecc errors within the MBM SDRAM.

Determine by checking the switch or jumper whether we are in MBM or PBM mode.

Read the MBM & Rack thumb-wheels and start-up the network interface using the derived IP address for the MBM. Start-up 4 ppp connections to the CMMs to allow for automatic IP message forwarding to each CMM. The initial connections are established through the use of the vxWorks function, usrPPPInit, with arguments of the derived IP addresses of each CMM, and PPP options: PPP_OPT_PROXYARP and PPP_OPT_PASSIVE_MODE.

Initialize a service to periodically check on the availability and health of each CMM.

Initialize a service that initially reads and caches the I2C device data and then periodically updates the dynamically changing portion of this data.

The following list of services is determined to be started in every MBM and have a distinct function of processing externally received messages. The services are separated so as to improve expediency and avoid latencies in processing requests that require device accessing:

- Start the Group Message socket reception processing of LAN Group Messages as defined in the network protocol specification
- Start the Atomic Update Message socket reception process to perform the Data Base Update services as defined in the network protocol specification
- Initialize a service to process Partition Control Messages
- Initialize a service to process Firmware Load and Upgrade requests using TFTP and start the TFTP Server.
- Initialize a service to process Environmental/FRU Messages
- Initialize a service to process all other commands, which currently seem to not require any device latency and therefore get bundled in this service.

Now that the list of request processing services is started; start the service that sends application requests on the SM LAN Command/Response socket and the service that receives on that same port.

The remaining services on the MBM are started via a request from the group leader to delegate a system wide service to the MBM.

The final service, MBM Watchdog, is started in a non-debug environment to insure the MBM stays alive.

MBM ECC Error Handling

The ELANSC520 SDRAM controller has provisions for correcting single bit ECC errors and detecting multi-bit errors. Enabling ECC error checking causes some latency in accessing SDRAM.

I2C Bus Driver

The I2C bus driver accepts requests to I2C devices on the I2C buses. The hardware device chosen for the I2C masters are Philips 8584 (See PCF8584 Data Sheet for details all disclosures of which are incorporated herein by reference). Internally the driver interacts with the 8584's Control/Status Register and Data Register to send the request to I2C device being addressed. Note: There are no multi-master requirements on the I2C buses. I2C buses beyond zero require a selection on the part of the driver setting the multiplexer register.

The vxWorks application interface to this driver consists of the following commands: open, ioctl, read, write and close. The I2C Driver also makes use of an ISR routine to capture LM80 interrupts caused by thermal or voltages being out of range. The following implementation note suggests a means of keeping the current offset for a device atomic across groups of reads and writes:

I2C Request Handling

There are several requests that require accessing I2C data that can dynamically change (GET VOLTAGE READINGS, GET TEMPERATURE READINGS, GET FAN RPM READINGS, GET POWER STATE, GET SWITCH STATE, GET OCP SWITCH STATE & any request involving the thumb-wheel settings or LED values). These requests as well as others are made for environmental sensor readings found on I2C slave devices containing thermal, voltage, fan speed, digital switches. Since many sources can be requesting this data, avoidance of I2C bus latency is enforced by taking data from a global structure that is cached in RAM. On a periodic basis of approximately 2 seconds a refresh is performed on this cached data. The EEROM device values are also cached and only read in at initialization time.

Write requests to I2C devices (SET FAN RPM SPEED, SET OCP DISPLAY DATA, SET ATTENTION LIGHT INDICATOR & SET EEROM DATA) get written first to cache and then to the device itself via the I2C Bus Driver. During any write phase a global flag is set to insure that the refresh process synchronization does not overwrite the new data.

A fixed table of actions to take when sensors go out of range is also performed by this service. At initialization the LM80s are setup to interrupt on the Warning condition, which when reached is changed to the Failure Condition.

MBM Watchdog

The ELANSC520 CPU has an internal watchdog reset capability that is used to ensure the MBM functioning despite firmware failure.

The MBM watchdog task makes use of the VxWorks timeout delay to periodically update the SC520 CPUs watchdog timer so that a reset is not triggered. If the MBM system hangs the task fails to update the watchdog and the SC520 Hardware causes reset to occur.

This MBM watchdog task's usage and timeout parameters are controlled by compile time parameters. The time out duration is in seconds to insure re-triggering the time out counter is not influenced by other task priorities. As part of the MBM initialization phase, the reason for reset is detected and written to the NVRAM error log and the PMU alerted. As with any other MBM or PBM reset, group formation takes place and CMMs are checked for availability and the current state of each EV7.

Failsafe Loader

The MBM-FSL Image load is invoked by the boot program, when either the MBM image is corrupt or the FSL jumper has been set on the MBM. The MBM FSL requires a subset of the standard application.

The failsafe loader is limited in capability. It's duties are:

Initialize the error log by checking the log's validity and setting up its pointers.

Initialize the CLI handler to control the Debug COM port.

Invoke an error entry that will write a message to the OCP indicating a firmware upgrade is required, an error log message and a PMU alert.

Read the MBM & rack thumb-wheel and start the network interface using the derived IP address for the MBM.

Start the TFTP/Bootp request for the MBM Image and write the image packets to flash. On completion of this process, reset the MBM.

Error Logging and Reporting

The MBMs devote a section of their non-volatile storage to error logs. Error such as environmental errors and network errors are stored for later retrieval. In addition, MBMs notify the PMU and partition primary EV7s of errors. A mechanism to allow PMUs to retrieve error logs is described here.

Error Log Format

Turning now to FIG. 70, an Error Log Entry Format is shown.

A circular error log is maintained in a group of flash sectors. At initialization, the global pointers to the first and last entry are set as well as the current entry number. A flash sector is erased each time the log approaches the next sector, and the first entry pointer is recalculated. Error log entries are variable in length and use the format shown in Fig.

The end of log entry is identified by an entry number, timestamp and entry size value of 0xffffffffffffffff.

The error entry has a header and a data portion. Only errors that require special data values besides those found in the header require a data portion. A format for ERROR ENTRY DATA FORMAT is shown in FIG. 71.

The text portion returned from an error log entry retrieval is not kept in the error log but rather as a part of the MBM/PBM program. The Device Error Codes 1 and 2 are reserved for free form text errors and binary form text errors respectively.

Error Log Controls

The PMU application can gather error log data from all MBM/PBMs by polling those entities for the GET ERROR LOG COUNT and obtaining any new entries via GET ERROR LOG ENTRY. When adding new MBM or PBM components, or fixing errors that were reported, the PMU or operator should decide whether the ERROR LOG CLEAR is to be used.

The PMU error log database, as a minimum, should consist of the error log count for each MBM and PBM in the Multiprocessor computer system. The format and contents of the PMU database is not specified in this document.

Error Reporting Message Flow

When an error is reported by a Server Management entity, the actions to be taken in reporting the error depend on the severity. The system-wide table of "Error Messages and Actions" is used by the MBM, PBM and CMM firmware to determine the actions to take on an error.

Figure 72:
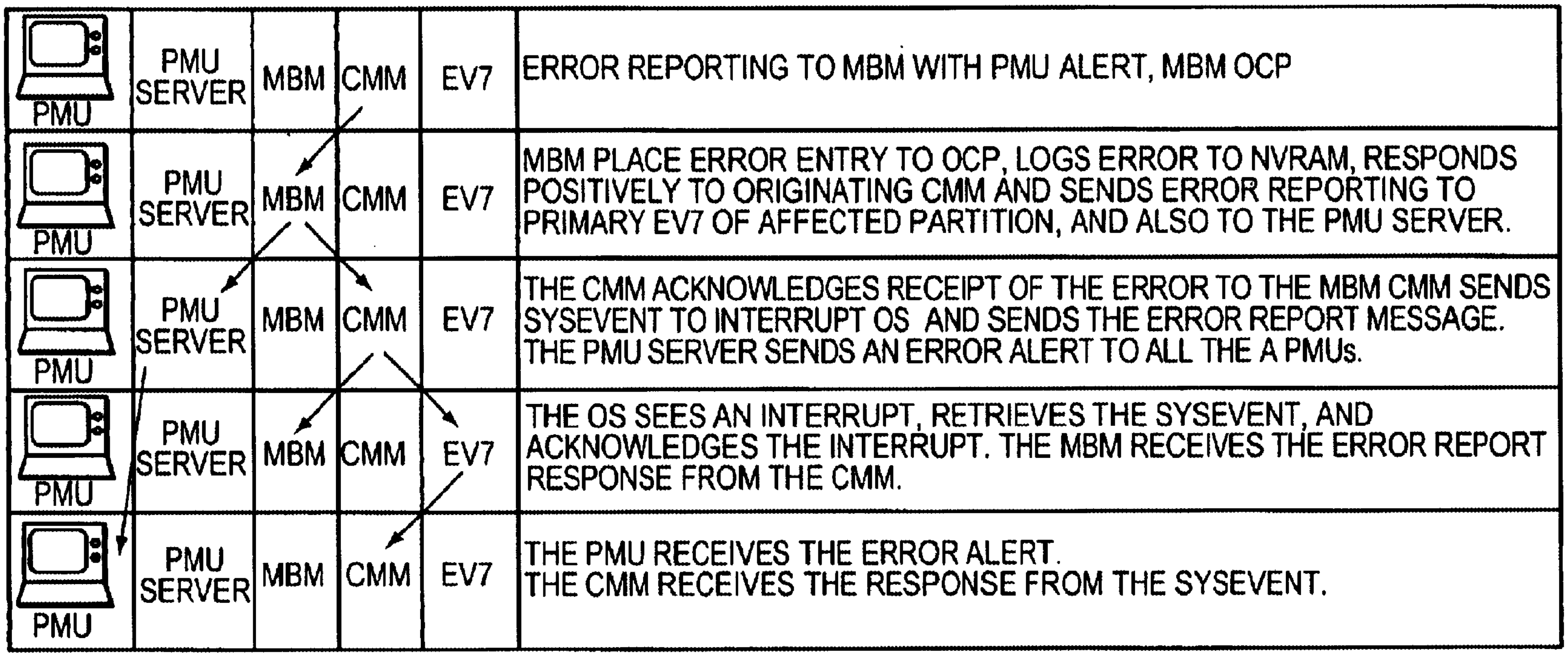
FIG. 72 is a diagram giving an Error Reporting Flow Diagram.

As an example, we can follow the actions in reporting an EV7 thermal overheat condition by a CMM through the flow diagram of FIG. 72.

FRU Analysis from the SM Subsystem

General Diagnostic Flow

The Partition coordinator is responsible for bringing a hard partition into an initialized state. This involves sequencing the hardware through power-on, diagnostics, and SRM firmware load.

Diagnostics are performed, (and FRUs potentially indicted), whenever a hard partition is completely re-initialized. This occurs initially at power-on, but can also occur upon the creation of a new hard partition or upon an operator reset request. Individual CPUs are also initialized and re-diagnosed, when they are hot added to a running partition. At several points in the initialization process, the possibility exists that a failing response (or timeout) will occur. When this does occur, the partition coordinator must make a decision on what hardware capabilities to disable (or simply not make use of).

In the case of diagnostics in which there is interaction between components, this may require collating the results from multiple CPUs, running through a decision tree, and forming a new result.

FRU Examples

A module, cable, or assembly that can be removed and replaced in the field is a FRU. In some cases, for the purpose of diagnosis and repair, additional detail is made available to help isolate the failing component.

FRU Indictment

When a failure occurs, a field replaceable unit (FRU) must be identified and replaced. A decision tree is used to collate errors from multiple sources concerning a FRU. Each test includes instructions on the FRU callout determination. This applies mainly to the tests which involve the interconnect between CPUs where a decision must be made whether to indict the EV7s or their interconnecting cables and etch.

Diagnostics include not only the SROM and XSROM EV7 tests, but also the power supply, fan, and cable test status determined by the MBMs. For instance, a PCI drawer that contains no working power supplies would be mapped out of operation. An 8P backplane in which the fan has failed would not be used as part of a partition.

FRUs that fail completely must be marked as failed in the list of available resources to configure.

For instance, router configuration must not try to configure the RBOX of an EV7 that has experienced a fatal error.

FRU Callout

Figure 73:
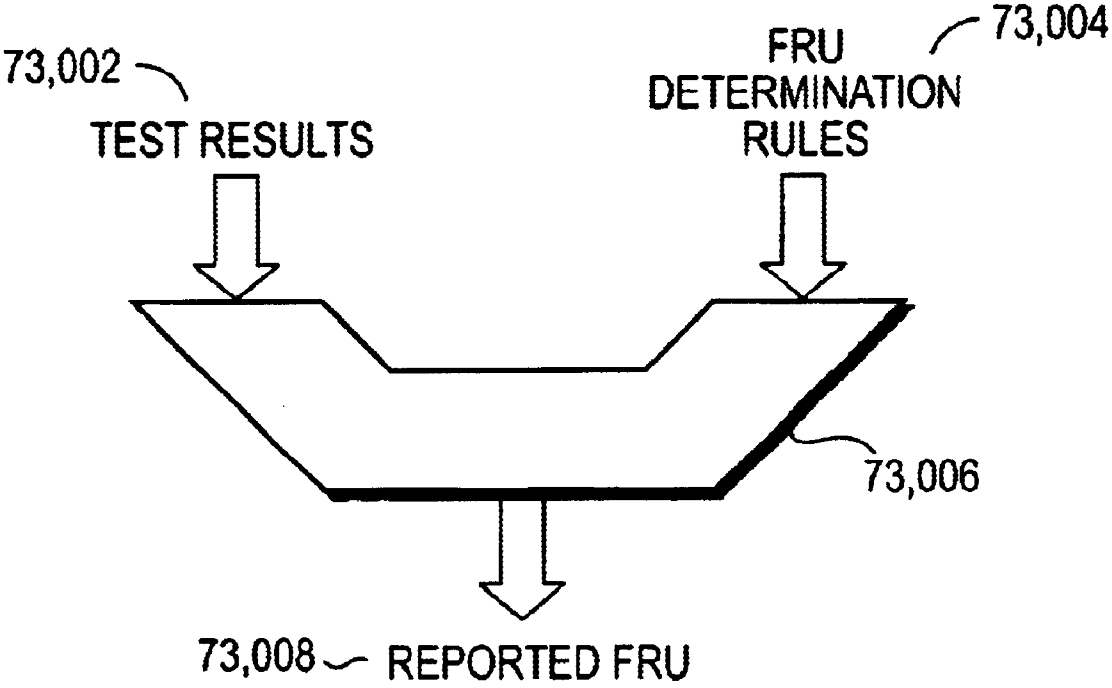
FIG. 73 is a flow diagram for logic and reporting status of a Field Replaceable Unit (FRU)

Referring now to FIG. 73, a block diagram of FRU logic is shown. Test results 73,002 are combined with "FRU DETERMINATION RULES" 73,004 by logic 73,006 to generate FRU Reports 73,008.

Upon completion of indictment the "Reported FRU" is then reported by the partition coordinator and logged using the Error Reporting packet. It is up to the PMU to display these errors as they are received. They should also be available to the operator by having the PMU interrogate the MBM/PBM error logs after POST has completed.

Partial Failure

In some cases, the partition coordinator will have to decide whether to make use of a FRU even when a test (or tests) have failed. In the case of interconnect failure, that link must not be used by the routing computation or enabled from either side. In the case of failing memory, a CPU may still be used without configuring the memory.

Unroutable Nodes

Due to the architecture of the EV7 router, the configuration of a partition which results from mapping the user's desired configuration onto the population of good CPU nodes may result in some nodes being unreachable by the router. The partition coordinator applies the appropriate heuristics (possibly as simple as forming the largest possible rectangle) in order to create a routable subset. This results in some good CPUs remaining unused by the initialized partition.

OCP Display Format

Assuming that the OCP has 20 columns and 4 rows, the layout in an exemplary embodiment of the invention for the display area depends on the state of the MBM 8P. FIG. 74 shows the display in table form. During the MBM initialization the format can be depicted as follows: Where, Overall Progress—can take on the values:
"MBM PowerOnSelfrest",
"MBM Initialization",
"MBM Group Formation",
"Server Management Ready"

Current State—takes on values of steps within the Overall Progress.

Location within state—takes on detailed values of the address or identifier within the current state.

Error Message—on failure, the message depicts the type of failure at the state and location identified.

Figure 75:
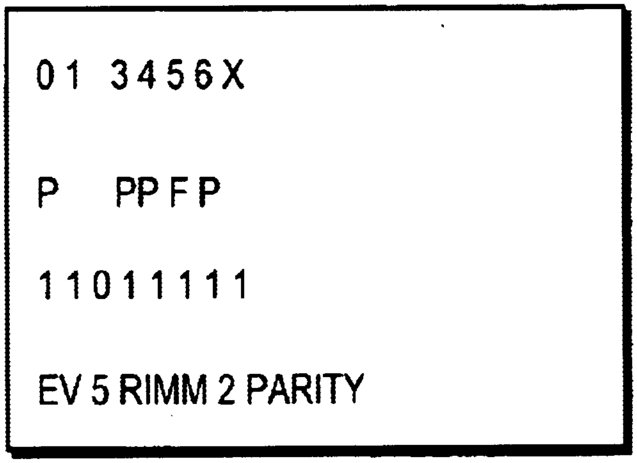
FIG. 75 is a table giving an OCP 8P Example.
Figure 76:
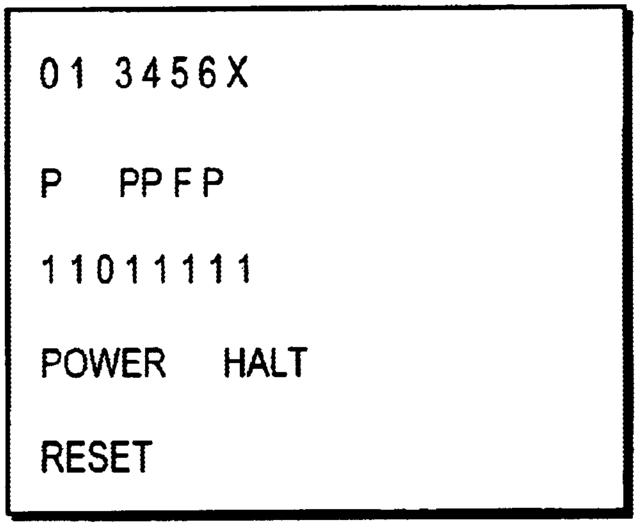
FIG. 76 is a table giving an OCP Button Label Example.

When the partition(s) that the 8P MBM has been assigned to are started, the OCP display takes on the format shown in FIG. 75.

Where the data on each line is as follows:

1. The 1st line, the CPU line, has a simple EV7 number of the location within the 8P when present, a blank when not present and an X when failed.
2. The $2^{nd}$ line, the memory line, is used to denote whether the memory test passed P or F failed.
3. The $3^{rd}$ line, the power line, is used to denote presence of power 1 or absence 0.
4. The $4^{th}$ line, the error message line otherwise contains indicators of the OCP switches located in the display as shown in FIG. 76.

The MBM firmware clears the error line when rechecking the state of the failing part.

OCP Switch Control

Figure 77:
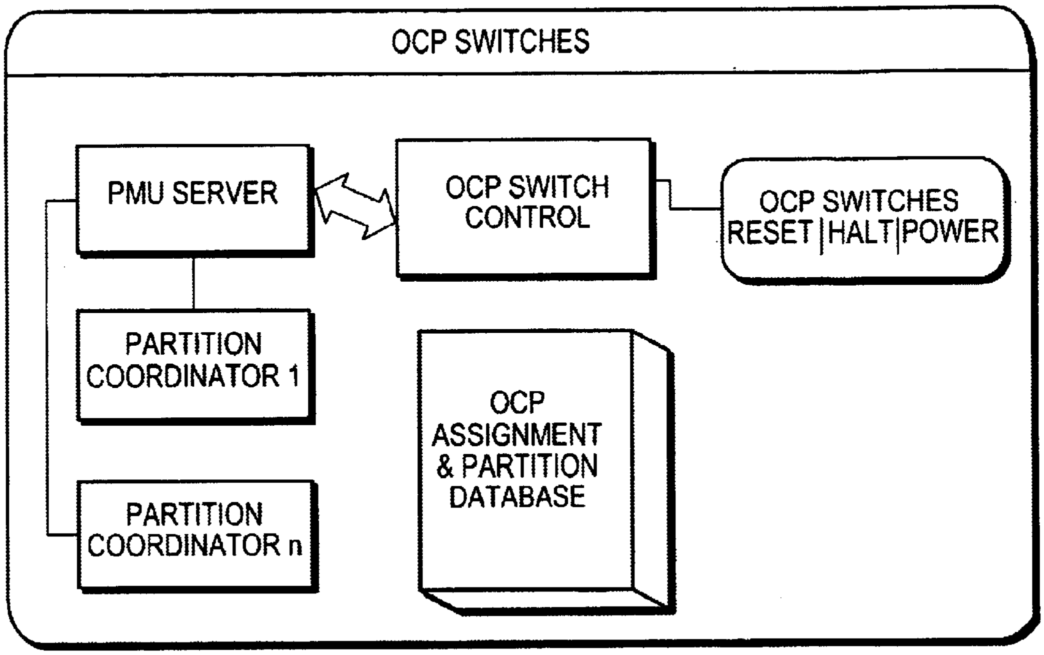
FIG. 77 is an OCP Switches Block Diagram.

When the MBM receives an OCP SWITCH ASSIGNMENT, it stores the value in its private copy of NVRAM, which is later used to determine the action to take when the switches are depressed. FIG. 77 shows a block diagram of an OCP switch process.

The MBM polls the switch status of its OCP buttons to determine if an operator has depressed the reset, power on/off or halt button. The current state of the OCP switches is maintained by the MBM for recall when a GET SWITCH STATE is requested. It is also used by the MBM to determine a change in the state of the switches. In this case, for EV7s physically located on this MBM, the MBM takes action himself; otherwise, the MBM sends a reset, power on, power off, halt enable or halt disable command to the PMU Server for either the entire system, or for the partition assigned to the OCP. A determination of which action to take depends on the current OCP assignment for the MBM.

Miscellaneous Command Handling

There is a group of commands that are bundled into "miscellaneous," and also a set that have not been covered above. The table of FIG. 78 describes the processing methods on these commands:

CLI Commands

A serial communications port is dedicated to the processing of a command line interface. Commands entered on this line are forwarded to the PMU Server and used to depict the configuration. This command line interface can only handle commands used to control the 2P Multiprocessor computer system Platform, which only has the ability to run a single hard partition. The commands available at this interface are shown in the table of FIG. 79A–D.

MODEM Operations

Modem Control on CLI Port

The Multiprocessor computer system 2P configuration makes use of the knob settings shown in the table of FIG. 80 to establish a modem to modem connection on the CLI serial port:

Reliability, Robustness, and Resilience

Failures in the SM subsystem can affect the Multiprocessor computer system. Once a partition is up and running, the role of an MBM is limited and probably not catastrophic. A partition that is not up and running might not start, depending on the configuration, with a failed MBM member. The impact of the different failures that could happen are described in this section.

MBM Failures

MBM Failures on an Idle Partition

The effects of an MBM failure in an idle partition vary depending on the configuration. If there is only one MBM in the partition's configuration, the partition is not capable of being started. If there is more than one MBM in the partition, that suggests that EV7s behind each of the MBMs are in the partition. Therefore, if one of the MBMs fails, the partition may be able to start in a degraded configuration without the resources behind the failed MBM.

MBM Failure Effects on the CMM in a Running Partition

Although important, many of the services of the MBM to the CMMs are not critical to a stable, running partition. The effects of an MBM failure to its CMM children are described in the table of FIG. 81.

LAN Failures and Split Group Actions

The PMU Server will not allow any cabling requests, destroy partition or actions on all partitions when the system is in a split state. The Partition Coordinator, when starting up after a new group is formed, determines if some of his members (EV7s and IO7s) are no longer available but were in the previous group. The requests that he accepts depend on the following Boolean conditions:

1. The Partition is running SRM or OS
2. Complete set of EV7s for the partition can be found in the group and perhaps only IO7s are incomplete
3. Whether the partition coordinator is contained in a minority or a majority group.

The table of FIG. 82 indicates the conditions when the Partition Coordinator can accept/reject the partition related commands. (T=True; X=Don't care)

Discovery/Membership/Groups

MBMs and PBMs need to know about each other's existence. Some activities are restricted on degraded systems.

Reconciliation Concepts

When MBMs and PBMs form a group, they exchange their copies of the replicated databases. These databases may be inconsistent. The methods for arriving at a common replicated database among all the MBMs/PBMs are called reconciliation methods.

Database reconciliation methods.

Case

Initial Power-on into a majority group MaxPrevMajorityGroup=(0,0)

Merge Algorithm

All members load their database from NVRAM

The Leader obtains all database copies and compares, looking for a majority of copies that match. If there is no consensus, then the default values are used. The result is sent to all members via the first train of this group.

Case

Majority Group Formation with MaxPrevMajorityGroup≠(0,0)

Merge Algorithm

Retrieve db, PrevMajorityGroup, and the update list from each member whose PrevMajorityGroup matches the MaxPrevMajorityGroup. Use the copy with the longest update list as the initial state. The result is sent to all members via the first train of this group.

Case

Minority Group Formation with MaxPrevMajorityGroup≠(0,0)

Merge Algorithm

The db and updates are held. The train does not run. Access to the db (read or write) is blocked.

Important properties of the two phase train protocol:

1. The initiator of an update can only consider the update successful when it sees the train come around the first time. That means that all members have a copy of the unstable update. Thus, any resulting majority group will commit that update upon reconfiguring.
2. Updates initiated by members of the majority group are applied at most once by all members.

Database Structures

The database information is shared by all MBM/PBM participants and contains a set of structures required to indicate the current operational state of a subset or the entire Multiprocessor computer system. Some database entries are maintained in a volatile form, others non-volatile and most in both forms. The reliable train messages are often used to communicate changes to the database copies of all members. The table of FIGS. 83A and B indicates operations that cause modifications to databases maintained in RAM or NVRAM and the affected structures.

Turning to FIG. 84A and FIG. 84B, tables showing the structure of the database 84,000 is shown.

Components of the data base replicated system wide are maintained in flash memory, as shown in tables 84,002, 84,004 and 84,006, and 84,008. Table 84,002 gives the "Non-Volatile Partition Database". In table 84,002 the column "N/S" (or North-South) and the columns "E/W" (East-West) contain the mesh coordinates of the EV7 processors. These coordinates are assigned to the EV7 processors by the thumbwheels on each rack. These N/S and E/W values are the coordinates of the EV7 processors, and are the "key" to the database. The column "Hard" gives the partition number to which the EV7 processor is assigned by the human operator, and the value ranges from 0 to 255. The column "Sub" gives the subpartition to which the EV7 processor is assigned by the human operator. Table 84,002 is "Dense", or densely populated in that only entries for user defined EV7 processors are in the table.

Table 84,004 gives data on the microprocessor set. The column labeled "Rack" gives the rack number as read from thumbwheel settings, with the range of 0–32, as 32 racks may be assembled into a multiprocessor system. Each rack may hold from 0 to 8 EV7 processors. The column labeled "Box" gives the box number of the IO boxes in the rack, and are set on the thumbwheels.

Table 84,006 gives the SRM environmental variables "SRM ENV VARs" arranged according to subpartitions. Collection of the SRM environmental variable information is given in FIG. 67 and the accompanying disclosure.

Table 84,008 gives the delta time "Delta Time" arranged according to subpartition. Delta time is described with reference to FIG. 63 showing a process for obtaining a new "base time", and in the accompanying discussion. Delta time is further discussed in the section entitled "Virtual TOY Clock".

Table 84,020 gives the database entries maintained in RAM memory by the MBMs and PBMs. Columns labeled N/S and E/W give the EV7 processor identifications, as also given in table 84,002. The columns identify the EV7 processor described by the horizontal entry in the table. The column headed "Hard" gives the hard partition to which the EV7 is assigned. The column "Sub" gives the subpartition to which the EV7 is assigned. The column labeled "Primary" states whether or not the EV7 is assigned as "primary" processor in its partition or subpartition (Y) or is not assigned as primary (N).

Cable connections of the EV7 are given in the entries headed "Cable Connections". The entries under "N" give the (x,y) coordinates of the EV7 connected to the processors North port. The column headed "S" gives the (x,y) coordinates of the EV7 connected to the processors South port. The column headed "E" gives the coordinates (x,y) of the EV7 connected to the processors East port. The column headed "W" gives the EV7 coordinates (x,y) connected to the processors West port. The column headed "I" gives the thumbwheel setting of the processor. The column headed "PID" gives the identification number of the processor, and ranges from 0–255. A cable connection value of "−1" indicates that the cable is disconnected. This table is dense, meaning that only the user defined EV7 processors are entered into the table.

Table 84,030 gives routing information to each processor for one EV7 processor in one hard partition. Table 84,030 gives the route through RBOXs for each processor in the multiprocessor computer system to reach every other processor by a message. A copy of the data shown in table 84,030 is generated for each EV7 in a hard partition, and contains an entry to all other EV7s in the hard partition. Table 84,030 is divided into a section for each EV7 processor, as indicated by (x,y) which give the processor's coordinates within the mesh. The processors identification (PID) is given as the Logical PID. The Logical PID identifies the processor entry, and gives the correspondence between the (x,y) entry giving the location of a processor within the mesh and the Logical PID. The processor identification is then followed by a route to each EV7 processor which it can reach in its partition. The route to each processor is made up of components such as: #1 RBOX_ROUTE, #2 RBOX_ROUTE, etc.

Each MBM handles up to eight (8) EV7 processors, and each EV7 may be in a different partition. Accordingly, each MBM may be required to maintain routing information for eight (8) partitions. The routing information maintained in table 84,030 is maintained in MBM RAM memory, and is regarded as temporary, or short lived information because a route between EV7 processors can change as a RBOX fails, a cable is disconnected, a new rack is hot swapped into the computer system, etc.

Table 84,040 maintains the status of each EV7 processor controlled by the MBM in question. Each MBM unit controls up to eight (8) EV7 processors, and so there may be up to eight entries in table 84,040. Table 84,040 is maintained by each MBM, and in an exemplary embodiment of the invention, is replicated throughout the MBMs of the partitions in which the EV7 processors are assigned.

Table 84,050 maintains information on "Base Time" of the multiprocessor computer system. The time base is the date, including day, month, year, hour, minutes, and seconds. This date information is maintained much like the time in any industry standard time of day chip.

The PBM

Figure 85:
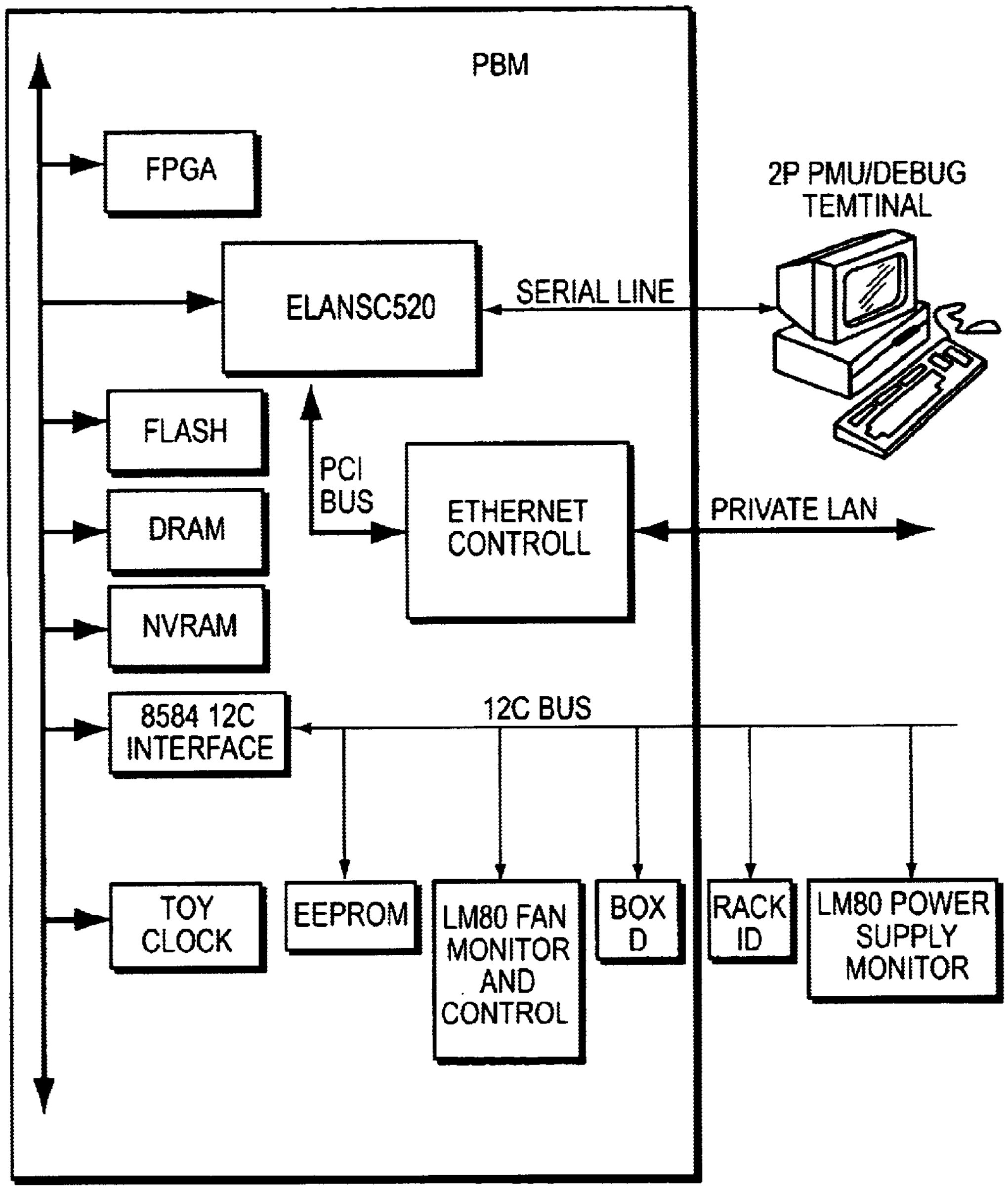
FIG. 85 is a block diagram of PBM Hardware.

The PBM hardware shown in FIG. 85 and software is much like that of the MBM. It does not have the quad uart. The PBM firmware block diagram shown in FIG. 86 is similar to the MBM firmware.

Figure 86:
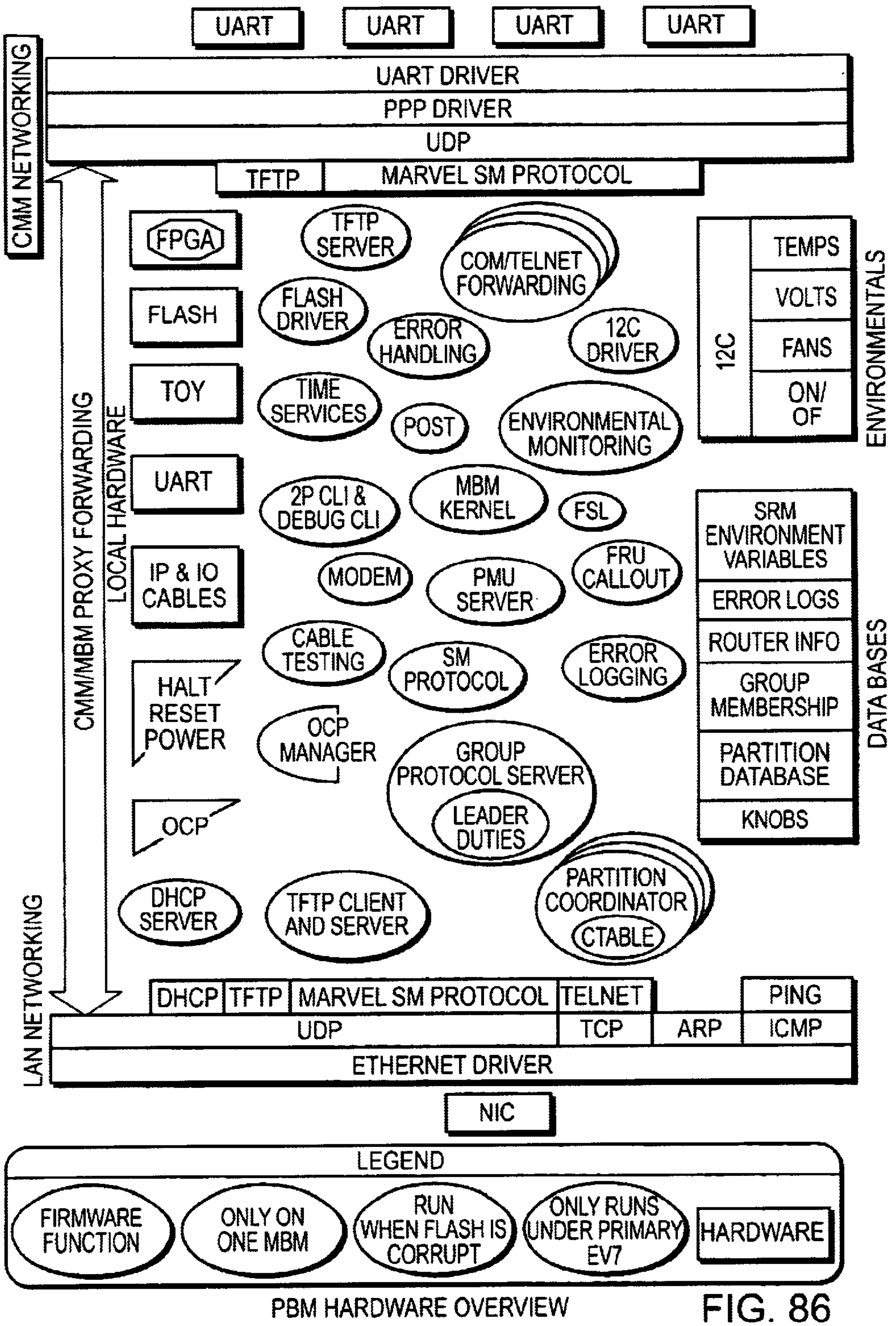
FIG. 86 is an Overview of PBM processes.

The firmware overview of FIG. 86 is the same as the MBM figure, except for the addition of an FPGA. Also the dark hashed areas indicate MBM functionality that does not exist on the PBM. The PBM has the same data bases as the MBM, it has the same group participation, the same capabilities to the partition coordinator, DHCP server, etc . . .

The services that an MBM provides to a CMM are listed as follows:

Proxy Forwarding
CMM presence watchdog
TFTP Server
Error repository & distribution
Power hierarchy
Time Services
Virtual Console Terminal
SRM Env. Var. Repository The PBM does not have to do proxy forwarding, CMM watchdog, TFTP Server a PPP connection, store errors for a CMM, provide a time, or a virtual console, and there is no power hierarchy. The PBM is involved with SRM environment variables, since those variables are stored in the replicated non-volatile data base.

Although the PBM has an OCP, the OCP capability circle is reduced. The OCP functionality of a PBM refers to a power on/off switch and some LEDs.

FPGA Setup

The FPGA must be written with FPGA firmware, by the PBM. The PBM cannot load the firmware while the IO7 is active. The PBM only loads the FPGA firmware as part of a POWER ON command. Loading a test version of the FPGA firmware is not allowed. All IO7s must run the same FPGA code.

Set PCI Slot Information

The PBM does not have access to the IO busses. In order to help the PMU display information about the IO devices, the operating system probes the IO busses and provides this information to the SM subsystem. The operating system issues an SM protocol packet, SET PCI SLOT INFORMATION, with IO bus information. The packet destination is the PBM where the IO devices reside. The data is stored in the PBMs ram and can be retrieved by the PMU with a GET PCI SLOT INFORMATION.

Error Messages and Actions

The table of FIG. 87 gives an embodiment of the messages and actions to be taken in reporting failures. It includes a series of fields that define the actions and additional localizing data that is stored in the error log.

Private LAN message routes and message formats are given in FIGS. 88-110.

Figure 88:
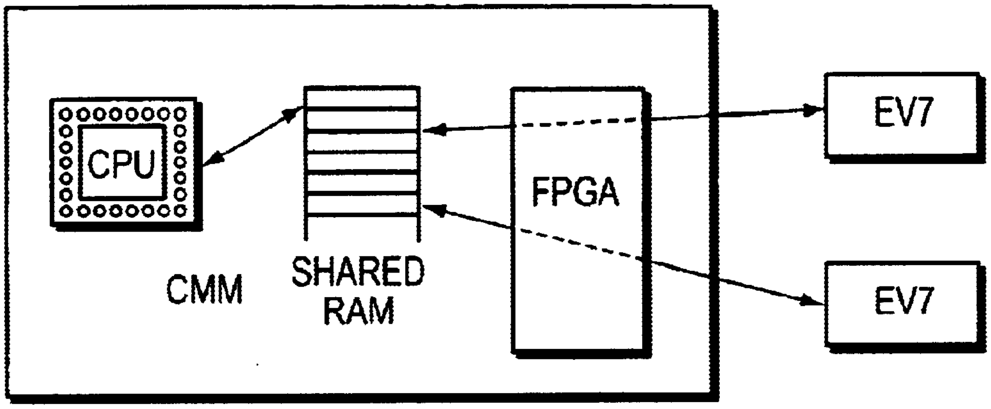
FIG. 88 is a block diagram of a shared RAM communication.

As shown in FIG. 88, network packets are passed between the EV7 and CMM via data buffer rings stored in CMM RAM. This allows a CMM to obtain requests from an application running on an EV7 and transfer responses to an EV7 from the MBM. The operating system can use this method directly. SM LAN packets transferred via these command rings do not contain IP/UDP headers. The CMM firmware will add/remove IP headers if these packets need to traverse the LAN.

Figure 89:
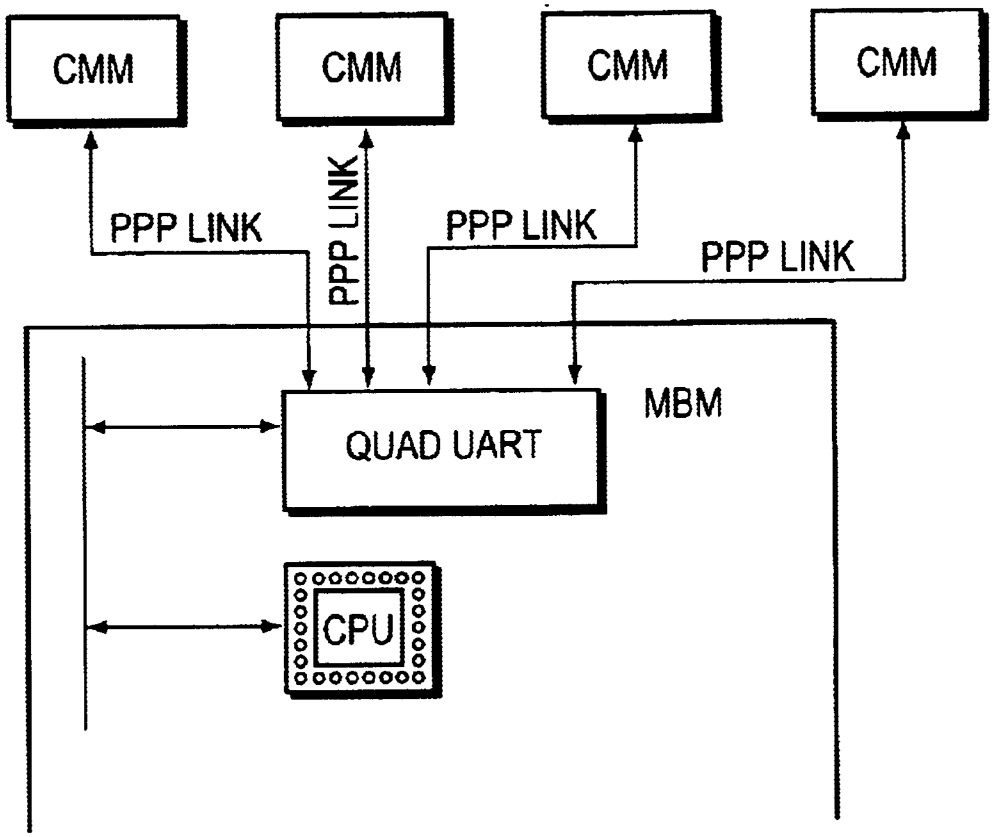
FIG. 89 is a block diagram of an MBM to CMM communication.

As illustrated in FIG. 89, the first serial port on the CMM is used to communicate with the point to point serial port on the MBM at approximately 384,000 baud. The PPP protocol (RFC 1661) is used to transfer IP packets between the two microprocessors. The CMM implements a minimal PPP/IP/UDP stack in order to accomplish this.

Figure 90:
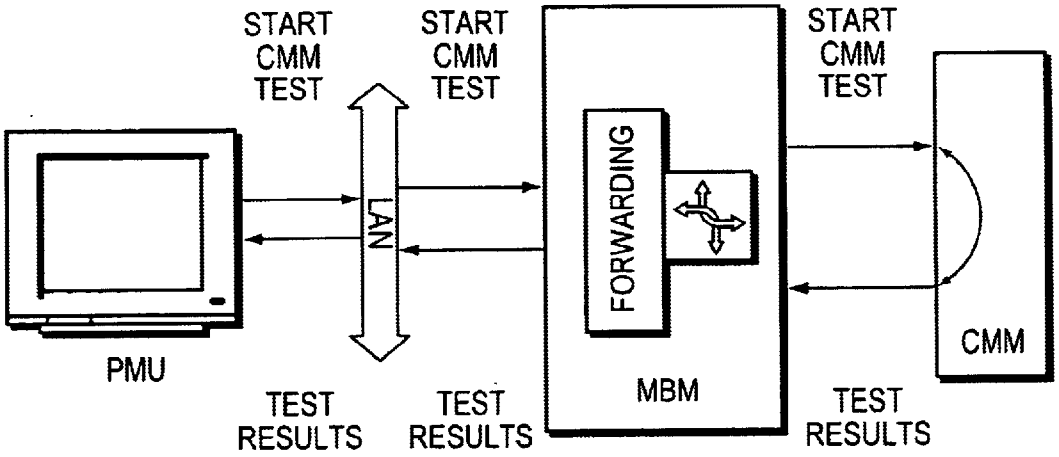
FIG. 90 is a block diagram of an example of MBM forwarding.

As illustrated in FIG. 90, the CMM and EV7s all get IP address assignments according to the addressing scheme described in paragraph 3.5 IP Addressing. The MBM must respond to all requests on the LAN made to any of it's own CMMs and EV7s and forward any requests to the appropriate CMM. This is done via two methods. The CMMs appear visible on the LAN via proxy ARP (RFCs 925 & 1027). EV7s are visible from the LAN via the MBM aliasing the EV7's IP address on its own Ethernet interface. The vxWorks ifAddrAdd function is used to install an IP address for each destination EV7 on the MBMs network interface.

Requests made from the EV7 side for another MBM will be forwarded directly to the member in question. The CMM forwards any SM LAN packets that it receives from the EV7, (that are not destined for itself), to the MBM.

Figure 91:
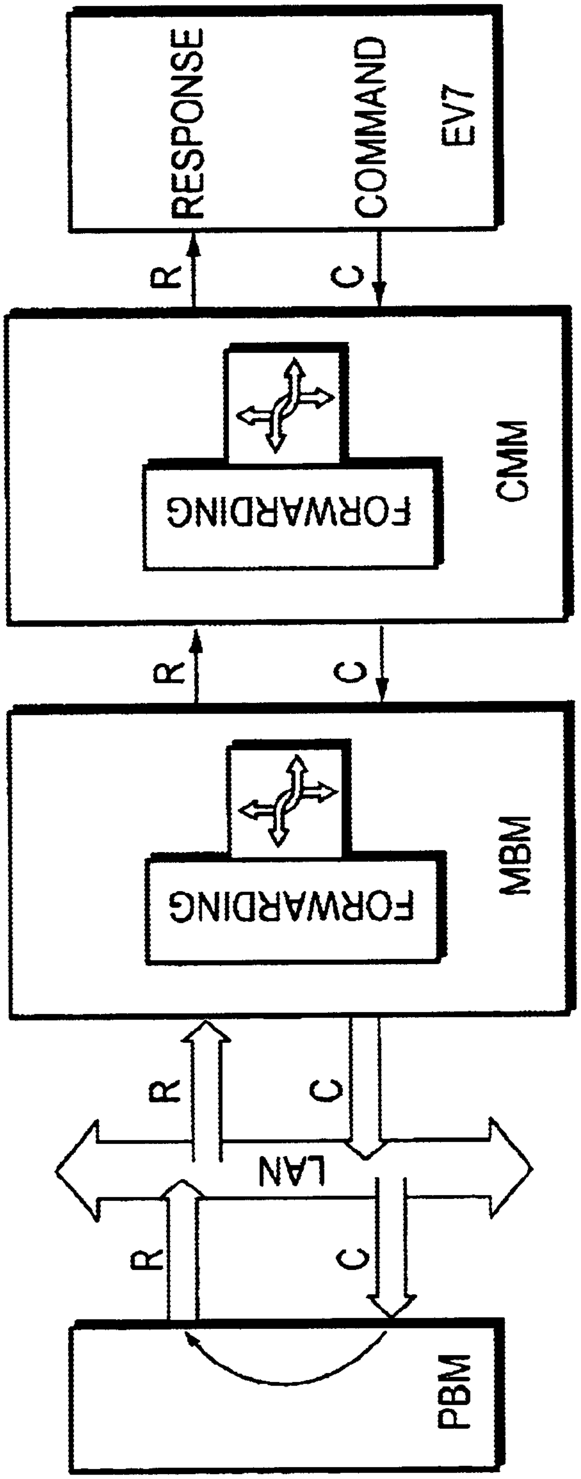
FIG. 91 is a block diagram of an example of CMM forwarding.

As illustrated in FIG. 91, the CMM participates in the forwarding of requests from the EV7 to the MBM who handles the processing of the request and passes the response back to the CMM for forwarding to the EV7. For example, an APP running under UNIX may want to probe for the temperature reading in its IO box. The flow is depicted in FIG. 91.

Figure 92:
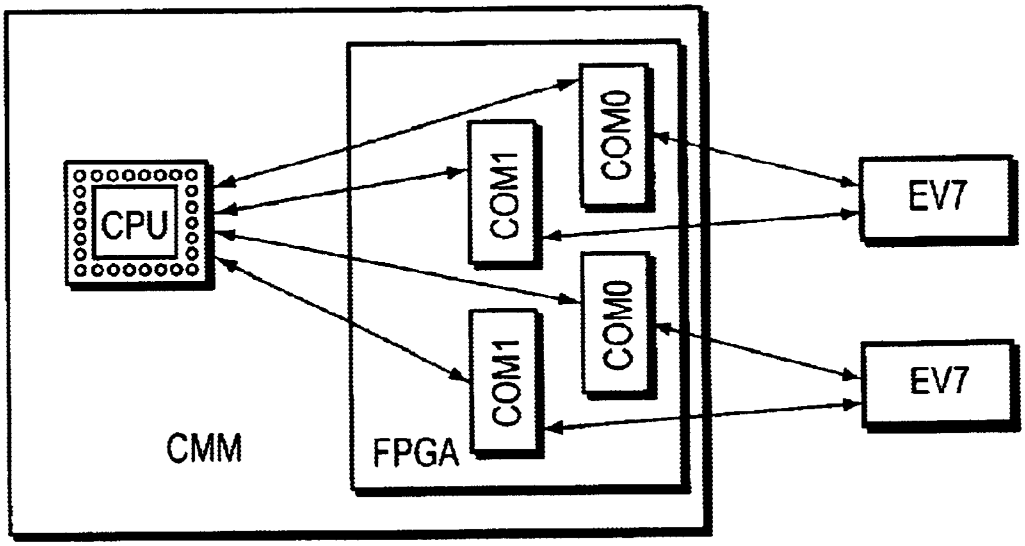
FIG. 92 is a CMM COM port connection.

As illustrated in FIG. 92, in general, the FPGA registers used for EV7 to CMM serial communication consist of: eight (8) single byte data registers for both transmit and receive on all four (4) virtual ports; and, two (2) control status registers—one (1) for each of the two (2) EV7s with bits indicating which data registers are full and if interrupts are enabled. The control status register also contains bits to indicate if interrupts occurred to the CMM from the EV7 and to request an EV7 interrupt from the CMM.

Figure 93:
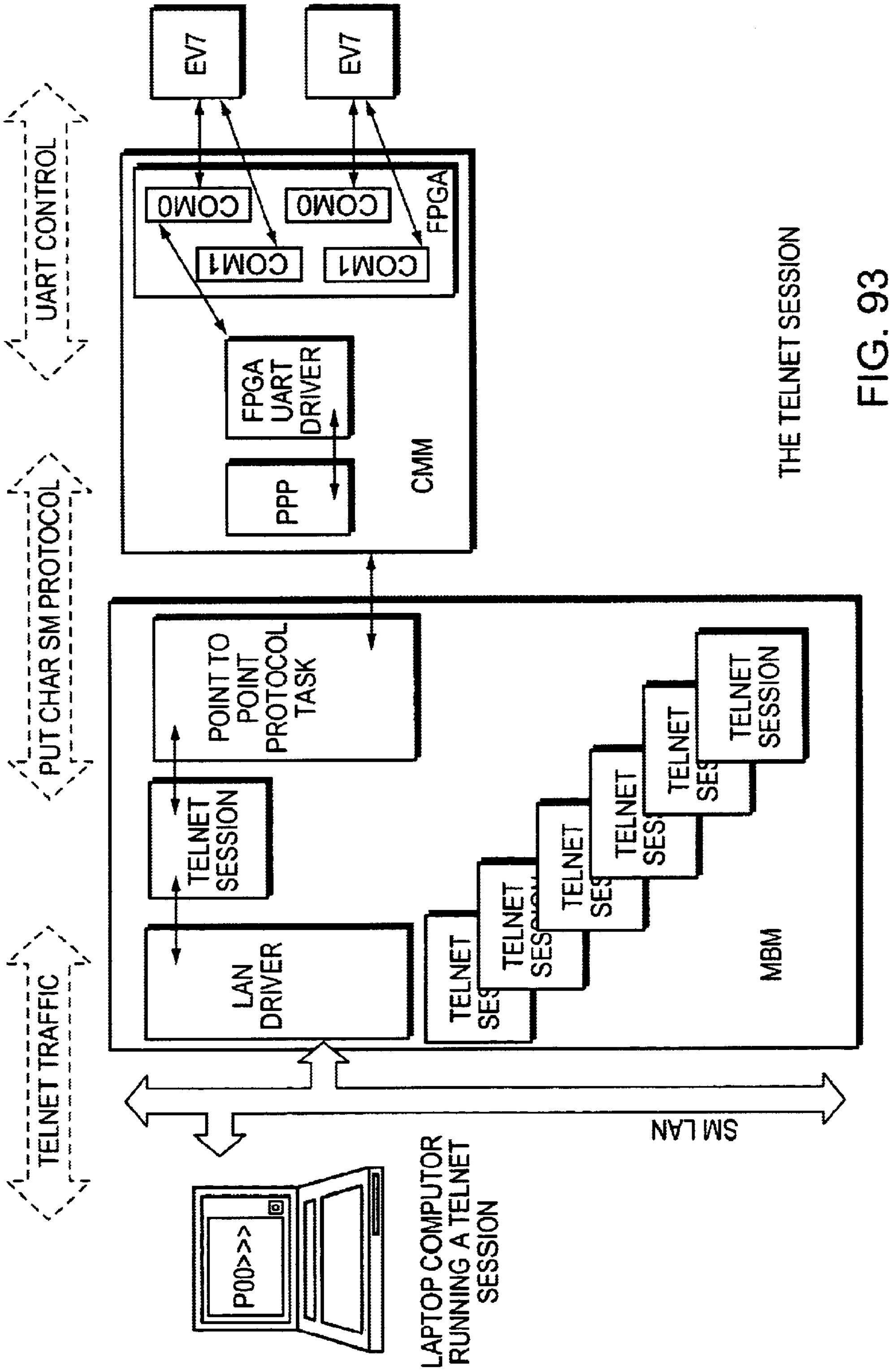
FIG. 93 is a block diagram of a Telnet session.

As is illustrated in FIG. 93, The EV7 that is designated as the primary for the partition uses the virtual COM ports to forward console characters to and from the MBM. This allows for a serial console pass through to a remote telnet connection running at the MBM. The PMU running a telnet session, on the SM LAN, connects to telnet session server on the MBM. There can be a telnet session for each COMx port that is being accessed.

The user types a character at the PMU telnet window. The character travels over the SM LAN to the telnet session on the MBM. This telnet session server envelops the character in a PUT_CHAR protocol packet and passes it to the serial protocol driver task. The serial driver passes the packet to the CMM serial driver. The CMM serial driver strips off the envelope and writes the character to the COMx port.

As is illustrated in FIG. 94 and FIG. 95, messages passing through the Server Management Subsystem have a common header format identifying a command request and its associated response. Packets are encapsulated using UDP. For the most part any request expects to have a corresponding response; however, some Command Requests may require use of a broadcast, which only applies to those members that are found on the Server Management Subsystem's private LAN.

The common header on all messages contains the originator and destination of the request/response, a sequence number, a command code and the actual data contents. In the case of a response the top order bit of the command code is set and a positive or negative error reply immediately follows this command code. The length field will not exceed a predetermined maximum size and for cases where it is necessary to move data beyond that length a series of related command codes affords such movement at the application level.

Turning now to FIG. 94, the common Request message format is shown. Turning now to FIG. 95, the common Response message format is shown. Terms used in the message formats have the following meanings.

Originator—The IP address, associated with the requester of the data. If the requester is an OS application, the MBM places the IP address for the EV7 from which the request arrived. MBMs, PBMs and PMUs have pre-assigned IP addresses for the LAN. CMMs and EV7s have fixed IP addresses even though they are not on the LAN, but the MBM that they are attached to shall respond and forward requests for them.

Destination—The IP address of the target expected to respond to the command. In the case that a broadcast is used the destination field contains the special naming convention: broadcast 255.255.255.255. Broadcast destination addresses are only meant for those entities on the Server Management Subsystem private LAN. Another special naming convention is used when an OS application wants to address the closest MBM, the address 0.0.0.1 is used.

Identifier—a reserved space used by the application to match requests with responses.

Command Code—consists of a request response bit, a group identifier and a request identifier.

The bit breakdown of this byte is defined as follows: bit 15, 0-request, 1-response; bit 14–8, message group identifier; and, bit 7–0. request identifier.

Messages on the LAN are sent via UDP packets using one of the sockets listed below: UDP port No. 710, Group messages; UDP port No. 711, SM LAN Command/Response Traffic; UDP port No. 712, Atomic Update Messages; and, UDP port No. 323–335, Virtual Console traffic, assigned by GET TELNET IP ADDRESS PORT request.

Result Code—0—no error; else refer to list of errors given in FIG. 87.

Data Content—The values depend on the command in use.

Group Messages are the messages used to form or maintain the group communication protocol. These messages include those that are broadcast to all microprocessors directly connected to the LAN.

SM LAN Command/Response Traffic, is any of the commands or responses described in the succeeding chapters. These are the "action" commands of the SM LAN.

Atomic Update Messages are those that are used to perform guaranteed communication and/or replicated database updates through the train protocol.

Virtual Console traffic is the communication that implements the MBM to CMM link.

Referring now to FIG. 96, the train header is used on messages that are performing operations and/or updates on all group members in a guaranteed, ordered fashion. The general algorithm for the train protocol is described. The first train message is "injected" onto the LAN by the leader upon successful group formation. The train message begins with a Command Code of "empty". When a member wishes to initiate a command or update for all members, it waits to receive the empty train. Before sending the train message to the next member, it changes the command code to "full" and appends the command packet. When the message is received by the initiator a second time, it changes the command code to "empty" and removes the command packet from the message.

Format:

Originator IP Address—should be 0—special case for a train message.

Destination Node—should be ffffffffh—special case for a train message.

Identifier—should be the GroupID—allows matching to detect a left over train message from a previous group.

Command Code—xxxx=train empty, yyyy=train full. Indicates if there is a valid SM LAN message appended.

SM LAN message—optional appended message to be executed by all nodes.

Train messages are MBM or PBM member to member commands/updates only. They can not be initiated or received by the PMU, CMMs, or EV7s. They are internal to the SM LAN and any usage by external utilities is prohibited.

Any SM LAN message can be sent via the train. However, not all messages are sent via train mechanism.

SM LAN messages sent via train messages are not replied to. Successful travel around the ring of members twice implies success of the command/update. Messages that are not guaranteed to succeed should not be sent via this mechanism, but should be sent via a unicast method from the leader (or other originating node).

Referring now to FIGS. 97-110, message type groups are given, along with the name of the messages in each group.

FIG. 97 gives the messages in the LAN Formation Group. The LAN formation group of messages is used to implement the group communications protocol. This set of messages is only implemented by the MBM and PBM microprocessors.

FIG. 98 gives the Reliable message group. These messages define the messages for the train protocol.

FIG. 99 gives the system discovery group of messages. These messages derive the LAN components configuration and current state.

FIG. 100 gives the Partition Control group of messages. This group of messages has commands that effect changes in the state or configuration of partitions, including migration of EV7 processors, power on/off, and halt CPU.

FIG. 101 gives the EV7 Setup group of messages. This group of messages consists of commands to manipulate the EV7, aid in the manual configuration of IO7 cabling, and the EV7 CPU assignment for the IO7 subsystems.

FIG. 102 gives the Cable Test group of messages. The Multiprocessor computer system contains test signals in each cable linking pairs of EV7 routing axes around the external 8P connections. The 6 IP cables link EV7s for routing purposes and the 8 IO cables link the single EV7 to IO7 risers on PBMs. The signals light and extinguish LED pairs and may be asserted and/or read by MBMs or PBMs at each end of the cable. This command is directed at an MBM or PBM to modify the state of the cable test signals controlled by that entity.

FIG. 103 gives the Virtual Console group of messages. When the application requests a virtual console window, a telnet session is established between the requester and the MBM associated with the primary EV7 for the partition. Until the session is closed, all keystrokes and console output data are passed between MBM, CMM and the primary EV7 of that partition and handed over to the telnet session. Each primary EV7 has 2 virtual COM Port connections. Obtain the proper session by making a GET TELNET IP ADDRESS/PORT request. Opening a telnet session should cause the last 2k of buffered output from the virtual console to be displayed.

FIG. 104 gives the Firmware Load and Upgrade group of messages. Firmware for SROM, XSROM, FPGA, Memory Test, CMM, SRM, MBM and PBM are stored in the CMM, MBM or PBM Flash area. These commands facilitate the upgrading, loading and testing of Firmware for the Multiprocessor computer system Server Management subsystem.

The Trivial File Transfer Protocol (TFTP) is used to transfer flash image "files" throughout the Server Management LAN. These files are actually segments of the flash ROMs on each of the MBM, PBM, and CMM modules. The MBMs implement a simple TFTP server to provide images that are requested by the CMM. The PMU contains a TFTP server to provide Fail Safe Loader (FSL) images to MBMs, PBMs or CMMs that request them.

FIG. 105 gives the Environmental Retrieval group of messages. Application requests are made to the Server Management Subsystem to obtain dynamically changing data and states.

FIG. 106 gives the Field Replaceable Unit (FRU) group of messages. Serialization and other manufacturing data are stored in EEROMs on several Server Management Subsystem controlled components. Application programs use these requests to retrieve and set field values in these EEROMs.

FIG. 107 gives the error logging group of messages. Error logging takes on several forms. Some error information is maintained in the EEROM of the device itself (power supplies and RIMMS); some is reported on the OCP and some errors are logged to the NVRAM of the MBM, PBM or CMM that have the offending error. Errors can also be reported to the PMU and OS Application in the form of an alert.

FIG. 108 gives OS Watch Dog Timer group of messages. An OS Application can make a request to start a Keep Alive Watchdog. The MBM receiving this request expects to receive a keep alive message within the application indicated time frame or take the action(s) indicated in the start message. Before an OS shuts down, the Stop Watchdog Timer request is made.

FIG. 109 gives Date/Time group of messages. The Server Management LAN provides a time service that is used to provide the Alpha SRM BB_WATCH functionality. This takes the form of a Base Time that is shared by all microprocessors and maintained in a battery backed up watch chip, and a Delta Time that is maintained on a partition basis. The commands in this section are used to get and set the Base and Delta Time values.

FIG. 110 gives the Miscellaneous group of messages. These commands provide various utility functions.

It is to be understood that the above described embodiments are simply illustrative of the principles of the invention. Various other modifications and changes may be made by those skilled in the art which embody the principles of the invention and fall within the spirit and scope thereof.

What is claimed is:

1. A multiprocessor computer system having a plurality of processors interconnected so that they can share memory, comprising:

a plurality of links, each link of said plurality of links connecting a processor to another processor;

a router box (RBOX) associated with each processor of said plurality of processors, said RBOX arranged to forward a message received on an input link of said plurality of links from a source processor to an outgoing link of said plurality of links toward a destination processor in response to data carried in said message;

a plurality of microprocessors, each of said microprocessors having a microprocessor memory associated therewith, a selected microprocessor of said plurality of microprocessor associated with at least one processor of said plurality of processors, said plurality of microprocessors arranged to control said plurality of processors, said control including applying electric power to a selected processor and removing electric power from said selected processor;

a data structure stored in microprocessor memory, said data structure storing a representation of the links connecting said processors and storing routes used by said RBOX in routing messages along said links, a copy of said data structure stored in microprocessor memory of each of said microprocessors; and, a process to update said data structure in each said microprocessor memory in the event that a change occurs in a status of a component of said multiprocessor computer system.

2. The multiprocessor computer system of claim 1 further comprising:

a process executing in said microprocessors for directing said microprocessors in formation of a partition of said processors, said partition having a selected number of said processors as members, said members capable of reading and writing a common memory within said partition, and other non-member processors excluded from reading and writing said common memory; and, a second data structure for storing a representation of said partitions, and storing routes through said links for transfer of messages between processors within a partition but not between processors of different partitions.

3. The multiprocessor computer system of claim 2 wherein the microprocessors are interconnected through a local area network, the system further comprising:

a management computer communicating through said local area network with said microprocessors, said management computer having an input device for entering commands to said plurality of microprocessors to modify said second data structure in order to establish the processors belonging to a partition, said multiprocessor computer system supporting a plurality of said partitions; and a process responsive to said second data structure, said process executing in said microprocessors to establish that a processor in a partition can read and write memory associated with other processors of said partition, but cannot read and write memory associated with processors which are not members of said partition.

4. The multiprocessor computer system of claim 1 wherein the microprocessors are interconnected through a local area network, the system further comprising:

an input/output (IO) subsystem associated with at least one processor of said plurality of processors;

an IO microprocessor associated with each said IO subsystem, said IO microprocessor communicating with said microprocessors through said local area network, each said IO microprocessor having an IO microprocessor memory holding a copy of said second data structure;

a process executing in said IO microprocessor, said process responsive to said second data structure said process to apply power or remove power to said IO subsystem.

5. The multiprocessor computer system of claim 1 further comprising:

a boot-up process executing in microprocessors of said plurality of microprocessors, said boot-up process to start execution of said processors of said multiprocessor system, and said multiprocessor system capable of continuing operation, after start of execution of said processors, to permit removal of a microprocessor from the multiprocessor system without interrupting execution of said processors.

6. A method for operating a multiprocessor computer system, comprising:

connecting a plurality of processors so that they can share memory, a processor of said plurality of processors connected to another processor by at least one link of a plurality of links;

associating a router box (RBOX) with each processor of said plurality of processors, said RBOX arranged to forward a message received on an input link of said plurality of links from a source processor to an outgoing link of said plurality of links toward a destination processor in response to data carried in said message;

interconnecting a plurality of microprocessors, each of said microprocessors having a microprocessor memory associated therewith, a selected microprocessor of said plurality of microprocessors associated with at least one processor of said plurality of processors, said plurality of microprocessors arranged to control said plurality of processors, said control including applying electric power to a selected processor and removing electric power from said selected processor;

storing a data structure in microprocessor memory, said data structure storing a representation of the links connecting said processors and storing routes used by said RBOX in routing messages along said links, a copy of said data structure stored in microprocessor memory of each of said microprocessors; and, updating said data structure in each said microprocessor memory in the event that a change occurs in a status of a component of said multiprocessor computer system.

7. The method of claim 6, further comprising:

executing a process in said microprocessors for directing said microprocessors in formation of a partition of said processors, said partition having a selected number of said processors as members, said members capable of reading and writing a common memory within said partition, and other non-member processors excluded from reading and writing said common memory; and, storing in a second data structure a representation of said partitions, and storing routes in said second data structure through said links, said routes for transfer of messages between processors within a partition but not between processors of different partitions.

8. The method of claim 6, further comprising:

establishing communication between a management computer and said microprocessors through said local area network, said management computer having an input device for entering commands to said plurality of microprocessors to modify said second data structure in order to establish the processors belonging to a partition, said multiprocessor computer system supporting a plurality of said partitions;

establishing, in response to said second data structure, that a processor in a partition can read and write memory associated with other processors of said partition, but cannot read and write memory associated with processors which are not members of said partition.

9. The method of claim 6, further comprising:

associating an input/output (IO) subsystem with selected processors of said plurality of processors;

associating an IO microprocessor with each said IO subsystem, said IO microprocessor communicating with said microprocessors through said local area network, each said IO microprocessor having an IO microprocessor memory holding a copy of said second data structure;

executing a process in said IO microprocessor, said process responsive to said second data structure, said process to apply power or remove power to said IO subsystem.

10. The method as in claim 6, further comprising:

executing a boot-up process in microprocessors of said plurality of microprocessors, said boot-up process to start execution of said processors of said multiprocessor system, and said multiprocessor system capable of continuing operation, after start of execution of said processors, to permit removal of a microprocessor from the multiprocessor system without interrupting execution of said processors.

* * * * *

UNITED STATES PATENT AND TRADEMARK OFFICE

CERTIFICATE OF CORRECTION

PATENT NO. : 6,973,517 B1 
APPLICATION NO. : 09/652458
DATED : December 6, 2005
INVENTOR(S) : David Golden et al.

It is certified that error appears in the above-identified patent and that said Letters Patent is hereby corrected as shown below:

In column 18, line 54, delete “usename” and insert -- username --, therefor.

In column 27, line 49, delete “A1” and insert -- 1 --, therefor.

In column 28, line 10, delete “19,014” and insert -- 19,044 --, therefor.

In column 49, line 13, delete “PowerOnSelfrest” and insert -- PowerOnSelfTest --, therefor.

In column 58, line 6, in Claim 1, delete “microprocessor” and insert -- microprocessors --, therefor.

Signed and Sealed this

Fourteenth Day of July, 2009

JOHN DOLL
*Acting Director of the United States Patent and Trademark Office*